(12) United States Patent
Tsuda et al.

(10) Patent No.: US 7,286,108 B2
(45) Date of Patent: Oct. 23, 2007

(54) DISPLAY DEVICE, METHOD OF DRIVING SAME AND ELECTRONIC DEVICE MOUNTING SAME

(75) Inventors: Kazuhiko Tsuda, Ikoma-gun (JP); Masahiro Shimizu, Tenri (JP); Hisakazu Nakamura, Yamatokoriyama (JP); Kouji Kumada, Tenri (JP); Takashige Ohta, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 704 days.

(21) Appl. No.: 10/846,180

(22) Filed: May 14, 2004

(65) Prior Publication Data

US 2005/0140632 A1    Jun. 30, 2005

Related U.S. Application Data

(62) Division of application No. 09/856,926, filed as application No. PCT/JP01/03543 on Apr. 24, 2001.

(30) Foreign Application Priority Data

| Apr. 28, 2000 | (JP) | 2000-131183 |
| Apr. 28, 2000 | (JP) | 2000-131251 |
| Oct. 5, 2000 | (JP) | 2000-306761 |
| Mar. 1, 2001 | (JP) | 2001-57398 |
| Mar. 28, 2001 | (JP) | 2001-94034 |

(51) Int. Cl.
*G09G 3/36* (2006.01)
*G02F 1/1368* (2006.01)

(52) U.S. Cl. ............ 345/92; 345/87; 345/94; 345/95; 345/99; 345/38; 345/46; 345/47; 345/52; 345/138

(58) Field of Classification Search .......... 345/87–100; 349/38, 46, 47, 52, 138

See application file for complete search history.

(56) References Cited

U.S. PATENT DOCUMENTS

| 5,223,824 | A | | 6/1993 | Takeda et al. |
| 5,899,548 | A | * | 5/1999 | Ishiguro ............... 349/47 |
| 5,933,202 | A | * | 8/1999 | Watanabe et al. ......... 345/94 |
| 6,538,630 | B1 | | 3/2003 | Tanaka et al. |

FOREIGN PATENT DOCUMENTS

JP    59-036227    2/1984

(Continued)

*Primary Examiner*—David L. Lewis
(74) *Attorney, Agent, or Firm*—William J. Daley, Jr.; David G. Conlin; Edwards Angell Palmer & Dodge LLP

(57) ABSTRACT

A liquid crystal panel (2) includes scanning signal lines (31) for supplying scanning signals to gate electrodes (20) of TFTs (14), and data signal lines (32) for supplying data signals to data electrodes (24) of TFTs. The liquid crystal panel further includes auxiliary capacitive electrode pads (27a) for use in forming auxiliary capacitance and an auxiliary capacitive lines (33) so as not to generate a capacitive bond with the scanning signal lines. The liquid crystal panel is driven at a rewriting frequency of a screen of not more than 30 Hz. As a result, the liquid crystal panel can be driven at a low consumption power while maintaining a desirable display quality of the liquid crystal panel.

25 Claims, 58 Drawing Sheets

FOREIGN PATENT DOCUMENTS

| | | |
|---|---|---|
| JP | 62-221281 | 9/1987 |
| JP | 02-064693 | 3/1990 |
| JP | 02-131219 | 5/1990 |
| JP | 02-210492 | 8/1990 |
| JP | 03-219287 | 9/1991 |
| JP | 05-100226 | 4/1993 |
| JP | 07-199152 | 8/1995 |
| JP | 07-306397 | 11/1995 |
| JP | 08-122813 | 5/1996 |
| JP | 08-286170 | 11/1996 |
| JP | 09-243996 | 9/1997 |
| JP | 11-003063 | 1/1999 |
| KR | 1999-0078257 | 10/1999 |
| WO | WO-00/20920 | 4/2000 |

\* cited by examiner

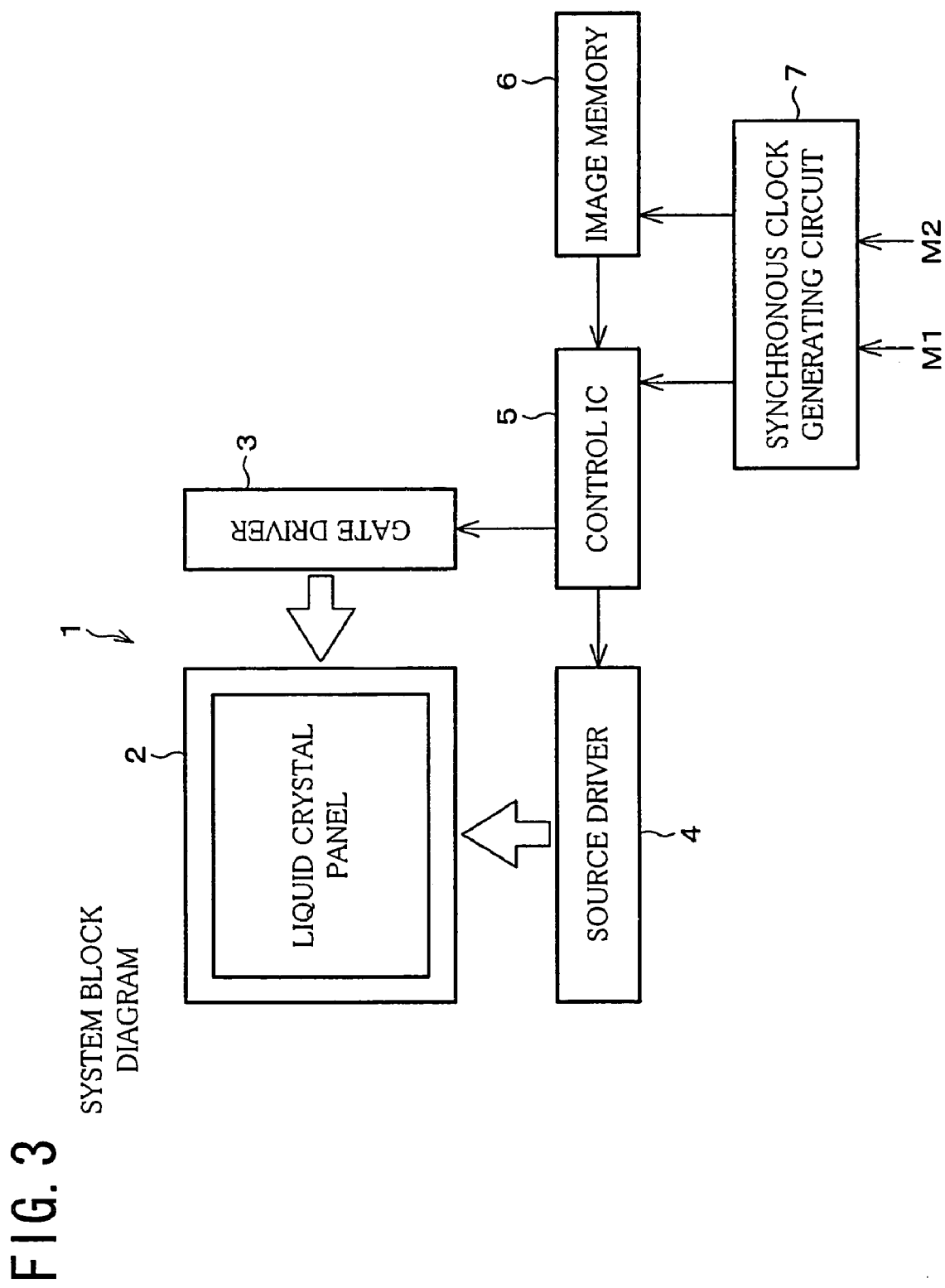
FIG. 3    SYSTEM BLOCK DIAGRAM

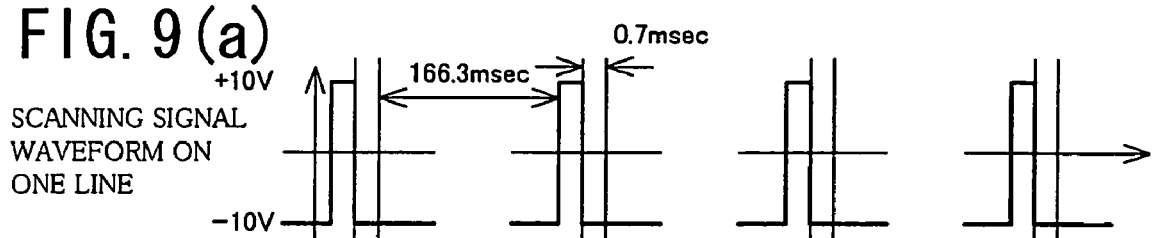
FIG. 9(a) SCANNING SIGNAL WAVEFORM ON ONE LINE
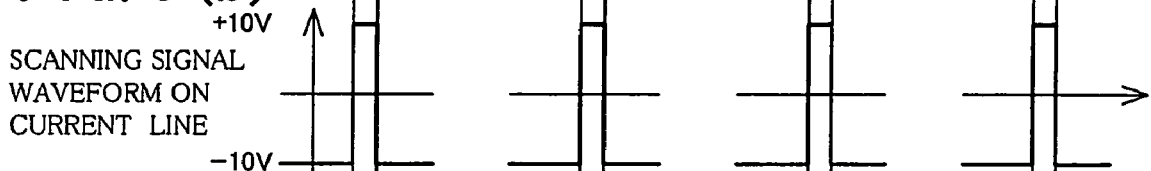
FIG. 9(b) SCANNING SIGNAL WAVEFORM ON CURRENT LINE
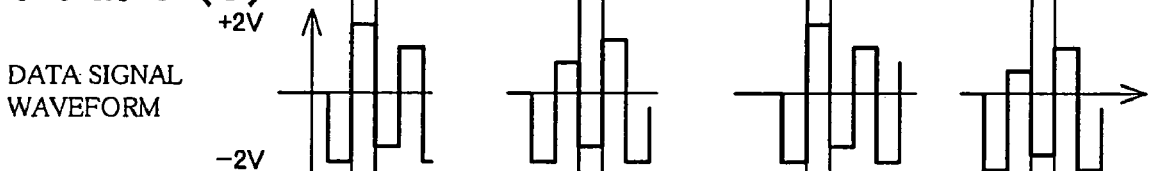
FIG. 9(c) DATA SIGNAL WAVEFORM
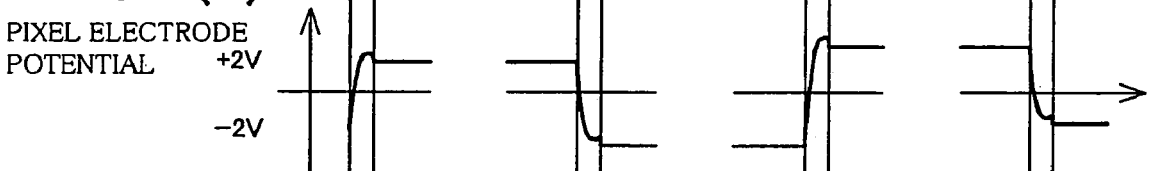
FIG. 9(d) PIXEL ELECTRODE POTENTIAL
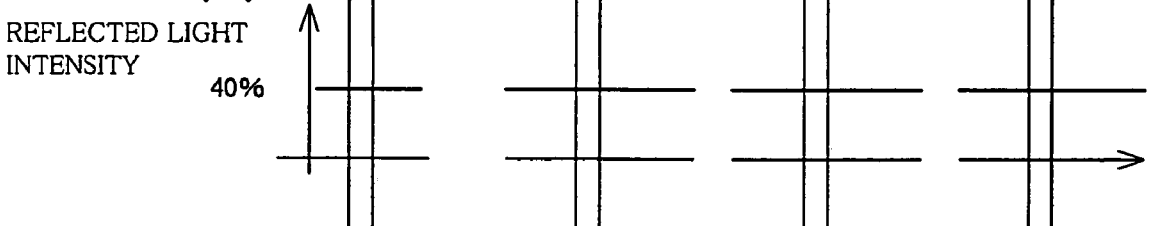
FIG. 9(e) REFLECTED LIGHT INTENSITY

SCANNING SIGNAL WAVEFORM ON ONE LINE

SCANNING SIGNAL WAVEFORM ON CURRENT LINE

DATA SIGNAL WAVEFORM

PIXEL ELECTRODE POTENTIAL

REFLECTED LIGHT INTENSITY

FIG. 38(a)
+10V
SCANNING SIGNAL
WAVEFORM ON
PREVIOUS LINE
−10V
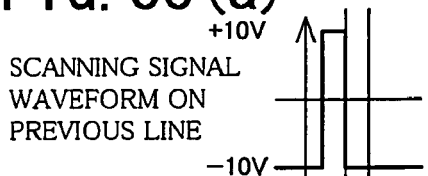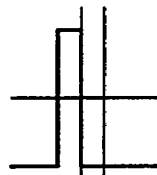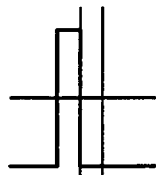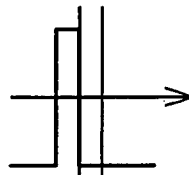
FIG. 38(b)
+10V
SCANNING SIGNAL
WAVEFORM ON
CURRENT LINE
−10V
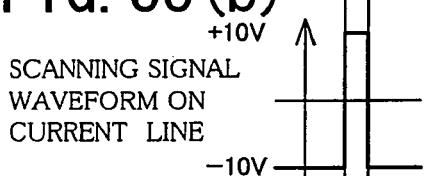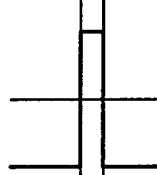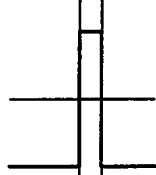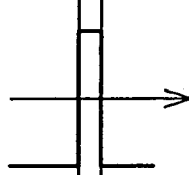
FIG. 38(c)
+2V
DATA SIGNAL
WAVEFORM
−2V
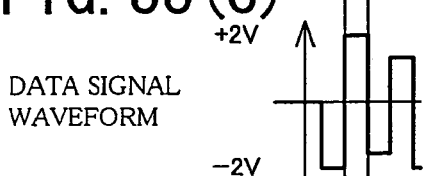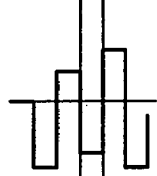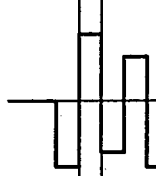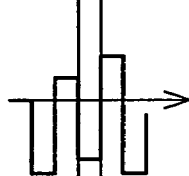
FIG. 38(d)
PIXEL ELECTRODE
POTENTIAL    +2V
−2V
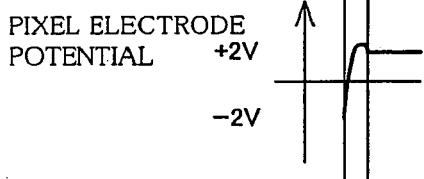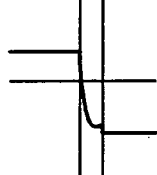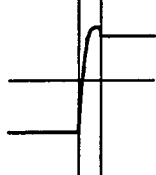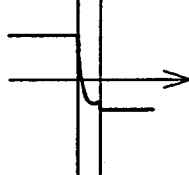
FIG. 38(e)
REFLECTED LIGHT
INTENSITY
            40%
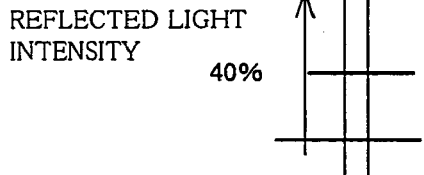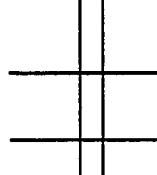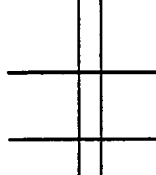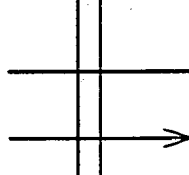

FIG. 40 (a)
SCANNING SIGNAL WAVEFORM ON PREVIOUS LINE
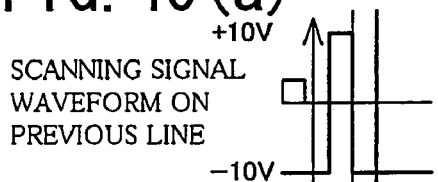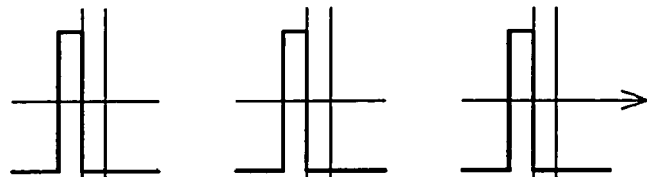
FIG. 40 (b)
SCANNING SIGNAL WAVEFORM ON CURRENT LINE
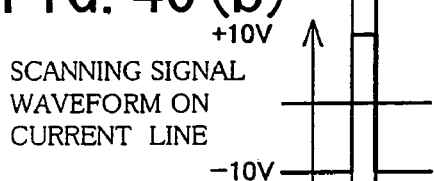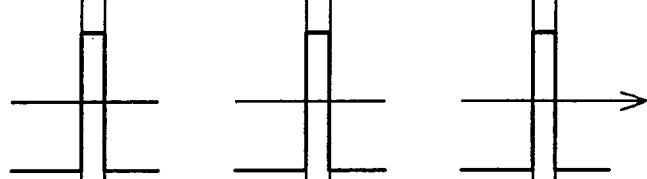
FIG. 40 (c)
DATA SIGNAL WAVEFORM
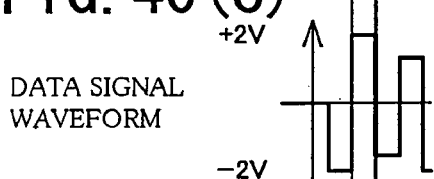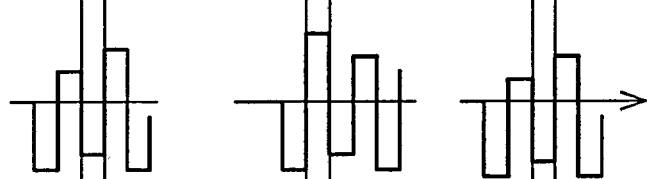
FIG. 40 (d)
PIXEL ELECTRODE POTENTIAL
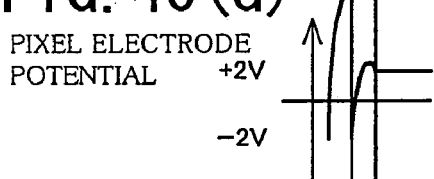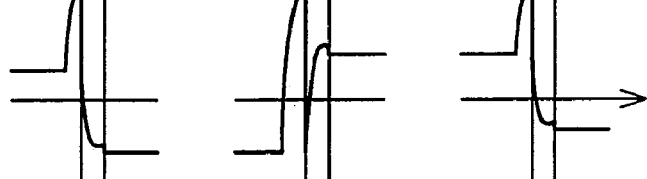
FIG. 40 (e)
REFLECTED LIGHT INTENSITY
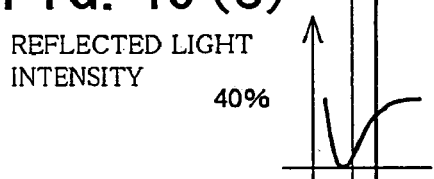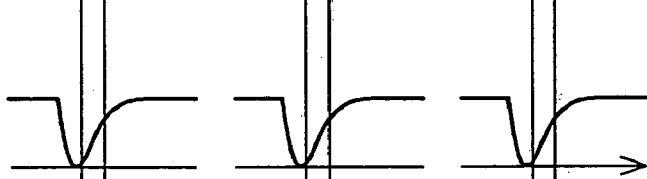

FIG. 43

| | SOURCE DRIVER | | | |
|---|---|---|---|---|
| | S(0) | S(1) | S(2) | S(3) |
| G(0) | (0, 0) | (1, 0) | (2, 0) | (3, 0) |
| G(1) | (0, 1) | (1, 1) | (2, 1) | (3, 1) |
| G(2) | (0, 2) | (1, 2) | (2, 2) | (3, 2) |
| G(3) | (0, 3) | (1, 3) | (2, 3) | (3, 3) |

GATE DRIVER

DISPLAY DEVICE, METHOD OF DRIVING SAME AND ELECTRONIC DEVICE MOUNTING SAME

This application is a divisional of co-pending U.S. application Ser. No. 09/856,926, filed May 29, 2001, which was a National Stage Filing of PCT Application No. PCT/JP01/03543, filed Apr. 24, 20001, the teachings of all being incorporated herein by reference.

TECHNICAL FIELD

The present invention relates to techniques which realize a display device of reduced power consumption.

BACKGROUND OF THE INVENTION

Recent years have seen a rapid increase in demands for liquid crystal devices in various applications such as word processors, lap-top personal computers, pocket televisions. Particularly, reflective-type liquid crystal device, which displays by reflecting an incident light from the exterior, has been viewed with interest for their beneficial features as to small-power consumption, thinness, and light weight as achieved by eliminating the need of backlight.

Conventional reflective-type liquid crystal devices can be classified into the following three systems: the segment display system, the simple-multiplex driving system, and the active-matrix driving system. In the segment display system, only simple numerals or pictographs for use in, for example, clocks, etc., can be displayed. In the simple-matrix driving system, a complex display can be realized, for use in, for example, personal computers, portable information terminals, etc. In the active-matrix driving system, a display is performed by using active elements such as TFTs (thin film transistors). In any of the foregoing systems, it is preferable to achieve a reduction in power consumption.

In response, Japanese Laid-Open Patent Publication No. 232447/1993 (Tokukaihei 5-232447, published on Sep. 10, 1993) discloses a power consumption reducing technique for the segment display system, wherein in the stand-by state, i.e., in the non-display state of totally white display or totally black display, common electrodes and segment electrodes are set so as to have the same potential, so that the totally white display or the totally black display can be realized under stable conditions. Japanese Laid-Open Patent Publication No. 210492/1990 (Tokukaihei 2-210492, published on Aug. 21, 1990) discloses a technique for reducing power consumption of a driving circuit by setting the impedance of the MOS-type transistor, which directly drives liquid crystals in the stand-by state, in the high impedance state.

The foregoing power consumption reducing techniques are preferable for the segment display type liquid crystal display devices, and figurative performances are therefore limited to the display of simple numerals or pictographs. It is therefore not possible to apply the foregoing techniques to the display devices which deal with complicated information, such as personal computers, portable information terminals, etc.

It is also difficult of apply the foregoing driving method to the matrix-type liquid crystal display devices. Specifically, in the case of 4×4 matrix-type liquid crystal display device as illustrated in FIG. 43, scanning signals to be supplied to scanning signal lines G(0) through G(3) are as illustrated in FIG. 44, and selective voltage is sequentially applied to scanning signal lines G(0) through G(3). At an instant when the scanning line for a certain line is selected in the foregoing manner, data signals are supplied to data signal lines S(0) through S(3) in synchronous with scanning signals, thereby writing charges corresponding to data in respective pixels. Upon completing the scanning of the last line, as illustrated in FIG. 45, after a short period of vertical fly-back time, a scanning operation is started again from the first line.

This vertical fly-back time is initially set to allow electron beams from an electron gun stored in the CRT to return to its original position, and in this regard, such vertical fly-back time is totally unnecessary for the liquid crystal display device. However, in liquid crystal display devices designed for reproducing normal television video images, the vertical fly-back time is set to ensure the compatibility with TV video signals such as NTSC.

As described, for the matrix-type liquid crystal display, it is required to sequentially drive a plurality of pixels in data signal lines arranged in a vertical direction of the screen, and there is no data signal output for driving only one particular pixel corresponding to the segment output of the segment display system. Therefore, even if the data signal line and the counter electrode of a pixel are set in the high impedance state using the drive method of the segment display system after writing charges to pixels in the last line, the charges as written are not held for other pixels than the pixels in the last line. It is therefore not possible to ensure a stable display.

For the matrix-type liquid crystal display of a simple multiplex driving system, although a power consumption is relatively small, for example, in the range of from 10 mW to 15 mW for the size of type 2, the problems arise in basic display performances, such as insufficient brightness, contrast, response speed. In contrast, for the matrix-type liquid crystal display of active driving system adopting TFTs, etc., although sufficient basic display quality can be ensured as to brightness, contrast, response speed, etc., the power consumption within the range of from 100 mW to 150 mW is required for the size type 2 it, and it is not possible to achieve a reduction in power consumption to the satisfactory level.

Specifically, for the liquid crystal display device having liquid crystal display elements of active-matrix type adopting the active element, in order to obtain desirable dynamic display, the rewriting frequency which determines the frequency for writing fluctuations in respective pixels, i.e., the rewriting frequency of one screen is generally set to 60 Hz. In the display device of active driving system, rewriting of screen is performed at such high frequency (60 Hz) for the following reason. That is, when performing an impulse type display for displaying one screen utilizing the residual effect of human eyes using a luminescent material which instantaneously flashes light, it is required to rewrite a screen at high speed even when displaying a static image.

In the liquid crystal display device of the active matrix display system, not only that the rewriting is performed at high frequency, but also that the voltage polarity of the data signal is reversed per one scanning signal line, resulting in an increase in power consumption of a scanning signal driver and a data signal driver.

The applicant of the present application performed an experiment of rewriting at a low frequency, i.e., at or below 30 Hz with respect to the liquid crystal device of the Cs-on-gate structure to reduce the power consumption of the liquid crystal display device. As a result, flicker noise occurred. As can be seen from the result of the experiment, it was found that when merely reducing the rewriting frequency in the Cs-on-gate structure to reduce the low power consumption, deterioration of display quality cannot be avoided.

In response, earnest researches have been made to achieve a reduction in power consumption to the sufficient level and a desirable display quality.

For example, Japanese Laid-Open Utility Model Publication No. 50573/1985 (Jitsukaisho 60-50573, published on Apr. 9, 1985) and Japanese Laid-Open Patent Publication No. 10489/1998 (Tokukaihei 10-10489, published on Jan. 16, 1998) disclose the method which realizes reduction in power consumption. These methods are focussed on the method of transmitting a television signal, and reduction in power consumption is realized by stopping the operation of a peripheral driving circuit in the vertical fly-back time, utilizing the feature that the data does not exist in the vertical fly-back period.

Japanese Laid-Open Patent Publication No. 107563/1997 (Tokukaihei 9-107563, published on Apr. 22, 1997) discloses a power consumption reducing technique for the head-mount type display for use in field sequential cubic image display having two liquid crystal panels corresponding to both eyes, wherein the two liquid crystal panels are alternatively driven for each field by not driving one while driving the other.

Further, SID 95 DIGEST pp 249 to 252 and Japanese Laid-Open Patent Publication No. 271795/1991 (Tokukaihei 3-271795, published on Dec. 3, 1991) proposes the multi-field driving method as the method of reducing the power consumption of the TFT liquid crystal driver. In this method, a scanning operation of one screen is divided into several times by scanning the scanning signal lines in one screen by every other line or every other plural lines, and the polarity of the voltage of the data signal line is not reversed while scanning one time. Furthermore, fluctuations in brightness generating each line, flicker noise are cancelled out by the adjoining lines of opposite polarities, and as a whole, a display which is free from flicker noise is realized.

For example, Japanese Laid-Open Patent Publication No. 342148/1994 (Tokukaihei 6-342148), published on Dec. 13, 1994 discloses the method of reducing power consumption by reducing driving frequency (refresh rate) while ensuring memory by adopting ferroelectric liquid crystal to the liquid crystal panel.

However, when stopping the operation of the peripheral driving circuit in the vertical fly-back period, as disclosed also in Japanese Laid-Open Utility Model Publication No. 50573/1985, the vertical fly-back period occupies only 8 percent of the total field period, and the expected reduction in power consumption within this period is only 5 percent.

According to the method of Japanese Laid-Open Patent Publication No. 107563/1997, throughout the field period, any of liquid crystal panels is driven, and the required power consumption may not be increased but cannot be reduced. Furthermore, by adopting the head mount type display for both eyes, either one of the displays is always refreshed, and image without much flicker can be realized. However, for the liquid crystal display device, a display without flicker can be obtained when driving at a frequency of 30 Hz, particularly at above 45 Hz. When applying this method to the system for directly seeing the liquid crystal panel, flicker noise is liable to be perceptible.

Furthermore, flicker noise generates every line even when multi-field driving, and therefore flicker noise is recognized even when the flicker noise is cancelled out between adjoining lines, which leads to a significant deterioration in visibility. Furthermore, an expected reduction in driving frequency is very small, and a sufficient reduction in power consumption cannot be achieved. In the multi-field driving system, one screen is divided into a plurality of sub fields, and scanning is performed very other lines or every other plural lines, and therefore, it is required to read out signals corresponding to the scanning signal line to be driven after once storing the image in the frame memory, and therefore the structure of the circuit inevitably complicated. As a result, the peripheral circuit becomes larger in size, and a manufacturing cost increases.

Furthermore, according to the method disclosed in Japanese Laid-Open Patent Publication No. 342148/1994 (Tokukaihei 6-342148), a ferroelectric liquid crystal is basically for the binary value (black-and-white), and a gradation display cannot be achieved, and a natural display cannot be achieved. Furthermore, in order to arrange ferroelectric liquid crystals in a panel, an advanced technique is required for preparing panels, and thus it is difficult to adopt it in practical applications. Therefore, the foregoing method has not yet being used in practical applications.

In the method of driving a conventional matrix-type display device, it was not possible to realize a reduction in power consumption while ensuring basic display characteristics such as brightness, contrast, response speed, gradation, etc. Furthermore, in the conventional method of driving the matrix-type liquid crystal display device, it is not possible to realize both reduction in power consumption to a sufficient level and a high quality display device without flicker noise at the same time. The foregoing problems are encountered not only in the liquid crystal display devices, but also a generally used matrix-type display devices can be used.

The present invention is achieved in finding out a solution to the foregoing problem, and it is therefore an object of the present invention to provide a matrix-type display device and a driving method thereof which permits the power consumption to be reduced to a sufficient level while ensuring basic display quality such as brightness, contrast, response speed, gradation, etc., can be realized. It is another object of the present invention to provide a matrix-type display device and a driving method thereof which realize reduction in power consumption and high quality display in which flicker noise is fully suppressed.

DISCLOSURE OF THE INVENTION

In order to achieve the foregoing objects, a display device in accordance with the present invention which is provided with a display element of an active matrix type comprising:

scanning signal lines for supplying thereto scanning signals from a scanning signal driver;

data signal lines for supplying thereto data signals from a data signal driver by AC driving; and pixels connected to the scanning signal lines and the data signal lines, each of the pixels including a predetermined electric capacitance in which a charge, which determines a display state as an active element is periodically set in a selective state, is written via the active element based on a scanning signal and a data signal, wherein each of the pixels includes an auxiliary capacitance formed with respect to the electric capacitance in such a manner that a capacitive bond is not generated between an electrode of the auxiliary capacitance and a corresponding one of the scanning signal lines, the display device further comprising:

frequency setting means capable of setting a rewriting frequency, which determines a cycle of writing the charge, to be not more than 30 Hz.

According to the foregoing arrangement, an auxiliary capacitance is formed in an area such that a capacitive bond is not generated between the electrode of the auxiliary capacitance according to a predetermined electric capacitance and the scanning signal line. Therefore, with the foregoing structure, by arranging such that at a rewriting frequency at which a charge in the liquid crystal capacitance $C_{LC}$, i.e., the screen of the display element is rewritten is set to be not more than 30 Hz by the frequency setting means, the problem with the conventional case of forming the auxiliary capacitance in the Cs-on-gate structure, i.e., fluctuation in potential of the pixel electrode of the electric capacitance due to fluctuation in potential of the scanning signal lines such as a scanning signal lines in one line above can be prevented.

With the low frequency driving of not more than 30 Hz, the frequency of the scanning signal can be reduced, and it is therefore possible to fully suppress the power consumption of the scanning signal driver, and similarly, the frequency for reversing polarity of the data signal can be reduced, and it is therefore possible to fully suppress the power consumption of the data signal driver. Additionally, fluctuation in potential of the electrode of the electric capacitance in which a charge which determines the display state is written can be prevented, thereby realizing a stable and quality display without flicker noise.

As a result, it is possible to provide a display device having an active element which realizes a reduction in power consumption while ensuring a desirable display quality.

In order to achieve the foregoing objects, a method of driving a display device of the present invention which displays by selecting and scanning each scanning signal line of a screen having pixels arranged in a matrix form and supplying through a data signal line a data signal to a corresponding pixel of the scanning signal line as selected, is characterized in that a quiescent period, in which all the scanning signal lines are set in non-scanning state, is set to be longer than a scanning period required for scanning the screen one time, wherein a sum of the scanning period and the quiescent period is set to be equivalent to one vertical period.

According to the foregoing method, a scanning period and a quiescent period which is longer than the scanning period, in which all the scanning signal lines are set in the non-scanning state, are set, in each vertical period alternately and repetitively. For example, in the case where the scanning period is set to a time period for normal frequency Hz, as the quiescent period longer than the scanning period is set, the vertical frequency becomes lower than 30 Hz. This scanning period and the quiescent period may be suitably adjusted to be suited for the degree of the motion of an image to be displayed such as a static image or a moving picture. In the quiescent period, all the scanning signal lines are set in the non-scanning state, and it is therefore possible to reduce a supply frequency of the data signals.

As explained, by setting a quiescent period to be longer than the scanning period, a vertical frequency becomes low frequency. Therefore, for the matrix-type display device in which basic display quality such as brightness, contrast, response speed, gradation, etc., can be ensured, such as an active matrix liquid crystal display, etc., the power consumption of data signal line driver which increases in proportion to the supply frequency of data signals can be significantly reduced with ease without any sacrifice of display quality.

As a result, the method of driving an active matrix display device which permits the power consumption to be reduced to a sufficient level while ensuring basic display quality such as brightness, contrast, response speed, gradation, etc., can be realized.

In order to achieve the forgoing objects, the method of driving a display device in accordance with the present invention, which displays by selecting and scanning each scanning signal line of a screen having pixels arranged in a matrix form and supplying through a data signal line a data signal to a corresponding pixel of the scanning signal line as selected, wherein:

subsequent to a scanning period required for scanning a screen one time, a quiescent period, in which all the scanning signal lines are set in non-scanning state, is formed so as to be longer than the scanning period, and in the quiescent period, a potential of the data signal line is set to a predetermined data signal line quiescent potential.

According to the foregoing method, the quiescent period which is longer than the scanning period is provided as a non-scanning period subsequent to the scanning period of rewriting one screen, and it is therefore possible to reduce the power consumption of the data signal line driver (source driver), which increases in proportion to the supply frequency of the data signal, with ease.

Further, by fixing the potential of the data signal line at the prescribed quiescent potential of the data signal line, it is possible to optimally control the potential of the data signal line in the quiescent period. Namely, between the scanning period and the quiescent period, it is possible to achieve the same effects of the potential of the data signal line onto the pixel electrodes. As a result, although the quiescent period is provided, by setting the effective value for the potential of the pixel electrode substantially constant, a display without flicker noise can be realized.

Therefore, the matrix-type display device which permits required power consumption to be significantly reduced, and in which flicker noise is suppressed to a sufficiently low level can be realized.

BRIEF DESCRIPTION OF THE DRAWINGS

FIG. 3 is a system block diagram illustrating the structure of a liquid crystal display device in accordance with one embodiment of the present invention.

FIG. 9(a) through FIG. 9(e) are timing charts illustrating the signal and characteristics of the liquid crystal panel.

FIG. 38(a) through FIG. 38(e) are timing charts which show signals and characteristics of the liquid crystal panel of FIG. 32.

FIG. 40(a) through FIG. 40(e) are timing charts which show signals and characteristics of the liquid crystal panel of FIG. 39.

FIG. 43 is a block diagram illustrating the structure of the matrix type display device.

BEST MODES FOR CARRYING OUT THE INVENTION

First Embodiment

Figure 1:
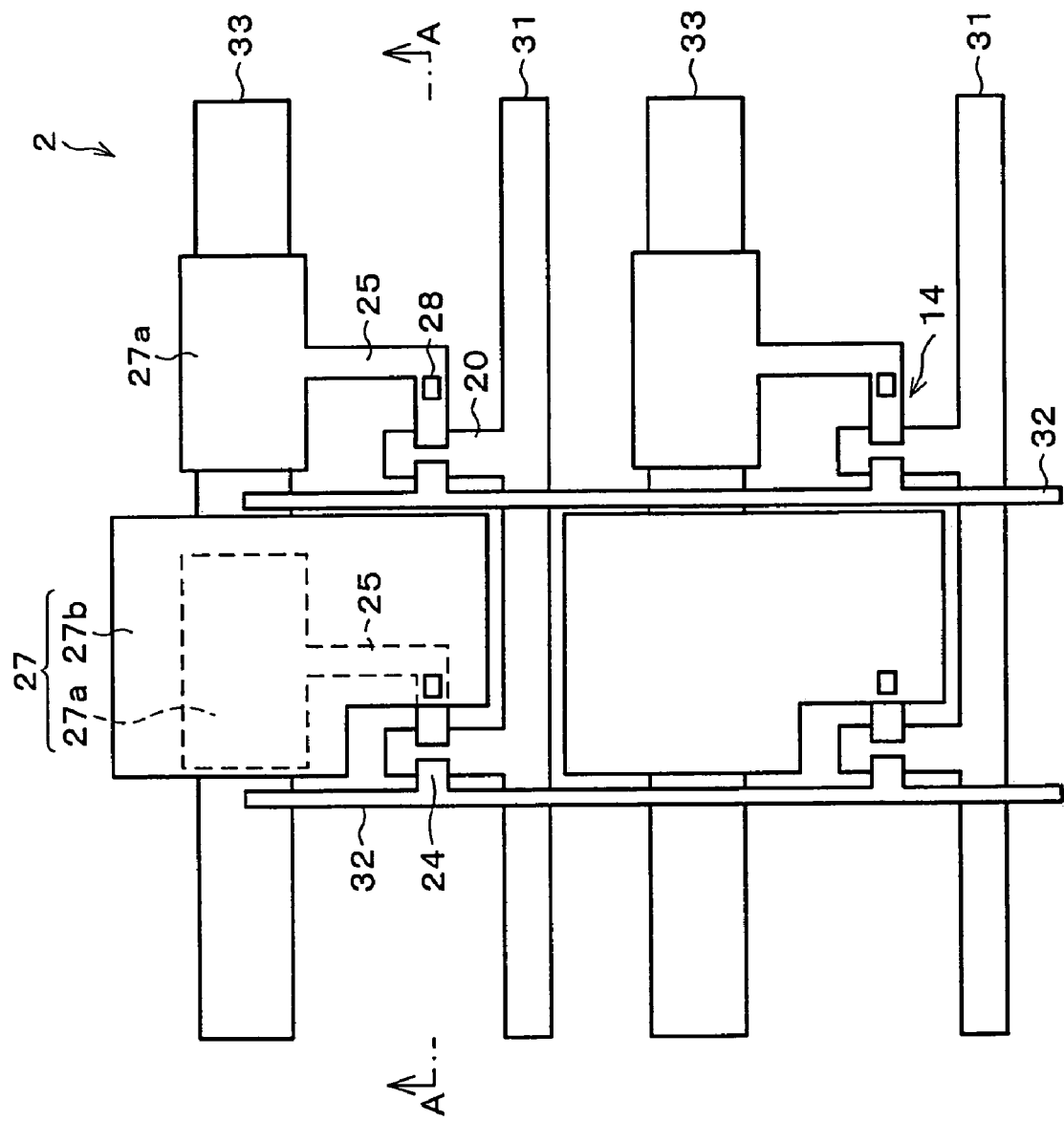
FIG. 1 is a perspective plan view illustrating the structure of a liquid crystal panel of a liquid crystal display device in accordance with one embodiment of the present invention.

The following descriptions will discuss one embodiment provided with a display device of the present invention in reference to FIGS. 1 to 11.

The inventors of the present application tried to find out a cause of flicker noise generated when driving the liquid crystal display device having a Cs-on-gate structure with a rewriting frequency of 30 Hz or below, and have found to be the following.

In the case of a so-called Cs-on-gate structure wherein auxiliary capacitive electrodes of pixels in a liquid crystal display element having an active element are formed on a scanning signal line in one line above the pixels, the pixel electrode potential of the pixels largely fluctuate with an application of scanning signals onto the scanning signal line in one line above the pixels. Generally, when adopting the rewriting frequency of 30 Hz or higher, a response of liquid crystal molecules due to fluctuation in pixel electrode potential is averaged and is therefore not perceptible. However, at a rewriting frequency of below 30 Hz, a response of liquid crystal molecule is perceptible, and a display quality would be significantly damaged. Conventionally, a resistance value of an active element, a resistance value, a dielectric constant of a liquid crystal material, and auxiliary capacitance per pixel are not designed for a rewriting frequency of not more than 30 Hz, and a flicker noise contains fluctuations of the pixel electrode potential due to poor charge maintenance when driving with a frequency of 30 Hz or below. It was found that when power consumption is reduced by merely reducing rewriting frequency in the Cs-on-gate structure to achieve a lower power consumption, a reduction in display quality cannot be avoided.

The display device of the present invention is designed for preventing flicker noise generated for the above reasons.

A system block diagram of a liquid crystal display device 1 (display device) is illustrated in FIG. 3. The liquid crystal display device 1 includes a liquid crystal panel 2, a gate driver 3, a source driver 4, a control IC 5, an image memory 6 and a synchronous clock generating circuit 7. The structure of the liquid crystal panel 2 as a display element, further as a liquid crystal display element, will be described in detail later. The gate driver 3 as a scanning signal driver outputs scanning signals of voltages respectively for the selection period and the non-selection period to respective scanning signal lines of the liquid crystal panel 2. The source driver 4 serving as a data signal driver outputs image data as a data signal to be supplied to pixels on the scanning signal line as selected to each data signal line of the liquid crystal panel 2 by AC driving. The control IC 5 receives an image data as stored in the image memory 6 inside the computer, etc., and distributes the gate start pulse signal GSP and the gate clock signal GCK to the gate driver 3, and gradation data of RGB, a source start pulse signal SP of RGB, and a source clock signal SCK to the source driver 4.

The synchronous clock generating circuit 7 (frequency setting means) generates a synchronous clock for use in reading out image data from the image memory 6 by the control IC, and a synchronous clock for use in generating a gate start pulse signal GSP to be outputted, a gate clock signal GCK, a source start pulse signal SP and a source clock signal SCK. In the present embodiment, in order to set above respective signals to a rewriting frequency of a screen of a liquid crystal panel 2, a frequency of a synchronous clock is set in the synchronous clock generating circuit 7. The frequency of the gate start pulse signal GSP corresponds to the rewriting frequency, and in the synchronous clock generating circuit 7, at least one rewriting frequency can be set to 30 Hz, and plurality of arbitrary rewriting frequencies including those above 30 Hz can be set.

In the system illustrated in the FIG. 3, the synchronous clock generating circuit 7 alters the setting of the rewriting frequency according to frequency setting signals M1 and M2 to be input from the exterior. Here, the number of frequency setting signals can be arbitrary. For example, when adopting frequency setting signals M1 and M2 of two kinds, four rewriting frequencies can be set as shown in Table 1.

TABLE 1

| M1 | M2 | SET FREQUENCY [Hz] |
| --- | --- | --- |
| H | H | 60 |
| H | L | 30 |
| L | H | 15 |
| L | L | 6 |

The rewriting frequency may be set such that a plurality of frequency setting signals are input to the synchronous clock generating circuit 7 as in this example, or the synchronous clock generating circuit 7 provided with a switch for adjusting the rewriting frequency, or a switch for selecting the rewriting frequency. Needless to mention, these switches for adjusting the rewriting frequency and for selecting the rewriting frequency may be provided on the outer surface of the cabinet of the liquid crystal display device 1 to help user setting. The structure of the synchronous clock generating circuit 7 is not particularly limited, as long as a rewriting frequency can be set as desired based on an instruction given from the exterior. Alternately, it may be arranged such that the rewriting frequency is switched automatically according to an image to be displayed.

The gate driver 3 starts scanning the liquid crystal panel 2 in response to a gate start pulse signal GSP as received from the control IC and sequentially applies a selective voltage to each scanning signal line according to the gate clock signal GCK. Based on the source start pulse signal SP as received from the control IC 5, the source driver 4 stores the received gradation data of each pixel in the register according to the source clock signal SCK, and write the gradation data in each data signal line of the liquid crystal panel 2 according to the next source start pulse signal SP.

Figure 2:
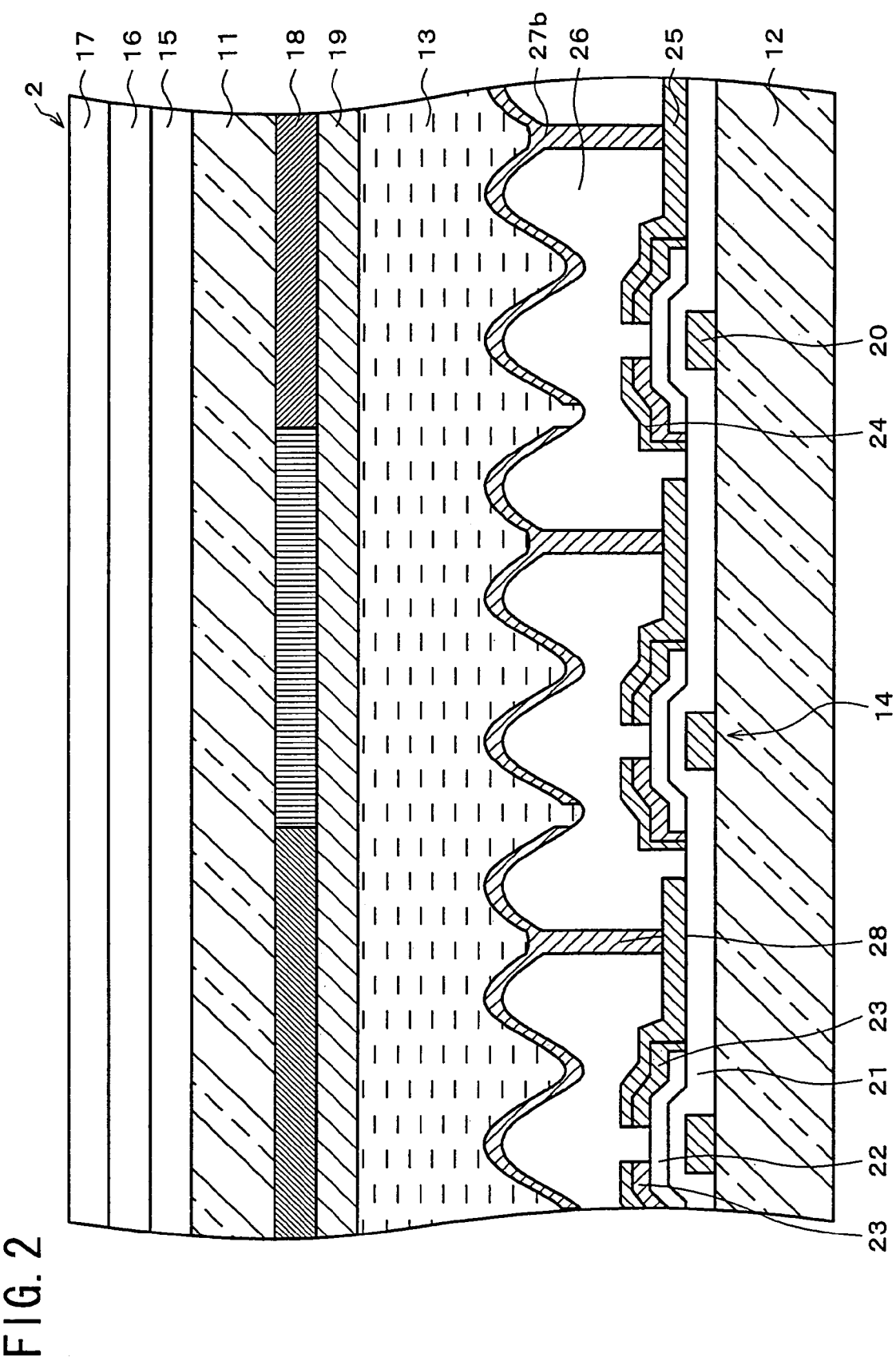
FIG. 2 is a cross section of the portion along an arrow line A-A of the image sensor of FIG. 1.

The cross-sectional view of the liquid crystal panel 2 is illustrated in FIG. 2 which is a cross section of the portion along a line A-A of FIG. 1 to be described later. The liquid crystal panel 2 is an active matrix liquid crystal panel of reflective type. The liquid crystal panel 2 includes a pair of glass substrates 11 and 12 having a liquid crystal layer 13 (such as nematic liquid crystal layer) interposed in between, and further includes TFTs 14 (active elements) formed on the glass substrate 12. In the present embodiment, TFTs are adopted as active elements; however, active elements of the present embodiment are not limited to TFTs, and for example, a two-terminal elements such as MIMs (Metal Insulator Metals), etc., or three-terminal elements such as FETs other than TFT may be adopted. The TFTs 14 and other FETs are arranged so as to be set in the selective state as the source and the drain are conducted with each other with an application of a selective voltage to the gate by the scanning signal in the selection period. In the structure to be described later, the two-terminal element is arranged such that a voltage according to a scanning signal is applied to one terminal, and a voltage according to a data signal is applied to the other terminal via liquid crystals, and further in the selection period, both terminals conduct with an application voltage by the scanning signal and an application voltage by the data signal, and whereby the two-terminal element is set in the selective state.

On the upper surface of the glass substrate 11, laminated are a phase-difference plate 15 for use in controlling the state of incident light, a polarizing plate 16, and an anti-reflection film 17 in this order. On the lower surface of the glass substrate 11, formed are RGB color filters 18 and transparent common electrodes 19 as counter electrodes in this order. With this color filters 18, a color display can be realized.

In each TFT 14, a part of a scanning signal line formed on the glass substrate 12 is used as a gate electrode 20, and a gate insulating film 21 is formed so as to cover the gate electrode 20. Further, an i-type amorphous silicon layer 22 is formed facing the gate electrode 20 via the gate insulating film 21 sandwiched in between. On the i-type amorphous silicon layer 22, two n$^+$-type amorphous silicon layers 23 are formed so as to sandwich a channel region of the i-type amorphous silicon layer 22. On the upper surface of one of the n$^+$-type amorphous silicon layers 23, formed is a gate electrode 24 which constitutes a part of the data signal line, and on the upper surface of the other n$^+$-type amorphous silicon layer 23, formed is a drain electrode 25 extending from the upper surface of the other n$^+$-type amorphous silicon layer 23 to the entire upper surface of a flat portion of the gate insulating film 21. As illustrated in FIG. 1 (to be described later), the extension start position of the drain electrode 25 and the other end are connected to a rectangular auxiliary capacitive electrode pad 27a facing the auxiliary capacitance line 33. On the upper surfaces of the TFTs 14, formed are interlayer insulating films 26, and further reflective electrodes 27b are formed on the upper surface of the interlayer insulating film 26. The reflective electrodes 27b are reflective members for use in performing reflective display using surrounding light. For controlling the direction of reflected light by the reflective electrodes 227b, fine protrusions and recessions are formed on the surface of the inter-layer insulating film 26.

Further, each reflective electrode 27b is conducted to the drain electrode 25 via a contact hole 28 formed in the inter-layer insulating film 26. Namely, the voltage to be controlled by the TFT 14 as applied from the data electrode 24 to the reflective electrode 27b from the drain electrode 25 via the contract hole 28, and the liquid crystal layer 13 is driven by a voltage across the reflective electrode 27b and the transparent common electrode 19. Namely, the auxiliary capacitive electrode pad 27a and the reflective electrode 27b are conducted with each other, and liquid crystal is interposed between the reflective electrode 27b and the transparent common electrode 19. As described, the auxiliary capacitive electrode pad 27a and the reflective electrode 27b constitute a pixel electrode 27. The electric capacitance (liquid crystal capacitance $C_{LC}$ to be described later), to be written via the TFT 14 wherein charges which determines a display state are in the selective state, are constituted by the pixel electrode 27 and the transparent common electrode 19 having liquid crystal interposed in between. In the case of the transparent liquid crystal display device, pixel electrodes provided corresponding to the above respective electrodes are transparent electrodes. The liquid crystal panel 2 illustrated in FIG. 2 is arranged such that the transparent common electrode 19 is formed on the glass substrate 12 different from the pixel electrode 27. However, the liquid crystal panel of the present embodiment is not limited to the foregoing arrangement, and, for example, a liquid crystal panel in the IPS (In Plane Switching) mode wherein a common electrode and pixel electrodes are formed on the same substrate may be adopted as well.

As illustrated in FIG. 1 taken from above the portion below the liquid crystal layer 13 of FIG. 2, the liquid crystal panel 2 includes scanning signal lines 31 for supplying scanning signals to the gate electrodes 20 of the TFTs 14 and data signal lines 32 for supplying data signals to the data electrodes 24 of the TFTs 14. These scanning signal lines 31 and the data signal lines 32 are arranged in a matrix form on the glass substrate 12. Further, auxiliary capacitance lines 33 are formed so as to face the corresponding auxiliary capacitive electrode pads 27a respectively. A pair of an auxiliary capacitive electrode pad 27a and an auxiliary capacitance line 33 serves as an electrode for use in forming an auxiliary capacitance (auxiliary capacitance $C_{CS}$ to be described later) with respect to the electric capacitance (liquid crystal capacitance $C_{LC}$) in a pixel to be described later. Parts of the auxiliary capacitance lines 33 are formed parallel to the scanning signal lines 31 on the glass substrate 12 in other portion than the areas the scanning signal lines 31 are formed, i.e., to avoid the areas the scanning signal lines 31 are formed, so as to make pairs with auxiliary capacitive electrode pads 27a sandwiching the gate insulating film 21 in between, whereby almost no capacitive bond is generated between the auxiliary capacitance line 33 and the scanning signal lines 31, and between the auxiliary capacitance electrode pads 27a and the scanning signal lines 31. It should be noted here that the present embodiment is not intended to be limited to the foregoing structure, as long as the auxiliary capacitive electrode pads 27a and the auxiliary capacitance line 33 are provided so as not to generate a capacitive bond between the scanning signal lines 31. The capacitive bonds between the reflective electrodes 27b and the scanning signal lines 31 are very small, and thus can be ignored.

When seen from above the liquid crystal panel 2, the glass substrates 11 and 12, the liquid crystal layer 13, the TFT 14, the phase difference plate 15, the polarizing plate 16, the anti-reflection film 17, the color filter 18, the transparent common electrode 19, the inter-layer insulating film 26, the pixel electrode 27 and the auxiliary capacitance line 33 in an area approximately surrounded by adjoining scanning signal lines and adjoining data signal lines constitute a pixel. Each pixel is connected to one of the scanning signal lines 31 and one of the data signal lines 32, and based on the scanning signal and the data signal, and charges which determines a display state as the TFT 14 is switched to the selective state periodically are written in predetermined electric capacitance (liquid crystal capacitance $C_{LC}$ to be described layer) via TFT 14. In the FIG. 1, the part of the reflective electrodes 27b is omitted so as to clarify the positional relationship between the auxiliary capacitive electrode pad 27a and the auxiliary capacitance line 33. The protrusions and recessions formed on the surface of the inter-layer insulating film 26 in FIG. 2 are omitted from FIG. 1.

In the case of adopting two-terminal elements such as MIMs as active elements in the structure of FIG. 1, a two-terminal element is provided at position of each TFT 14, and two-terminal elements are connected in series between the data signal lines corresponding to the data signal lines 32 and pixel electrodes corresponding to the pixel electrodes 27. Further, each scanning signal line corresponding to the scanning signal line 31 is connected not to the two-terminal element but to a counter electrode (transparent electrode) provided for each pixel so as to face the auxiliary capacitive electrode pad corresponding to the auxiliary capacitive electrode pad 27a via the liquid crystal layer corresponding to the liquid crystal layer 13. In this case, each pixel is constituted by elements corresponding to the liquid crystal panel 2 adopting the TFTs 14 in an area approximately surrounded by adjoining scanning signal lines and adjoining data signal lines. The structure of adopting FETs other than TFTs as three-terminal elements are the same as the structure of adopting TFTs 14 in electrical connection, and explanations therefore shall be omitted here.

Figure 4A:
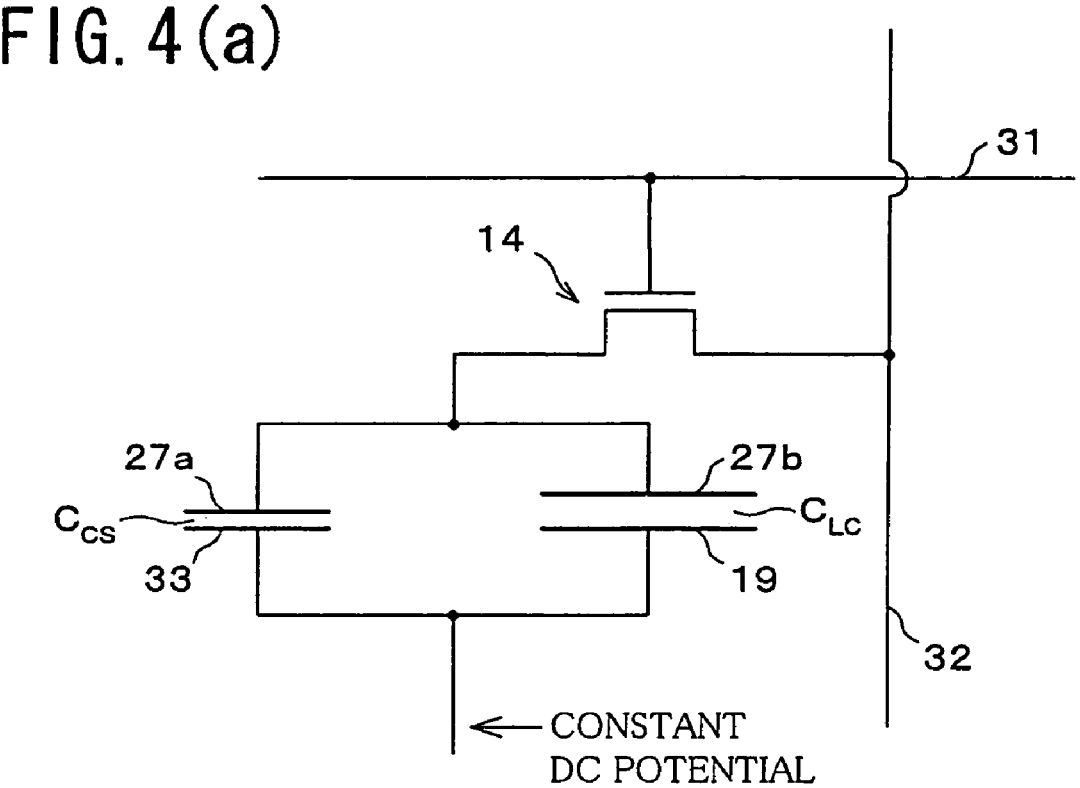
FIG. 4(a) and FIG. 4(b) are circuit diagrams illustrating an equivalent circuit per pixel of the liquid crystal panel of FIG. 1.
Figure 4B:
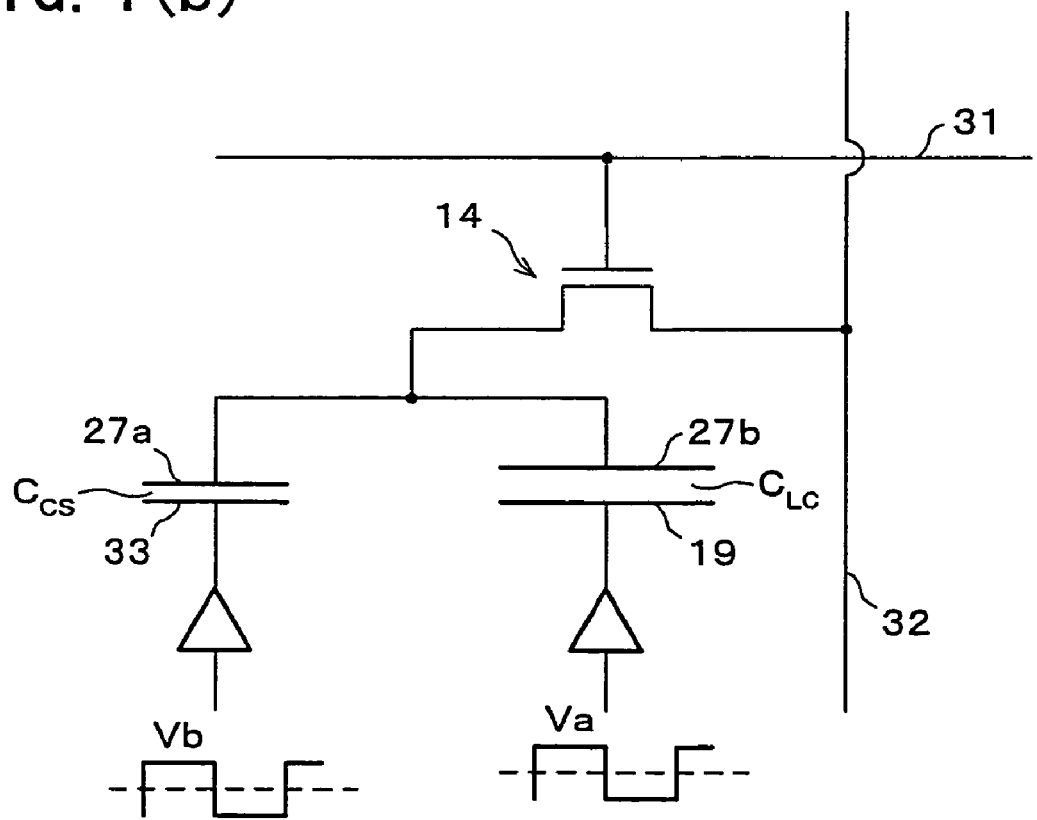

An equivalent circuit per pixel of the liquid crystal panel 2 of the foregoing structure wherein three terminal elements as the active elements is illustrated in FIGS. 4(a) and 4(b). An equivalent circuit illustrated in FIG. 4(a) includes a liquid crystal capacitance $C_{LC}$, formed by interposing the liquid crystal layer 13 between the transparent common electrode 19 and the reflective electrode 27b, and an auxiliary capacitance $C_{CS}$, formed by interposing the gate insulating film 21 between the auxiliary capacitive electrode pad 27a and, the auxiliary capacitance line 33, which are connected to the TFTs 14, wherein a transparent common electrode 19 and an auxiliary capacitance line 33 are set to constant DC potentials. In an equivalent circuit illustrated in FIG. 4(b), an AC voltage Va is applied to the transparent common electrode 19 of the liquid crystal capacitance $C_{LC}$ via a buffer, and an AC voltage Vb is applied to the auxiliary capacitance line 33 of the auxiliary capacitance $C_{CS}$. The AC voltage Va and the AC voltage Vb have equivalent voltage amplitudes, and are in the same phases. Therefore, in this case, the potential of the transparent common electrode 19 and the potential of the auxiliary capacitance line 33 respectively oscillate in the same phase. Alternately, it may be arranged such that a common AC voltage is applied via the buffer in replace of a constant DC potential in the structure wherein the liquid crystal capacitance $C_{LC}$ and the auxiliary capacitance $C_{CS}$ are connected in parallel as illustrated in FIG. 4(a).

In these equivalent circuits, a selective voltage is applied to the scanning signal line 31 to set ON the TFTs 14, and data signals are applied to the liquid crystal capacitance $C_{LC}$ and the auxiliary capacitance $C_{CS}$ through the data signal line 32. Next, the non-selective voltage is applied to the scanning signal line 31 to set OFF the TFTs 14, whereby the pixel holds charges written in the liquid crystal capacitance $C_{LC}$ and the auxiliary capacitances $C_{CS}$. Here, as described, the auxiliary capacitance lines 33 for use in forming the auxiliary capacitances $C_{CS}$ of the pixels are formed in areas where almost no capacitive bond is generated with the scanning signal lines 31. Therefore, in the foregoing equivalent circuits illustrated in the figures, the respective capacitive bonds are omitted. Therefore, in this state, by arranging such that charges in the liquid crystal capacitance $C_{LC}$, i.e., the screen of the liquid crystal panel 2 are rewritten with a rewriting frequency of not more than 30 Hz by the synchronous clock generating circuit 7, fluctuations in potential of the pixel electrode 27, serving as electrodes of the liquid crystal capacitance $C_{LC}$ due to fluctuations in potential of the scanning signal line such as the scanning signal line 31 in one line above in FIG. 1 can be suppressed unlike the conventional case of forming the auxiliary capacitance in the Cs-on-gate structure. The foregoing effects can be achieved also from the structure adopting two-terminal elements as active elements.

By arranging so as to drive at low driving frequency of 30 Hz or below, the frequency of the scanning signal can be reduced, and the power consumption of the scanning signal driver can be reduced to a sufficiently low level, and in the meantime, the frequency of reversing polarity of the data signal can be reduced, and the power consumption of the data signal driver, or the source driver 4 in the structure of FIG. 1, can be sufficiently reduced. Further, by suppressing fluctuations in potential of the pixel electrodes 27, a stable display without flicker noise can be obtained.

Next, the results of analysis on characteristics of the liquid crystal panel 2 are explained, where the liquid crystal panel 2 has a width across corners of 0.1 m, which is provided with the scanning signal lines 31 and the data signal lines 32 in numbers of 240 and 320×3 respectively.

Figure 5A:
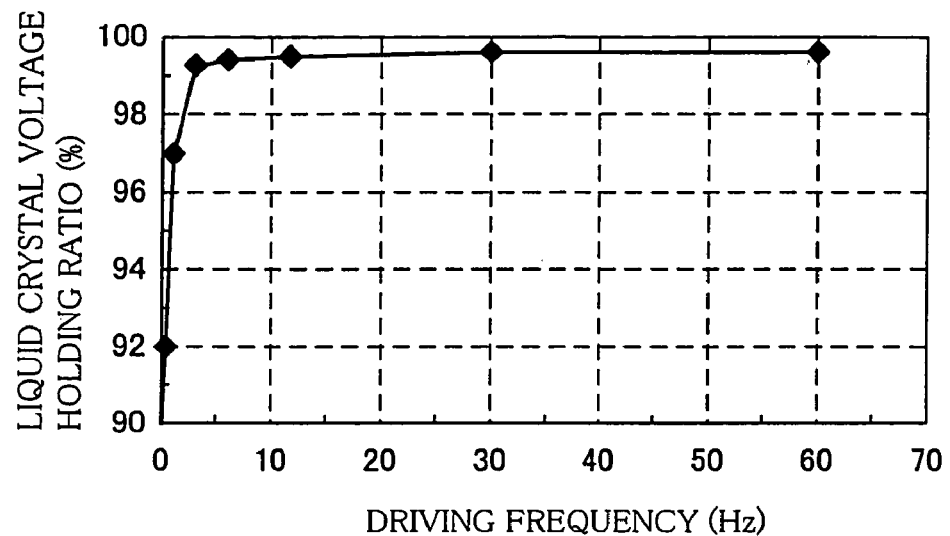
FIG. 5(a) and FIG. 5(b) are graphs which illustrate characteristics of liquid crystal.
Figure 5B:
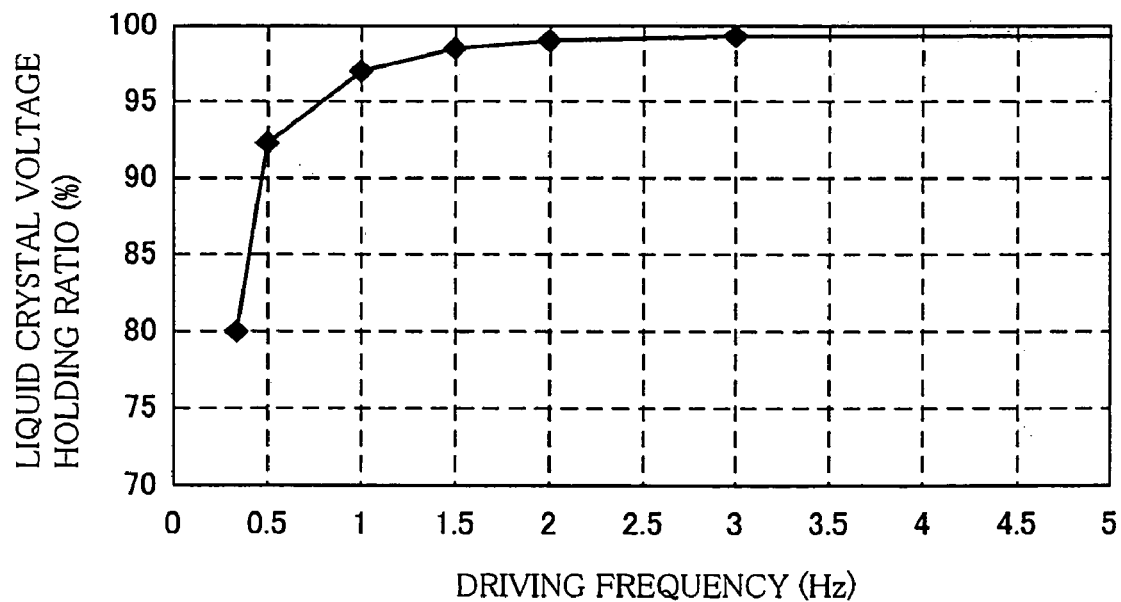
Figure 6:
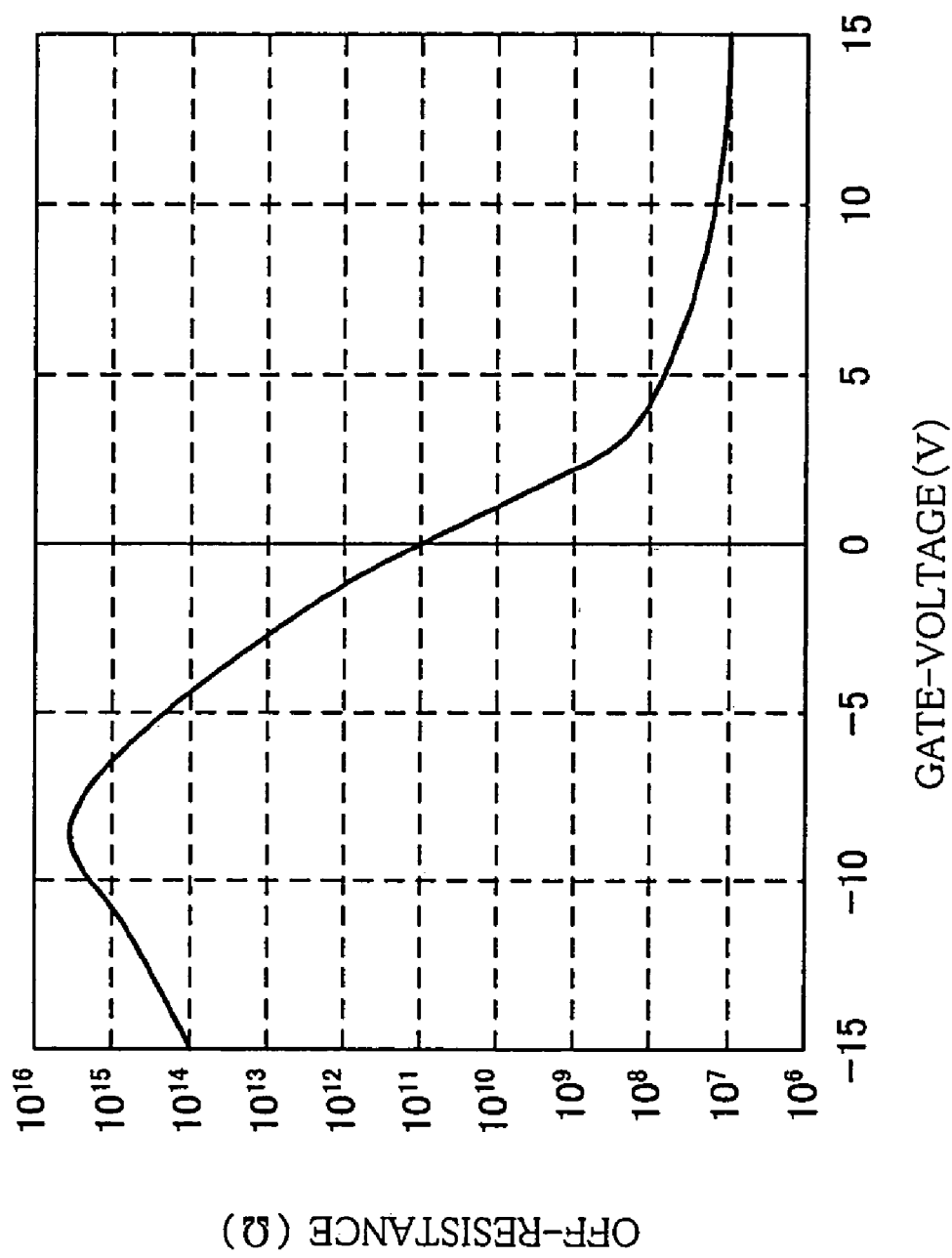
FIG. 6 is a graph illustrating the OFF resistance characteristics of the TFT.
Figure 7:
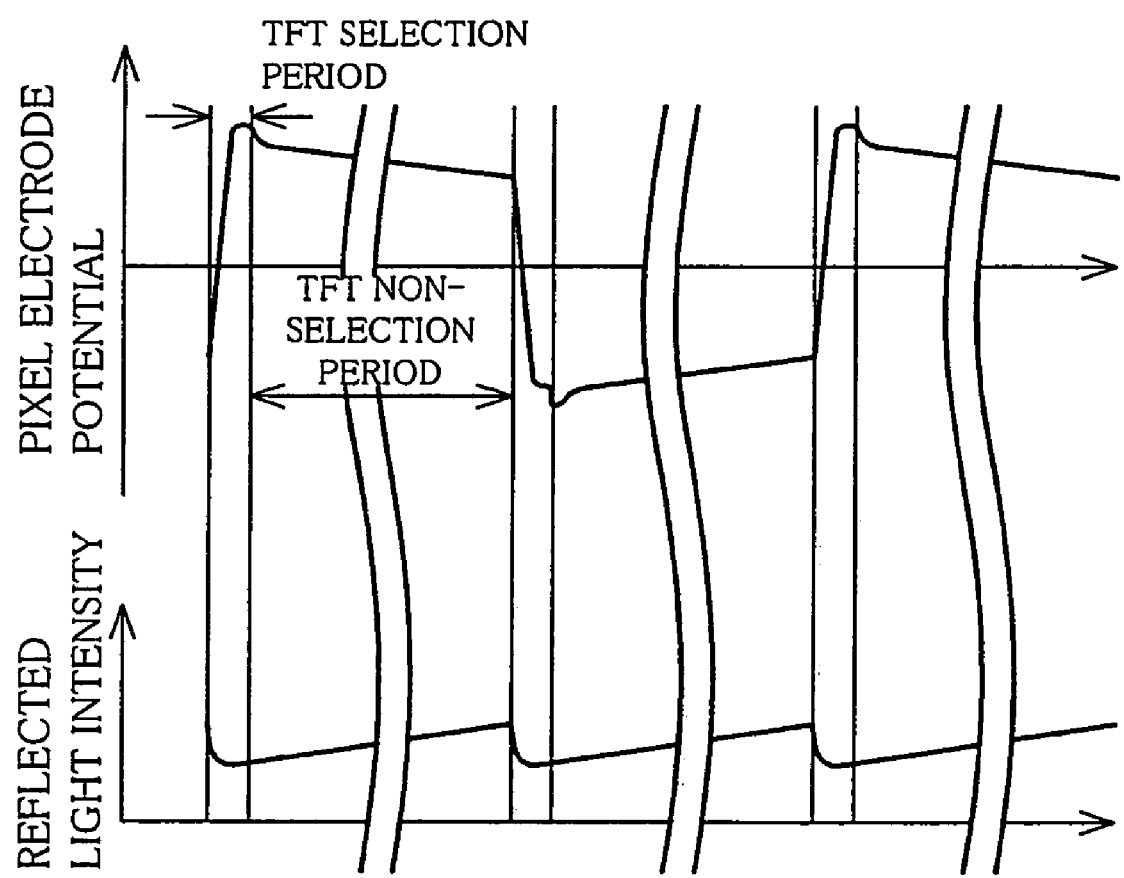
FIG. 7 is an explanatory view which explains changes in pixel electrode potential and changes in reflected light intensity in the case where charges cannot be held to the sufficient level.

FIGS. 5(a) and 5(b) are graphs showing the results of measurements on the dependency of the liquid crystal voltage holding ratio Hr on the driving frequency (writing frequency) under the condition of a constant writing time (for example, 100 μsec) with respect to liquid crystals (Merk Co., Ltd. ZLI-4792) adopted in the liquid crystal layer 13. FIG. 5(b) is an enlarged view of the region having the driving frequency in a range of from 0 Hz to 5 Hz in the structure of FIG. 5(a). FIG. 6 is a graph showing the results of measurements on the relationship between the OFF resistance value of the TFT 14 and the potential of the gate electrode of the TFT 14, i.e., the potential of the scanning signal line 31. If the liquid crystal voltage holding ratio Hr and OFF resistance values of the TFT 14 are not sufficient, a problem occurs in that charges written in the liquid crystal capacitance $C_{LC}$ and the auxiliary capacitances $C_{CS}$ leak in the non-selection period of the TFT 14. As a result the potential of the pixel electrode 27 fluctuates, and the reflective light intensity from the reflective electrode 27b fluctuates as illustrated in FIG. 7.

The pixel voltage holding ratio P, which is dependent on the potential of the pixel electrode 27, and the reflective light intensity from the reflective electrode 27b, can be expressed by the following formula (1);

$$P = V_1 \cdot \exp[-T/\{(C_{LC}+C_{CS}) \cdot R\}]/V$$

$$V_1 = V - \{V \cdot (1-Hr(T)) \times C_{LC}/(C_{LC}+C_{CS})\}, \quad (1)$$

wherein T is a non-selective period of TFT 14, Hr(T) is a liquid crystal voltage holding ratio at certain driving frequency after a time period T in FIGS. 5(a) and 5(b), V is a potential difference between the pixel electrode 27 and the transparent common electrode 19 directly after writing, and R is an OFF resistance value of the TFT 14 in FIG. 6. The formula V1·exp[−T/{($C_{LC}+C_{CS}$)·R}] indicates a potential difference between the pixel electrode 27 and the transparent common electrode 19 when a time period T has passed after the completion of writing.

For example, under the conditions that the liquid crystal voltage holding ratio at T=180 msec, the resistance value in the non-selective period of the TFT 14, i.e., the OFF resistance value R, the liquid crystal capacitance $C_{LC}$ and the auxiliary capacitance $C_{CS}$ are set as shown in the following Table 2, the pixel voltage holding ratio P can be obtained as 99.7% from the above formula (1).

TABLE 2

| | |
|---|---|
| LIQUID CRYSTAL VOLTAGE HOLDING RATIO (after 180 msec) | 99.7% |
| RESISTANCE OF TFT WHEN NON-SELECTING | $1.5 \times 10^{15}$ Ω |
| LIQUID CRYSTAL CAPACITIVE | 0.45 pF |
| AUXILIARY CAPACITIVE | 0.32 pF |

Figure 8A:
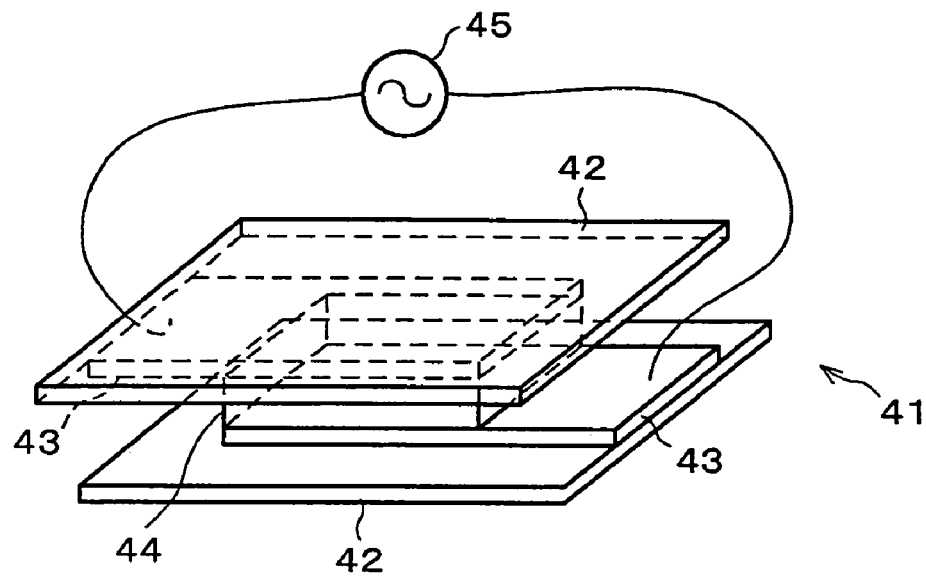
FIG. 8(a) and FIG. 8(b) are explanatory view which explain the method of evaluating characteristics of the liquid crystal panel.
Figure 8B:
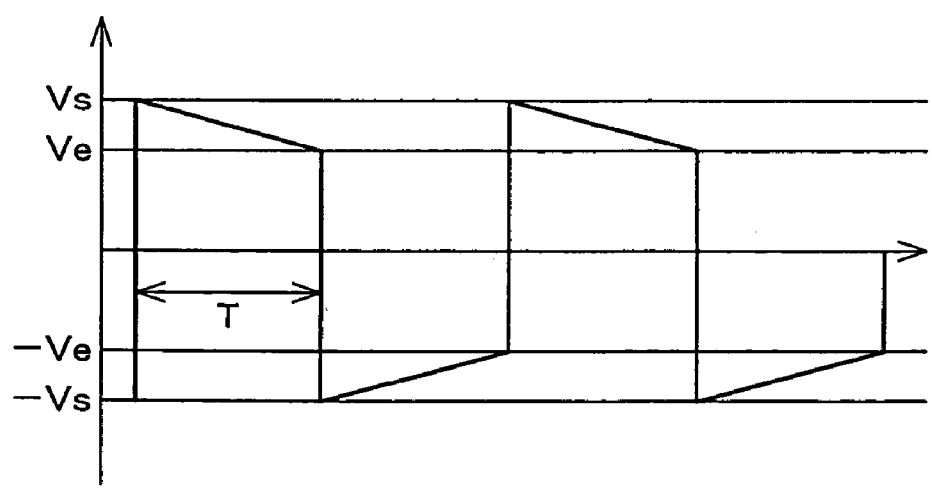

Here, the pixel voltage holding ratio P and the perception limits for the flicker noise were fully examined. As illustrated in FIG. 8(a), two glass substrates 42 face each other in such a manner that pixel electrodes 43 are formed on the inner surface, and a flicker-noise-evaluation-use cell 41 including two transparent electrodes 43 having a liquid crystal layer 44 interposed in-between is prepared. Between these two transparent electrodes 43 of the flicker-noise-evaluation-use cell 41, a voltage is applied from a signal generating device 45. A voltage waveform to be output from the signal generating device 45 is illustrated in FIG. 8(b). In this FIG. 8(b), Vs is set to 2V, and variable Ve is set with respect to the change in the non-selection period T from 32 msec (about 30 Hz) to 167 msec (about 6 Hz). Initially, the flicker-noise-evaluation-use cell 41 is charged to a voltage Vs, and the voltage thereof is gradually reduced to Ve. Next, with an application of −Vs, the brightness of the flicker-noise-evaluation-use cell 41 changes, and these fluctuations in brightness, i.e., fluctuations in flicker noise are observed with eyes.

Here, Ve/Vs corresponds to an actual pixel voltage holding ratio P in the liquid crystal display device 1. The pixel voltage holding ratio P and the flicker generating state were observed in details. The results of observation are as illustrated in the following Table 3.

TABLE 3

| PIXEL VOLTAGE HOLDING RATIO[%] | RESULT OF OBSERVATION ON FLICKER NOISE WITH EYES |
|---|---|
| 80.0 | x |
| 82.0 | x |
| 84.0 | x |
| 86.0 | Δ |
| 88.0 | Δ |
| 90.0 | o |
| 92.0 | o |
| 94.0 | o |
| 96.0 | o |
| 98.0 | o |
| 100.0 | o | o: flicker noise was not perceptible.
Δ: flicker noise was partially perceptible.
x: flicker noise was perceptible.

As can be seen from the results shown in Table 3, in order to obtain the liquid crystal panel 2 which offers a stable display without flicker noise even at a rewriting frequency of the screen of 30 Hz or below, the following condition should be satisfied; the pixel voltage holding ratio P is set as P≧0.9, so that.

FIG. 9(a) through FIG. 9(e) respectively illustrate the scanning signal waveform, the scanning signal waveform, the potential of the pixel electrode 27, and the reflective light intensity from the reflective electrode 27 when driving the liquid crystal display device 1 having the foregoing structure at low frequency. In this experiment, the rewriting frequency for the screen was set to 6 Hz, i.e., 1/10 of 60 Hz. Specifically, in the rewriting period 167 msec corresponding to 6 Hz, the selection period and the non-selection period for one of the scanning signal lines 31 are set to 0.7 msec and 166.3 msec respectively. A driving is performed in such a manner that the polarity of the data signal to be supplied to data signal lines 32 is reversed per each scanning signal, and a data signal whose polarity is reversed per each writing is input in each pixel.

FIG. 9(a) illustrates a scanning signal waveform to be output to the scanning signal line 31 in one line above the scanning signal line 31 of the pixel being focused. FIG. 9(b) illustrates a scanning signal waveform to be output to the data signal line 31 on the current line of the pixel being focused. FIG. 9(c) illustrates a data signal waveform to be output to the data signal line 32 of the pixel being focused. FIG. 9(d) illustrates a potential of the pixel electrode 27 of the pixel being focused. As can be seen from FIG. 9(a) and FIG. 9(d), when the selection voltage is applied to the scanning signal line 31 on a previous line, the potential of the pixel electrode 27 is stabilized. In this state, the intensity of the reflective light from the reflective electrode 27b was measured. As a result of measurement, fluctuations in intensity of the reflected light was hardly observed as illustrated in FIG. 9(e). It was also confirmed as a result of observation with eyes, a high quality uniform display without flicker noise could be realized.

Figure 10:
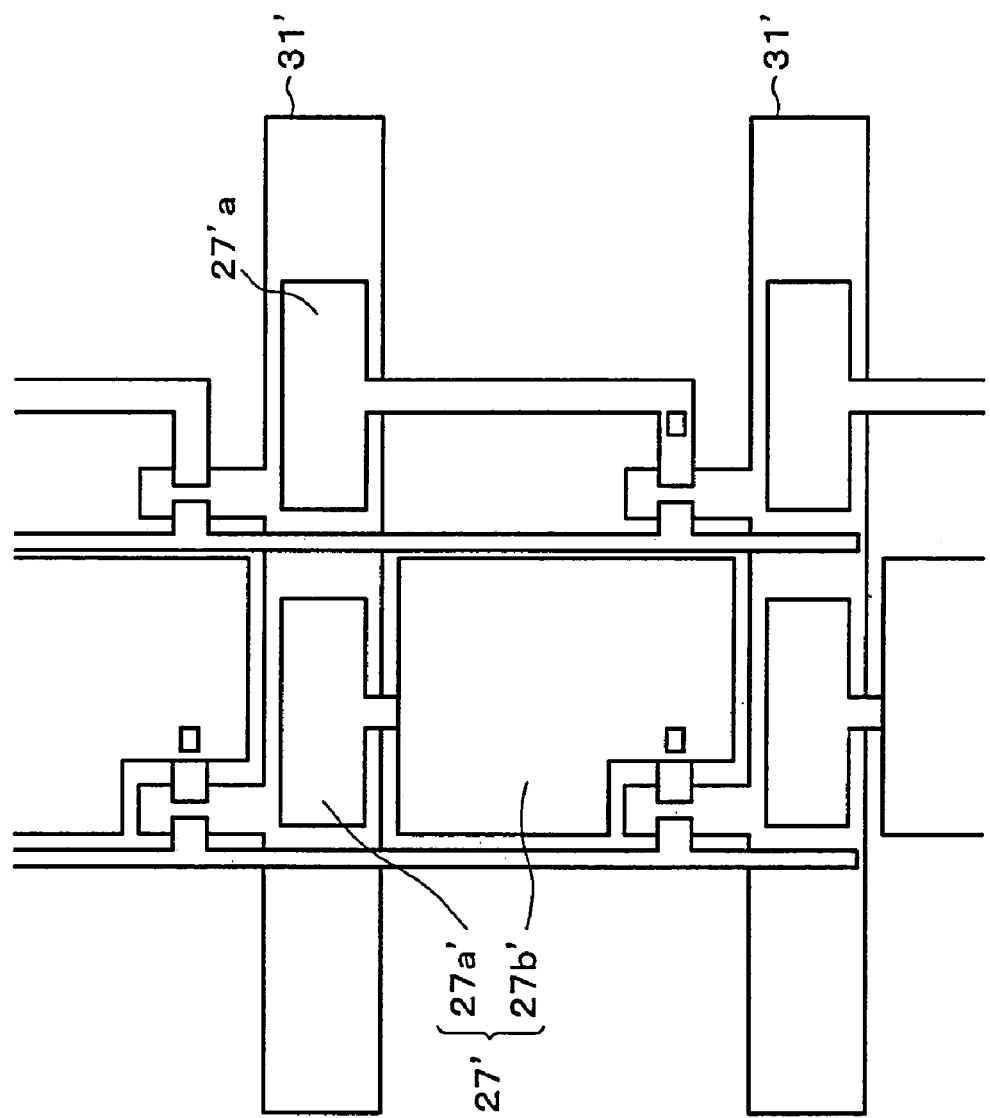
FIG. 10 is a perspective plan view illustrating the structure of the liquid crystal panel as a comparative example of the liquid crystal panel of FIG. 1.
Figure 11:
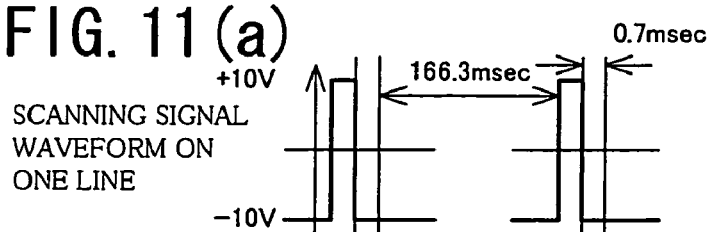
FIG. 11(a) through FIG. 11(e) are timing charts illustrating the signal and the characteristic of the liquid crystal panel of FIG. 10.
Figure 11:
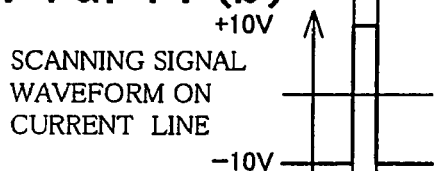
Figure 11:
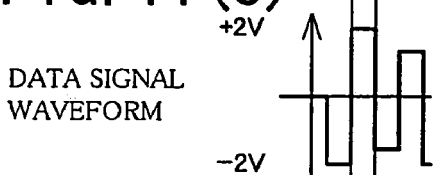
Figure 11:
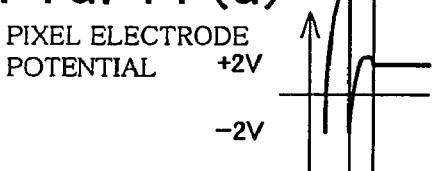
Figure 11:
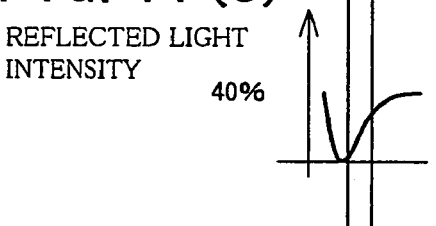

Comparative measurement was performed with respect to the conventional Cs-on-gate structure wherein auxiliary capacitances are formed by providing the auxiliary capacitive electrode pads 27a' so as to face the scanning signal lines 31' in one line above as illustrated in FIG. 10. The results of this comparative measurements are shown in FIGS. 11(a) through 11(e). As can be seen from FIGS. 11(a) through 11(d), the potential of the pixel electrode 27' greatly fluctuated when the selective voltage was applied to the scanning signal line 31' in one line above, and as a result, the intensity of the reflected light from the reflective electrode 27b' also fluctuated as illustrated in FIG. 11(e). It was also confirmed as a result of observation with eyes, a flicker noise was generated.

Figure 26:
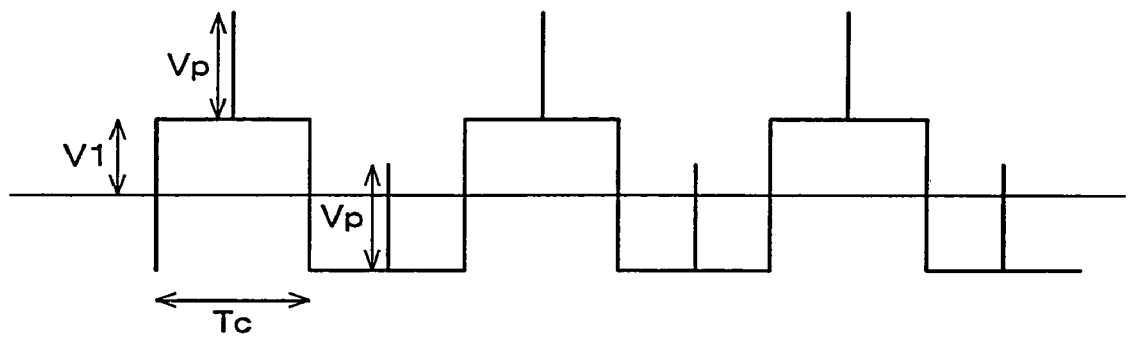
FIG. 26 is a waveform diagram which illustrates a waveform of a signal for use in evaluating the characteristics of a liquid crystal panel of the liquid crystal display device in accordance with still another embodiment of the present invention.

Here, potential fluctuation of pixel electrodes by a scanning signal and the perception limits for the flicker noise were fully examined. To the flicker-noise-evaluation-use cell 41 of FIG. 8(a), a voltage having a waveform shown in FIG. 26 was applied. In FIG. 26, voltage V1 indicates a voltage to be applied to the liquid crystal layer 44 (between transparent electrodes 43) for displaying predetermined gradations. The voltage V1 corresponds to a drain-common voltage (a potential of the pixel electrode) in an actual liquid crystal display device, namely a voltage of a predetermined electric capacitance in which charges which determine a display state are written. The pulse voltage Vp to be superimposed on the voltage V1 indicates a noise portion to be added to voltage V1 generated by the scanning of the scanning signal line, and the superimposed portion of the pulse voltage Vp corresponds to the fluctuated portion of the voltage V1.

Here, experiments were performed under the conditions of a pulse width of a pulse voltage Vp of 50 μsec and variable cycle Tc of the voltage V1 (corresponding to the frequency of rewriting charges of a predetermined electric capacitance) within a range of from 33.3 msec to 167 msec, and the state of flicker noise with variable pulse voltage VP were confirmed, and the results shown in Table 4 were obtained.

TABLE 4

| PULSE VOLTAGE Vp [V] | RESULT OF OBSERVATION OF FLICKER NOISE WITH EYES |
|---|---|
| 2.0 | ○ |
| 2.2 | ○ |
| 2.4 | ○ |
| 2.6 | ○ |
| 2.8 | ○ |
| 3.0 | ○ |
| 3.2 | Δ |
| 3.4 | Δ |
| 3.6 | x |
| 3.8 | x |
| 4.0 | x |

○: flicker noise was not perceptible.
Δ: flicker noise was partially perceptible.
x: flicker noise was perceptible.

○: flicker noise was not perceptible.

Δ: flicker noise was partially perceptible.

x: flicker noise was perceptible.

As can be seen from the results shown in Table 4, in order to obtain the liquid crystal panel which offers a stable display without flicker noise even at a rewriting frequency of the screen of 30 Hz or below (change frequency T of 33.3 msec or above), it is desirable to set fluctuations in potential of pixel electrode (fluctuations in potential of predetermined electric capacitance) resulting from scanning within a range of not more than 3 V. In normal liquid crystal panels, capacitive bonds between the pixel electrode and the scanning signal lines to be connected to the pixel itself are small, and potential fluctuations of pixel electrodes resulting from scanning in the selection period of the pixel itself are not more than 2V, more particularly around 1V. Therefore, generally, flicker noise would not be perceptible by an amount of fluctuations in voltage V1 from the scanning signal line to be connected to the pixel itself, and it is therefore important to suppress potential fluctuations in pixel electrode to be 3V or below particularly in the non-scanning period T.

In the foregoing liquid crystal panel 2, the auxiliary capacitive electrode pads 27a and the auxiliary capacitance lines 33 are formed in areas where almost no capacitive bond is generated between the auxiliary capacitive electrode pad 27a and the scanning signal line 31 and between the auxiliary capacitance lines 33 and the scanning signal line 31. Therefore, a voltage of the liquid crystal capacitance $C_{LC}$ hardly fluctuate due to noise generated from the scanning signal lines 31 with a supply of a scanning signal, not only in the selection period but also in the non-selection period T. As described, the liquid crystal panel 2 are arranged so as to make fluctuations in voltage of the liquid crystal capacitance $C_{LC}$ due to noise generated from the scanning signal lines 31 with a supply of a scanning signal to be suppressed below a level (3V or below in this example) at which flicker noise on the display is perceptible.

As illustrated in FIG. 10, in the liquid crystal panel of the Cs-on-gate structure which includes the auxiliary capacitance $C_{CS}$ of the liquid crystal capacitance $C_{LC}$ by providing auxiliary capacitive electrode pads 27a' so as to face the scanning signal lines 31', the potential of the pixel electrode 27' fluctuates via the auxiliary capacitance $C_{CS}$, and the amount of fluctuations ΔVp is defined by the following formula:

$$\Delta Vp = \Delta Vg \times C_{CS}/(C_{CS}+C_{LC}+C_{GD}+C_{SD}) \quad (2),$$

ΔVg: fluctuation value of the scanning signal line potential;

$C_{GD}$: capacitance formed by the scanning signal line 31' and the pixel electrode 27' of the transistor section;

$C_{SD}$: capacitance formed by the pixel and the data signal line.

Here, the conditions $C_{LC} \ll C_{GD}$ and $C_{LC} \ll C_{SD}$ are generally satisfied. For example, when ΔVg=25V, and if $C_{LC}$ is ten time greater than $C_{CS}$, the condition ΔVp<3V can be mostly satisfied. Therefore, even in the liquid crystal display device having a liquid crystal panel of the Cs-on-gate structure, it is possible to realize a display without flicker noise by suppressing the fluctuations in voltage due to noise to below 3 V at which flicker noise in the display is perceptible. The fluctuation in voltage due to noise is included in the voltage of liquid crystal capacitance $C_{LC}$ from the scanning signal lines 31' with a supply of a scanning signal with respect to a scanning signal to be supplied to the scanning signal line 31'.

To drive the liquid crystal panel adopting TFTs of the Cs-on-gate like structure like the liquid crystal panel 2 of the present embodiment is essentially equivalent to apply a rectangular wave of low frequency to the flicker-noise-evaluation-use cell 41 (standard cell). In the past, refining technique of the liquid crystal has not been developed to a sufficient level, and the density of impurities contained in the liquid crystal was relatively high. This means that an optimization for rewriting at low frequency with respect to the resistance value of the liquid crystal material had not been made. In response, the applicant of the present application conducted an experiment in which a rectangular wave of low frequency is applied to the flicker-noise-evaluation-use cell 41 whose liquid crystal layer 44 consists of the liquid crystal in which the density of impurities is relatively high. As a result, the liquid crystal responded when reversing the polarity of the application voltage, and the flicker noise (flickering) was confirmed. Here, it is reasonable to assume that such flicker noise was generated due to a drop in voltage caused by releasing and receiving of charges with the movement of impurity ions when reversing the polarity. Such flicker noise is more obvious in the Cs-on-gate structure than in the Cs-on-common structure, because a scanning signal causes large fluctuation in the pixel electrode potential via the auxiliary capacitance under specific conditions. The foregoing phenomenon reappears by adopting "a liquid crystal material in which impurities are contaminated on purpose", "a liquid crystal material maintained under undesirable conditions", or "a cell maintained under undesirable conditions". Therefore, with the conventional material, in order to make the flicker noise invisible, it was required to set the frequency of reversing polarity to 30 Hz or above.

In contrast, when adopting "a highly refined liquid crystal material" and "a cell prepared in a highly cleaned process", a flicker noise was not observed even when driving a liquid crystal panel at 30 Hz or below. It was reasonable to assume that the foregoing effect was achieved for the reason that the movement of impurities in the liquid crystal was very small and can be ignored, and further, releasing and receiving of charges when reversing the polarity does not occur, and a drop in voltage therefore did not occur. As described, it was first confirmed by the applicant of the present application that it would be possible to drive a liquid crystal panel at or below 30 Hz without generating flicker noise. Unlike the CRT, the liquid crystal display device performs a "hold-type display" in which a display state is always held. In the conventional structure of the liquid crystal display device, even when displaying a static image which does not require to rewrite charges at high speed, a rewriting operation was always performed at high frequency, for example, 60 Hz according to the high speed writing of the CRT. As described, conventionally, even technical ideas of low frequency driving had not been even created, and there was no way to realize a low frequency driving a liquid crystal panel at or below 30 Hz by reducing fluctuations in potential of the pixel electrode in the liquid crystal panel 2 of the Cs-on-common structure of the liquid crystal display device 1 of the present embodiment, or other structure.

Next, the power consumption of the liquid crystal display device 1 was measured. As a result, the power consumption was 160 mW when driving with a rewriting period of a screen of 16.7 msec (at rewriting frequency of 60 Hz), while 40 mW when driving with a rewriting period of a screen of 167 msec (at rewriting frequency of 6 Hz). From the experiment, it was confirmed that the power consumption can be significantly reduced.

As a rewriting frequency of not more than 30 Hz, 6 Hz was adopted in FIG. 9(*a*) to FIG. 9(*e*); the low rewriting frequency of the present embodiment is not limited to this frequency, and the low rewriting frequency is preferably within a range of from 5 Hz to 30 Hz. As can be seen from the graph of FIG. 5(*b*), the liquid crystal voltage holding ratio Hr decreases below the point where the liquid crystal voltage holding ratio (Hr) is 97% and the driving frequency (Hz) is 1 Hz, further decreases sharply below the point where the liquid crystal voltage holding ratio (Hr) is 92% and the driving frequency (Hz) is 0.5 Hz. If the liquid crystal voltage holding ratio Hr becomes too small, the potential of the pixel electrodes 27 fluctuates due to leak current of the liquid crystal layer 13 or the TFT 14, and a flicker noise appears. Further, in the time region in 1 to 2 seconds after the writing, a larger fluctuation in OFF resistance value of the TFT 14 does not occur. The flicker noise in the display therefore has a strong dependency on the liquid crystal voltage holding ratio Hr.

In view of the foregoing, it is possible to fully suppress fluctuation in potential of the pixel electrode 27 by setting the rewriting frequency within the range of from 0.5 Hz to 30 Hz. As a result, the power consumption can be reduced to a sufficiently low level, and a flickering of the pixel can be surely prevented. It is more preferable that the rewriting frequency is set within the range below 15 Hz at which the power consumption can be significantly reduced to 1 Hz so that fluctuations in potential of the pixel electrode 27 can be reduced to be extremely small. As a result, the power consumption can be reduced to an extremely low level, and in the meantime, it is possible to more surely suppress a flickering of pixels.

As described, the synchronous clock generating circuit 7 is capable of setting a plurality of rewriting frequencies. Therefore, for example, by setting the rewriting frequency to be not more than 30 Hz when displaying a static image or a moving picture which is not being moved fast so that the power consumption can be reduced, while to or above 30 Hz when displaying a moving picture so that a smooth display can be ensured. Thus, it is possible to set the rewriting frequency suited for the image to be displayed. Further, by setting the plurality of rewriting frequencies to the multiples of the smallest rewriting frequency, such as 15 Hz, 30 Hz, and 60 Hz, in addition to the effect that a common reference synchronous signal can be adopted for all the rewriting frequencies, the effect that supplied data signals can be easily taken out or added is obtained when a rewriting frequency is switched to other requiring frequency. Further, by setting the respective frequencies to be those obtained by multiplying the smallest rewriting frequency (15 Hz in this example) by the integer power of the number 2 such as 30 Hz (15 Hz×2), 60 Hz (15 Hz×4), it is possible to generate respective rewriting frequencies by means of a generally used simple frequency dividing circuit for converting the frequency by dividing a logic signal of the smallest frequency by 1 over the integer power of the number 2.

In the liquid crystal display device 1, a refresh frequency for updating the display content of the liquid crystal panel 2 to a different image is set, which determines a data signal supply frequency for use in updating the display state by supplying different image data to each pixel. Further, by specifying the relationship between the rewriting frequency and the refresh frequency as below-indicated, improved characteristics of the liquid crystal panel 2 can be achieved.

For example, of all the plurality of rewriting frequencies, by at least setting the smallest rewriting frequency to integer multiples of not less than 2 of the refresh frequency, each pixel is selected based on the rewriting frequency in times of an integer of not less than 2 with respect to the same display content from the previous renewal to the next renewal. Assumed the refresh frequency be 3 Hz, then, in the example of FIGS. 9(*a*) through 9(*e*), the rewriting frequency of 6 Hz would be two times the refresh frequency, and it is therefore possible to supply the data signal of positive polarity and the data signal of negative polarity once respectively to the same pixel from the previous renewal to the next renewal. It is therefore possible to display the same display content by reversing the polarity of the potential of the pixel electrode 27 by the AC driving, and improved reliability of liquid crystal adopted in the liquid crystal panel 2 can be achieved.

Further, with respect to a change in refresh frequency, by arranging the synchronous clock generating circuit 7 at least to change the smallest rewriting frequency to an integer multiple of not less than 2 of the refresh frequency after being renewed, irrespectively of the renewal of the refresh frequency, it is possible to display the same display content by reversing the polarity of the potential of the pixel electrode 27 by the AC driving in the rewriting frequency after being renewed, and improved reliability of the liquid crystal adopted in the liquid crystal panel 2 can be easily achieved. For example, when the refresh frequency is changed from 3 Hz to 4 Hz, in response to this change, the rewriting frequencies of 6 Hz, 15 Hz and 30 Hz can be changed to 8 Hz, 20 Hz and 40 Hz respectively. Further, by setting the smallest rewriting frequency under the foregoing condition to integer multiples of 2 such as 6 Hz, the refresh frequency of not less than 1 Hz can be achieved, and the display content of the screen can be altered at least one time in 1 second. Therefore, when displaying a clock on the screen of the liquid crystal panel 2, the display of the clock can be made accurately at intervals of 1 sec.

As described, according to the liquid crystal display device 1 of the present embodiment, in the structure having the active element, it is possible to realize a reduction in power consumption while maintaining a desirable display quality. Moreover, since the liquid crystal display device 1 is provided with reflective electrodes 27*b* and is of the reflective type without requiring a back light, when driving at or below the frequency of or below 30 Hz, the power consumption can be reduced effectively (with high ratio). The same can be said for the reflective-type liquid crystal display device provided with a reflective member on the back surface of the liquid crystal panel.

The foregoing liquid crystal display device 1 are applicable to various electronic devices such as portable telephones, pocket-size game machines, PDA (Personal Digital Assistants), portable televisions, remote controllers, note-type personal computers, or other portable devices. If the foregoing portable devices are driven using battery, and by adopting the liquid crystal display device 1 of the present invention which realizes reduced power consumption while maintaining desirable display quality which is free from flicker noise, it is possible to drive them for a longer period of time with ease.

In the foregoing preferred embodiment, explanations have been given through the case of the display element wherein an auxiliary capacitance with respect to a predetermined electric capacitance is formed by the auxiliary capacitive electrode pads and auxiliary capacitance lines which are provided so as not to generate a capacitive bond with the scanning signal lines. However, the display element of the present embodiment is not limited to that of the foregoing structure, and, for example, a display element (liquid crystal display element) without auxiliary capacitance lines may be adopted as long as the formula (1) with the auxiliary capacitance $C_{CS}=0$ is satisfied. For example, as an example of such display element with the auxiliary capacitance $C_{CS}=0$, the following structure may be adopted; the structure of the liquid crystal panel 2 illustrated in FIG. 1 from which the drain electrodes 25, the auxiliary capacitive electrode pads 27a and the auxiliary capacitance lines 33 are omitted, and a drain of each TFT 14 is connected to the reflective electrode 27b.

Figure 27:
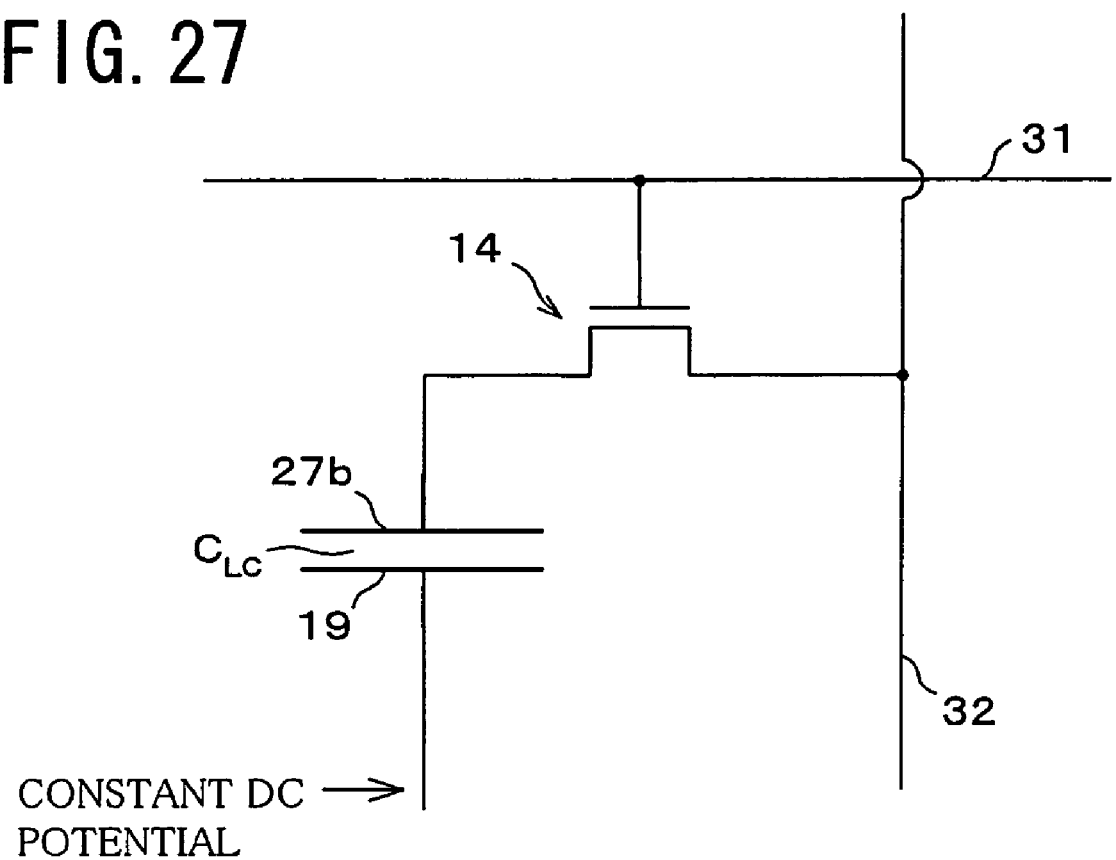
FIG. 27 is a circuit diagram illustrating an equivalent circuit per pixel of a liquid crystal panel in accordance with a modified example of the liquid crystal display device in accordance with one embodiment of the present invention.

An equivalent circuit per pixel of the foregoing structure is illustrated in FIG. 27. The equivalent circuit in FIG. 27 is arranged such that the auxiliary capacitor $C_{CS}$, constituted by the auxiliary capacitive electrode pad 27a, and the auxiliary capacitance lines 33 are omitted from the equivalent circuit of FIG. 4(a). In the present embodiment, with the auxiliary capacitance $C_{CS}=0$, the pixel voltage holding ratio P determined by the formula (1) would be 99.5%, and a display without flicker noise can be ensured even when driving at a rewriting frequency of 30 Hz or below.

Furthermore, even if a capacitive bond which cannot be ignored is formed between the pixel electrode and the scanning signal line, as long as the following conditions are satisfied such liquid crystal panel is arranged so that it permits fluctuations in noise to be applied to a voltage of the liquid crystal capacitance $C_{LC}$ from the scanning signal line with a supply of the scanning signal to be suppressed to below a level where flicker noise in the display state is perceptible. In the aforementioned formula (2), fluctuations in potential are described, which are to be applied to the pixel electrode 27' via the capacitance (auxiliary capacitance $C_{CS}$) between the auxiliary capacitive electrode pad 27a' and the scanning signal lines 31'. The capacitance between the pixel electrode 27' and the scanning signal line 31' changes with a distance between electrodes, a dielectric constant of the material between the electrodes, and an area of the electrode face. Therefore, assumed the bond capacitance between the pixel electrode 27' and the scanning signal line 31' be $C_{GP}$, then fluctuation in potential applied to the pixel electrode 27' in consideration of the bond capacitance $C_{GP}$ can be derived by the same way as the formula (2).

In the case of the Cs-on-gate structure wherein the bond capacitance $C_{GP}$ is not contained in the auxiliary capacitance $C_{CS}$, $\Delta Vp$ is obtained from the formula (2) wherein the numerator of the capacitive ratio is $C_{CS}+C_{GP}$, and the denominator is $C_{CS}+C_{GP}+C_{LC}+C_{GD}+C_{SD}$, and $\Delta Vp$ indicates an amount of fluctuation in potential of the pixel electrode. In the case of the Cs-on-common structure, $\Delta Vp$ is obtained from the formula (2) wherein the numerator of the capacitive ratio is $C_{GP}$, and the denominator is $C_{CS}+C_{GP}+C_{LC}+C_{GD}+C_{SD}$, and $\Delta Vp$ indicates an amount of fluctuation in potential of the pixel electrode. In the case of the structure without the auxiliary capacitance $C_{CS}$, $\Delta Vp$ is obtained from the formula (2) wherein the numerator of the capacitive ratio is $C_{GP}$, and the denominator is $C_{GP}+C_{LC}+C_{GD}+C_{SD}$, and $\Delta Vp$ indicates an amount of fluctuation in potential of the pixel electrode. Therefore, as long as $\Delta Vp$ is maintained at or below a predetermined value (3V or below in this example), a display state free from flicker noise can be realized.

As described, the structure of the liquid crystal panel 2 are arranged wherein the auxiliary capacitive electrode pads 27a and the auxiliary capacitance lines 33 are formed so as not to generate capacitive bonds with the scanning signal lines 31. This indicates that the capacitance which is a part of the foregoing bond capacitance $C_{GP}$ is not generated between the auxiliary capacitive electrode pad 27a and the scanning signal lines 31, and auxiliary capacitance lines 33 and the scanning signal lines 31, and $\Delta Vp$ with respect to scanning is not more than the predetermined value. As described, the structure of the liquid crystal panel 2 is arranged such that the capacitive bonds between the reflective electrodes 27b and the scanning signal lines 31 are very small and ignorable. This indicate that the capacitance which is a part of the foregoing bond capacitance $C_{GP}$ is not generated between the reflective electrodes 27b and the scanning signal lines 31, and $\Delta Vp$ with respect to scanning is not more than the predetermined value. With the foregoing structure, it is therefore possible to realize a display without flicker noise in the display of the liquid crystal panel 2.

Second Embodiment

The following descriptions will discuss still another embodiment of the display device of the present invention in reference to FIG. 12 through FIG. 19. For ease of explanation, members (structures) having the same functions as those shown in the drawings pertaining to the first embodiment above will be given the same reference symbols, and explanation thereof will be omitted here.

Figure 12:
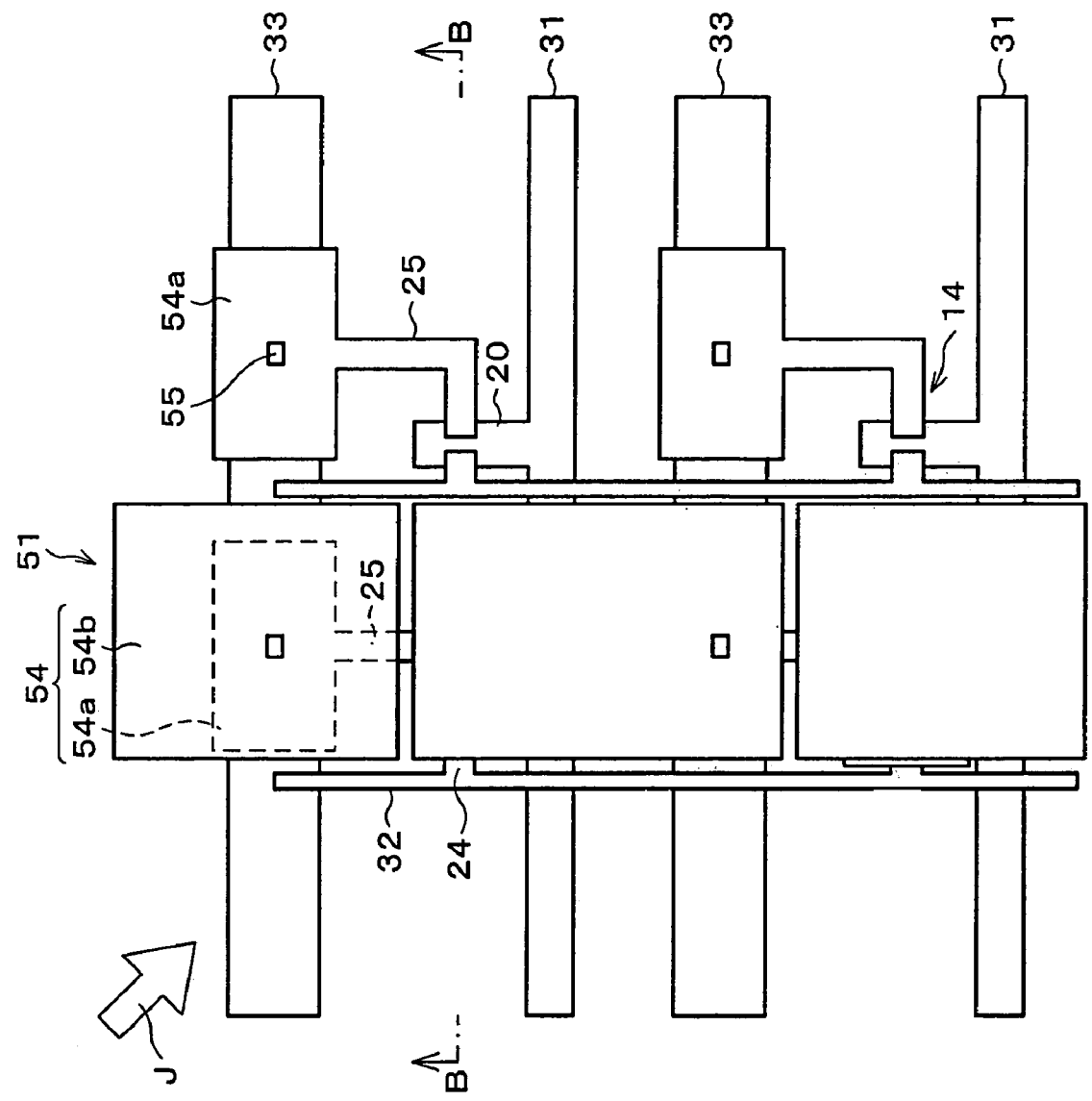
FIG. 12 is a perspective plan view illustrating the structure of the liquid crystal panel of the liquid crystal display device in accordance with another embodiment of the present invention.
Figure 13:
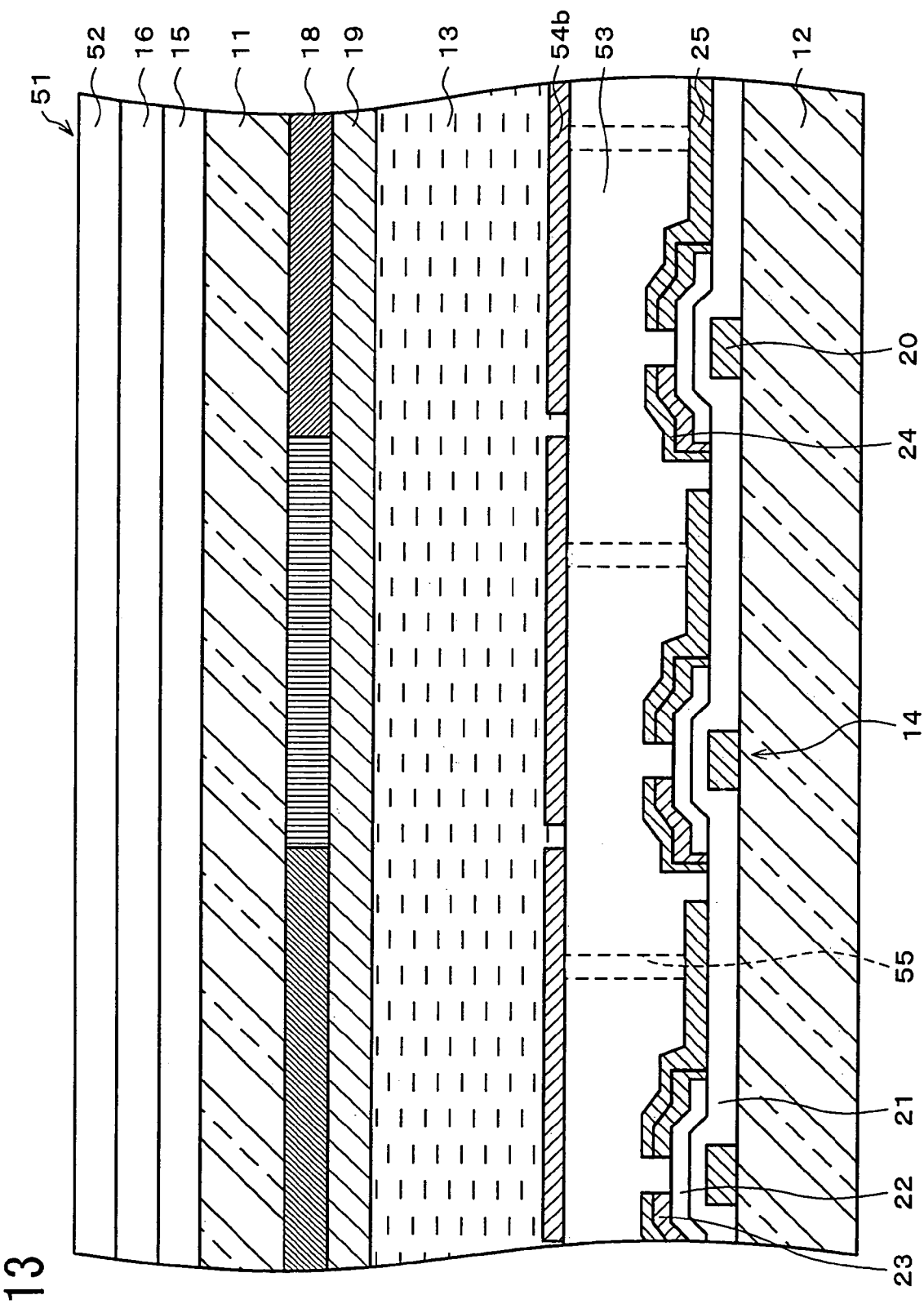
FIG. 13 is a cross section of the portion along an arrow line B-B of the liquid crystal panel of FIG. 12.

The display device of the present embodiment has the same structure as the liquid crystal display device 1 except that a liquid crystal panel 51 shown in FIGS. 12 and 13 is adopted as a display element (liquid crystal display element) in replace of the liquid crystal panel 2 of the first embodiment as explained in reference to FIG. 3.

FIG. 13 shows the cross-sectional view of the liquid crystal panel 51 which is a cross section of the portion along a line B-B of FIG. 12 to be described layer. The liquid crystal panel 51 is an active matrix liquid crystal panel of reflective type, and the basic structure thereof is the same as that of the liquid crystal panel 2 except for the following. On the top layer, formed is a front scattering plate 52 in replace of the anti-reflection film 17 of the liquid crystal panel 2. Further, in replace of the interlayer insulating film 26 having formed thereon fine protrusions and recessions of the liquid crystal panel 2, an interlayer insulating film 53 of the flat top is formed. In replace of the reflective electrode 27b of the liquid crystal panel 2, flat reflective electrodes 54b are formed. The auxiliary capacitive electrode pads 54a (in replace of the auxiliary capacitive electrode pad 27a) and the reflective electrodes 54b is conducted via the contact holes 55 formed at different positions from the contact holes 28 of the liquid crystal panel 2. In the foregoing structure of the present embodiment, the pixel electrodes 54 are constituted by the auxiliary capacitive electrode pads 54a and the reflective electrodes 54b.

As illustrated in FIG. 12 taken from above the portion below the liquid crystal layer 13 of the liquid crystal panel 51 shown in FIG. 13, the reflective electrode 54b of each pixel is formed to cover the scanning signal line 31 for driving pixels in one line above when the scanning direction is assumed to be the up-and-down direction of the liquid crystal panel 51 and the TFT 14 for use in driving the pixels in one line above. Further, the contact hole 55 of the auxiliary capacitive electrode pad 54a is formed above the portion where the auxiliary capacitance lines 33 and the auxiliary capacitance $C_{CS}$ are formed. Further, in the liquid crystal panel 51, an alignment treatment is applied in the direction of the arrow J.

In most of the time, a non-selection voltage is applied to each of the scanning signal line 31. In the case of an active matrix liquid crystal display device adopting amorphous silicone, the non-selective voltage is generally around −10 V. Further, in order to improve the reliability of the liquid crystal material, in general, it is therefore preferable that a data signal in which the polarity is normally reversed for each field be applied to the pixel electrode, i.e., an AC driving is performed with respect to the same pixel. When driving with the rewriting frequency of not more than 30 Hz under the foregoing conditions, in the case where the reflective electrode of each pixel is arranged so as not to face the scanning signal lines for use in driving the pixels in one line above, the electric field having the component in the direction parallel to the pixel electrode surface generate. Moreover, a difference in electric intensity is appeared between the positive polarity and the negative polarity of the data signal. As a result, a disclination due to reverse tilt domain is generated in the edge (end portion) of the pixel electrode, and flicker noise is perceptible, which lowers a display quality.

In view of the foregoing, in the present embodiment, the reflective electrode 54b of each pixel is formed so as to have a portion facing the scanning signal line 31 for driving the pixel in one line above. Accordingly, even in the case where the polarity of the data signal is reversed each time the data signal of the reflective electrode 54b is rewritten, electric field having a component parallel to the reflective electrode surface is not generated between the reflective electrode 54b and the scanning signal line 31 of the pixel in one line above (scanning signal line 31 to be connected to the pixel). It is therefore possible to suppress a generation of a disclination due to the reverse tilt domain in the edge of the reflective electrode 54b. In the foregoing example, the structure wherein the reflective electrode 54b is provided so as to face the scanning signal line 31 for use in driving the pixels in one line above is adopted; however, the structure wherein the reflective electrode 54b is provided so as to face the scanning signal line 31 for use in driving the pixels in two lines above may be equally adopted. Namely, the required condition is that the reflective electrode 54b is provided so as to face the scanning signal line 31 for use in driving the pixels, such as the pixels in one line above or below of the line adjacent in a fixed direction along the scanning direction to the line to which the reflective electrode 54b itself is connected. In other words, it may be arranged such that the reflective electrode 54b is provided so as to include at least a portion facing the scanning signal lines 31 to be connected to the pixel adjacent in a fixed direction along the scanning direction to the pixel to which the reflective electrode 54b itself is connected. In the present embodiment, the reflective electrode 54b is arranged so as to face the scanning signal line 31; however, the same effect can be achieved without modification when adopting the pixel electrode of a light transmissive type in replace of the reflective electrode 54b of the foregoing arrangement.

The reflective electrode 54b of each pixel is provided so as to have a portion facing the TFT 14 for use in driving the pixel in one line above. With the foregoing arrangement, as illustrated in FIG. 12, in the case where the gate electrode 20, which constitutes a part of the scanning signal line 31, is extended to the TFT 14 branched from the main body of the scanning signal line 31, the reflective electrode 54b faces the gate electrode 20. Therefore, between the reflective electrode 54b and the gate electrode 20, an electric field having a component parallel to the reflective electrode surface is not generated, and it is therefore possible to suppress the generation of disclination due to the reverse tilt domain in the edge of the reflective electrode 54b. In the foregoing example, the structure wherein the reflective electrode 54b is provided as to face the TFT 14 for use in driving the pixels in one line above is adopted; however, the structure wherein the reflective electrode 54b is provided so as to face the TFT 14 for use in driving the pixels in one line below may be equally adopted. Namely, the required condition is that the reflective electrode 54b is provided so as to face the TFT 14 for use in driving the pixels of the line adjacent in a fixed direction to the line to which the reflective electrode 54b itself is connected; in other words, the reflective electrode 54b is arranged so as to have at least a portion facing the TFT 14 of the pixel adjacent in the fixed direction to the pixel to which the reflective electrode 54b is connected.

With the foregoing arrangement, the channel region of the TFT 14 can be shielded by the layer of the reflective electrode 54b formed in the same substrate, winding of light into the channel region can be reduced. Further, by shielding the channel region, the photo excitation of the carrier in the channel region can be suppressed, and it is therefore possible to prevent a reduction in resistance value of the TFT 14 in the non-selection period. As a result, even when driving the pixel at a rewriting frequency of 30 Hz or below, fluctuations in brightness due to the charge holding failure can be suppressed, and a display without flicker noise can be obtained. In the present embodiment, the reflective electrode 54b is arranged so as to face the TFT 14; however, the same effect can be achieved without modification when adopting the pixel electrode of the non-transmissive type in replace of the reflective electrode 54b of the foregoing arrangement.

Figure 14:
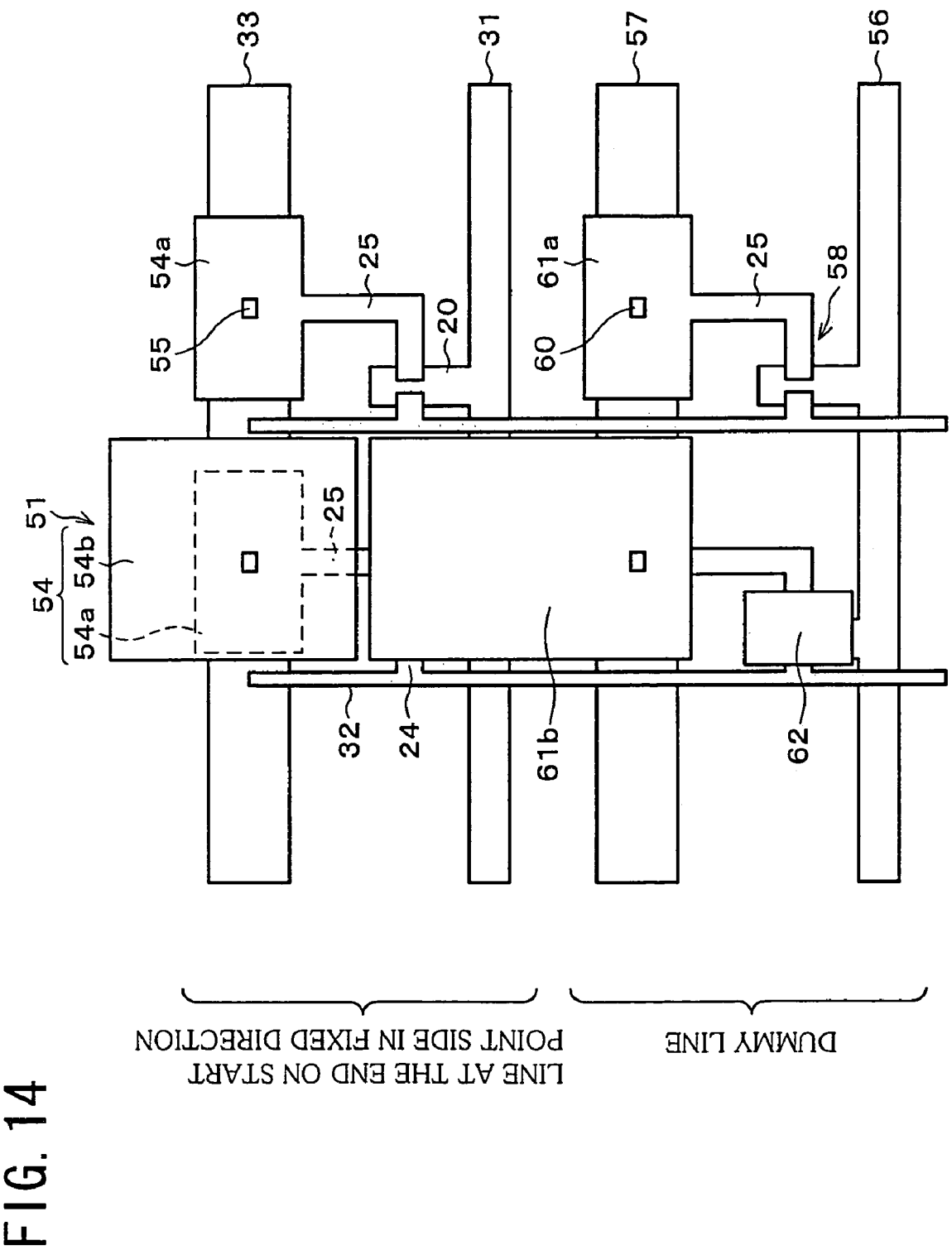
FIG. 14 is a perspective plan view illustrating the structure of the liquid crystal panel of FIG. 12.

As illustrated in FIG. 14, in the present embodiment, among lines effective for the display of the liquid crystal panel 51, as lines at the end of a start point in a fixed direction along the scanning direction, bottom lines are formed, and further under the bottom lines, dummy lines are formed. For the dummy lines, dummy scanning signal lines 56 and the dummy auxiliary capacitance lines 57 are formed so as to be extended in the same direction as the scanning signal lines 31 and the auxiliary capacitance lines 33. The TFTs 58 are provided at intersections between the dummy scanning signal lines 56 and the data signal lines 32, and further provided are the auxiliary capacitive electrode pad 61a connected to each TFT 58 via the drain electrode 25, and a reflective electrode 61b (active element light-shielding layer) connected to the auxiliary capacitive electrode pad 61a via the contact hole 60. The scanning signal line 31 and the TFTs 14 on the last line are provided so as to face the reflective electrodes 61b as selected by the dummy scanning signal line 56. As described, in the liquid crystal panel 51, a line of pixels having the same structure as that of the lines of pixels effective for display, wherein the reflective electrodes 61b serving as active element light-shielding layer is used as pixel electrode, is formed further to the outer side from the line at the end of a starting point in the fixed direction along the scanning direction. In other words, the liquid crystal panel 51 includes pixels having the same composition as that of the pixels effective for display, wherein the reflective electrodes 61b serving as active element light-shielding layer is used as pixel electrode, which are formed adjacent to the pixels, at the end of a starting point in the above fixed direction, in an opposite direction to this fixed direction.

According to the foregoing arrangement, the TFTs 14 of the line in the last stage can be shielded by the reflective electrode 61b, and it is therefore possible to prevent a reduction in resistance value of the TFTs 14 in the non-selection period. As a result, even when driving pixels at frequency of not more than 30 Hz, fluctuation in brightness due to charge holding failure can be suppressed, and a display free from flicker noise can be realized. The reflective electrodes 61b are non-transmissive type electrodes which can be AC driven by the data signals received through the data signal lines 32 as in the case of the reflective electrodes 54b. With this arrangement of AC driving the reflective electrodes 54b, for example, the following problem which can be avoided; the TFTs 58 electrically connected to the reflective electrodes 54b are in the OFF state, and the reflective electrodes 54b are electrically floated, i.e., charges which are not under control are stored in the reflective electrodes 54b, and then the stored charges turn into the DC voltage applied to the liquid crystal. As a result, the degradation of a liquid crystal around the reflective electrode 54b can be prevented, and the reliability in liquid crystal material can be improved, resulting an improvement of reliability in pixel area for display.

In the above arrangement, the reflective electrodes 61b are provided so as to shield the TFTs 14 of the line in the last stage; however, in the case of placing upside down the liquid crystal panel 51 in FIG. 14, "the fixed direction" which determines the direction adjacent to the aforementioned fixed direction is reversed in the up and down direction. Therefore, the TFTs 14 on the top line are shielded in this case. As described, the reflective electrodes 61b have a function of shielding the TFTs 14 of the line in the end portion on the start point side in the fixed direction, i.e., a function of shielding the TFTS 14 of pixels in the end portion on the start point side in the fixed direction among the pixels effective for display.

Further, the TFTs 58 are arranged so as to transmit data signals to the reflective electrodes 61b through the data signal lines 32 when the TFTs 58 are set in the selective state with a supply of scanning signals from the dummy scanning signal line 56. With this arrangement, the line of pixels in the last stage have the same composition as the lines of pixels in any upper stages than the bottom stage, and it is therefore possible to ensure the repetitive continuity of the structure in the scanning direction of the liquid crystal panel 51. As a result, the pixels of the line in the bottom line and the pixels of the line in any upper stages than the bottom stage are in the same voltage application state, thereby achieving an improved reliability of the liquid crystal material. In the above example, in the line in the bottom stage among the lines effective for display of the liquid crystal panel 51, a dummy scanning signal line 56 is formed in still lower stage than the line in the bottom stage. However, in the case of placing the upside down the liquid crystal panel 51 in FIG. 14, the dummy scanning signal line 56 is formed in still upper stage than the line in the top stage among the lines effective for display. As described, the dummy scanning signal line 56 is provided on further outside than the line at the end of a starting point in the aforementioned fixed direction.

Above respective TFTs 58 in the dummy line, the reflective film 62 for shielding the TFTs 58 is provided. The reflective film 62 is made of the same material and in the same process as the reflective electrodes 54b and 61b. In this example, the reflective film 62 in the form of one island is provided with respect to one TFT 58; however, the reflective film 62 may be provided as a pattern in the band shape connected in the direction of the dummy scanning signal line 56. Here, the reflective film 62 needs not be electrically insulated from the TFT 58.

Figure 15A:
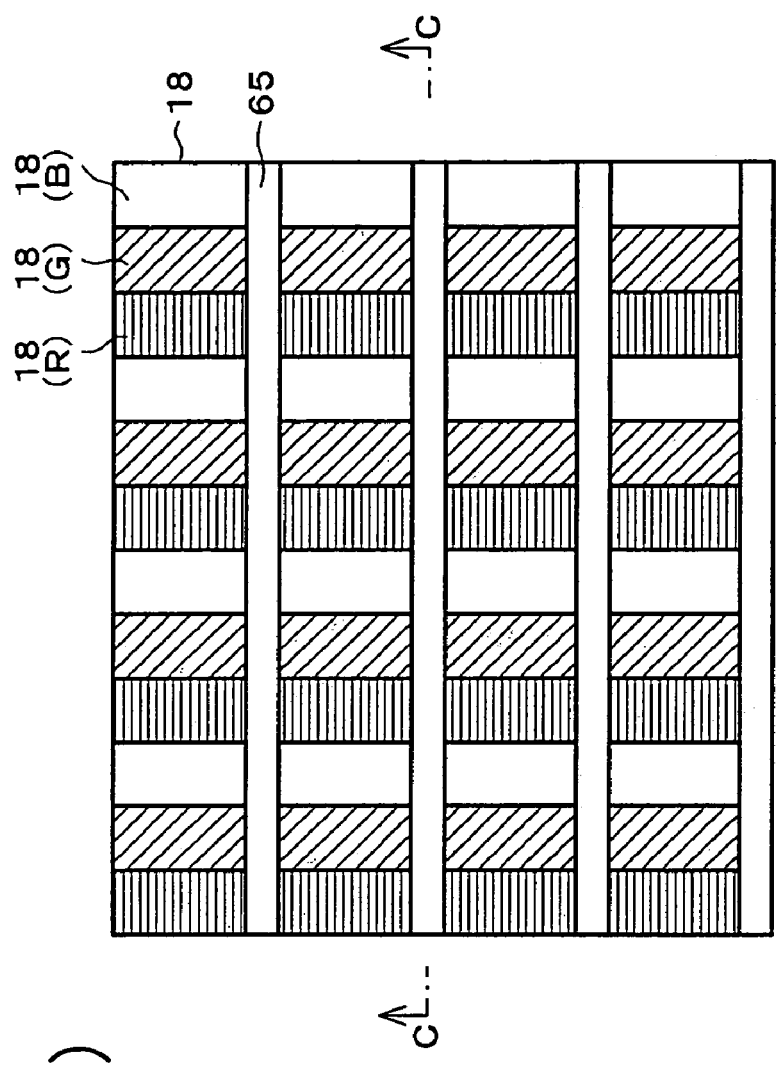
FIG. 15(a) and FIG. 15(b) are plan views and a side view respectively illustrating the structures of parts of the liquid crystal panel of FIG. 12.
Figure 15B:
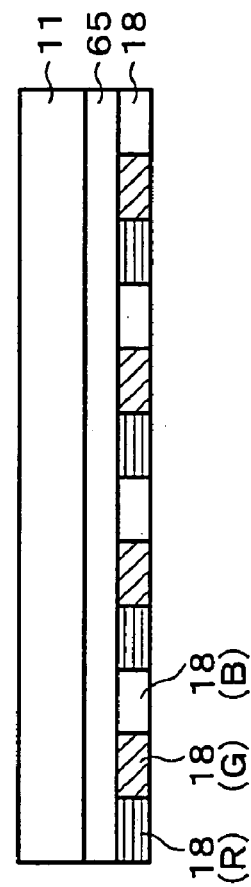
Figure 16:
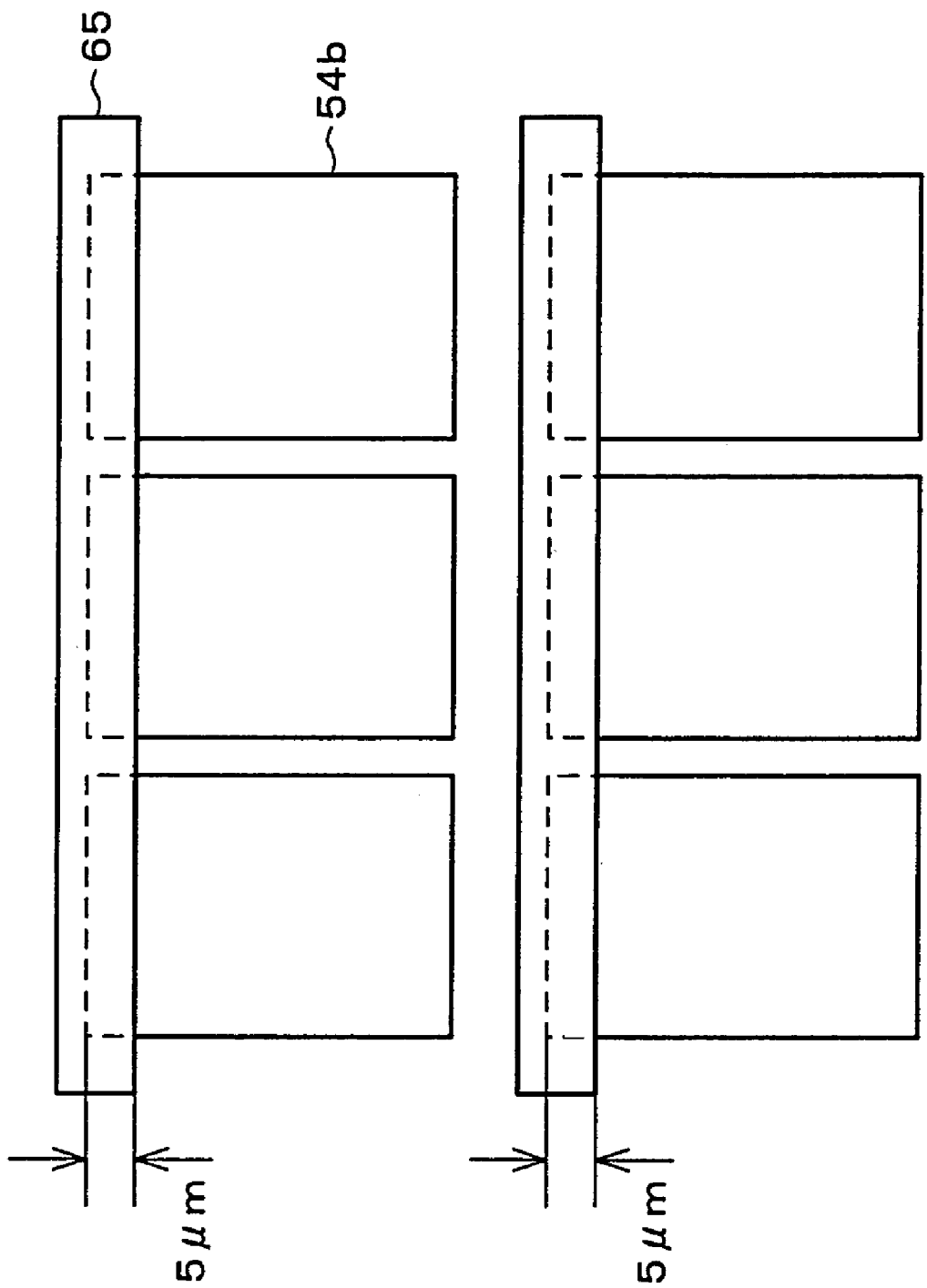
FIG. 16 is an explanatory view which explains the positional relationship-of the part of the liquid crystal panel of FIGS. 15(a) and 15(b).

Next, the color filter 18 shown in FIG. 13 will be explained. The color filter 18 may be provided with the light-shielding layer 65 shown in FIGS. 15(a) and 15(b). As shown in the perspective plan view of FIG. 15(a), the color filter 18 is composed of a plurality of red color filter includes a plurality of lines for the red color filters 18(R), lines for the green color filter 18(G), and lines for blue color filters 18(B). The respective light-shielding layers 65 are arranged in the same direction as the scanning signal lines 31. FIG. 15(b) is a cross section of the portion along a line C-C of FIG. 15(a). The light-shielding layers 65 are formed on the glass substrate. The positional relationship between the light-shielding layer 65 and the reflective electrodes 54b are shown in FIG. 16. As illustrated in FIG. 16, the respective light-shielding layers 65 are provided at positions (see arrow J of FIG. 12) facing the edge (end portion) on the side closer to the alignment treatment starting point of the reflective electrode 54b. In an example of FIG. 16, each light-shielding layer 65 covers the vicinity of the edge with a thickness of 5 μm, where the reflective electrodes 54b aligned on the same line. Here, the structure of the light-shielding layer 65 is not particularly limited, as long as each light-shielding layer 65 faces at least a part of the aforementioned edge.

By forming the forgoing light-shielding layers 65, if reversing the polarity of the data signal to be supplied to the data signal lines 32 for each scanning period, the disclination line due to reverse tilt domain generated at the edges of the reflective electrodes 54b can be concealed, thereby realizing a uniform display.

Figure 17:
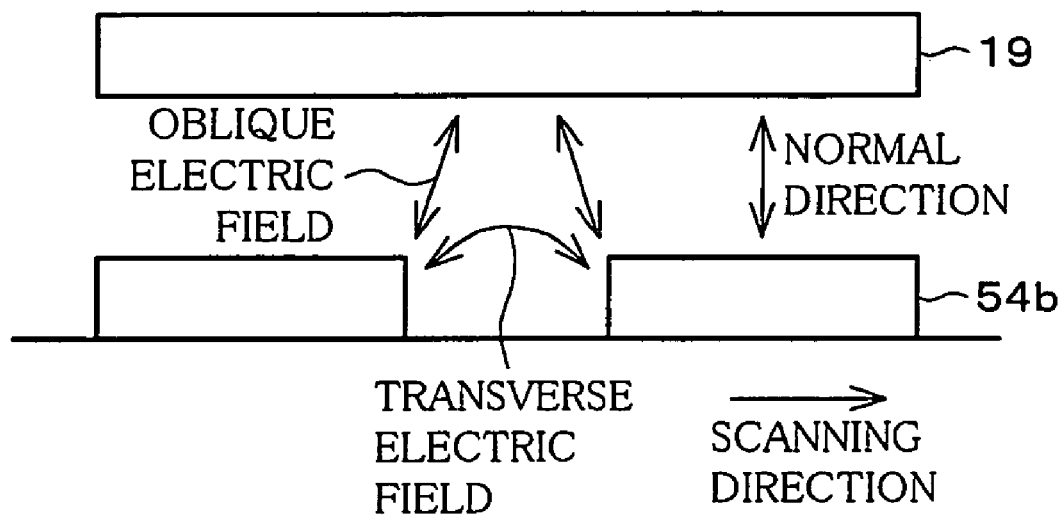
FIG. 17 is an explanatory view which explains the state of an electric field generated in the liquid crystal panel.

Next, the mechanism of the foregoing effect will be explained. When performing a driving method wherein the polarity of a data signal is reversed for each scanning period, as illustrated in FIG. 17, a transverse electric field having components in the scanning direction is generated between the two reflective electrodes 54b adjacent in the scanning direction, which may cause a generation of a disclination line due to a reverse tilt domain at the edges the reflective electrodes 54b on the closer side to the starting point of the alignment treatment. In the case where the disclination line is generated, when driving the liquid crystal panel 51 at a frequency of not less than 30 Hz, the disclination line as generated is maintained without being moved, and thus there would not have much effect of the disclination line on the display; on the other hand, when driving at frequency of not more than 30 Hz, due to the polarity of the voltage of the reflective electrodes 54b, an oblique electric field, generated between the edges of the reflective electrodes 54b and the transparent common electrode 19 in the direction inclined from the normal direction of the surface of the liquid crystal panel 51, and the transverse electric field becomes asymmetrical, and the disclination line is moved. In view of the foregoing, the light-shielding layers 65 are formed so that the disclination line being moved can be concealed.

The light-shielding layer 65 may be formed so as to oppose the entire surface of the reflective electrodes 61*b* of FIG. 14. With this arrangement, the display can be prevented from being affected by the reflected light from, which is returned on the display surface of the liquid crystal panel 51, the reflective electrodes 61*b* irrelevant to the display. As described, the light-shielding layer 65 corresponding to the reflective electrodes 61*b* of the FIG. 14 functions as the shielding layer against reflected light.

In the structure of FIG. 13, the interlayer insulating film 53 is set to 3 μm thick, and the interlayer insulating film 53 absorbs the level difference between the TFTs 14 as the ground member and each line. It is therefore possible to make the surface of the interlayer insulating film 53 flat, i.e., the reflective electrode 54*b* flat. As described, by making the flat state of the surface of the interlayer insulating film 53 and the reflective electrodes 54*b*, generation of distortion of the electric field can be prevented. In the case where the surface level difference exists in the reflective electrode 54*b*, variation in film thickness occurs corresponding to the level difference of the surface when applying the alignment film to the reflective electrodes 54*b*. In this structure, the polarization of the alignment film appears in the thickness direction; however, when driving a liquid crystal panel at low frequency, the direction of polarization of the alignment film is fixed. As a result, an offset is generated in the voltage to be applied to the liquid crystal by the polarization, and the amount of polarization varies with respect to the variations in film thickness, and then the amount of offset also varies. Namely, the optimal counter voltage varies in each portion within the pixel, and when the liquid crystal molecule responds to the reversing of polarity, a partial switching between the bright state and the dark state occurs, which are perceptible as the variation in the brightness, namely, as flicker noise in some cases.

Figure 18A:
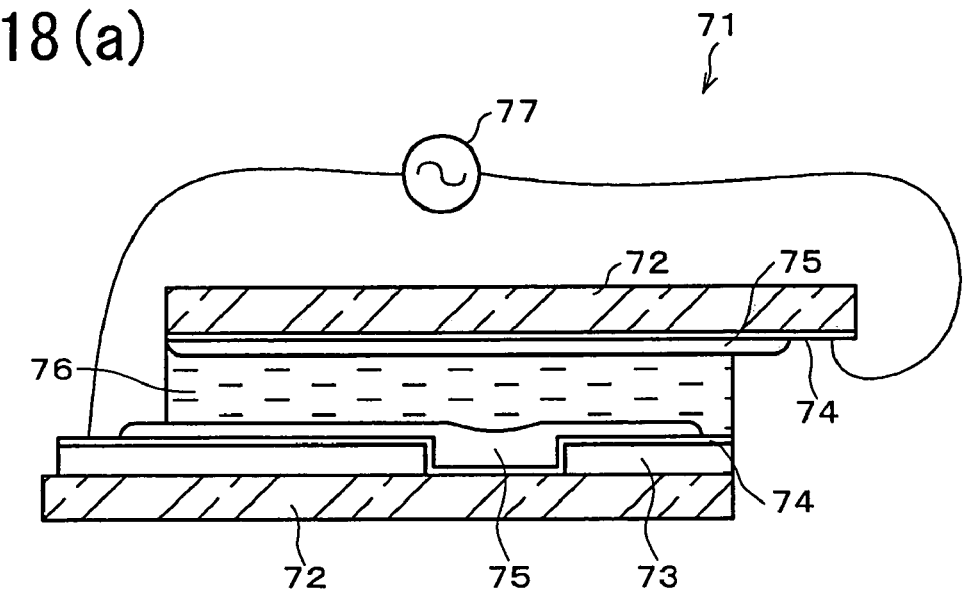
FIGS. 18(a) and 18(b) are explanatory views which explain the method of evaluating characteristics of the liquid crystal panel.
Figure 18B:
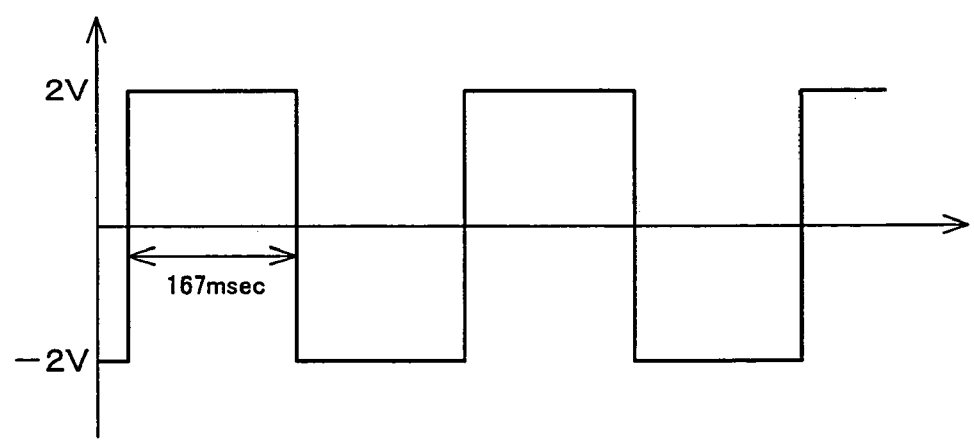

Here, the relationship between the surface level difference of the electrode and the condition of the generation of flicker noise were examined. FIG. 18(*a*) shows a cross-sectional view of the flicker-noise-evaluation-use cell 71 used in the experiment. The flicker-noise-evaluation-use cell 71 includes a photoresist pattern 73 formed on the upper surface of one of the pair of substrates 72 which are placed opposing one another. On the photoresist pattern 73, formed are the transparent electrode 74 and the alignment film 75 in this order, and on the lower surface of the other glass substrate 72, formed are a flat transparent electrode 74 and the alignment film 75, and the liquid crystal layer 76 interposed between the alignment films 75. The photoresist pattern 73 is formed by applying the positive-type photoresist (OFPR-800 available from Tokyo Applied Chemistry), to the substrate 72 and a level difference is formed by the photolithograpy. In this process, the revolutions of spin coating varies within the range of from 500 rpm to 3000 rpm, and various level differences within the range of from 1.0 μm to 0.1 μm are obtained. The alignment film 75 was formed by applying PVA by the spin coating method (800 rpm).

In the flicker-noise-evaluation-use cell 71, a voltage was applied between two the transparent electrodes 74 from the signal generating device 77. The resulting voltage waveform is shown in FIG. 18(*b*). In the case of adopting a flat cell without a level difference, there is no variations in film difference, while in the case of adopting a cell with a level difference, variations in film thickness occur in the alignment film. As a result, variations in polarization occur which in turn causes variations in electric field distribution, and variations in brightness, i.e., flicker noise are perceptible. In the state where a voltage is applied from the signal generating device 77, the level difference and the condition of the generation of the flicker noise were observed, and the results shown in Table 5 were obtained.

TABLE 5

| SURFACE LEVEL DIFFERENCE [μm] | RESULT OF OBSERVATION ON FLICKER NOISE WITH EYES |
|---|---|
| 0.1 | ○ |
| 0.2 | ○ |
| 0.3 | ○ |
| 0.4 | ○ |
| 0.5 | ○ |
| 0.6 | ○ |
| 0.7 | Δ |
| 0.8 | x |
| 0.9 | x |
| 1.0 | x |

○: flicker noise was not perceptible.
Δ: flicker noise was partially perceptible.
x: flicker noise was perceptible.

As can be seen from Table 5, it was confirmed that when the surface level difference was 0.7 μm, the flicker noise became less obvious, and when the surface level difference was at or below 0.6 μm, no flicker noise was perceptible. It could therefore be seen that the following condition is preferable; for respective reflective electrodes 54*b* shown in FIG. 13, the surface level difference excluding the portion electrically contacting the TFT 14, i.e., the portion formed on the contact hole 55, is not more than 0.6 μm. As long as the surface level difference is within the foregoing range, a still more uniform display in which the flicker noise is more suppressed can be realized because of no alignment disorder within the pixel. With respect to the respective reflective electrodes 54*b* of FIG. 13, in practice, the level difference was measured by the phase-shifted interference microscope. As a result, the maximum level difference was 0.2 μm.

Figure 19:
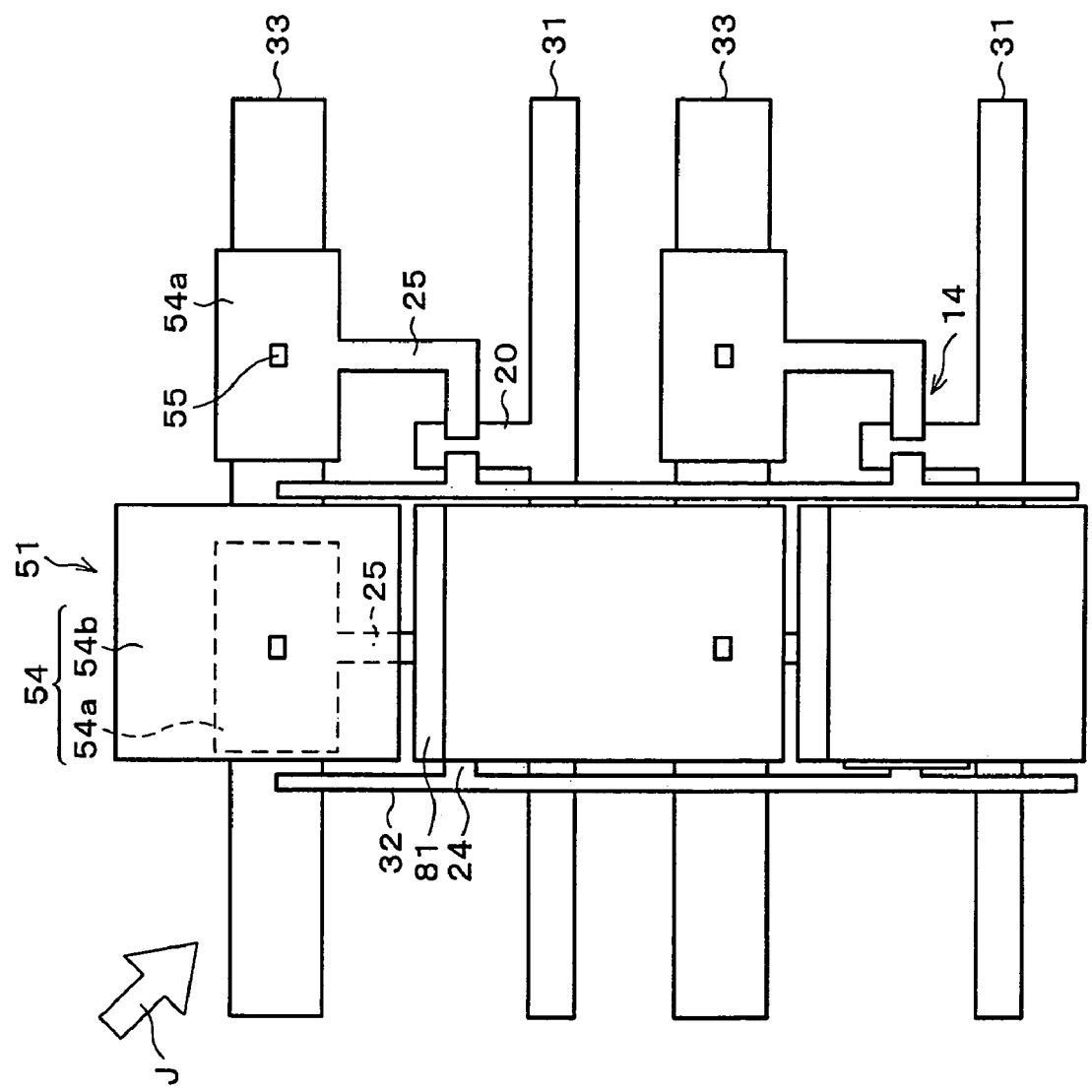
FIG. 19 is a perspective plan view which explains the modified example of the liquid crystal panel of FIG. 12.

In the liquid crystal panel 51, as illustrated in FIG. 19, the portion around the edge on the side closer to each alignment process starting points of the reflective electrodes 54*b* can be formed by the transparent electrode 81. With this arrangement, since the disclination line due to the reverse tilt domain as explained in FIG. 17 is generated on the transparent electrodes 81, the effect of the disclination line with respect to the reflected light can be eliminated, thereby a uniform display can be realized.

Figure 20:
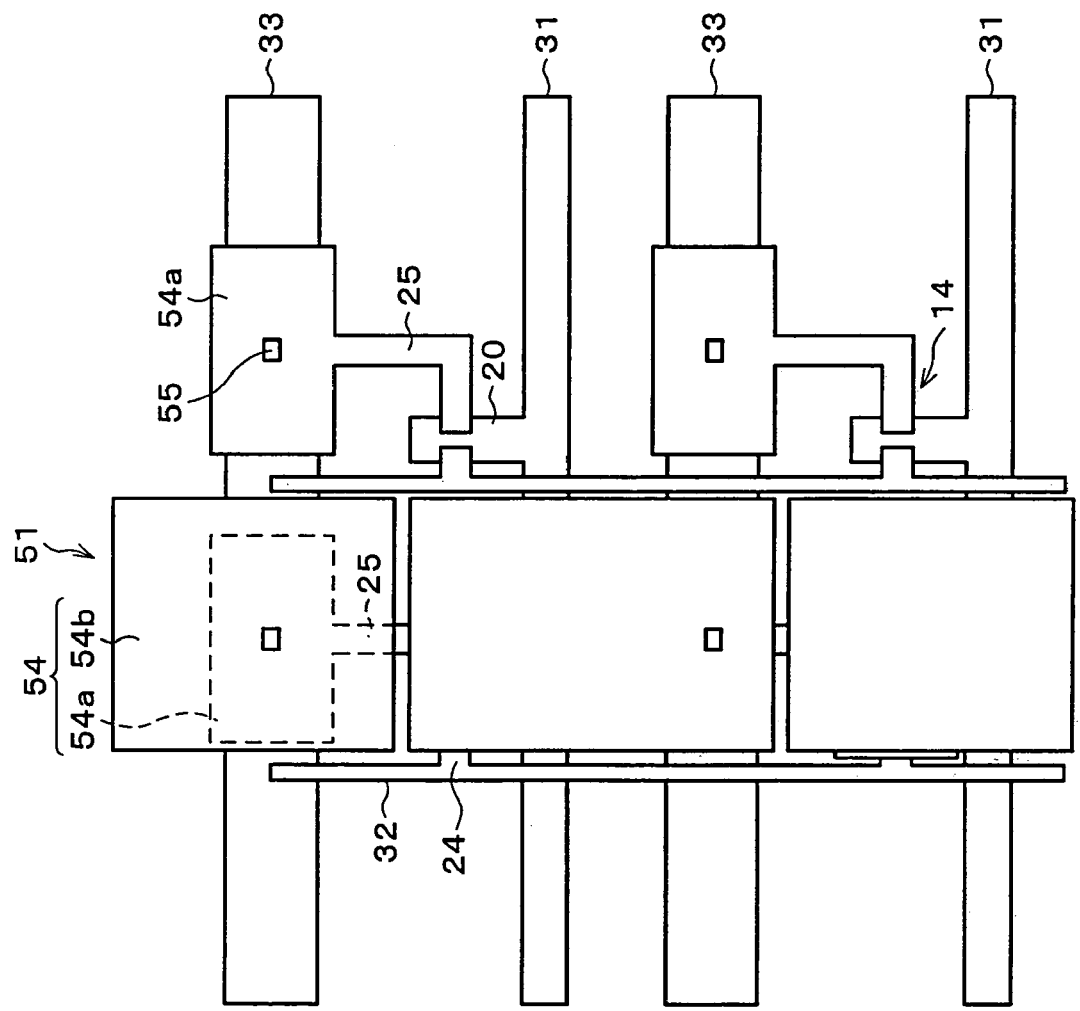
FIG. 20 is a perspective plan view which illustrates another modified example of the liquid crystal panel of FIG. 12.

As illustrated in FIG. 20, the liquid crystal panel 51 may be further arranged such that the alignment treatment direction on the side of the glass substrate 12 in which the TFTs 14 are formed may be set almost parallel to the scanning signal lines 31 (the direction of an arrow K). As a result, the alignment direction of liquid crystal molecules on the side of the glass substrate 12 is set within the plane vertical to the electric field in the lateral direction as explained in reference to FIG. 17. In the case of AC driving of the liquid crystal panel 51 at the rewriting frequency at or below 30 Hz, distortion in electric field with respect to the liquid crystal molecules become symmetrical. As a result, generation of disclination line due to the reverse tilt domain can be suppressed, thereby realizing a uniform display.

As described, according to the liquid crystal display device in accordance with the present embodiment, it is possible to reduce power consumption by driving the liquid crystal panel Slat a rewriting frequency of 30 Hz or below as in the structure of the aforementioned first embodiment, and in the meantime, by controlling the alignment state, or suppressing the effects of disclination, a uniform display free from flicker noise can be obtained.

Third Embodiment

Figure 21:
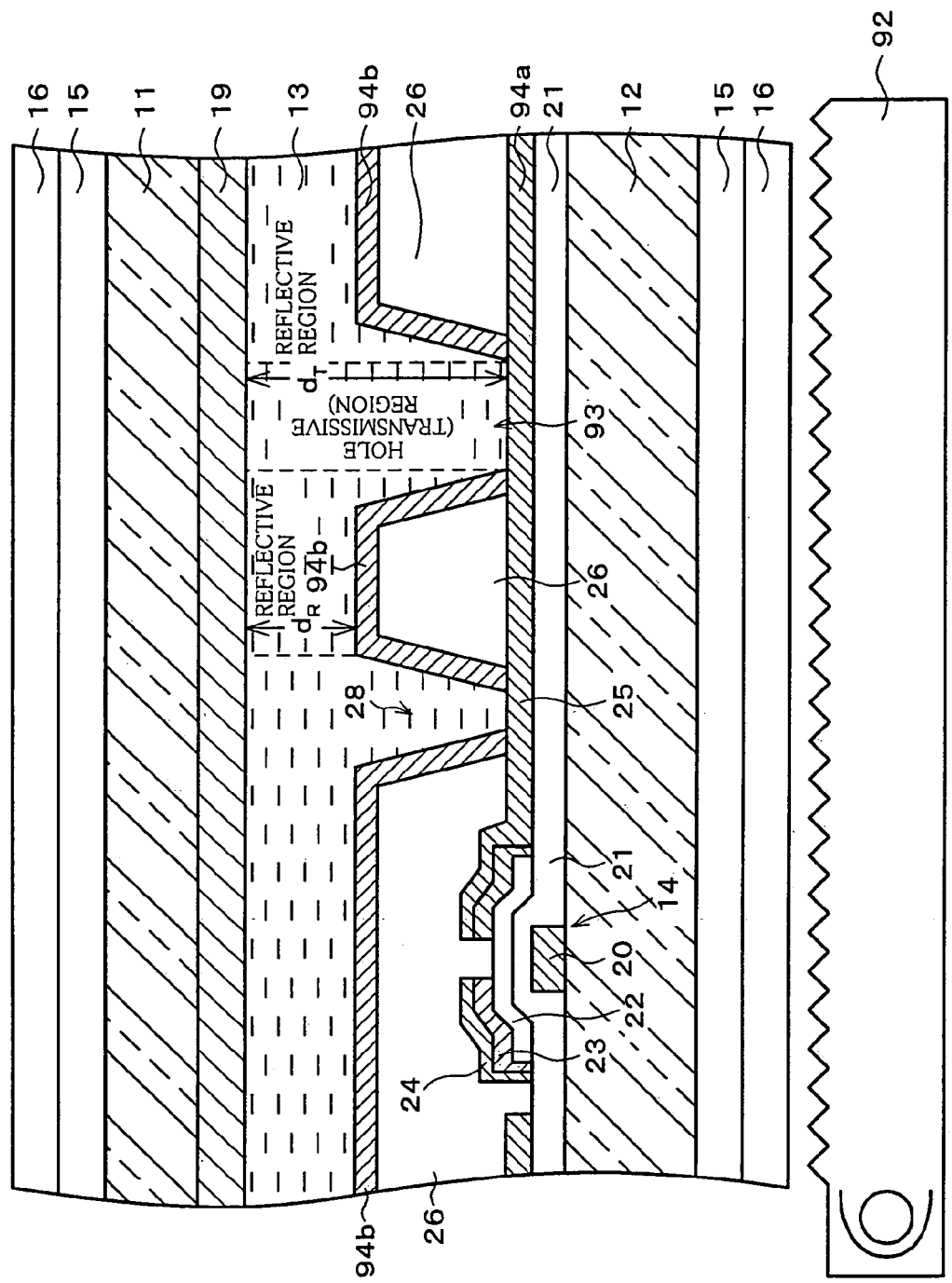
FIG. 21 is a cross-sectional view which illustrates the structure of a liquid crystal panel of a liquid crystal display device in accordance with still another embodiment of the present invention.
Figure 22:
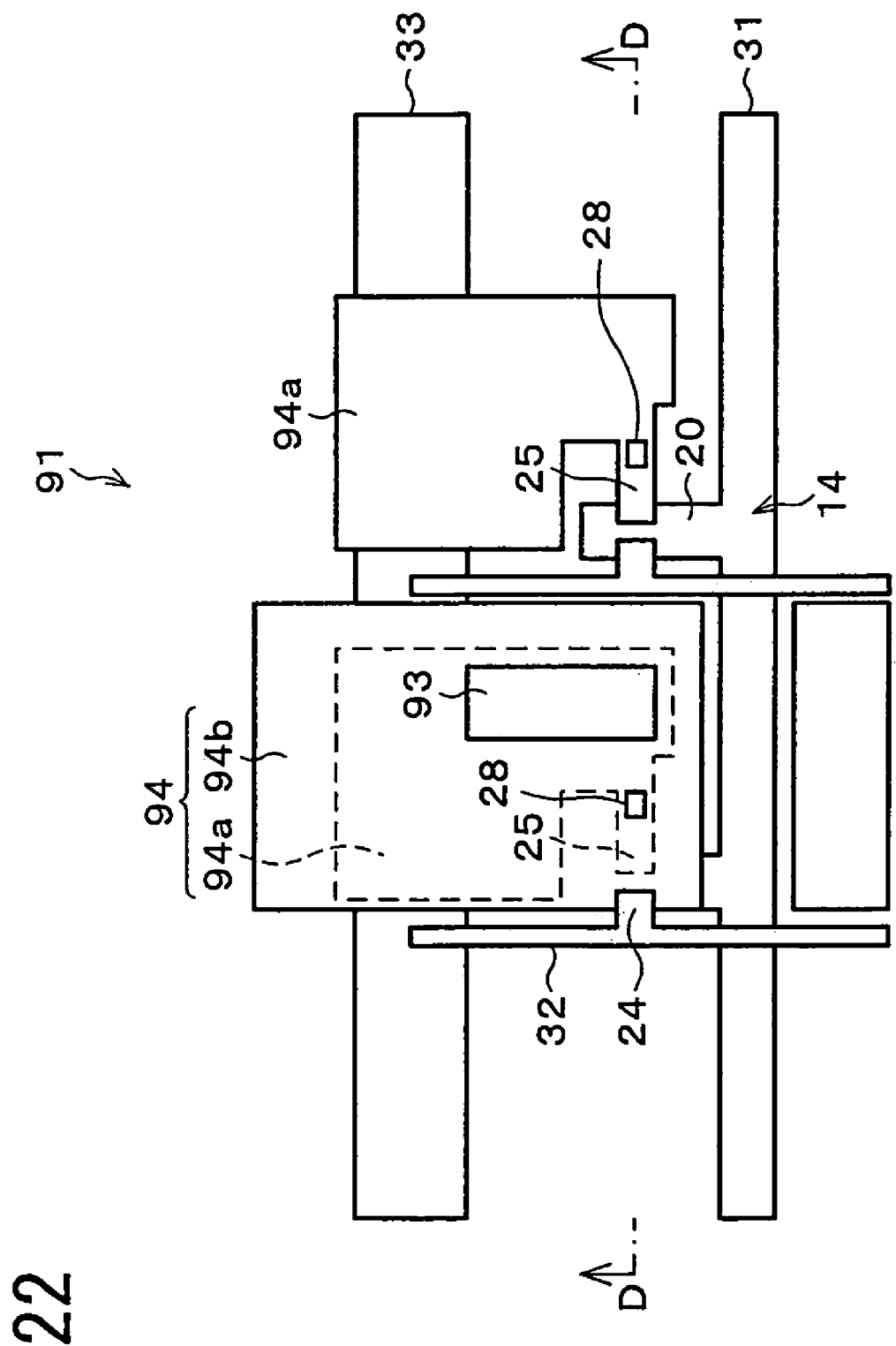
FIG. 22 is a perspective plan view of the liquid crystal panel of FIG. 21.

The following descriptions will discuss still another embodiment of the display device of the present invention in reference to FIG. 21 and FIG. 22. For ease of explanation, members (structures) having the same functions as those shown in the drawings pertaining to the first and second embodiments above will be given the same reference symbols, and explanation thereof will be omitted here.

The display device in accordance with the present embodiment is a liquid crystal display device which serves both as a transmissive mode and a reflective mode wherein the liquid crystal panel 2 in the liquid crystal display device 1 as explained using FIG. 3 in the first embodiment is replaced with the liquid crystal panel 1 illustrated in FIG. 21 and FIG. 22. As illustrated in FIG. 21 which is a cross-sectional view of the portion along a line D-D of FIG. 22, the liquid crystal panel 91 differs from the liquid crystal panel 91 in that the anti-reflection film 17 and the color filter 18 of the liquid crystal panel 2 are omitted, and the phase difference plate 15 and the polarization plate 16 are formed on the lower surface of the glass substrate 12 in this order. Further, on the bottom surface of the polarization plate 16, a backlight 92 is provided. The auxiliary capacitive electrode pads 94a are formed by the transparent electrodes such as ITO, etc.

Further, in a part of the reflective electrodes 94b formed above the auxiliary capacitive electrode pad 94a, formed is a light transmissive hole 93 which penetrates the interlayer insulating film 26. This light transmissive hole 93 serves as a transmissive region of light from the backlight 92. The reflective region from which light is reflected by the reflective electrodes 94b and the transmissive region are conducted via the contact hole 28 and are in the same potential, and one and it is therefore possible to drive the liquid crystal layer 13. In the case of displaying in the polarization mode using the liquid crystal panel 91, in order to attain the consistency of the phase difference between the reflective region and the transmissive region, it is desirable to set the thickness $d_T$ of the liquid crystal layer 13 in the transmissive region and the thickness $d_R$ of the liquid crystal layer 13 in the reflective region so as to satisfy the condition of $d_T \approx 2d_R$.

As illustrated in FIG. 22 taken from above the portion below the liquid crystal layer 13 of FIG. 21, the auxiliary capacitive electrode pad 94a and the reflective electrode 94b constitute the pixel electrode 94. Each auxiliary capacitive electrode pad 94a is arranged in the wide range surrounding the TFT 13 while arranging the auxiliary capacitive line 33 and the auxiliary capacitance $C_{CS}$. In the reflective electrode 94b and the interlayer insulating film 26, a rectangular light transmissive hole 93 is formed above the auxiliary capacitive electrode pad 94a so as not to overlap the scanning signal line 31 and the auxiliary capacitive line 33.

According to the liquid crystal panel 91 of the foregoing structure, in addition to the effects obtained from the structure of the first embodiment, the liquid crystal panel can serve both as the reflective mode when used under the condition of a plenty of surrounding light and the reflective mode when used under the condition of small amount of surrounding light. The foregoing effects can be achieved also in the case of adopting a semi-transparent reflective plate in the structure of the liquid crystal panel 2 of the first embodiment.

Fourth Embodiment

Figure 23:
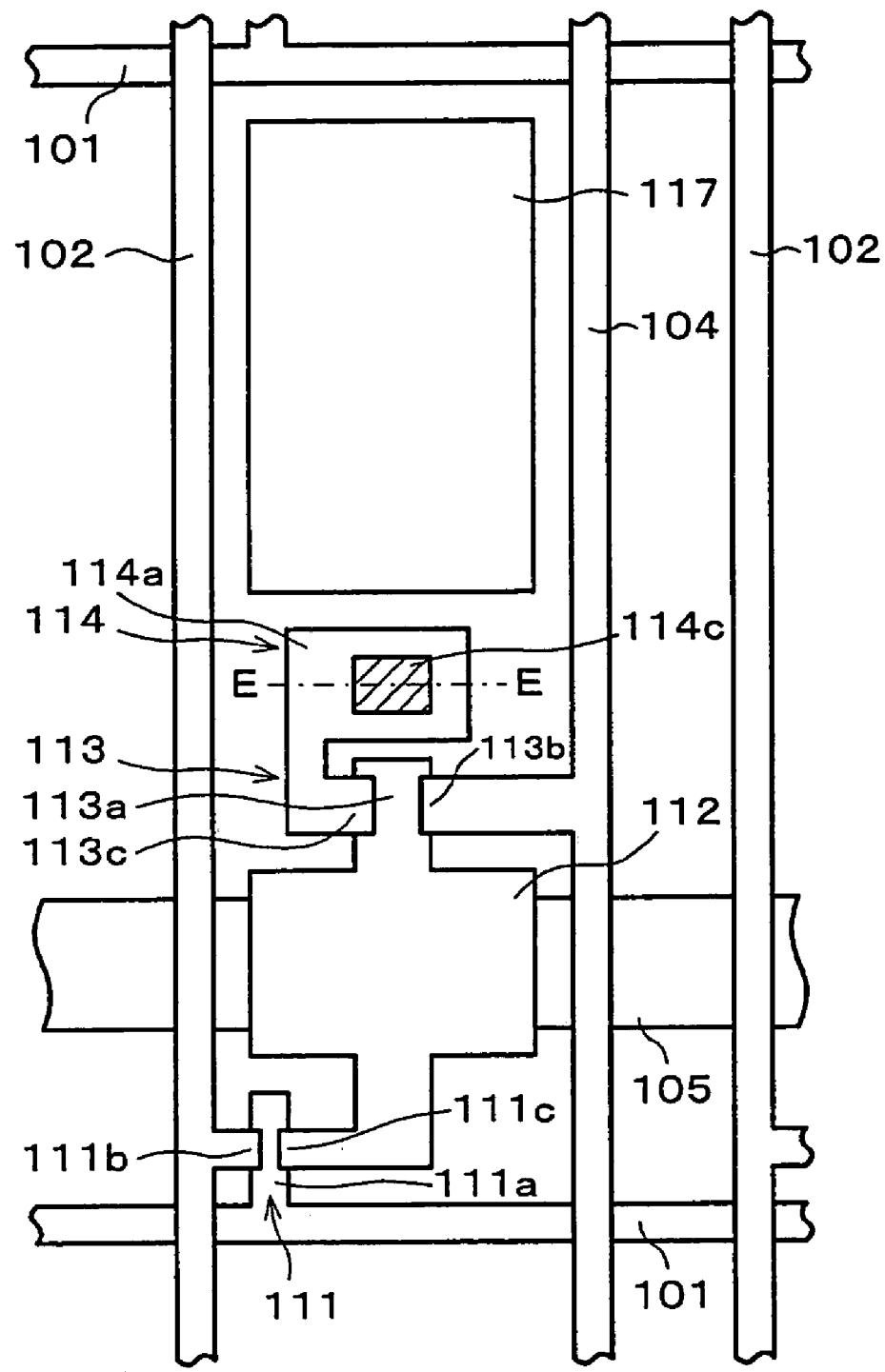
FIG. 23 is a perspective plan view illustrating the structure of an organic EL panel of an organic EL display device in accordance with still another embodiment of the present invention.
Figure 24:
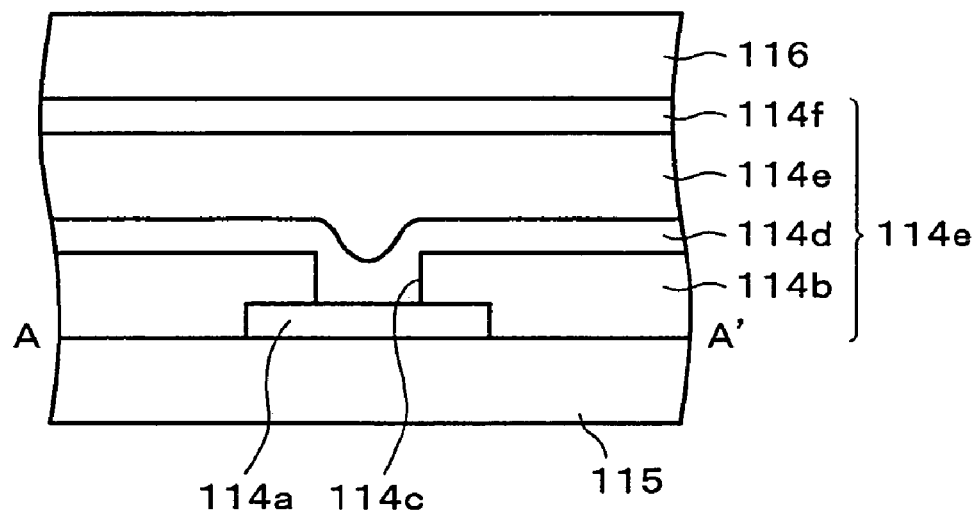
FIG. 24 is a cross section of the portion along an arrow line E-E of the organic EL panel of FIG. 23.
Figure 25:
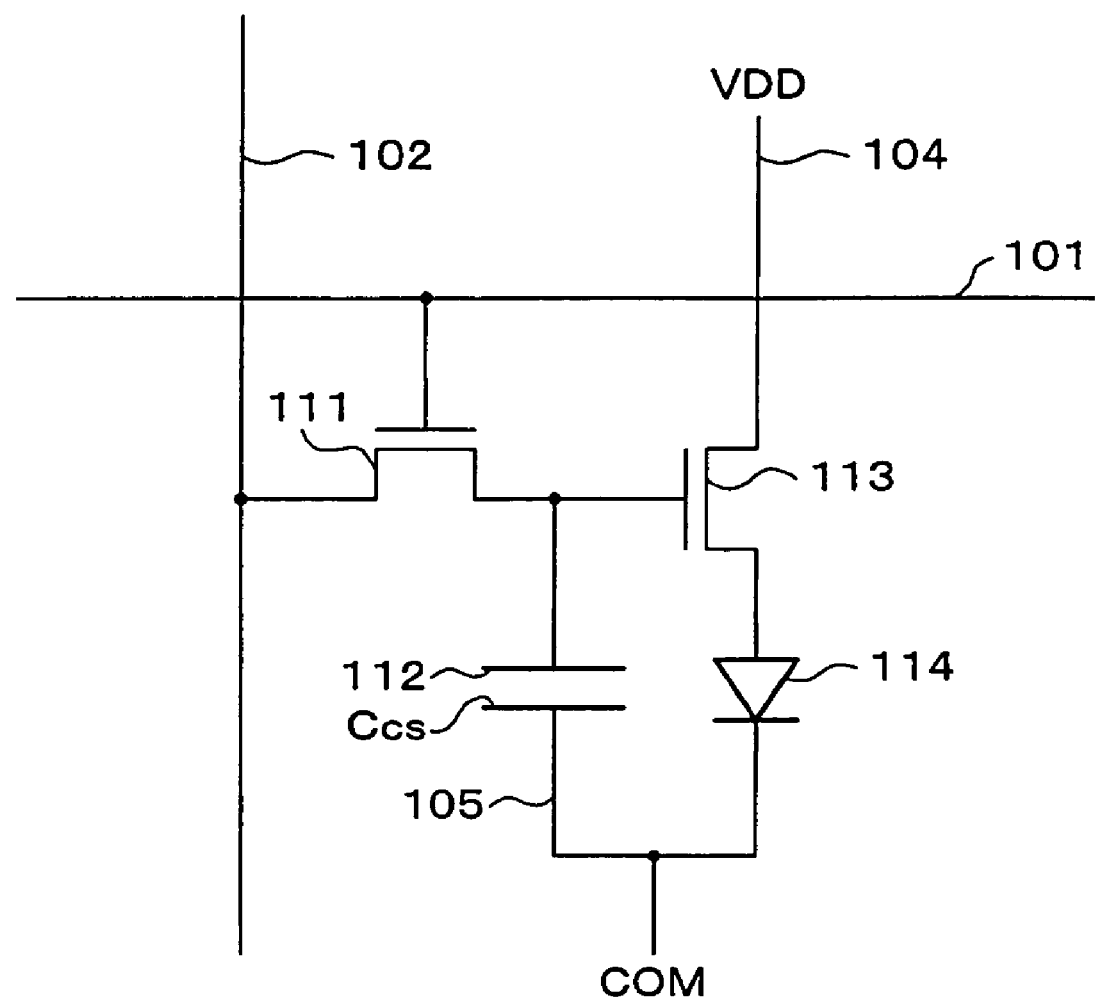
FIG. 25 is a circuit diagram illustrating an equivalent circuit per pixel of the organic EL panel of FIG. 23.

The following descriptions will discuss still another embodiment of the display device of the present invention in reference to FIG. 23 through FIG. 25. For ease of explanation, members (structures) having the same functions as those shown in the drawings pertaining to first through third embodiments above will be given the same reference symbols, and explanation thereof will be omitted here.

The display device in accordance with the present embodiment is an organic EL display device provided with an active matrix type organic EL panel as a display element. The organic EL panel is driven by the scanning signal driven and the data signal driven, which is the same as the liquid crystal display device 1 of FIG. 3. FIG. 23 shows a partial plan view of the organic EL panel. The organic EL panel includes scanning signal lines 101 to which scanning signals are supplied from the scanning signal driver, and data signal lines 102 to which data signals are supplied, which are formed on the glass substrate in a matrix form as in FIG. 1. FIG. 23 shows the structure per pixel of the organic EL panel. One pixel corresponds to the region surrounded by the adjoining two scanning signal lines 101 and two data signal lines 102.

In each pixel, a writing-use transistor 111 is provided as an active element in a vicinity of an intersection between the scanning signal line 101 and the data signal line 102, and this writing-use transistor 111 is switched periodically to a selective state with a supply of a scanning signal from the scanning signal line 101. The writing-use transistor 111 is made of TFTs, etc. In FIG. 23, the TFT is adopted wherein the gate electrode 111a is connected to the scanning signal line 101. The source electrode 111b of the TFT is connected to the data signal line 102. The drain electrode 111c of the TFT is pulled out, and is connected to the auxiliary capacitive electrode pad 112 serving as an electrode of an auxiliary capacitance $C_{CS}$ to be described later.

Adjacent to the auxiliary capacitive electrode pad 112, a driving-use transistor 113 of an organic EL element 114 (to be described later) is provided. The driving-use transistor 113 is composed of TFT, etc. In FIG. 23, the TFT is adopted wherein the gate electrode 113a is connected to the auxiliary capacitive electrode pad 112. The channel polarity of the TFT differs for each of pixels adjacent in the scanning direction, or in all directions. The high potential electrode on the side of high potential 113b of the channel of the TFT is connected to the power source line 104 for supplying a DC current to the organic EL element 114, and the electrode on the side of constant potential 113c is connected to an anode electrode 114a of an organic EL element 114.

The structure of an organic EL element 114 is shown in FIG. 24 which is a cross section of the portion along a line E-E of FIG. 23. The organic EL element 114 is interposed between the glass substrates 115 and 116 which are provided so as to oppose each other. On the glass substrate 115, formed is an anode electrode 114a, and further, an interlayer insulating film 114b with a contact hole 114c is formed on the anode electrode 114a. On the interlayer insulating film 114b, a transparent electrode 114d is formed to be conducted to the anode electrode 114a via the contact hole 114c. On the transparent electrode 114d, formed is a diode type light emitting layer 114e, and further on the light emitting layer 114e, formed is a counter electrode 114f composed of Al, etc. A current conducted through the light emitting layer 114e varies with changes in channel resistance, which are dependent on a voltage applied to the gate electrode 113a of the driving-use transistor 113, and the light emitting layer 114a emits light with an intensity in proportion to the current. As illustrated in FIG. 23, in the pixel, formed is an opening 117, and light beam is emitted from the light emitting layer 114e and is reflected from the counter electrode 114f, and radiate through the opening 117.

As illustrated in FIG. 23, the organic EL panel further includes an auxiliary capacitance line 105 provided per each line of pixels so as to face the auxiliary capacitive electrode pad 112 via an interlayer insulating film such as $S_iN_x$. Here, the auxiliary capacitance line 105, is set to the same potential as the counter electrode 114f of the organic EL element 114. The auxiliary capacitive electrode pad 112 and the auxiliary capacitance line 105 for use in forming auxiliary capacitance $C_{CS}$ with respect to the gate capacitance of the driving-use transistor 113. The auxiliary capacitance lines 105 are formed parallel to the scanning signal lines 101 on the glass substrate 115 in other portion than the areas where the scanning signal lines 101 are formed, so as not to generate a capacitive bond between the auxiliary capacitance lines 105 and the scanning signal lines 101, and the auxiliary capacitive electrode pad 112 and the scanning signal lines 101. However, the present invention is not limited to the foregoing structure as long as the auxiliary capacitive electrode pads 112 and the auxiliary capacitance lines 105 are provided so as not to generate capacitive bonds with the scanning signal lines 101.

An equivalent circuit per pixel of the foregoing structure is illustrated in FIG. 25. When the writing-use transistor 111 is set to the ON state (selection state) by scanning signals supplied from the scanning signal line 101, charges in proportion to the data signal as supplied from the data signal line 102 are written in the gate capacitance and the auxiliary capacitance $C_{CS}$ of the driving-use transistor 113. The gate capacitance is an electric capacitance for supplying thereto a charge which determines a display state of pixel is written via the writing-use transistor 111. A data signal is supplied from the data signal driver with an AC driving so as to reverse the polarity between the pixels adjacent in the scanning direction, or in all directions.

According to the potential of the gate electrode 113a of the driving-use transistor 113, the channel resistance of the driving-use transistor 113 are controlled, and current according to the channel resistance is conducted in the organic EL element 14, thereby displaying on a screen with an emitted light. The light emitting state continues while charges in the gate capacitance of the driving-use transistor 113 are maintained to the next period.

In the foregoing structure, the auxiliary capacitance $C_{CS}$ is formed at such position where the auxiliary capacitive electrode pad 112 and the auxiliary capacitance line 105 are provided so as not to generate a capacitive bond with the scanning signal lines 101. Therefore, even when rewriting the charge of the gate capacitance by the frequency setting means such as the synchronous clock generating circuit 7 adopted in each of the embodiments above, i.e., rewriting the screen of the organic EL display panel at a rewriting frequency of 30 Hz or below, fluctuations in potential of the gate electrode 113a due to fluctuations in potential of the scanning signal line such as the scanning signal line 101 in one line above do not occur. Namely, fluctuations in channel resistance of the driving-use transistor 113 do not occur till the next selection period, and it is therefore possible to ensure a stable light emitting state. This means that the organic EL display panel is arranged so as to suppress fluctuations in voltage, which are due to noise to be added to the voltage of the gate capacitance of the driving-use transistor 113 from the scanning signal lines 101 with the supply of the scanning signal, to below a level at which flicker noise in the display state is perceptible.

Therefore, in the state where a sufficient reduction in the power consumption of the scanning signal driver and the power consumption of the data signal driver can be achieved, a stable and quality display free from flicker noise can be realized. As a result, it is possible to achieve reduction in power consumption while ensuring desirable display quality.

As described, the display device of the present invention is provided with a display element of an active matrix type which includes scanning signal lines for supplying thereto scanning signals from a scanning signal driver, data signal lines for supplying thereto data signals from a data signal driver with an AC driving, pixels connected to the scanning signal lines and the data signal lines wherein a charge which determines a display state as a switching element is periodically set in the selection state is written in a predetermined electric capacitance via the active element based on the scanning signal and the data signal, wherein in each of the pixels, an auxiliary capacitance with respect to the electric capacitance is provided at position where the capacitive bond is not generated between the electrode of the auxiliary capacitance and the scanning signal line, and further provided is frequency setting means which is capable of setting the rewriting frequency which determines the rewriting frequency to be set to be not more than 30 Hz.

According to the foregoing arrangement, an auxiliary capacitance is formed in an area such that a capacitive bond is not generated between the electrode of the auxiliary capacitance according to a predetermined electric capacitance and the scanning signal line. Therefore, with the foregoing structure, by arranging such that a rewriting frequency, at which a charge in the electric capacitance is rewritten, i.e., the screen of the display element is rewritten, is set to be not more than 30 Hz by the frequency setting means, the problem of fluctuation in potential of the pixel electrode of the electric capacitance due to fluctuation in potential of the scanning signal lines such as a scanning signal line can be prevented contrary to the conventional case of forming the auxiliary capacitance in the Cs-on-gate structure.

With the low frequency driving of not more than 30 Hz, the frequency of the scanning signal can be reduced, and it is therefore possible to fully suppress the power consumption of the scanning signal driver, and similarly, the frequency for reversing the polarity of the data signal can be reduced, and it is therefore possible to fully suppress the power consumption of the data signal driver. Additionally, fluctuation in potential of the electrode of the electric capacitance in which a charge which determines the display state is written can be prevented, thereby realizing a stable and quality display without flicker noise.

As a result, it is possible to provide a display device having an active element which realizes a reduction in power consumption while ensuring a desirable display quality.

The display device of the present invention provided with a display element of an active matrix type which includes a scanning signal line to which a scanning signal is supplied from a scanning signal driver, a data signal line to which a data signal is supplied from a data signal driver with an AC driving, a pixel connected to the scanning signal line and the data signal line wherein a charge which determines a display state as an active element is periodically set in the selection state is written in a predetermined electric capacitance via the active element based on the scanning signal and the data signal, wherein the display element is arranged so as to suppress fluctuations in voltage due to a noise added to a voltage of the electric capacitance from the scanning signal line with a supply of the scanning signal can be suppressed to below a level at which flicker noise is perceptible in the display state, and further provided is frequency setting means which is capable of setting the rewriting frequency which determines the rewriting frequency of the charge to be not more than 30 Hz.

According to the foregoing structure, even if noise from scanning signal line is added to a voltage of a predetermined electric capacitance, to which charge which determines a display state is written, fluctuations in voltage of the electric capacitance due to noise can be suppressed to below a level at which flicker noise is perceptible in the display. In this state, by setting the charge of the electric capacitance, i.e., the screen of the display element to be rewritten with a rewriting frequency of at or below 30 Hz, the display state of pixels can be stabilized, and a stable and quality display without flicker noise can be realized. Furthermore, by driving a liquid crystal panel at a low frequency of not more than 30 Hz, the frequency of the scanning signal is reduced, and it is therefore possible to fully suppress the power consumption of the scanning signal driver, similarly, the frequency for reversing the polarity of the data signal is reduced, and it is therefore possible to fully suppress the power consumption of the data signal driver.

As a result, a display device having an active element which permits a reduction in power consumption while maintaining a desirable display quality can be realized.

In the display device of the present invention, the above rewriting frequency may be set within a range of from 0.5 Hz and 30 Hz.

According to the foregoing arrangement, by setting the rewriting frequency within a range of from 30 to and 0.5 Hz, it is possible to fully suppress fluctuations in potential of the electrode of the electric capacitance due to leak current through an active element from the electric capacitance. As a result, it is possible to reduce required power consumption, and at the same time a high quality display without flicker noise can be achieved.

In the display device of the present invention, the above rewriting frequency may be set within a range of from 1 Hz to 15 Hz.

According to the foregoing structure, a significant reduction in power consumption can be realized by setting the rewriting frequency to be not more than 15 Hz, and fluctuations in potential of the electrode of the electric capacitance can be significantly reduced by setting the lower limit of the rewriting frequency to 1 Hz. As a result, it is possible to significantly reduce required power consumption, and at the same time a high quality display without flicker noise can be surely achieved.

The display device of the present invention may be arranged such that the frequency setting means is capable of setting a plurality of rewriting frequencies.

According to the foregoing arrangement, a plurality of rewriting frequencies of a screen of a display element can be set by the frequency setting means, then after the compatibility between the reduction in power consumption and the high quality display is at least ensured by setting the rewriting frequency to be not more than 30 Hz, it is therefore possible to select between a relatively high rewriting frequency at which a quality display is given a priority according to the speed of the moving picture and a relatively low rewriting frequency at which reduction in power consumption is given a priority.

The display device of the present invention may be arranged such that the frequency setting means sets the rewriting frequency to be not less than 30 Hz.

According to the foregoing structure, it is possible to set the rewriting frequency of the screen of the display element to be not less than 30 Hz by the frequency setting means. For example, when displaying a static image or a moving picture of a normal speed, both a reduction in power consumption and a high quality display can be realized by setting the rewriting frequency to be not more than 30 Hz. On the other hand, when displaying a moving picture of high speed, a smooth display can be ensured by setting the frequency to be not less than 30 Hz. As a result, it is possible to set the rewriting frequency suited for the state of an image to be displayed.

In the display device of the present invention, the rewriting frequency may be set to an integer multiple of the smallest rewriting frequency.

According to the foregoing structure, respective rewriting frequencies can be set to integer multiples of smallest rewriting frequencies. Therefore, in addition to the advantage of adopting a common reference synchronous signal for all the rewriting frequencies, the data signal to be supplied when switching the rewriting frequency can be easily deleted or added.

The display device of the present invention may be arranged such that respective rewriting frequencies are set to integer powers of the number 2 of the smallest rewriting frequency.

According to the foregoing structure, respective rewriting frequencies may be set to integer powers of the number 2 of the smallest rewriting frequency, it is possible to generate respective rewriting frequency using a dividing circuit of a simple structure which divides the frequency by integer power of the number 2.

The display device of the present invention may be arranged such that among the rewriting frequencies, the smallest one is a multiple of an integer of not less than 2 of the refresh frequency which determines the cycle of updating the display content of the display element.

According to the display device of the present invention, the smallest rewriting frequency is set to a multiple of an integer of not less than 2 of the refresh frequency, and by adopting the frequency set in the forgoing manner, with respect to the same display content of the display element, the number of selecting each pixel is in the number of an integer of not less than 2. Therefore, with respect to the same display content, it is possible to reverse the polarity of the potential of the electrode of the electric capacitance by AC driving. Particularly, when adopting the liquid crystal display element as a display element, it is possible to achieve a still improved reliability of a liquid crystal adopted in the liquid crystal display element.

The display device of the present invention may be arranged such that upon altering the refresh frequency, the frequency setting means adjusts the setting of the smallest rewriting frequency in accordance with the refresh frequency after being altered.

According to the foregoing arrangement, the frequency setting means can at least alter the setting of the smallest rewriting frequency in accordance with the refresh frequency to a multiple of an integer of not less than 2 of the refresh frequency as altered. Therefore, even if the refresh frequency is altered, by adopting the rewriting frequency set in the foregoing manner, with respect to the same display content of the display element, it is possible to display with an reversed polarity of the potential of the electrode of the electric capacitance by AC driving. Particularly, in the case of adopting the liquid crystal display element as the display element, it is possible to maintain the reliability of the liquid crystal display element used in the liquid crystal display element with ease.

The display device of the present invention may be arranged such that the smallest rewriting frequency of all the rewriting frequencies is an integer of not less than 2 Hz.

According to the foregoing arrangement, the smallest rewriting frequency is set to an integer of not less than 2 Hz, and the smallest rewriting frequency as set is a multiple of an integer of not less than 2 of the refresh frequency, which results in the refresh frequency of not less than 1 Hz. With this arrangement, when displaying a clock on the screen of the display element, it is possible to accurately display a second at an interval of 1 second.

The display device of the present invention may be arranged such that the display element is a liquid crystal display element including the electric capacitance formed by interposing a liquid crystal between the pixel electrode and the counter electrode, and an auxiliary capacitance formed with respect to the electric capacitance, and that the liquid crystal display element has a pixel voltage holding ratio P satisfying the following condition of:

$$V_1 = V - \{V \cdot (1 - Hr(T)) \times C_{LC}/(C_{LC} + C_{CS})\}$$

$$P = V_1 \cdot \exp[-T/\{(C_{LC} + C_{CS}) \cdot R\}]/V \geq 0.9,$$

wherein $C_{LC}$ is the electric capacitance between the pixel electrode and the counter electrode, $C_{CS}$ is the auxiliary capacitance, T is a non-selection period of the active element, $Hr(T)$ is a liquid crystal voltage holding ratio after the non-selection period of T at the rewriting frequency, V is a potential difference between the pixel electrode and the counter electrode directly after writing, and R is a resistance value when the active element is not selected.

According to the above arrangement, the liquid crystal display element is adopted as the display element, and a voltage of a pixel as applied in the selection period, i.e., a voltage of an electric capacitance formed by interposing the liquid crystal between the pixel electrode and the counter electrode, can be held at a voltage holding ratio of not less than 90 percent throughout the non-selection period, and fluctuations in potential of the pixel electrode hardly occur. As a result, it is possible to obtain a stable and quality display without flicker noise.

The display device of the present invention may be arranged such that the display element is a liquid crystal display element including an electric capacitance formed by interposing a liquid crystal between the pixel electrode and the counter electrode, and the pixel electrode includes a portion facing a scanning signal line of a pixel connected to a line adjacent in a fixed direction along a scanning direction to a line to which a pixel of the pixel electrode is connected.

According to the foregoing structure, the liquid crystal display element is adopted as the display element, and the pixel electrode includes a portion facing a scanning signal line of a pixel connected to a line adjacent in a fixed direction along a scanning direction to a line to which a pixel of the pixel electrode is connected. For example, assumed that the scanning direction is an up-and-down direction of the liquid crystal display element, then, the pixel electrode includes a portion facing the scanning signal line of one line above or below the line to which the pixel of the pixel electrode is connected With this arrangement, in the case of reversing the polarity of a data signal when rewriting a charge of the electric capacitance, it is therefore possible to prevent a generation of an electric field having a component parallel to a pixel electrode surface between the pixel electrode and the scanning signal line of the pixel of the line adjacent to the fixed direction. As a result, it is possible to suppress the generation of disclination due to a reverse tilt domain at the edges (end portion) of the pixel electrodes.

The display device of the present invention may be arranged such that the display element is a liquid crystal display element including an electric capacitance formed by interposing a liquid crystal between the pixel electrode and the counter electrode, wherein the pixel electrode is a non-transmissive type electrode, and includes at least a portion facing an active element of a pixel connected to a line adjacent in the fixed direction to a line to which a pixel of the pixel electrode is connected.

According to the foregoing structure, the liquid crystal display element is adopted as the display element, and the pixel electrode of non-transmissive type includes a portion facing an active element of a pixel connected to a line adjacent in a fixed direction to a line to which a pixel of the pixel electrode is connected. For example, assumed that the scanning direction is an up-and-down direction of the liquid crystal display element, then, the pixel electrode includes a portion facing the line one line above or below the line to which the pixel of the pixel electrode is connected. With this arrangement, the active element can be shielded from light by the pixel electrode. As a result, winding of light into the active element can be reduced, and a reduction in resistance value of the active element in the non-selection period can be prevented. Therefore, even when driving the pixel at rewriting frequency of not more than 30 Hz, fluctuations in brightness due to charge holding failure can be suppressed, thereby realizing a display free from flicker noise.

The display device of the present invention may be arranged such that the foregoing liquid crystal display element includes an active element light-shielding layer for shielding an active element of a line at the end portion of a starting point in the fixed direction of all the lines effective for display.

According to the foregoing arrangement, the active element of the line at the end portion of a starting point in the fixed direction, i.e., the line in the top stage or the bottom stage, when assumed that the scanning direction is an up-and-down direction of the liquid crystal display element can be shielded by the active element light-shielding element. Therefore, even when driving the pixel at rewriting frequency of not more than 30 Hz, fluctuations in brightness due to the charge holding failure can be suppressed, and a display which is more free from flicker noise can be obtained.

The display device of the present invention may be arranged so as to include an anti-reflected light-shielding layer which prevent a reflected light from the active element light-shielding layer being returned onto a display surface of the liquid crystal display element.

According to the foregoing structure, the light reflected from the active element light-shielding layer can be prevented from being returned onto the display surface of the liquid crystal display element, no effect on the display of the foregoing structure of shielding the active element can be obtained.

The foregoing display device of the present invention may be arranged such that the active element light-shielding layer is an electrode provided in such a manner that a liquid crystal is interposed between the active element light-shielding layer and the counter electrode, and an AC voltage is applied between the active element light-shielding layer and the counter electrode.

According to the above arrangement, liquid crystal between the active element light-shielding layer and the counter electrode is AC driven, and an improved reliability of the liquid crystal material can be achieved.

The display device of the present invention may be arranged such that the liquid crystal display element includes a line of a pixel having the structure of the pixel adopting the active element light-shielding layer as the pixel electrode further outside from the line at the end of a starting point in the fixed direction.

According to the foregoing arrangement, the pixel of the line at an end portion on the starting point side in the predetermined direction in the region effective for the display, for example, the pixel of the line effective for the display in the top stage or the bottom stage when assuming that the scanning direction is an up-and-down direction of the liquid crystal display, has the same structure as the pixels of other lines effective for the display, it is therefore possible to maintain the repetitive continuity of the structure in the scanning direction of the liquid crystal display element. Therefore, a voltage application state becomes equivalent between pixels of a line effective for display at the end of a starting point in a fixed direction along the scanning direction, and pixels of other lines effective for display, thereby achieving an improved reliability of a liquid crystal material.

The display device of the present invention may be arranged such that the display element is a liquid crystal display element including an electric capacitance formed by interposing a liquid crystal between the pixel electrode and the counter electrode, and the liquid crystal display element includes a light-shielding layer facing at least a part of edges (end portion) of the pixel electrodes on the side closer to the starting point of the alignment treatment process from the display surface side.

According to the foregoing arrangement, the display element is a liquid crystal display element, and the edge of the pixel electrode is covered with a light-shielding film, and when the liquid crystal display device is AC driven with a rewriting frequency of 30 Hz, a disclination due to a reverse tilt domain generated at the edge of the pixel electrode can be hidden, thereby achieving a uniform display.

The display device of the present invention may be arranged such that the display element is a liquid crystal display element including an electric capacitance formed by interposing liquid crystal between the pixel electrode and the counter electrode, and a surface in contact with a portion treated with an alignment treatment of said pixel electrodes, excluding an area electrically in contact with the active elements, has a level difference of not more than 0.6 μm.

According to the arrangement, the display element is a liquid crystal display element, and when an alignment film is formed on the pixel electrode, variations in film thickness of an alignment film within the pixel can be suppressed, a disturbance in alignment within a pixel can be suppressed, and a uniform display without flicker noise can be realized.

The display device of the present invention may be arranged such that the display element is a liquid crystal display element including an electric capacitance formed by interposing a liquid crystal between the pixel electrode and the counter electrode, and a transparent electrode is formed around a portion in a vicinity of the edges (end portion) of the pixel electrodes on the side closer to a starting point of the alignment process.

According to the foregoing arrangement, the display element is a liquid crystal display element, and when the liquid crystal display element is AC driven with a rewriting frequency of not more than 30 Hz, a disclination due to a reverse tilt domain generated at the edge of the pixel electrode appears on a transparent electrode. It is therefore possible to eliminate the effect of the disclination line with respect to a reflected light, thereby realizing a uniform display.

The display device of the present invention may be arranged such that the display element is a liquid crystal display element including an electric capacitance formed by interposing a liquid crystal between the pixel electrode and the counter electrode, wherein an alignment treatment direction on the side of a substrate whereon the active element is provided is almost parallel to the above scanning signal line.

According to the foregoing structure, the display element is a liquid crystal display element, and the alignment direction of a liquid crystal molecule on the side of a substrate where the active element is provided is within a plane vertical to the electric field in the scanning direction generated between the adjacent pixel electrodes. In the case of AC driving the liquid crystal display element at a rewriting frequency of not more than 30 Hz, the disclination of the electric field with respect to the liquid crystal molecule becomes symmetrical. Therefore, the generation of disclination line due to reverse tilt domain is suppressed and a uniform display can be achieved.

The display device of the present invention may be arranged so as to include a reflective member for reflective-type display using surrounding light.

According to the foregoing arrangement, a reflective-type liquid crystal display device without a backlight is adopted, and it is therefore possible to further increase the power consumption which is driven at a frequency of not more than 30 Hz.

The display device of the present invention may be arranged such that the reflective member is at least a part of the pixel electrode.

According to the foregoing structure, the reflective member is at least a part of the pixel electrode, namely, at least part of the pixel electrode is a reflective electrode of the reflective-type liquid crystal display device. It is therefore no need to separately provide the reflective member, and an overall number of components which constitute the device can be reduced.

The display device of the present invention may be arranged such that a light transmissive hole is formed in the reflective member, or the reflective member is semi-transparent.

According to the foregoing structure, by adopting a liquid crystal display device applicable to both transmissive-type and reflective-type, the display device can be used selectively to be suited for the surrounding condition in the reflective mode when used under the condition of a plenty of surrounding light or the transmissive mode when used under the condition of small amount of surrounding light.

According to the electronic device of the present invention adopting the foregoing display device, which permits a reduction in power consumption while maintaining a desirable display quality. It is therefore possible to drive the foregoing electronic devices using battery for a long period of time with ease.

Fifth Embodiment

The following descriptions will discuss still another embodiment of the present invention in reference to FIG. 28 through FIG. 45. The below-explained structure of the present embodiment is applicable to the structures of the above-explained embodiments.

In the present embodiment, a method of driving a liquid crystal device of the present invention, the display device adopting the same and an electronic device will be explained.

Figure 29:
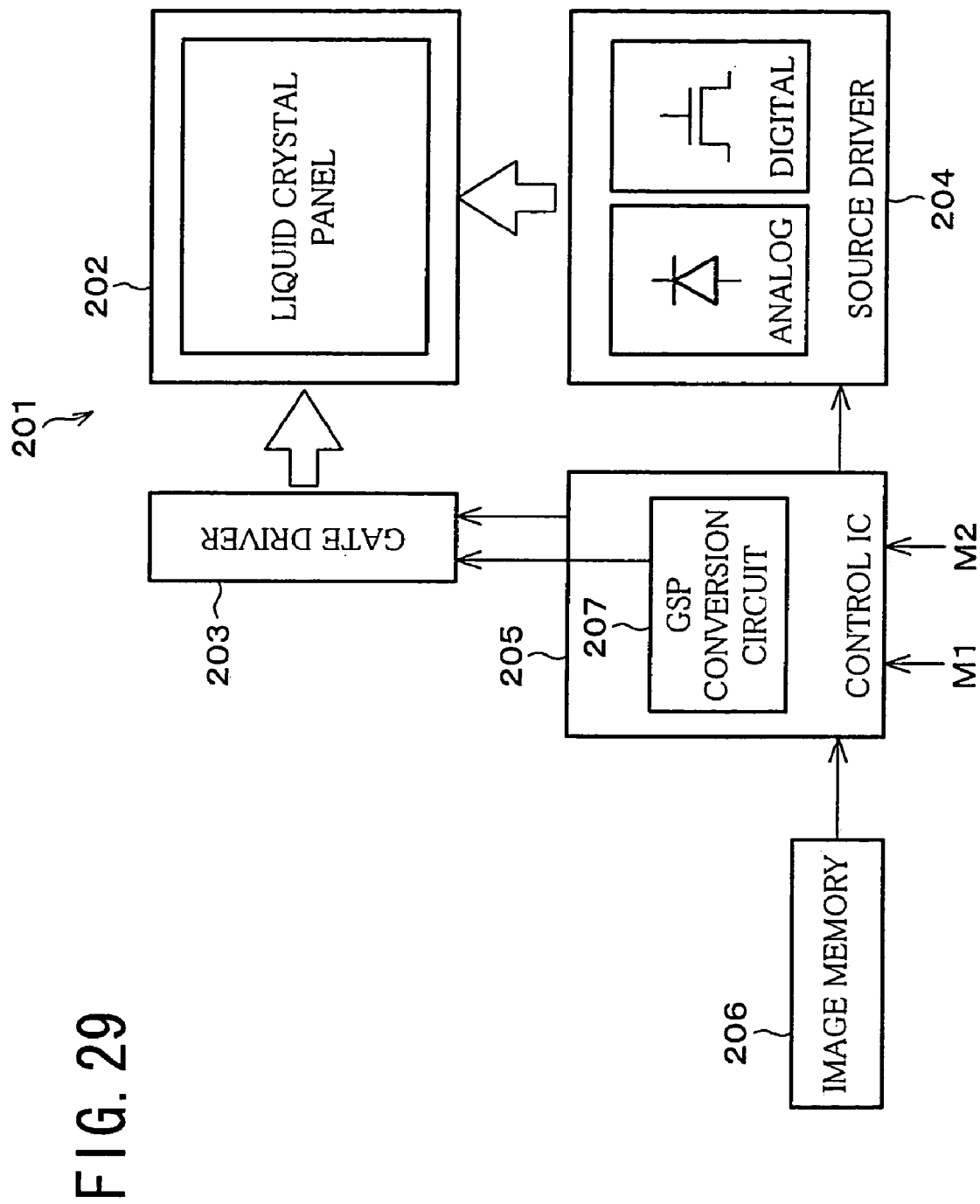
FIG. 29 is a system block diagram illustrating a structure the structure of a display device to which the method of driving the display device of FIG. 28 is adopted.

FIG. 29 shows a block diagram of a system of a liquid crystal display device 201 (display device) in accordance with the present embodiment. The liquid crystal display device 201 includes a liquid crystal panel 202, a gate driver 203, a source driver 204, a control IC 205 and an image memory 206. The liquid crystal panel 202 is provided with a screen which includes pixels arranged in a matrix form, a plurality of scanning signal lines for selectively scanning lines on the screen sequentially, and a plurality of data signal lines for supplying data signals to pixels connected to a line as selected. The scanning signal lines and the data signal lines are arranged so as to cross at right angles. The gate driver 203 is a scanning signal line driver, and applies respective voltages according to a selection period and a non-selection period to each scanning signal line of the liquid crystal panel 202. The source driver 204 is a data signal line driver, and outputs a data signal to each data signal line of the liquid crystal panel 202 and supplies image data to respective pixels on the scanning signal line as selected.

The control IC 205 receives image data as stored in the image memory 206 such as in a computer, etc., and supplies a gate start pulse signal GSP and a gate clock signal GCK to the gate driver 203, and in the meantime supplies gradation data of RGB, a source start pulse signal SSP, a source latch strobe signal SLS, and a source clock signal SCK to the source driver 204. These signals are all in synchronous with one another which generally satisfy the condition of:

$$fGSP<fGCK=fSSP<fSCK,$$

wherein f indicative of frequency is added to each signal. In the case of the so-called pseudo double speed driving, the condition of fGCK>fSSP is held.

The image data as stored in the image memory 206 as the image data storage means is the base data of a data signal. The control IC 205 to be described later has a function as control means for executing the drive method of a display device in accordance with the present embodiment.

The gate driver 203 starts a scanning of a liquid crystal panel 202 in response to the gate start pulse signal GSP as received from the control IC 205, and sequentially applies voltage to each scanning signal line according to the gate clock signal GCK. The source driver 204 stores the gradation data of each pixel as received in the resistor according to a source clock signal SCK based on the source start pulse signal SSP as received from the control IC 205, and writes the gradation data in each data signal line of the liquid crystal panel 202 according to the next source latch strobe signal SLS.

The control IC 205 includes a GSP conversion circuit 207 for setting a pulse interval of the gate start pulse signal GSP. The pulse interval of the gate start pulse signal GSP is about 16.7 msec for the normal frame frequency, i.e., 60 Hz. The GSP conversion circuit 207, for example, enables this pulse interval of the gate start pulse signal GSP to 167 msec. If the scanning period T1 of one screen is maintained at normal state, about 9/10 of the pulse interval is occupied by the period of the non-scanning state. As described, in the GSP conversion circuit 207, the non-scanning period after the end of a scanning period T1 till a point the gate start pulse signal GSP is re-entered into the gate driver 203 can be set longer than the scanning period T1. The foregoing non-scanning period longer than the scanning period T1 is referred to a quiescent period T2.

Figure 28:
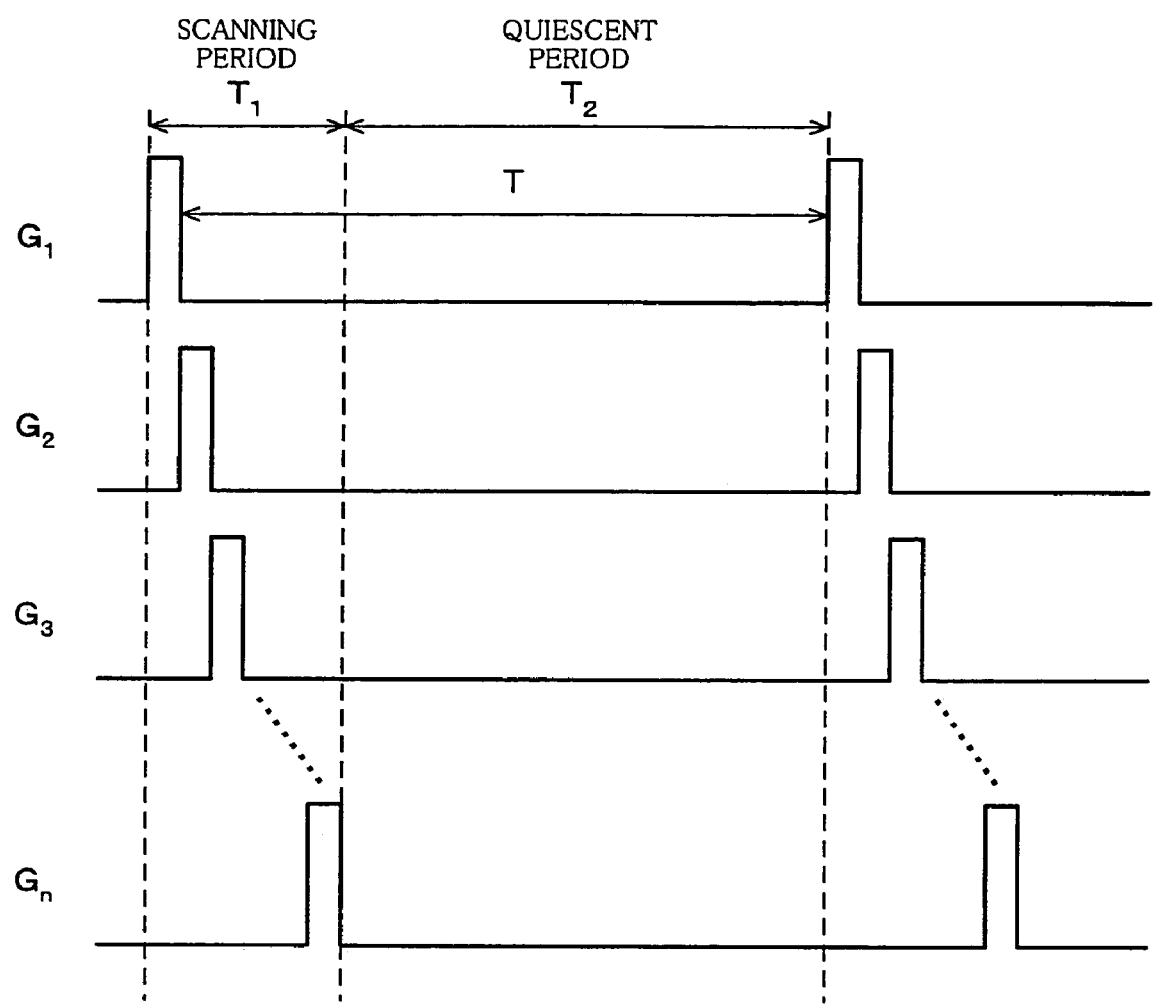
FIG. 28 is a timing chart which explains a method of driving a display device in accordance with still another embodiment of the present invention.

FIG. 28 show respective waveforms of scanning signals to be supplied to scanning signal lines $G_1$ to $G_n$ when the quiescent period T2 is set for the non-scanning period. In FIG. 28, when n=4, compared to the waveform of a scanning signal in the conventional structure illustrated in FIG. 44, the quiescent period T2 which is longer than the scanning period T1 is set as the non-scanning period in replace of the vertical fly-back period, and as can be seen, a longer vertical cycle indicative of the frame or field can be achieved.

When the quiescent period T2 is set for the non-scanning period in the GSP conversion circuit 207, one vertical period is equivalent to a sum of the scanning period T1 and the quiescent period T2. For example, when the scanning period T1 is set to the period corresponding to 60 Hz generally adopted, the quiescent period T2 is longer than the scanning period T1, and the vertical frequency therefore becomes lower than 30 Hz. The scanning period T1 and the non-scanning period can be suitably adjusted according to the type of images to be displayed such as a static image or a moving picture (motion thereof) to be displayed. In the GSP conversion circuit 207, a plurality of non-scanning period can be adopted according to the content of image. Then, at least one non-scanning period is equivalent to the quiescent period T2. In FIG. 29, the GSP conversion circuit 207 alters the setting of the non-scanning period according to the non-scanning period setting signals M1 and M2 to be input from the exterior. The number of the non-scanning period setting signals is not particularly limited, and for example, when adopting logic signals of the above two kinds for the non-scanning period setting signals M1 and M2, non-scanning periods of four different types can be set.

By setting the foregoing quiescent period T2, the number of times of rewriting a screen can be reduced, i.e., the supply frequency of a data signal to be outputted from the source driver 204 can be reduced, thereby reducing power required for charging pixels. Therefore, in the case of adopting an active matrix liquid crystal display device as the liquid crystal display device 201, which can ensure basic display characteristics, such as brightness, contrast, response speed, gradation, etc., by setting the quiescent period T2 as the non-scanning period, the power consumption of the data signal line driver which increases in proportion to the supply frequency of the data signal can be reduced to a sufficiently low level with ease without lowering display quality.

In view of the foregoing, when displaying a static image, or a moving picture which is not being moved fast, a long quiescent period T2 is set for the non-scanning period. On the other hand, when displaying moving pictures which are being moved aggressively, for the non-scanning period, a short quiescent period T2 or a period shorter than the quiescent period is set. For example, in the case where a sufficiently short quiescent period (for example, 16.7 msec) is set for the non-scanning period, as the drive frequency corresponds to normal frequency, i.e., 60 Hz, a moving picture can be displayed at sufficiently high speed. On the other hand, in the case where a long quiescent period (for example, 3333 msec) is set for the non-scanning period, power consumption for rewriting screen with respect to a static image or a moving picture which is not being moved fast, can be reduced while ensuring basic image quality. Namely, the display can be performed by suitably selecting the liquid crystal panel 202 for the dynamic display or the low power consumption display. As described, according to the method of the present embodiment, the frequency of rewriting screen can be changed according to the type of display image such as a static image, a moving picture, etc., and therefore an optimal low power consumption can be obtained for each type of display image.

In the method of the present invention, it is preferable that the non-scanning periods satisfy the following condition:

$$(T1+T02)=(T1+T01)\times N \text{(N is an integer not less than 2)} \quad (3).$$

In the equation (3), T01 is the shortest non-scanning period and T02 is an arbitrary non-scanning period among all the non-scanning periods. Namely, it is preferable that a frame period using a plurality of respective non-scanning period is set to an integer multiple of a frame period using the shortest non-scanning period T01. For example, when driving at normal frequency (60 Hz), T1 is set to not more than 16.7 msec. A desirable display can be realized by setting T01 to be a vertical fly-back period, and T01 to satisfy the above equation (3), and by performing a sampling one every some integer times with respect to data signals on the screen transferred at frequency 60 Hz. As a result, a common reference sync signal can be used among non-scanning periods, and a low frequency driving can be realized merely by adding a simple circuit, and in the mean time an amount of additionally required power consumption can be reduced.

The respective non-scanning periods may be set by inputting a plurality of non-scanning period setting signals to the GSP conversion circuit 207, or set using a switch, for adjusting/selecting respective non-scanning periods, provided in the GSP conversion circuit 207. Needless to mention, these switches for adjusting the rewriting frequency and for selecting the rewriting frequency may be provided on the outer surface of the cabinet of the liquid crystal display device 201 to help user setting. For this GSP conversion circuit 207, it is only required to have a function of altering a non-scanning period according to an instruction externally given. In the structure illustrated in FIG. 29, the GSP conversion circuit 207 is integrated in the control IC 205; however, the GSP conversion circuit 207 of the present invention is not limited to the foregoing structure, and it may be, for example, provided independently of the control IC 205.

Next, the method of further reducing power consumption when setting the quiescent period T2 will be explained.

The gate drivers 203 and the source drivers 204 respectively store therein logic circuits and transistors. These logic circuits consume power when driving respective transistors. The power consumption of these logic circuits are therefore in proportion to the number of times using respective transistors, and in proportion to clock frequencies. In the quiescent period T2, all the scanning signal lines are set in the non-scanning state, and therefore by not inputting other signals than gate start pulse signals GSP such as a gate clock signal GCK, a source start pulse SSP, a source clock signal SCK, etc., to the gate driver 203 and the source driver 204, the need of driving the logic circuits stored in the gate driver 203 and the source driver 204 can be eliminated, thereby reducing required power consumption.

Figure 30:
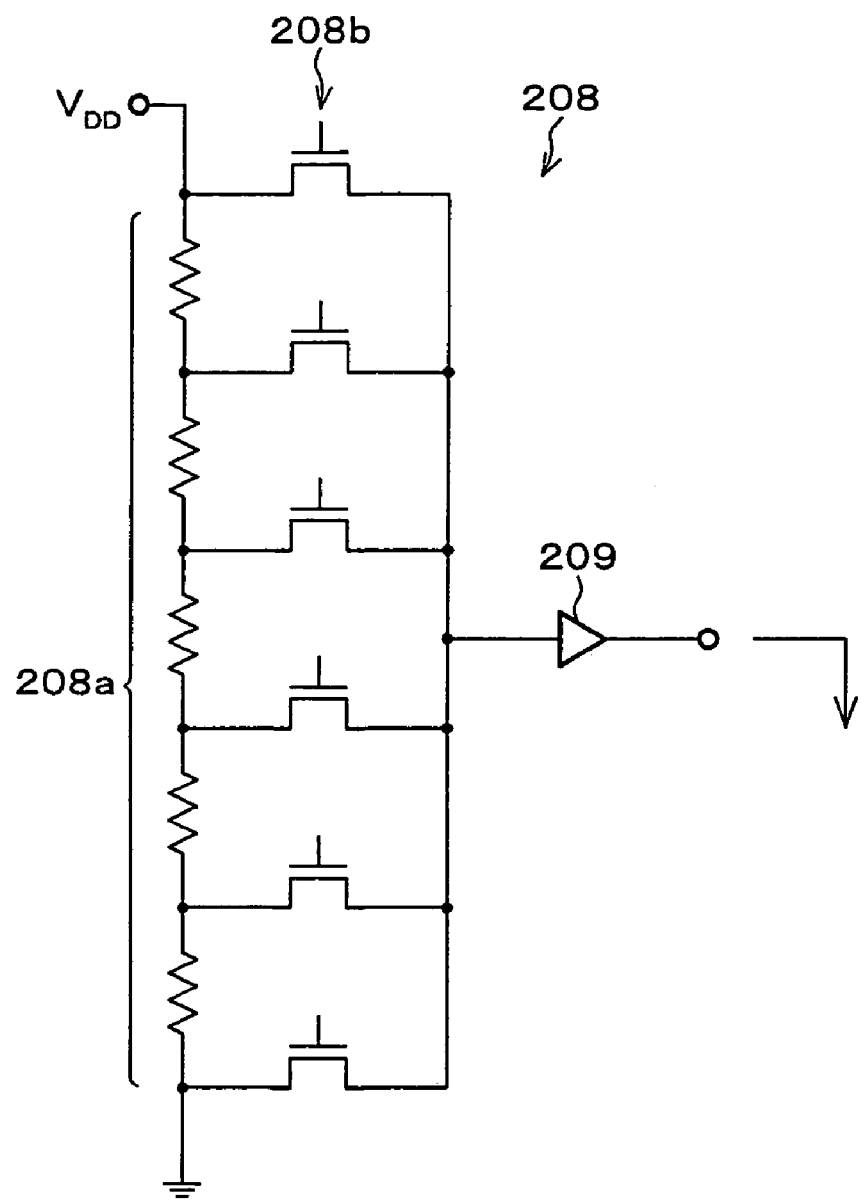
FIG. 30 is a circuit diagram illustrating the inside structure of a data signal driver for the display device of FIG. 29.

When adopting a digital driver for the source driver 204 which deals with digital data signals, analog circuits such as a gradation generating circuit 208 and a buffer 209 in which a stationary current flows are provided in the source driver 204 as illustrated in FIG. 30, and based on a gradation signal as received from the control IC 205, a gradation voltage is selected from the power source voltage $V_{DD}$ by the resistance dividing method using a voltage-dividing resistor 208*a* and a switching element 208*b*. Thereafter, a current is amplified by the buffer 209, and is output to each data signal line. On the other hand, when adopting an analog driver in the case of adopting an analog driver as the source driver 204, which deals with analog data signals, analog circuits of a sampling hold circuit and a buffer are provided in the source driver 204. Further, an analog circuit may be provided in the control IC 205.

The power consumption of the analog circuit is not dependent on the driving frequency, and therefore the power consumption cannot be reduced merely by stopping the operations of the logic circuits provided in the gate driver 203 and the source driver 204. In response, it is arranged so as to stop the foregoing analog circuits in the quiescent period T2, and to separate these analog circuits from the power source. As a result, a required power consumption of the analog circuits can be reduced, and an overall power consumption of the entire liquid crystal display device 201 can be further reduced. When adopting an active matrix liquid crystal display device as the liquid crystal display device 201, a non-selective voltage is applied to pixels from the gate driver 203 in the quiescent period T2, it may be arranged so as to stop operations of analog circuits which are not related to at least the gate driver 203, i.e., the display in the quiescent period T2. Here, by arranging so as to stop at least the operations of analog circuits in the source driver 204 which consume power most, an overall power consumption of the liquid crystal display device 201 can be reduced efficiently.

Furthermore, in the quiescent period T2, data are not written in pixels. Therefore, by stopping the transfer of the image data from the image memory 206 in the quiescent period T2, the power consumption for transferring the image data in the quiescent period T2 can be reduced. The transfer of the image data can be stopped by sending a command for stopping an operation of transferring the image data from the control IC 205 to the image memory 206 based on, for example, the above-mentioned non-scanning period setting signals M1 and M2. As a result, it is possible to further reduce an overall power consumption of the liquid crystal display device 201 by controlling the stopping operation of transfer with ease.

The liquid crystal display device 201 may be provided with image data supply means for supplying image data from the exterior to the liquid crystal display device 201. In this case, the image memory 206 may or may not be provided inside the liquid crystal display device 201. Under these conditions, it is possible to control the liquid crystal display device 201 so as to terminate the operation of receiving the image data as supplied from the image data supply means in the quiescent period T2. For example, based on the non-scanning period setting signals M1 and M2, the input section of the control IC 205 is set to "High-impedance" with respect to the image data supply side. As a result, the power consumption for receiving the image data supply can be reduced in the quiescent period T2. As described, by controlling the liquid crystal display device 201 so as to terminate an operation of receiving the image data as supplied from the image data supply means, in the quiescent period T2, the power consumption for receiving the image data can be reduced, and the overall power consumption of the liquid crystal display device 201 can whereby be further reduced.

Next, a method which achieves a high display quality in which flicker noise on the screen can be suppressed to a sufficient level with setting the quiescent period T2 will be explained.

First, the source driver 204 is set to high-impedance state, for example, by separating the entire data signal line from the source driver 204 in the quiescent period T2. By doing so, the potential of each data signal line can be maintained constant in the quiescent period T2. As a result, fluctuations in data holding state in each pixel due to fluctuations in potential of the data signal lines such as fluctuations in potential of pixel electrodes due to capacitive bond between the data signal line and the pixel electrode, which possibly occur in the case where the liquid crystal display device 201 includes pixel electrodes to be connected to the data signal line, whereby flicker noise can be suppressed to a sufficient level. As a result, power consumption can be suppressed to a sufficient level, and flicker noise can also be suppressed to a sufficient level, thereby realizing high quality display.

As described, when terminating an operation of an analog circuit inside the buffer 209 of the source driver 204 for suppressing power consumption, the buffer 209 is at a ground potential. Then, the data signal line connected to the buffer 209 also becomes at a ground potential, and in the case where the liquid crystal display device 201 includes pixel electrodes to be connected to the data signal line, fluctuations in potential of the pixel electrodes occur due to a capacitive bond. Here, after setting all the data signal line at high impedance state, an operation of analog circuits irrelevant to the display of the quiescent period T2 is stopped, as a result, fluctuations in data holding state of pixels can be suppressed while reducing power consumption of the analog circuit, thereby achieving high quality display from which flicker noise is further suppressed.

It is more preferable that all the data signal lines be set in high impedance state after setting them to have potential at which fluctuation in data holding state of all the pixels are almost minimized on average. For example, in the case where the liquid crystal display device 201 includes pixel electrodes connected to data signal lines, the counter electrode and liquid crystal interposed between the pixel electrodes and the counter electrode, preferably all the data signal lines be set to potential at the center of the amplitude of AC voltage when applying AC voltage to the counter electrode, and to the same potential as the counter electrode when the DC voltage is applied to the counter electrode. In this case, even if the pixel electrodes having potential of positive polarity and pixel electrodes having potential of negative polarity exist at the same time, fluctuations in charge holding state of all the pixels due to capacitive bond between the data signal line and the pixel electrode, i.e., fluctuations in data holding state can be almost minimized on average. As a result, even when the data holding state of pixels changes per line, overall fluctuations in data holding state on the screen can be almost minimized, thereby realizing a high quality display in which flicker noise is further suppressed.

Next, a concrete example of the liquid crystal panel 202 of the liquid crystal display device 201 will be explained.

Figure 31:
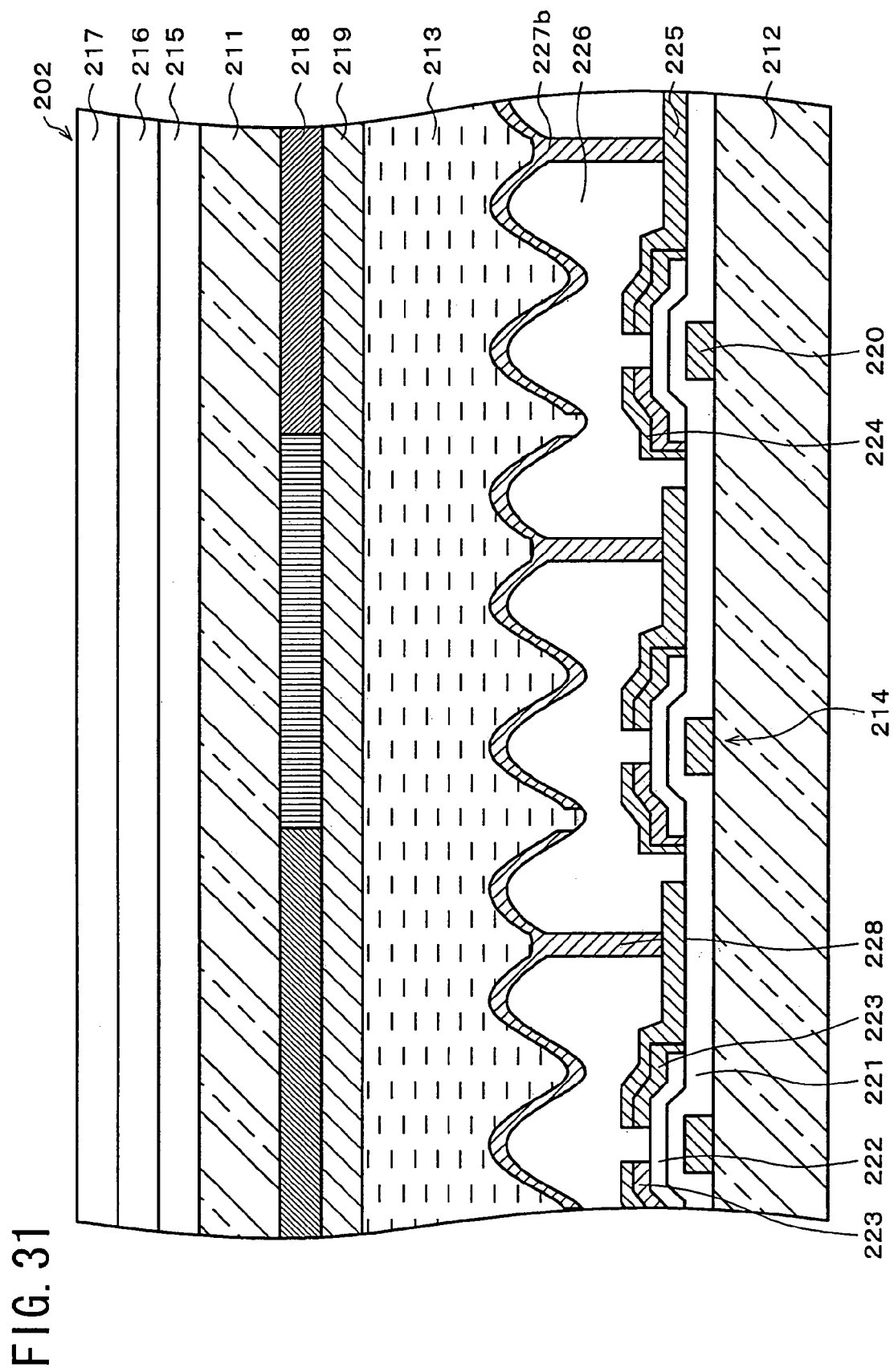
FIG. 31 is a cross-sectional view which illustrates the structure of a liquid crystal panel of the display device of FIG. 29.

FIG. 31 illustrates a cross-sectional view of the liquid crystal panel 202. The FIG. 31 is a cross-sectional view of the portion along a line A-A of FIG. 32 (to be described later). The liquid crystal panel 202 is a reflective-type active matrix liquid crystal panel. The liquid crystal panel 202 includes as a basic structure two glass substrates 211 and 212 having a liquid crystal layer 213 such as nematic liquid crystal sandwiched in between, and TFTs 214 as active elements formed on the glass substrate 212. In the present embodiments, TFTs are adopted as the active elements. However, the active elements of the present invention are not limited to TFTs, and MIMs (Metal Insulator Metals) or FETs other than TFTs may be adopted. On the upper surface of the glass substrate 211, laminated are a phase-difference plate 215 for use in controlling the state of incident light, a polarizing plate 216, and an anti-reflection film 217 in this order. On the lower surface of the glass substrate 211, formed are RGB color filters 218 and transparent common electrodes 219 as counter electrodes in this order. With this color filters 218, a color display can be realized.

Figure 32:
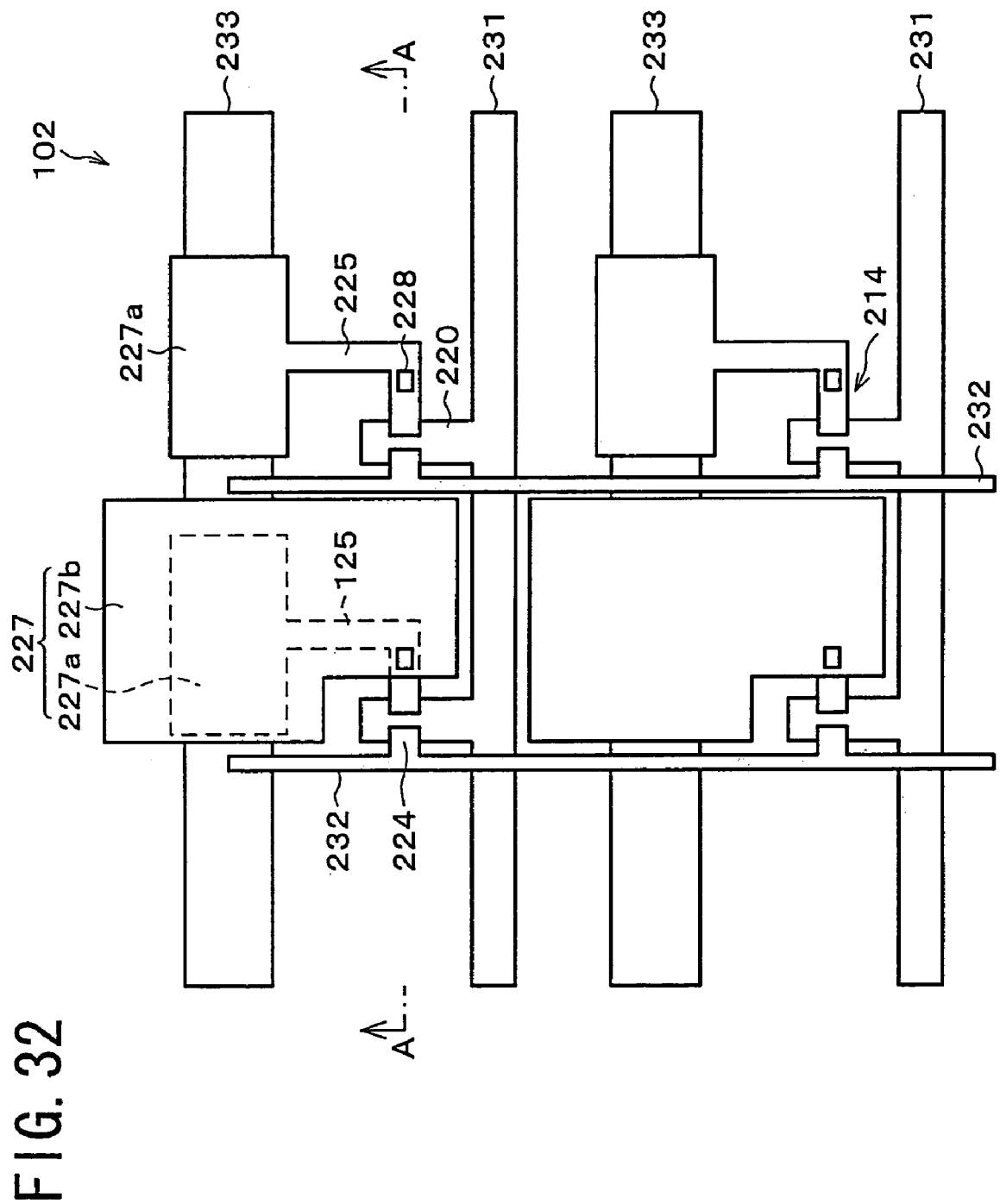
FIG. 32 is a perspective plan view which illustrates the structure of the liquid crystal panel of the display device of FIG. 29.
Figure 33:
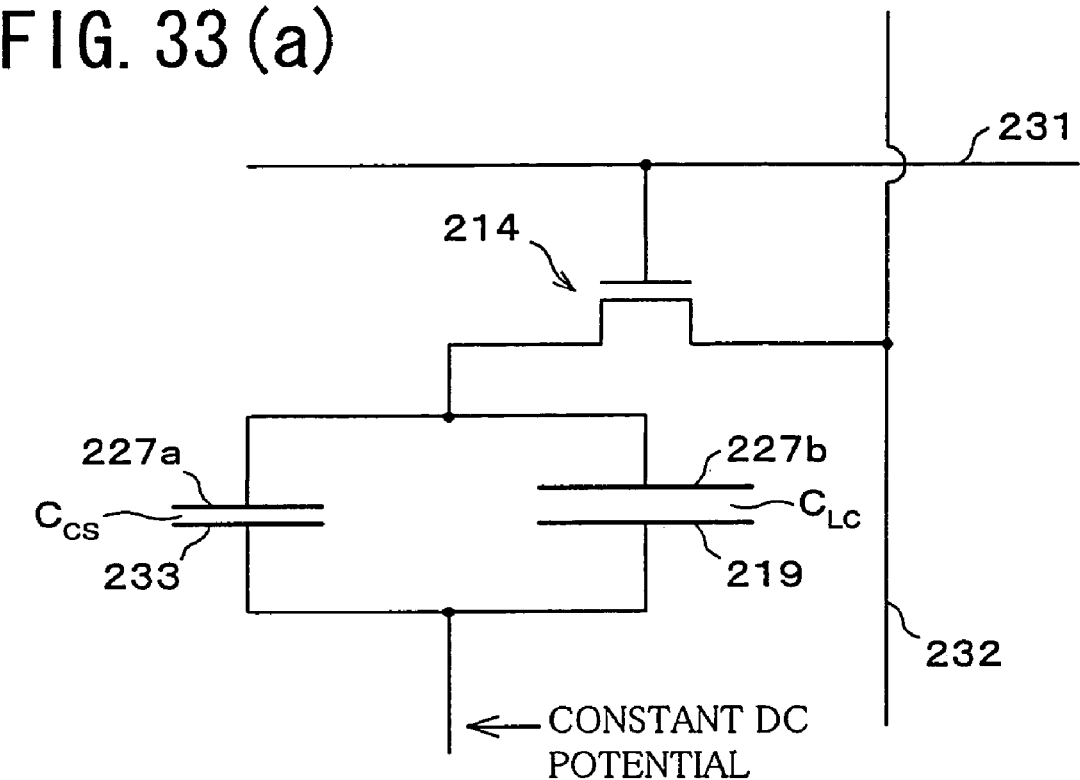
FIG. 33(a) and FIG. 33(b) are circuit diagrams illustrating an equivalent circuit of FIG. 32.
Figure 33:
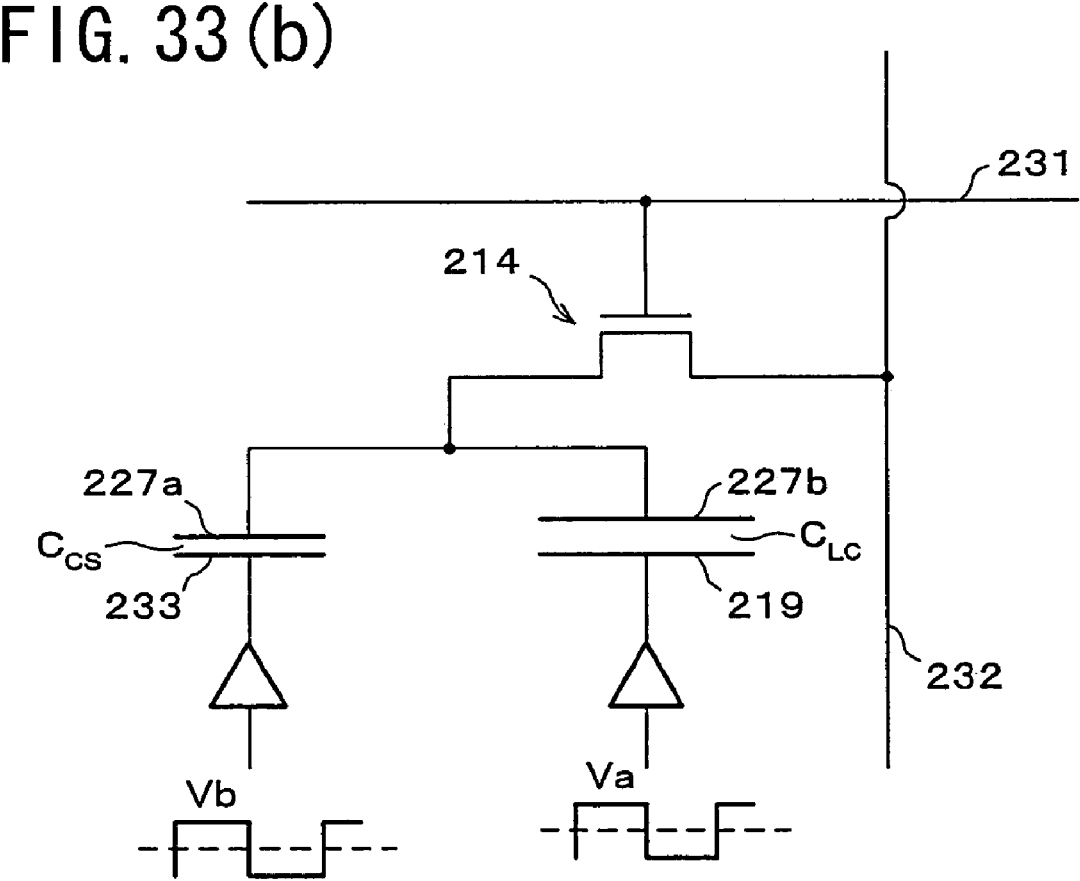

In each TFT 214, a part of a scanning signal line formed on the glass substrate 212 is used as a gate electrode 220, and a gate insulating film 221 is formed so as to cover the gate electrode 220. Further, an i-type amorphous silicon layer 222 is formed facing the gate electrode 220 via the gate insulating film 221 sandwiched in between. On the i-type amorphous silicon layer 222, two $n^+$-type amorphous silicon layers 223 are formed so as to sandwich a channel region of the i-type amorphous silicon layer 222. On the upper surface of one of the $n^+$-type amorphous silicon layers 223, formed is a data electrode 224 which constitutes a part of the data signal line, and on the upper surface of the other $n^+$-type amorphous silicon layer 223, formed is a drain electrode 225 extending from the upper surface of the other $n^+$-type amorphous silicon layer 223 to the entire upper surface of a flat portion of the gate insulating film 221. As illustrated in FIG. 32 (to be described layer), one end of the drain electrode 225 opposite the extension start position is connected to a rectangular auxiliary capacitive electrode pad 227a facing the auxiliary capacitance line 233. On the upper surfaces of the TFTs 214, formed are interlayer insulating films 226, and further reflective electrodes 227b are formed on the upper surface of the interlayer insulating film 226. The reflective electrodes 227b are reflective members for use in performing reflective display using surrounding light. For controlling the direction of reflected light by the reflective electrodes 227b, fine protrusions and recessions are formed on the surface of the inter-layer insulating film 226.

Further, each reflective electrode 227b is conducted to the drain electrode 225 via a contact hole 228 formed in the inter-layer insulating film 226. Namely, the voltage to be controlled by the TFT 214 as applied from the data electrode 224 is applied to the reflective electrode 227b from the drain electrode 225 via the contract hole 228, and the liquid crystal layer 213 is driven by a voltage reflective electrode 227b and the transparent common electrode 219. Namely, the auxiliary capacitive electrode pad 227a and the reflective electrode 227b is conducted, and liquid crystal is interposed between the reflective electrode 227b and the transparent common electrode 219. As described, the auxiliary capacitive electrode pad 227a and the reflective electrode 227b constitute the pixel electrode 227. In the case of transmissive-type liquid crystal display device, a transparent electrode provided corresponding to each electrode serves as a pixel electrode.

As illustrated in FIG. 32 taken from above the portion below the liquid crystal layer 213 of FIG. 31, the liquid crystal panel 202 includes scanning signal lines 231 for supplying scanning signals to the gate electrodes 220 of the TFTs 214 and data signal lines 232 for supplying data signals to the data electrodes 224 of the TFTs 214. These scanning signal lines 231 and the data signal lines 232 are arranged in a matrix form on the glass substrate 212. Between the auxiliary capacitive electrode pads 227a, formed are auxiliary capacitance lines 233 serving as auxiliary capacitive electrodes for use in forming auxiliary capacitances of pixels. Parts of the auxiliary capacitance lines 233 are formed parallel to the scanning signal lines 231 on the glass substrate 212 in other portion than the areas where the scanning signal lines 231 are formed, so as to make pairs with auxiliary capacitive electrode pads 227a sandwiching the gate insulating film 221 in between. The present invention, however, is not limited to the foregoing structure as long as the auxiliary capacitance lines 233 are formed so as not to be overlapped with the scanning signal lines 231. In FIG. 32, the part of the reflective electrodes 227b is omitted so as to clarify the positional relationship between the auxiliary capacitive electrode pads 227a and the auxiliary capacitance lines 233. The protrusions and recessions formed on the surface of the inter-layer insulating film 226 in FIG. 31 are also omitted from FIG. 32.

An equivalent circuit per pixel of the liquid crystal panel 202 of the foregoing structure is illustrated in FIGS. 33(a) and 33(b). The equivalent circuit illustrated in FIG. 33(a) includes a liquid crystal capacitance $C_{LC}$, formed by interposing the liquid crystal layer 213 between the transparent common electrode 219 and the reflective electrode 227b, and an auxiliary capacitance $C_{CS}$, formed by sandwiching the gate insulating film 221 between the auxiliary capacitive electrode pad 227a and the auxiliary capacitance line 233, which are connected to the TFTs 214, wherein a transparent common electrode 219 and an auxiliary capacitance line 233 are set to constant DC potentials. In an equivalent circuit illustrated in FIG. 33(b), an AC voltage Va is applied to the transparent common electrode 219 of the liquid crystal capacitance $C_{LC}$ via a buffer, and an AC voltage Vb is applied to the auxiliary capacitance line 233 of the auxiliary capacitance $C_{CS}$. The AC voltage Va and the AC voltage Vb have equivalent voltage amplitudes, and are in the same phases. The AC voltage Va and the AC voltage Vb have equivalent voltage amplitudes, and have the same phases. Therefore, in this case, the potential of the transparent common electrode 219 and the potential of the auxiliary capacitance line 233 respectively oscillate in the same phase. As illustrated in FIG. 33(a), in the structure wherein the liquid crystal capacitance $C_{LC}$ and the auxiliary capacitance $C_{CS}$ are connected in parallel, in replace of a constant DC potential, a common AC voltage may be applied via the buffer.

The method of driving a display device in accordance with the present embodiment in which the quiescent period T2 is set will be explained with respect to the liquid crystal panel 202 of the foregoing structure.

In the equivalent circuits of FIGS. 33(a) and 33(b), a selective voltage is applied to the scanning signal line 231 to set ON the TFTs 214, and data signals are applied to the liquid crystal capacitance $C_{LC}$ and the auxiliary capacitance $C_{CS}$ through the data signal line 232. Next, the non-selective voltage is applied to the scanning signal line 231 to set OFF the TFTs 214, thereby holding charges written in the liquid crystal capacitance $C_{LC}$ and the auxiliary capacitances $C_{CS}$. Here, as described, the auxiliary capacitance lines 233 for use in forming the auxiliary capacitances $C_{CS}$ of the pixels are formed so as not to overlap the scanning signal lines 231. Therefore, in the foregoing equivalent circuits, the respective capacitive bonds between the scanning signal line 231 and the auxiliary capacitive electrode pads 227a can be ignored. Therefore, in this state, by driving the liquid crystal panel 202 by setting the quiescent period T2 by the control IC 205, unlike the case of forming the auxiliary capacitance by the Cs-on-gate structure, fluctuation in potential of pixel electrodes 227 due to fluctuations in potential of the scanning line of the previous adjacent line can be eliminated.

With the low frequency driving by setting the quiescent period T2, the frequency for reversing the polarity of the data signal can be reduced, and significant reduction in power consumption of the data signal driver (source driver 204 in this example) can be achieved. Furthermore, by suppressing fluctuation in potential of the pixel electrodes 227, a high quality display in which flicker noise is suppressed can be achieved even when setting a long quiescent period T2.

In the case where a DC voltage is applied to the transparent common electrode 219 in the scanning period T1 as illustrated in FIG. 33(a), the transparent common electrode 219 in the quiescent period T2 is set to the same potential as the transparent common electrode 219 of the scanning period T1. In the case where the AC voltage is applied to the transparent common electrode 219 in the scanning period T1 as illustrated in FIG. 33(b), the transparent common electrode 219 in the quiescent period T2 is set to the potential at the center of the amplitude of the AC voltage. As described, by setting the potential of the transparent common electrode 219 in the quiescent period T2 to the foregoing potential, fluctuation in potential of the pixel electrodes 227 due to capacitive bond between each pixel and the counter electrodes can be suppressed. As a result, fluctuation in data holding state of pixels can be suppressed, and a high quality display in which flicker noise is suppressed can be achieved.

Figure 34:
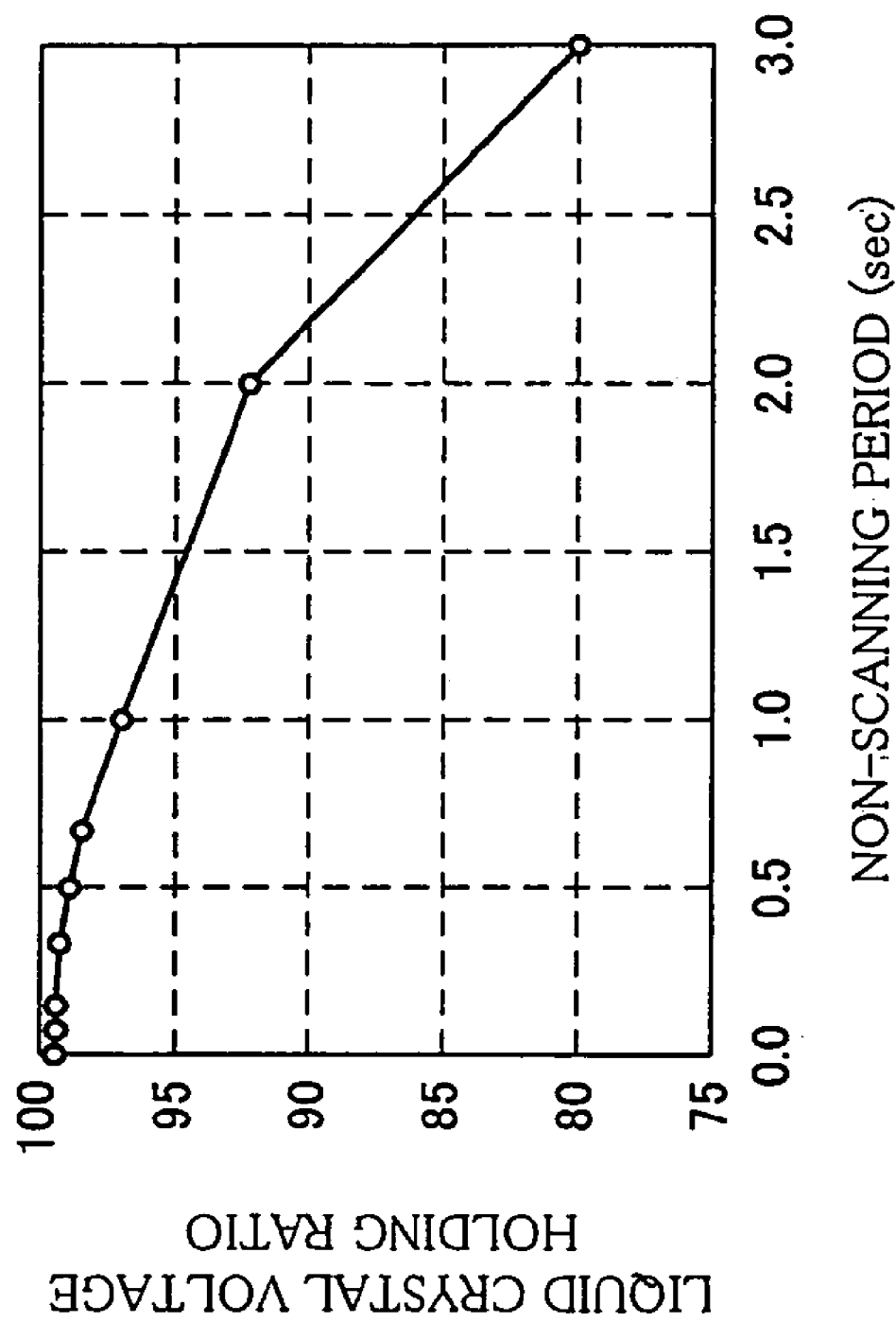
FIG. 34 is a graph showing characteristics of liquid crystal.

Next, the driving method will be explained based on the results of analysis on characteristics of the liquid crystal panel 202 having a width across corners of 0.1 m, which is provided with the scanning signal lines 231 and the data signal lines 232 in numbers of 240 and 320×3 respectively. FIG. 34 is a graph showing the results of measurements on non-scanning period dependency on the liquid crystal voltage holding ratio Hr with respect to liquid crystals (Merk Co., Ltd. ZLI-4792) adopted in the liquid crystal layer 213. As can be seen from the FIG. 34, a liquid crystal voltage holding ratio Hr sharply drops from the non-scanning period of 2 sec where the liquid crystal voltage holding ratio Hr is 92% to the non-scanning period of 3 sec where the liquid crystal voltage holding ratio Hr is 80%. In the non-scanning period of 3 sec, a pixel voltage holding ratio P (to be described later) is 88%. However, for the pixel voltage holding ratio P, 90% or above is preferable, and it is therefore preferable to set the non-scanning period be not more than 2 sec. When the non-scanning period is set to not less than 16.7 msec, the non-scanning period becomes a quiescent period T2 for the scanning period at 60 Hz of 16.7 msec.

Therefore, by setting the quiescent period T2 to not less than 16.7 msec, the power consumption of the source driver 204 can be reduced as compared to the case of driving at frequency of 60 Hz, and by setting the quiescent period T2 to be not more than 2 sec, the flicker noise due to fluctuation in potential of pixel electrode 227 caused by leak current from the liquid crystal and the TFT 214 can be suppressed, thereby achieving high quality display. Still more preferably, the quiescent period T2 be set to not less than 50 msec and not more than 1 sec. By setting the quiescent period T2 be set to not less than 50 msec, the power consumption of the source driver 204 can be significantly reduced, and by setting the quiescent period T2 be set to not more than 1 sec., the flicker noise due to fluctuation in potential of the pixel electrode 227 by the leak current from the liquid crystal and the TFT 214 can be significantly suppressed, thereby achieving a still higher display quality.

Figure 35:
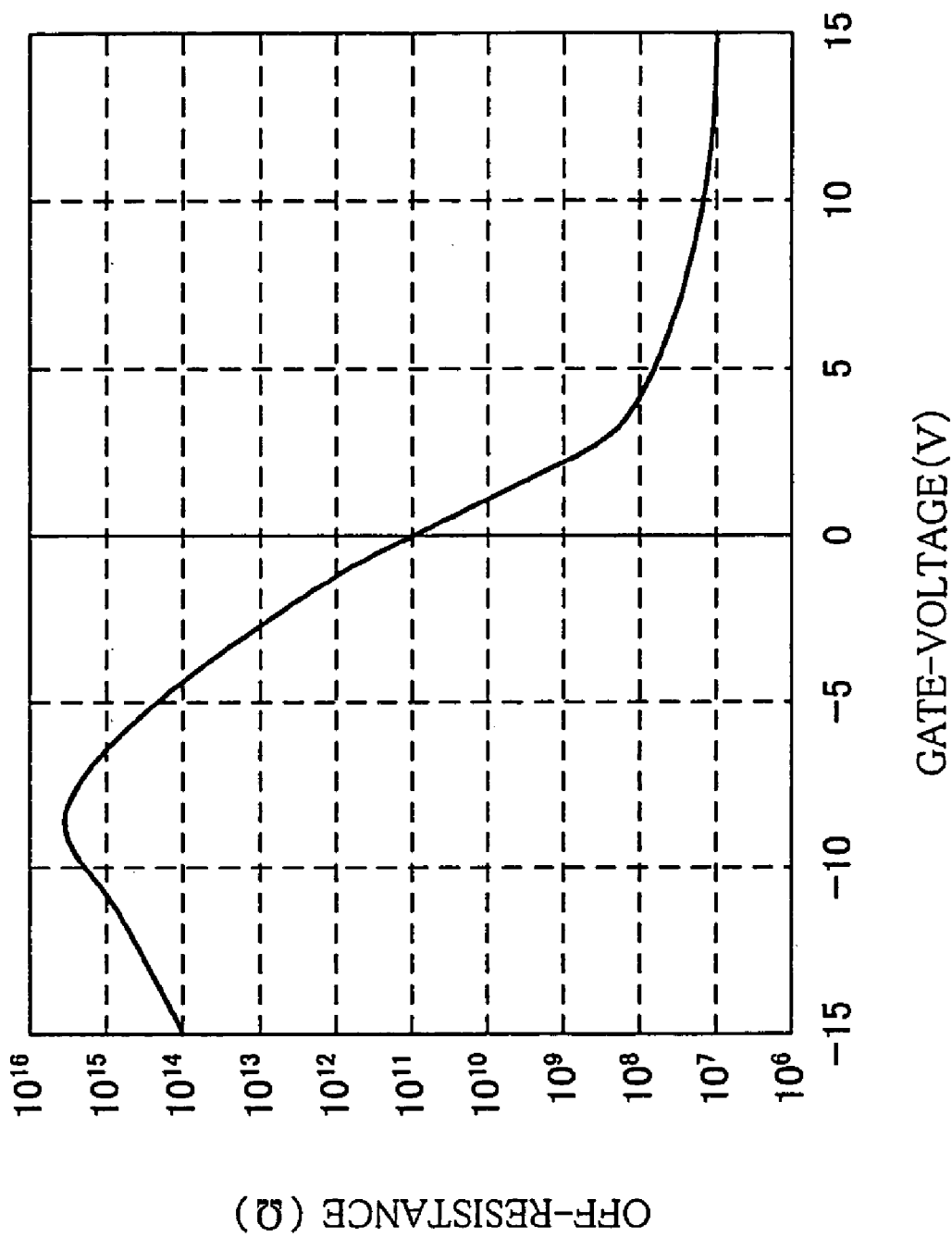
FIG. 35 is a graph showing characteristics of an OFF resistance of a TFT.
Figure 36:
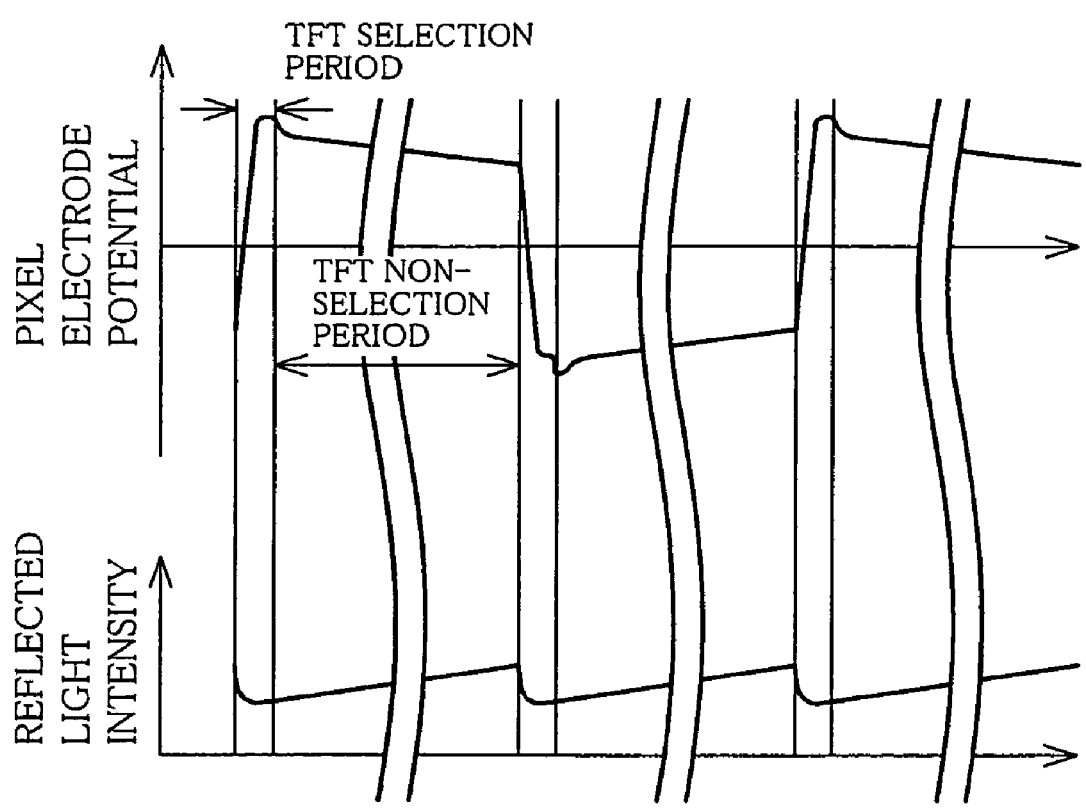
FIG. 36 is an explanatory view which explains fluctuations in pixel electrode potential and fluctuations in reflective light intensity in the case where charges cannot be stored sufficiently.

FIG. 35 illustrates the results of measurements on the relationship between the OFF resistance values of the TFTs 214 and the potential of the gate electrode 220 of the TFT 214, i.e., the potential of the scanning signal line 231. The OFF voltage of the TFT 214 is usually around −10V, and only with a slight change in the OFF voltage, sufficient liquid crystal voltage holding ratio Hr and the OFF resistance value of the TFT 214 may not be ensured, which leads to significant amount of leakage of charges written in the liquid crystal capacitances $C_{LC}$ and the auxiliary capacitances $C_{CS}$ occur in the non-selection period of the TFTs 214, and as illustrated in FIG. 36, potentials of pixel electrodes 227 fluctuate, and the intensity of reflected light from the reflective electrodes 227b fluctuate, thereby generating flicker noise.

Assumed here that the non-selective voltage at which the OFF resistance value of the TFTs 214 is almost maximized is applied to all the scanning signal lines 231. This non-selective voltage is around −8V in FIG. 35. In the quiescent period T2 where the all the scanning signal lines 231 become non-scanning state, in order to maintain the OFF-resistance value of the TFT 214 at maximum value, fluctuation in potential electrode 227 due to leak current to the data signal lines 232 are suppressed. As a result, even if the pixel potential varies per scanning line, fluctuations in data holding state of pixels can be suppressed, thereby realizing a high quality display in which flicker noise is suppressed.

By applying the non-selective voltage to all the scanning signal lines 231 in the foregoing manner, unlike the aforementioned case, even if signals other than gate start pulse signals GSP can be supplied to the gate driver 203 and the source driver 204 without any treatment in the quiescent period T2, and the source driver 204 outputs data signals to the data signal line of the liquid crystal panel 202, the potential of the pixel electrode 227 can be maintained, and the display is not varied.

The pixel voltage holding ratio P, which is dependent on the potential of the pixel electrode 227, and the reflective light intensity from the reflective electrode 227b, can be expressed by the following formula (4)

$$P = V_1 \cdot \exp[-T/\{(C_{LC}+C_{CS}) \cdot R\}]/V$$

$$V_1 = V - \{V \cdot (1-Hr(T)) \times C_{LC}/(C_{LC}+C_{CS})\} \quad (4)$$

T: a non-selective period of TFT 214,

Hr(T): a liquid crystal voltage holding ratio after the non-selective period T in FIG. 34, V: a potential difference between the pixel electrode 227 and the transparent common electrode 219 directly after writing, and R: an OFF resistance value of the TFT 214 in FIG. 35.

The formula $V_1 \cdot \exp[-T/\{(C_{LC}+C_{CS}) \cdot R\}]$ indicates a potential difference between the pixel electrode 227 and the transparent common electrode 219 when a time period T has passed after the completion of writing. The non-scanning period T can be expressed by the following formula:

$$T = (T1+T0) - T1/n,$$

wherein n is the number of scanning signal lines Hr(T) T1 is a scanning period, and T0 is a non-scanning period.

For example, under the conditions of the liquid crystal voltage holding ratio Hr(T) at T=180 msec, the resistance value in the non-selective period of the TFT 214, i.e., the OFF-resistance value R, the liquid crystal capacitance $C_{LC}$ and the auxiliary capacitance $C_{CS}$ as shown in the following Table 6, the pixel voltage holding ratio P can be obtained as 99.7% from the above formula (4).

TABLE 6

| | |
|---|---|
| LIQUID CRYSTAL VOLTAGE HOLDING RATIO (after 180 msec) | 99.7% |
| RESISTANCE IN NON-SELECTIVE PERIOD OF TFT | $1.5 \times 10^{15}$ Ω |
| LIQUID CRYSTAL CAPACITANCE | 0.45 pF |
| AUXILIARY CAPACITANCE | 0.32 pF |

Figure 37A:
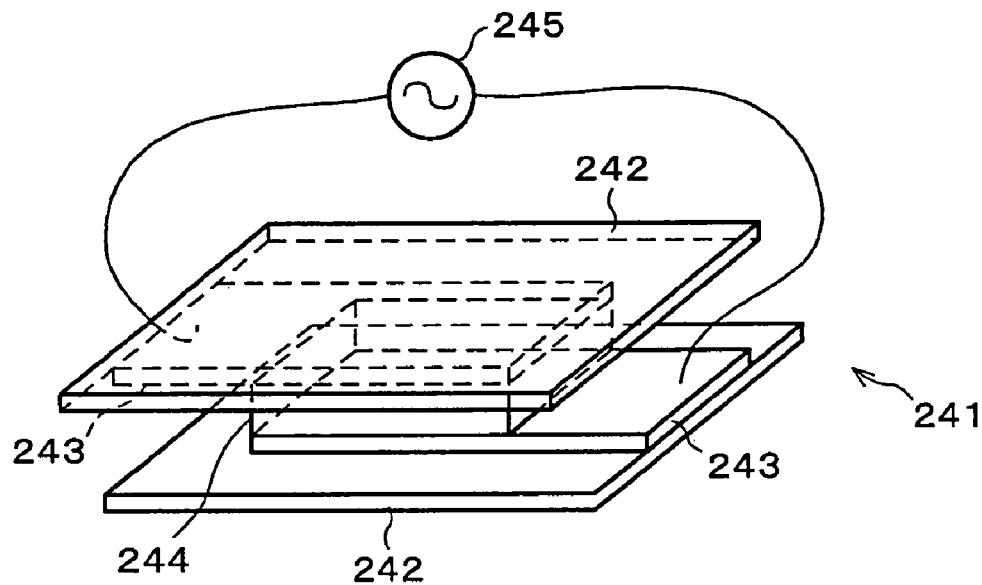
FIG. 37(a) and FIG. 37(b) are explanatory views which explain the method of evaluating characteristics of the liquid crystal panel.
Figure 37B:
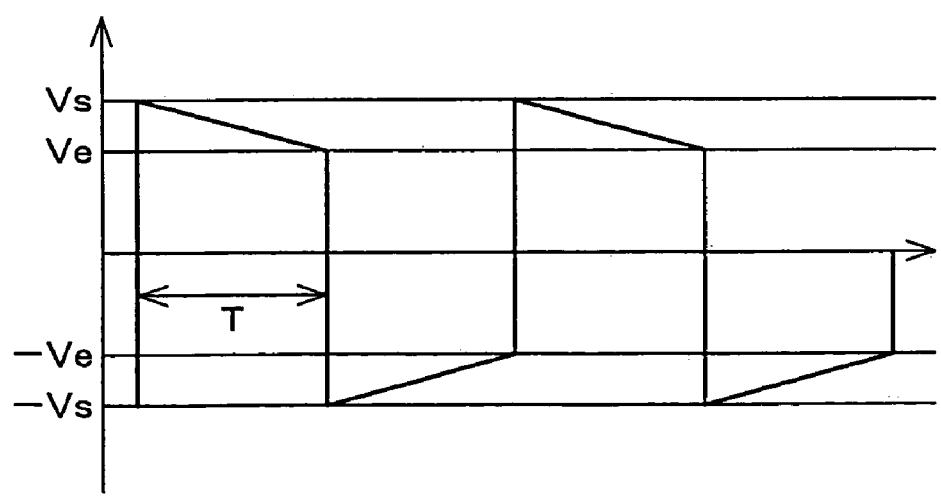

Here, the pixel voltage holding ratio P and the perception limits for the flicker noise were fully examined. As illustrated in FIG. 37(a), two glass substrates 242 are connected in such a manner that pixel electrodes 243 are formed on the inner surface, and a flicker-noise-evaluation-use cell 241 including two transparent electrodes 243 having a liquid crystal layer 244 interposed in-between is prepared. Between these two transparent electrodes 243 of the flicker-noise-evaluation-use cell 241, a voltage is applied from a signal generating device 245. A voltage waveform to be output from the signal generating device 245 is illustrated in FIG. 37(b). In FIG. 37(b), Vs and the non-selective period T are set to 3 V and 167 msec respectively, with variable Ve. Initially, the flicker-noise-evaluation-use cell 241 is charged to a voltage Vs, and the voltage thereof is gradually reduced to Ve. Next, with an application of −Vs, the brightness of the flicker-noise-evaluation-use cell 241 changes, and these fluctuations in brightness, i.e., fluctuations in flicker noise are observed with eyes.

Here, Ve/Vs corresponds to an actual pixel voltage holding ratio P in the liquid crystal display device 201. The pixel voltage holding ratio P and flicker generating state were observed in details. The results of observation are as illustrated in the following Table 7.

TABLE 7

| PIXEL VOLTAGE HOLDING RATIO[%] | RESULT OF OBSERVATION ON FLICKER NOISE WITH EYES |
|---|---|
| 80.0 | x |
| 82.0 | x |
| 84.0 | x |
| 86.0 | Δ |
| 88.0 | Δ |
| 90.0 | ○ |
| 92.0 | ○ |
| 94.0 | ○ |
| 96.0 | ○ |
| 98.0 | ○ |
| 100.0 | ○ |

○: flicker noise was not perceptible.
Δ: flicker noise was partially perceptible.
x: flicker noise was perceptible.

As can be seen from the results shown in Table 7, in order to obtain the liquid crystal panel 202 which is free from flicker noise even when setting the quiescent period T2, the following condition be satisfied:

pixel voltage holding ratio P≧0.9.

FIG. 38(a) through FIG. 38(e) respectively illustrate the scanning signal waveform, the data signal waveform, the potential of the pixel electrode 227b, the reflective light intensity from the reflective electrode 227 when driving the liquid crystal display device 201 having the foregoing structure at low frequency. In this experiment, the scanning period T1 was set to 16.7 msec, the quiescent period T2 was set to 167 msec. Further, when writing images in odd-number of times, the data signal lines 232 are set to positive polarity when scanning odd-numbered scanning signal lines ($G_1$, $G_3$, ... ), and to negative polarity when scanning even-numbered scanning signal lines ($G_2$, $G_4$, ... ). On the other hand, when rewriting images in even-number of times, the data signal lines 232 are set to negative polarity when scanning odd-numbered scanning signal lines ($G_1$, $G_3$, ... ), and to positive polarity when scanning even-numbered scanning signal lines ($G_2$, $G_4$, ... ). In this way, the polarity in the scanning line direction can be reversed, and in each pixel, AC signal whose polarity is reversed each time can be input.

FIG. 38(a) illustrates a scanning signal waveform to be output to the scanning signal line 231 in the pre-stage of the pixel being focused. FIG. 38(b) illustrates a scanning signal waveform to be output to the data signal line 231 on a current line of the pixel being focused. FIG. 38(c) illustrates a data signal waveform to be output to the data signal line 232 of the pixel being focused. FIG. 38(d) illustrates a potential of the pixel electrode 227 of the pixel being focused. As can be seen from FIG. 38(a) and FIG. 38(d), when the selection voltage is applied to the scanning signal line 231 on the previous line, the potential of the pixel electrode 227 can be stabilized. In this stage, the intensity of the reflective light from the reflective electrode 227b was measured. As a result of measurement, fluctuations in intensity of the reflected light was hardly observed as illustrated in FIG. 38(e). It was also confirmed as a result of observation with eyes, a high quality uniform display without flicker noise could be realized.

Figure 39:
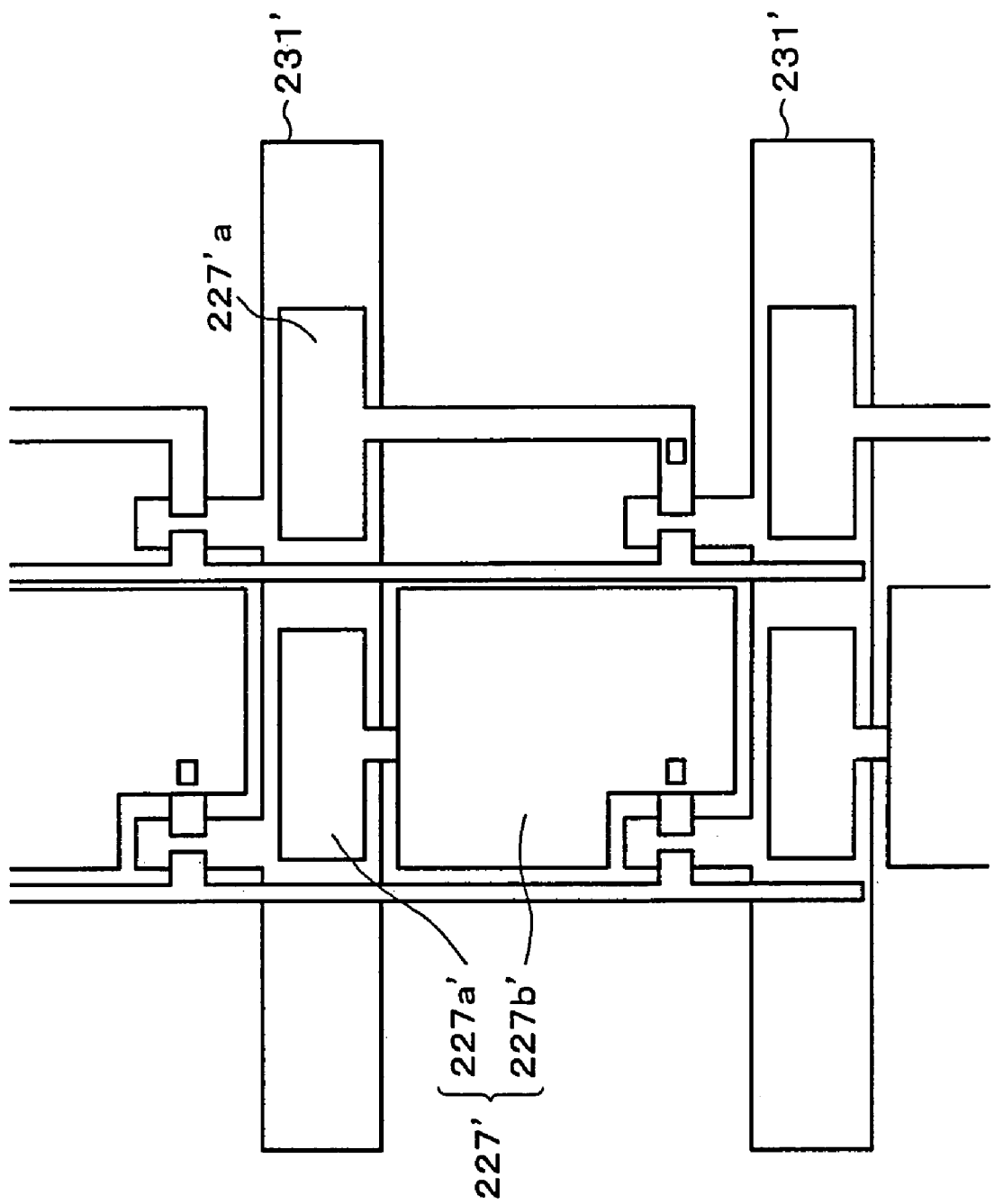
FIG. 39 is a perspective plan view which illustrates the structure of a comparative example of the liquid crystal panel of FIG. 32.

Comparative measurement was performed with respect to the conventional Cs-on-gate structure wherein auxiliary capacitances are formed providing auxiliary capacitive electrode pads 227a' facing the scanning signal lines 231' on the previous line as illustrated in FIG. 39. The results of this comparative measurements are shown in FIGS. 40(a) through 40(e). As can be seen from the results shown in FIG. 40(a) and through FIG. 40(d), when the selective voltage was applied to the scanning signal line 231' in one line above, the potential of the pixel electrode 227' greatly fluctuated, and as a result, the intensity of the reflected light from the reflective electrode 227b' also fluctuated as illustrated in FIG. 40(e). It was also confirmed as a result of observation with eyes, the flicker noise was generated.

The power consumption of the liquid crystal display 201 was also measured under the conditions of with and without the quiescent period T2. As a result, when driving the liquid crystal display device 201 without setting the quiescent period T2, the power consumption was 160 mW. On the other hand, when driving the liquid crystal display device 201 by setting the quiescent period T2, the power consumption was 40 mW which was significantly smaller than that of the above case without the quiescent period T2. Further experiments were performed under the condition where the non-scanning period is set to the vertical fly-back period, and images are rewritten repetitively at every 16.7 msec, a normal moving picture in which images are changed sequentially could be displayed.

As described, according to the liquid crystal display device 201 provided with active elements, it is possible to reduce power consumption while ensuring desirable display quality. Furthermore, the liquid crystal display device 201 of the present invention provided with reflective electrodes 227b is a reflective-type liquid crystal display device without requiring a backlight, required power consumption can be reduced effectively when driving at low frequency of not more than 30 Hz. The same can be the for the reflective-type liquid crystal display device provided with a reflective member on the back surface of the liquid crystal panel.

Figure 41:
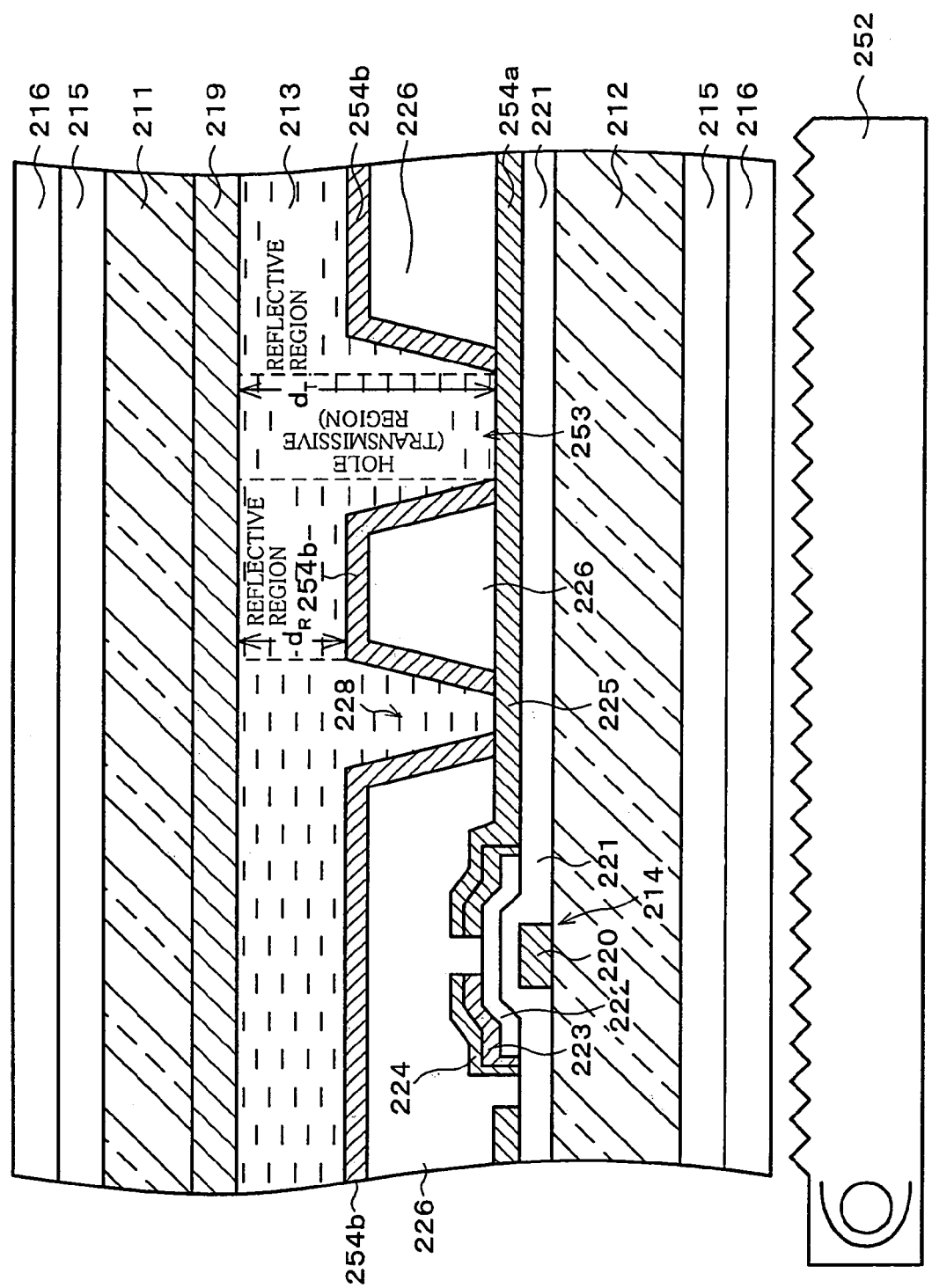
FIG. 41 is a cross-sectional view illustrating the structure of a modified example of the liquid crystal panel of FIG. 31.

Next, as another example of the liquid crystal display device, a liquid crystal display device applicable to both transmissive-type and reflective-type will be explained. In this liquid crystal display device, the liquid crystal panel 202 of the liquid crystal display device 201 illustrated in FIG. 31 and FIG. 32 is replaced with a liquid crystal display panel 251 illustrated in FIGS. 41 and 42. As illustrated in FIG. 41 which is a cross section of the portion along a line B-B of FIG. 42, in the liquid crystal panel 251, the anti-reflection film 217 and the color filter 202 of the liquid crystal panel 216 are omitted, and the phase-difference plate 215 and the polarizing plate 218 are formed on the lower surface of the glass substrate 212 in this order, and further the backlight 252 is provided below the polarizing plate 215. The auxiliary capacitive electrode pad 254a is formed by the transparent electrode such as ITO (indium tin oxide), and fine protrusions and recessions are not formed on the inter-layer insulating film 226 and the reflective electrode 254b.

Further, light transmissive holes 253 are formed in a part of the reflective electrodes 254b above the auxiliary capacitive electrode pad 254a so as to pierce the interlayer insulating film 226. This light transmissive hole 253 serves as a transmissive region where light from the backlight 252 can be transmitted. The reflective region from which light is reflected by the reflective electrodes 227b and the foregoing transmissive region conduct via the contact hole 228 and have the same potential, and in these regions, the liquid crystal layer 213 can be driven. When displaying on the liquid crystal panel 251 in the polarizing mode, it is required to adjust the phase difference between the reflective region and the transmissive region, and for this reason, it is preferable for the thickness $d_T$ of the liquid crystal layer 213 in the transmissive region and the thickness $d_R$ of the liquid crystal layer 213 in the reflective region satisfy the condition of $d_T \approx 2d_R$.

Figure 42:
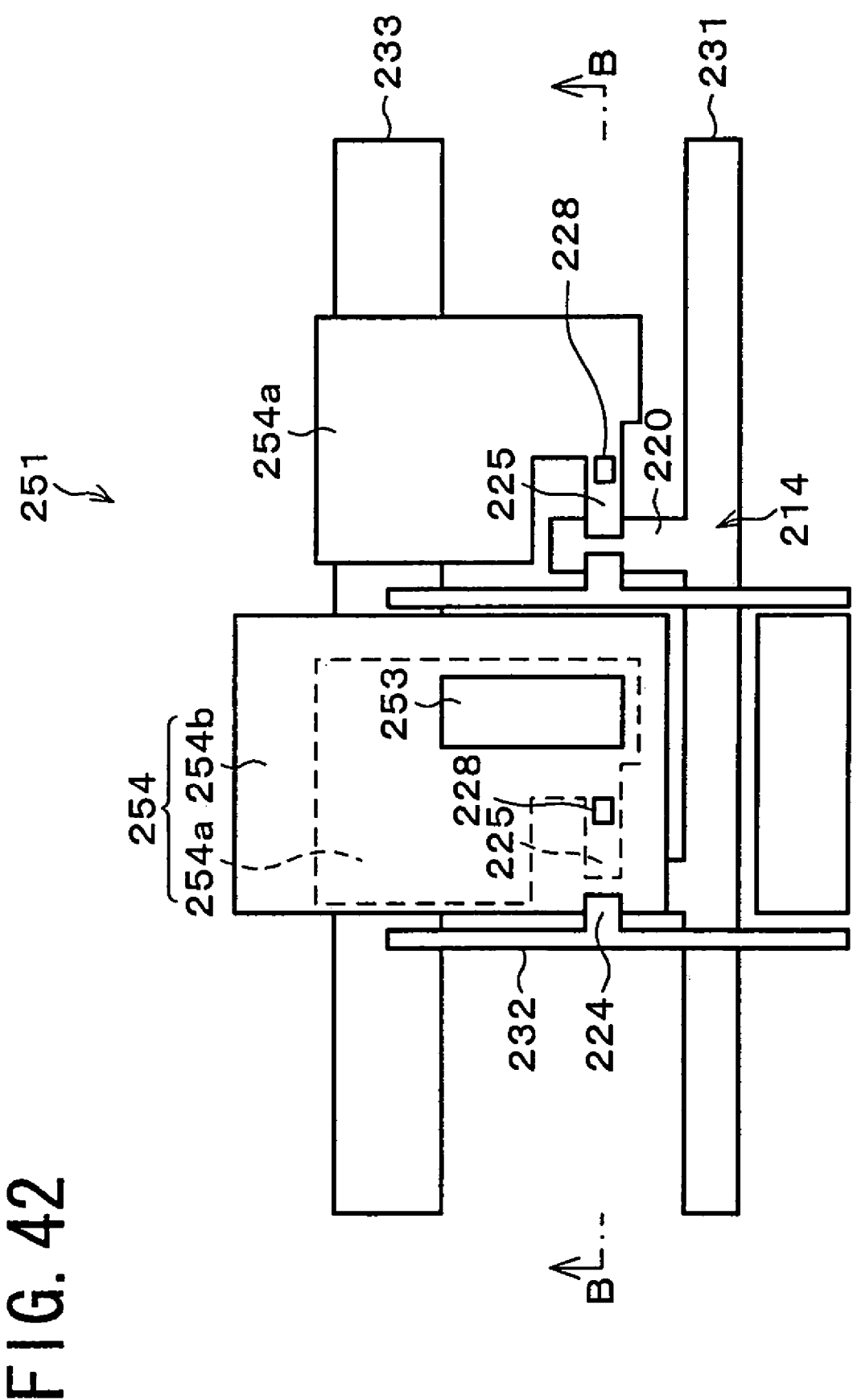
FIG. 42 is a perspective plan view illustrating the structure of a modified example of the liquid crystal panel of FIG. 31.
Figure 44:
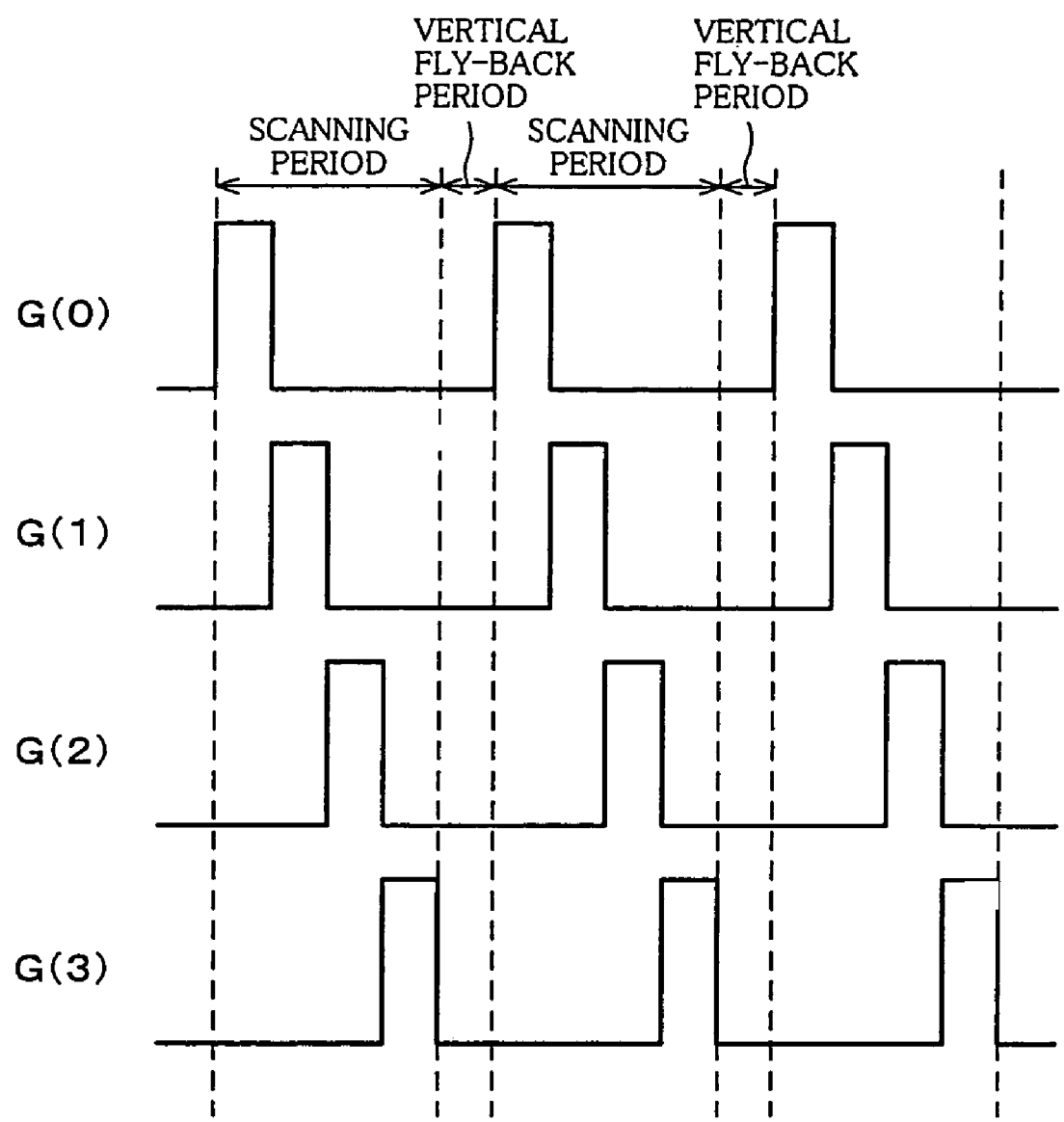
FIG. 44 is a timing chart which explains a conventional method of driving a display device.
Figure 45:
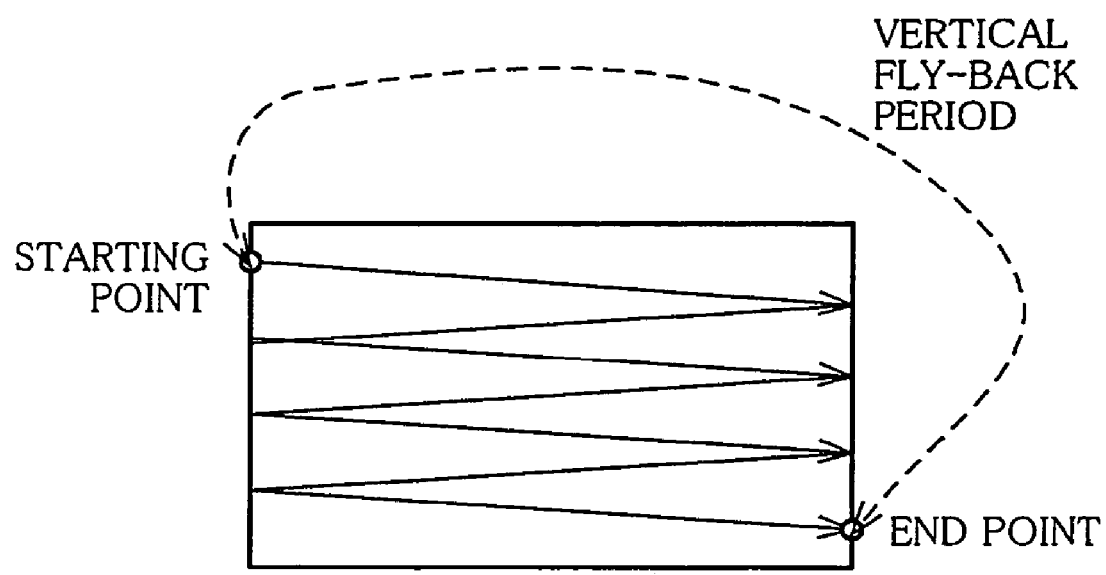
FIG. 45 is an explanatory view which explains a vertical fly-back period.

FIG. 42 illustrates the portion below the liquid crystal layer 213 illustrated in FIG. 41 when seen from above. The auxiliary capacitive electrode pad 254a and the reflective electrode 254b constitute the pixel electrode 254. Each auxiliary capacitive electrode pad 254a forms an auxiliary capacitance $C_{CS}$ with the auxiliary capacitance line 233. The auxiliary capacitive electrode pads 254a are formed in a wide range so as to surround the TFTs 214. A rectangular light transmissive hole 253 is formed in the reflective electrode 254b and the inter-layer insulating film 226 above the auxiliary capacitive electrode pad 254a so as not to be overlapped with the scanning signal line 231 nor the auxiliary capacitance line 233.

According to the liquid crystal panel 251 of the foregoing structure, in addition to the effects achieved from the aforementioned liquid crystal display device 201, the display device can be used selectively to be suited for the surrounding condition in the reflective mode when used under the condition of a plenty of surrounding light and the reflective mode with the backlight 252 on when used under the condition of small amount of surrounding light. The foregoing effects can be achieved also from a liquid crystal panel having the structure of the liquid crystal panel 202 except that a semi-transparent reflective plate is used.

It should be noted here that the present invention is not intended to be limited to the foregoing display device and the method of driving the same as explained in the above preferred embodiments. For example, the display device of the present invention is not limited to active matrix liquid crystal display device, and, a simple multiplex liquid crystal display device, EL (Electro Luminescence) display device, PDP (Plasma Display Panel), giricon, etc., may be adopted. The foregoing display device may be applicable to portable telephones, pocket-size game machines, PDA (Personal Digital Assistants), portable televisions, remote controllers, note-type personal computers, or other portable devices. The foregoing portable devices are driven using battery, and by adopting the display device of the present invention which realizes reduced power consumption while maintaining desirable display quality which is free from flicker noise, it is possible to drive them for a longer period of time with ease.

As described, the method of driving a display device which displays by selecting and scanning each scanning signal line of a screen having pixels arranged in a matrix form and supplying through a data signal line a data signal to a corresponding pixel of the scanning signal line as selected, wherein a quiescent period, in which all the scanning signal lines are set in non-scanning state, is set to be longer than a scanning period required for scanning the screen one time, wherein a sum of the scanning period and the quiescent period is set to be equivalent to one vertical period.

According to the foregoing method, a scanning period and a quiescent period which is longer than the scanning period, in which all the scanning signal lines are set in the non-scanning state, are set in each vertical period alternately and repetitively. For example, in the case where the scanning period is set to a time period for normal frequency 60 Hz, as the quiescent period longer than the scanning period is set, the vertical frequency becomes lower than 30 Hz. This scanning period and the quiescent period may be suitably adjusted to be suited for the type (motion) of an image to be displayed such as a static image or a moving picture. In the quiescent period, all the scanning signal lines are set in the non-scanning state, and it is therefore possible to reduce a supply frequency of the data signals.

As explained, by setting a quiescent period to be longer than the scanning period, a vertical frequency becomes low frequency. Therefore, for the matrix-type display device in which basic display quality such as brightness, contrast, response speed, gradation, etc., can be ensured, such as an active matrix liquid crystal display, etc., the power consumption of data signal line driver which increases in proportion to the supply frequency of data signals can be significantly reduced with ease without any sacrifice of display quality.

As a result, the method of driving a matrix-type display device which permits the power consumption to be reduced to a sufficient level while ensuring basic display quality such as brightness, contrast, response speed, gradation, etc., can be realized.

The method of driving a display device of the present invention may arranged such that non-scanning periods including the foregoing quiescent period can be selected from among plurality of periods.

According to the foregoing method, non-scanning periods including the quiescent period can be switched among the plural periods, and it is therefore possible to adjust a rewriting frequency for screens according to the type of an image to be displayed such as a static image or a moving picture, etc. As a result, it is possible to reduce the power consumption to an appropriate low level for each type of the image to be displayed.

It is also preferable for the foregoing method of driving a display device of the present invention to satisfy the condition of:

$(T1+T02)=(T1+T01) \times N$(N is an integer of not less than 2), wherein T1 is the scanning period, T01 is the shortest non-scanning period among all, and T02 is an arbitrary non-scanning period other than T01.

According to the foregoing method, a frame period adopting respective plural non-scanning periods can be set to an integer multiple of the frame period adopting the shortest non-scanning period. For example, when driving at normal frequency of 60 Hz, the scanning period T1 is 16.7 msec or below. By setting the non-scanning period T01 to be the vertical fly-back period, and the non-scanning period T02 to satisfy the above condition, the required number of sampling times to be applied to the data signals of the screen transferred at 60 Hz can be reduced to once in several integer times.

With the foregoing arrangement, reference synchronous signals can be used in common among respective non-scanning periods, and a low frequency driving can be realized only by adding a simple structure, and it is therefore possible to reduce additionally required power consumption to be very small.

The foregoing method of driving a display device of the present invention may be arranged such that in the structure having image data storage means for storing image data based on which the data signals are produced, the display device is controlled to stop an operation of transferring the image data from the image data storage means.

With the foregoing arrangement, the display device is controlled so as to stop the operation of transferring the image data from the image data storage means in the quiescent period, and it is therefore possible to reduce the power consumption for transferring the image data in the quiescent period. As a result, an overall power consumption of the display device can be further reduced.

The foregoing method of driving a display device of the present invention may be arranged such that in the structure having image data supply means for supplying image data as a source of the data signal to the display device, the display device is controlled to stop an operation of receiving the supply of the image data from the image data supply means in the quiescent period.

With the foregoing arrangement, the display device is controlled so as not to receive the image data from the image data supply means in the quiescent period, and it is therefore possible to reduce the power consumption for receiving the supply of the image data in the quiescent period. As a result, an overall power consumption of the display device can be further reduced.

The foregoing method of driving a display device of the present invention may be arranged so as to stop an operation of an analog circuit irrelevant to display.

According to the foregoing method, among the analog circuits formed in the data signal line driver or its control circuit, etc., the operation of those analog circuits irrelevant to the display is not performed in the quiescent period. In this way, the power consumption of the circuits which otherwise always consume a fixed amount of power can be reduced, thereby realizing further reduction in power consumption of the entire display device.

The foregoing method of driving a display device of the present invention may be arranged so as to stop at least the operation of the analog circuit of the driver for the data signal line in the quiescent period.

According to the foregoing method, at least the operation of an analog circuit which consumes the greatest amount of power is stopped in the quiescent period, and it is therefore possible to effectively reduce the power consumption of the entire display device.

The method of driving a display device of the present invention may be arranged so as to set the data signal lines all in high-impedance state with respect to the data signal driver for driving all the data signal lines.

According to the foregoing method, all the data signal lines are set in the high-impedance state with respect to the data signal driver, for example, by separating them from the data signal driver in the quiescent period, and it is therefore possible to maintain the potential of each data signal line constant in the quiescent period. It is therefore possible to suppress fluctuations in data holding state of each pixel caused by fluctuations in potential of the data signal line associated with the structure of the liquid crystal display device having pixel electrodes connected to the data signal line, such as fluctuations in potential of pixel electrode due to capacitive bond between the data signal line and the pixel electrode, and to suppress a flicker noise in the screen to a sufficiently low level. As a result, the method of driving a matrix-type display device which enables the required power consumption to be reduced to a sufficiently low level and, at the same time, ensures a high quality display in which flicker noise is suppressed to a sufficiently low level can be realized.

The method of driving a display device of the present invention may be arranged such that after setting all the data signal lines in high-impedance state, an operation of an analog circuit irrelevant to display is stopped in the quiescent period.

According to the foregoing method, after setting all the data signal lines in high-impedance state, an operation of an analog circuit irrelevant to display is stopped in the quiescent period. It is therefore possible to avoid such problem that the data signal line becomes ground potential via an analog circuit. As a result, while reducing power consumption of analog circuit, fluctuations in data holding state of pixels can be suppressed, and a high quality display in which flicker noise is suppressed can be realized.

Furthermore, the method of driving a display device of the present invention may be arranged so as to stop operations of at least an analog circuit of a driver of the data signal line in the quiescent period.

According to the foregoing method, at least the operation of an analog circuit which consumes a large amount of power is stopped in the quiescent period, and it is therefore possible to effectively reduce an overall power consumption of the entire display device.

The method of driving a display device of the present invention may be arranged so as to set all the data signal lines to such potential that fluctuations in data holding state of all the pixels are almost minimized on average, before setting all the data signal lines in high-impedance state.

According to the foregoing method, all the data signal lines are set in the high-impedance state after setting them to such potential that fluctuations in data holding state of all the pixels are almost minimized on average. For example, in the case where the liquid crystal display device includes pixel electrodes connected to data signal lines, the counter electrode and liquid crystal interposed between the pixel electrodes and the counter electrode, preferably all the data signal lines be set to potential at the center of the amplitude of AC voltage when applying AC voltage to the counter electrode, and to the same potential as the counter electrode when the DC voltage is applied to the counter electrode. In this case, even if the pixels having potential of positive polarity and pixel electrodes having potential of negative polarity exist at the same time by AC driving, fluctuations in charge holding state of all the pixels, i.e., fluctuations in data holding state can be minimized on average.

As a result, even in the case where the data holding state of pixels differ per line, fluctuations in data holding state of entire screen can be almost minimized, and it is therefore possible to ensure a high quality display in which flicker noise is suppressed.

A display device of the present invention which displays by a driving method of selectively scanning each scanning signal line on a screen whereon pixels are arranged in a matrix form, and supplying a data signal from the data signal line to each of pixels connected to the scanning signal line as selected, may be arranged so as to include control means for executing the driving method of the display device, and in the driving method, a quiescent period, in which all the scanning signal lines are set in the non-scanning state, is set to be longer than the scanning period for scanning a screen one time, and a sum of the scanning period and the quiescent period is set to be equivalent to one vertical period.

According to the foregoing arrangement, it is possible to provide a matrix-type display device which permits a required power consumption to be significantly reduced while ensuring a display of desirable quality in basic characteristics such as brightness, contrast, response speed, gradation, etc., with ease.

The display device of the present invention may be arranged such that the control means executes the method of driving a display device wherein the data signal lines are all set in high-impedance state in the quiescent period with respect to the data signal driver for driving all the data signal lines.

According to the foregoing structure, a matrix display device which permits power consumption to be reduced sufficiently while ensuring a high quality display in which flicker noise is suppressed to sufficiently low level can be realized.

The method of driving a display device of the present invention which displays by selectively scanning each scanning signal line on a screen whereon pixels are arranged in a matrix form, and supplying a data signal from the data signal line to each to pixels connected to the scanning signal line as selected, may be arranged such that a quiescent period, in which all the scanning signal lines are set in non-scanning state, is set to be longer than a scanning period required for scanning a screen one time, wherein a sum of the scanning period and the quiescent period is set to be equivalent to one vertical period, and may be arranged so as to adopt in the display device of a liquid crystal display device provided with liquid crystal display elements of pixels arranged in a matrix from may be adopted wherein charges based on a data signal as supplied from a data signal line is written periodically in electric capacitance which is formed by interposing liquid crystal between a pixel electrode and a counter electrode via an active element as selected by a scanning signal supplied from a scanning signal line.

According to the foregoing method, it is possible to provide a method of driving an active matrix display device which permits a power consumption to be reduced to a sufficiently low level while ensuring basic display quality such as brightness, contrast, response speed, gradation, etc.

The foregoing method of driving a display device of the present invention may be arranged so as to set all the data signal lines in high-impedance state with respect to the data signal driver for driving all the data signal lines.

According to the foregoing method, it is possible to realize the method of driving an active matrix display device which permits power consumption to be reduced to sufficiently low level and at the same time offers a high quality display in which flicker noise is suppressed sufficiently.

The foregoing method of driving a display device of the present invention may be arranged such that when a DC voltage is applied to the counter electrode in a scanning period, the counter electrode in the quiescent period is set to have the same potential as in the scanning period, while when an AC voltage is applied to the counter electrode in the scanning period, the counter electrode in the quiescent period is set to have a potential at a center of an amplitude of the AC voltage.

According to the foregoing method, by setting the potential of the counter electrode in the quiescent period as indicated above, fluctuations in potential of the pixel electrode due to the capacitive bond between each pixel and the counter electrode can be suppressed. As a result, fluctuations in data holding state of pixels can be suppressed, and a high quality display in which flicker noise is suppressed can be realized.

The foregoing method of driving a display device of the present invention may be arranged such that in the quiescent period, a non-selective voltage which almost maximizes an OFF resistance value of the active element is applied to all the scanning signal lines.

According to the foregoing method, in the quiescent period, in which all the scanning signal lines are set in the non-scanning state, the OFF resistance value of the active element can be maintained almost at a maximum value, and it is therefore possible to suppress fluctuations in potential of the pixel electrode due to leak current into the data signal line. As a result, even when the potential of pixels changes per line, overall fluctuations in data holding state of pixels can be minimized, thereby realizing a high quality display in which flicker noise is further suppressed.

The method of driving a display device of the present invention may be arranged such that the quiescent period is set to not less than 16.7 msec and not more than 2 sec.

According to the foregoing method, the quiescent period is set to not less than 16.7 msec corresponding to the length of the scanning period at 60 Hz or longer, and the power consumption of the data signal line driver can be reduced. Moreover, by setting the quiescent period to or shorter than 2 sec, flicker noise due to fluctuations in potential of the pixel electrode due to leak current from the liquid crystal and the active element can be suppressed, and a high quality display can be realized.

The foregoing method of driving a display device of the present invention may be arranged such that the quiescent period is set to not less than 50 msec and not more than 1 sec.

According to the foregoing method, by setting the quiescent period to 50 msec or longer, the power consumption of the data signal line driver can be significantly reduced. Moreover, by setting the quiescent period to 1 sec or below, flicker noise due to fluctuations in potential of pixel electrode due to leak current from the liquid crystal and the active element can be significantly suppressed, and a high quality display can be realized.

The display device of the present invention may be a liquid crystal display device provided with a liquid crystal display element having pixels arranged in a matrix form in which charges based on data signals supplied from the data signal line are written periodically in electric capacitances, which is formed by interposing liquid crystal between a pixel electrode and a counter electrode via the active element as selected by a scanning signal to be supplied from the scanning signal line, and the display device of the present invention displays by a drive method of selectively scanning each scanning signal line on a screen whereon the pixels are arranged in a matrix form, and supplying a data signal from the data signal line to each of pixels connected to the scanning signal line as selected, and the display device of the present invention may be arranged so as to include control means which executes a method of driving a display device in which a quiescent period in which all the scanning signal lines are set in the non-scanning state is set to be longer than a scanning period required for scanning a screen one time, wherein the sum of the scanning period and the quiescent period is set to be equivalent to one vertical period.

According to the foregoing arrangement, it is possible to provide an active matrix type display device which permits a required power consumption to be significantly reduced while ensuring a display of desirable quality in basic characteristics such as brightness, contrast, response speed, gradation, etc., with ease.

The foregoing display device of the present invention may be arranged such that the control means set all the data signal lines in high-impedance state in the quiescent period with respect to the data signal driver for driving all the data signal lines.

According to the foregoing structure, an active matrix display device which permits power consumption to be reduced sufficiently and at the same time offers a high quality display in which flicker noise is suppressed to sufficiently low level can be realized.

The foregoing display device of the present invention may be arranged such that the liquid crystal display device includes auxiliary capacitive electrodes for forming auxiliary capacitances of the pixel with the pixel electrodes are formed so as not to be overlapped with the scanning signal lines.

According to the foregoing structure, the auxiliary capacitive electrodes for forming auxiliary capacitances of pixels are formed so as to avoid the areas where the scanning signal lines are formed, and electric capacitance bond between the scanning signal line and the pixel electrode can be ignored. Therefore, when driving the liquid crystal display element, by setting the quiescent period in this state by the control means, unlike the case of forming the auxiliary capacitances in the Cs-on-gate structure, fluctuations in potential of pixel electrodes due to fluctuations in potential of the scanning signal lines in one line above do not occur. As a result, a high quality display free from flicker noise can be ensured even when setting a long quiescent period.

The foregoing display device of the present invention may be arranged such that the liquid crystal display element having a pixel voltage holding ratio satisfying the following condition of:

$$P=V_1 \cdot \exp[-T/\{(C_{LC}+C_{CS}) \cdot R\}]/V \geqq 0.9, \text{ and}$$

$$V_1 = V - \{V(1-Hr(T)) \times C_{LC}/(C_{LC}+C_{CS})\},$$

wherein $C_{LC}$ is an electric capacitance between the pixel electrode and the counter electrode, $C_{CS}$ is an auxiliary capacitance, T is a non-selection period of the active element, Hr(T) is a liquid crystal voltage holding ratio after the non-selection period of T3 at the rewriting frequency, V is a potential difference between the pixel electrode and the counter electrode directly after writing, R is a resistance value when the active element is not selected.

According to the foregoing structure, the non-selection period T can be expressed by the following formula:

$$T=(T1+T0)-T1/n,$$

wherein n is a number of scanning signal lines, T1 is a scanning period, and T0 is a non-scanning period. Therefore, a voltage of a pixel applied in the selection period from the data signal line can be held at a voltage holding ratio of 90% or above throughout the non-selection period even when setting the non-scanning period T0 to the quiescent period. Therefore, almost no potential fluctuation of the pixel electrodes occurs in the non-selection period T. As a result, a high quality display free from flicker noise can be ensured even when setting a long quiescent period.

The foregoing display device of the present invention may be arranged such that the liquid crystal display element includes a reflective member for use in reflective-type display using surrounding light.

According to the foregoing structure, a reflective-type liquid crystal display device which eliminates a need of backlight can be realized. It is therefore possible to reduce a required power consumption to an improved ratio when being driven by the method in which the quiescent period is set.

The foregoing display device of the present invention may be arranged such that the reflective member constitutes at least a part of the pixel electrode.

According to the foregoing structure, the reflective member constitutes at least a part of the pixel electrode, i.e., at least a part of the pixel electrode serves as the reflective electrode of the reflective type liquid crystal display device, thus the reflective member does not need to be provided separately, and the required number of members in the display device can be reduced.

The foregoing display device of the present invention may be further arranged such that a light transmissive hole is formed in the reflective member or the reflective member is semi-transparent.

According to the foregoing structure, the liquid crystal display device can be used both as the light-reflective mode and the light-transmissive mode, and it is therefore possible to selectively use the liquid crystal device to be suited for the surrounding condition in the reflective mode when used under the condition of a plenty of surrounding light and the reflective mode with the backlight on when used under the condition of small amount of surrounding light.

An electronic device of the present invention which displays by a driving method of selectively scanning each scanning signal line on a screen whereon pixels are arranged in a matrix form, and supplying a data signal from the data signal line to each of pixels connected to the scanning signal line as selected, may be arranged so as to include control means for executing the display device driving method, wherein a quiescent period, in which all the scanning signal lines are set in the non-scanning state, is set to be longer than the scanning period required for scanning a screen one time, and a sum of the scanning period and the quiescent period is set to be equivalent to one vertical period.

According to the foregoing structure, it is possible to provide an electronic device which permits a required power consumption to be significantly reduced while ensuring a display of desirable quality in basic characteristics such as brightness, contrast, response speed, gradation, etc., with ease, and to drive such device with battery for a longer period of time.

The foregoing electronic device of the present invention may be arranged such that the control means executes a liquid crystal device driving method wherein the data signal lines are all set in high-impedance state in the quiescent period with respect to the data signal driver for driving all the data signal lines.

According to the foregoing structure, it is possible to provide an electronic device which permits a required power consumption to be significantly reduced while ensuring a display of desirable quality, and to drive such device with battery for a longer period of time.

The foregoing electronic device of the present invention may be a liquid crystal display device provided with a liquid crystal display element having pixels arranged in a matrix form in which charges based on data signals supplied from the data signal line are written periodically in electric capacitances via the active element as selected by a scanning signal to be supplied from the scanning signal line, and the foregoing electronic device displays by a drive method of selectively scanning each scanning signal line on a screen whereon the pixels are arranged in a matrix form, and supplying a data signal from the data signal line to each of pixels connected to the scanning signal line as selected, and the foregoing display device may be arranged so as to include control means which executes a method of driving a display device in which a quiescent period, in which all the scanning signal lines are set in the non-scanning state, is set to be longer than a scanning period required for scanning a screen one time, wherein the sum of the scanning period and the quiescent period is set to be equivalent to one vertical period.

Sixth Embodiment

The following descriptions will discuss still another embodiment of the present invention in reference to FIG. 46 to FIG. 58. The below-explained structure of the present embodiment is also applicable to the above-explained embodiments.

In the present embodiment, examples will be given for a method of driving a liquid crystal device of the present invention, a display device adopting the same and an electronic device mounting the same.

In the following embodiment, explanations for the method of driving a display device of the present invention and a display device adopting the same will be given through the case of an active matrix liquid crystal display device. However, the display device of the present invention is not limited to the active matrix liquid crystal display device, and the display device of the present invention is also applicable to, for example, an EL (Electro Luminescence) display device for addressing using TFT elements. The foregoing liquid crystal display device is applicable to various electronic devices such as portable telephones, pocket-size game machines, PDA (Personal Digital Assistants), portable televisions, remote controllers, note-type personal computers, or other portable devices. The foregoing portable devices are driven using battery, and by adopting the display device of the present embodiment which realizes reduced power consumption while maintaining desirable display quality which is free from flicker noise, it is possible to drive them for a longer period of time with ease.

Figure 51:
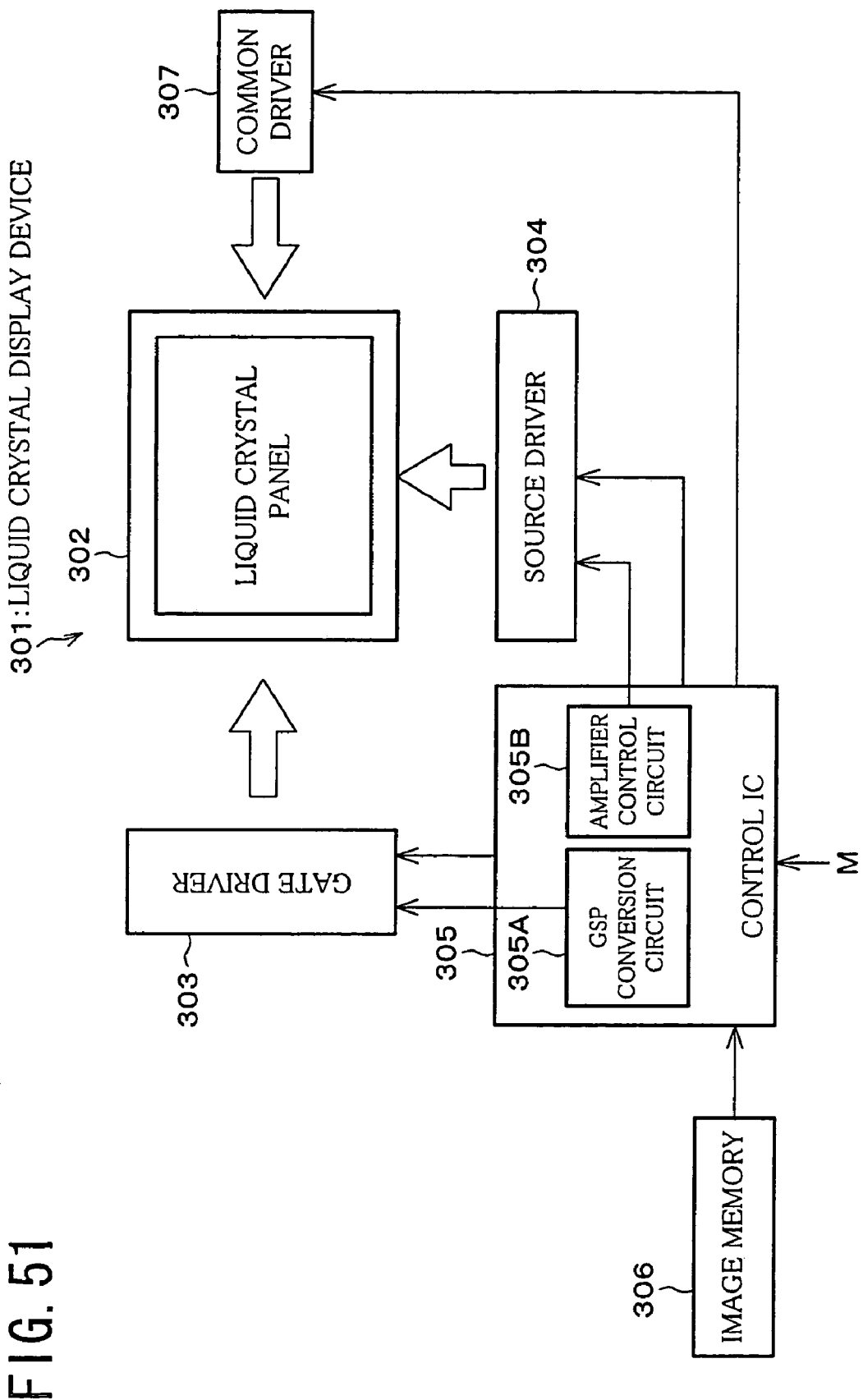
FIG. 51 is a block diagram illustrating a schematic structure of a liquid crystal display device adopting a driving method of a display device illustrated in FIGS. 46, 50 and 56.

FIG. 51 is a system block diagram illustrating a system of a liquid crystal display device (display device) 301 in accordance with the present embodiment. The liquid crystal display device 301 is a reflective-type liquid crystal display device, which includes a liquid crystal panel (screen) 302, a gate driver 303, a source driver (data signal driver) 304, a control IC (control means) 305, an image memory 306, and a common driver 307.

Figure 52:
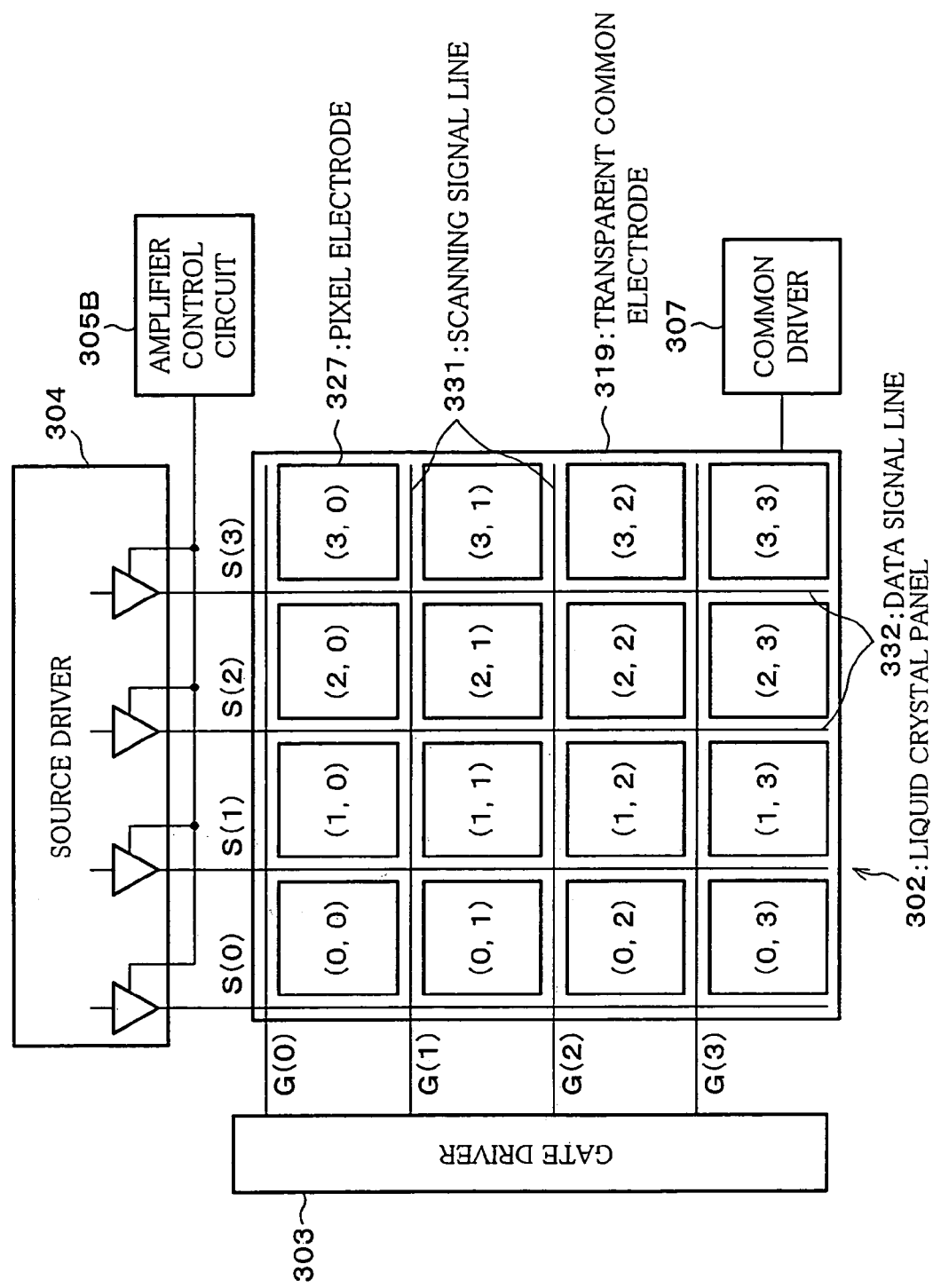
FIG. 52 is a block diagram illustrating a schematic structure of a liquid crystal panel provided in the liquid crystal panel of FIG. 51.

As illustrated in FIG. 52, the liquid crystal panel 302 is provided with a screen which includes pixels arranged in a matrix form, a plurality of scanning signal lines for selectively scanning lines on the screen sequentially and a plurality of data signal lines for supplying data signals to pixels connected to a line as selected. The scanning signal lines and the data signal lines are arranged so as to cross at right angles.

Figure 53:
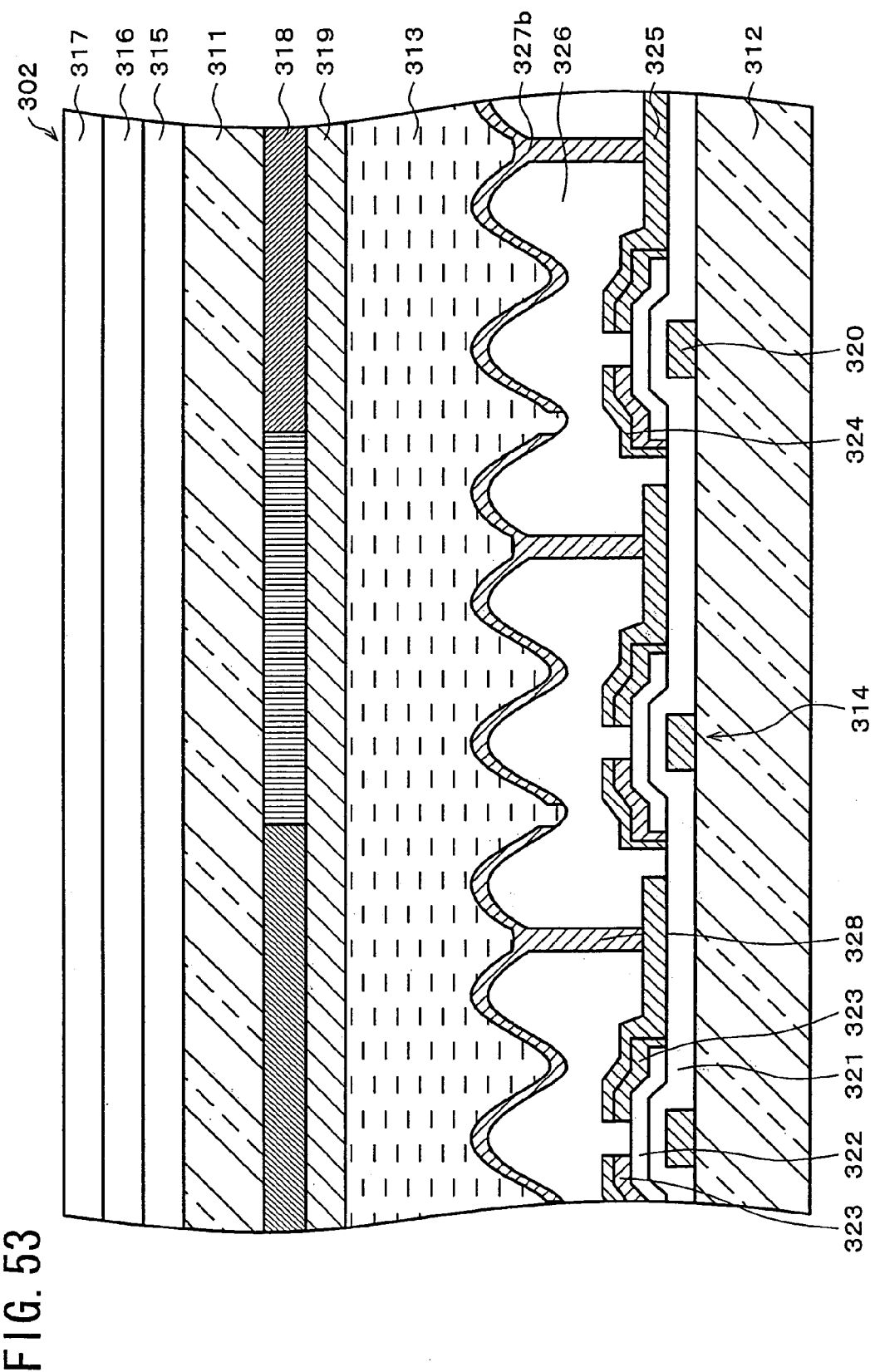
FIG. 53 is a cross-sectional view illustrating the structure of a liquid crystal panel provided in the liquid crystal panel of FIG. 51.
Figure 54:
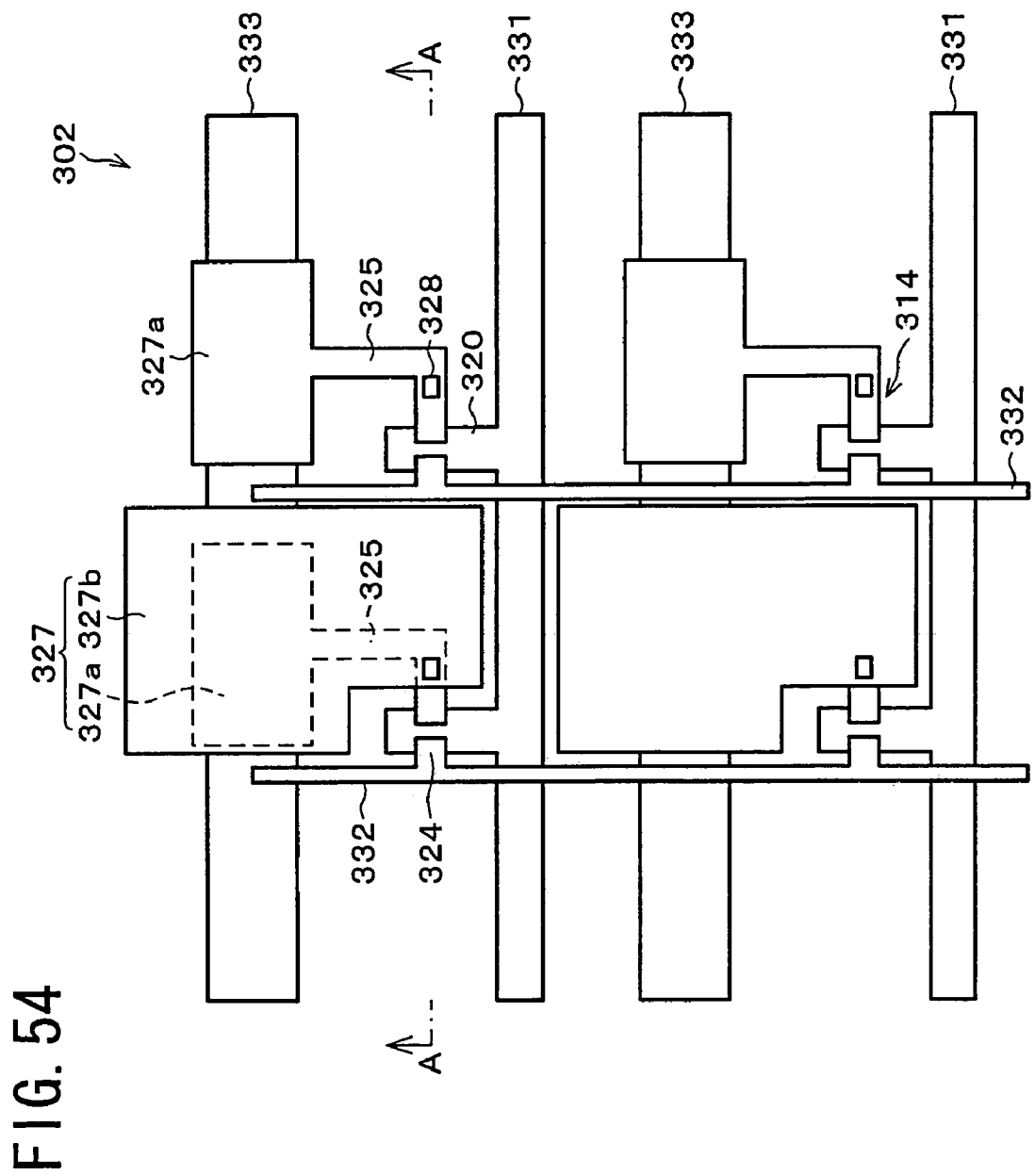
FIG. 54 is a perspective plan view illustrating the structure of a liquid crystal panel provided in the liquid crystal panel of FIG. 51.

Here, in reference to FIG. 53 and FIG. 54, an example structure of the liquid crystal panel 302 will be explained. The FIG. 53 is a cross-sectional view of the portion along a line A-A of FIG. 54. FIG. 54 is a plan view illustrating the structure of a part below the liquid crystal layer 313 of the structure illustrated in FIG. 53.

As illustrated in FIG. 53, the liquid crystal panel 302 is a reflective type active matrix liquid crystal panel. The liquid crystal panel 302 includes as a basic structure two glass substrates 311 and 312 having a liquid crystal layer 313 such as nematic liquid crystal interposed in between, and TFTs 314 as active elements formed on the glass substrate 312. In the present embodiments, TFTs are adopted as the active elements. However, the active elements of the present invention are not limited to TFTs, and MIMs (Metal Insulator Metals) or FETs other than TFTs may be adopted. On the upper surface of the glass substrate 311, laminated are a phase-difference plate 315, a polarizing plate 316, and an anti-reflection film 317 in this order for the purpose of controlling the state of incident light. On the lower surface of the glass substrate 311, formed are RGB color filters 318 and transparent common electrodes (counter electrodes) 319 in this order. With these color filters 318, a color display can be realized.

In each TFT 314, a part of a scanning signal line formed on the glass substrate 312 is used as a gate electrode 320, and a gate insulating film 321 is formed so as to cover the gate electrode 320; Further, an i-type amorphous silicon layer 322 is formed so as to face the gate electrode 320 via the gate insulating film 321. On the i-type amorphous silicon layer 322, two n$^+$-type amorphous silicon layers 323 are formed so as to sandwich a channel region of the i-type amorphous silicon layer 322. On the upper surface of one of the n$^+$-type amorphous silicon layers 323, formed is a gate electrode 324 serving as a part of the data signal line, and on the upper surface of the other n$^+$-type amorphous silicon layer 323, formed is a drain electrode 325 drawn from the upper surface of the other n$^+$-type amorphous silicon layer 323 to the entire upper surface of a flat portion of the gate insulating film 321. As illustrated in FIG. 54, one end of the drain electrode 325 opposite the portion, from which the drain electrode 325 is drawn, is connected to a rectangular auxiliary capacitive electrode pad 327a facing the auxiliary capacitance line 333. On the upper surfaces of the TFTs 314, formed is an interlayer insulating film 326 whereon reflective electrodes 327b are formed. The reflective electrodes 327b are reflective members for use in performing reflective-type display using surrounding light. For controlling the direction of reflected light by the reflective electrodes 327b, fine protrusions and recessions are formed on the surface of the inter-layer insulating film 326.

Further, each reflective electrode 327b is conducted to the drain electrode 325 via a contact hole 328 formed in the inter-layer insulating film 326. Specifically, the voltage applied from the data electrode 324 and is controlled by the TFT 314 is applied to the reflective electrode 327b from the drain electrode 325 via the contract hole 328, and the liquid crystal layer 313 is driven by a voltage across the reflective electrode 327b and the transparent common electrode 319. Namely, the auxiliary capacitive electrode pad 327a and the reflective electrode 327b conduct, and liquid crystal is interposed between the reflective electrode 327b and the transparent common electrode 319. As described, the auxiliary capacitive electrode pad 327a and the reflective electrode 327b constitute the pixel electrode 327. In the case of the transmissive-type liquid crystal display device, a pixel electrode provided corresponding to each electrode serves as a transparent electrode.

As illustrated in FIG. 54 taken from above the portion below the liquid crystal layer 313 of FIG. 53, the liquid crystal panel 302 includes scanning signal lines 331 for supplying scanning signals to the gate electrodes 320 of the TFTs 314, and data signal lines 332 for supplying data signals to the data electrodes 324 of the TFTs formed on the glass substrate 312. The scanning signal lines 331 and the data signal lines 332 are arranged in a matrix a matrix form. Between the auxiliary capacitive electrode pads 327a, formed are auxiliary capacitance lines 333 serving as auxiliary capacitive electrodes for use in forming auxiliary capacitances of pixels. Parts of the auxiliary capacitance lines 333 are formed parallel to the scanning signal lines 331 on the glass substrate 312 in other portion than the areas the scanning signal lines 331 are formed, so that auxiliary capacitance lines 333 make pairs with auxiliary capacitive electrode pads 327a sandwiching the gate insulating film 321 in between.

The present invention, however, is not limited to the above structure as long as the scanning signal lines 331 are formed so as not to be overlapped with the scanning signal lines 331. In the FIG. 54, the reflective electrodes 327b are partially omitted so as to clarify the positional relationship between the auxiliary capacitive electrode pad 327a and the auxiliary capacitance line 333. The protrusions and recessions formed on the surface of the inter-layer insulating film 326 in FIG. 53 are also omitted from FIG. 54. The liquid crystal panel 302 of the present embodiment has a width across corners of 0.1 m, which is provided with the scanning signal lines 331 and the data signal lines 332 in numbers of 240 and 320×3 respectively.

Figure 55:
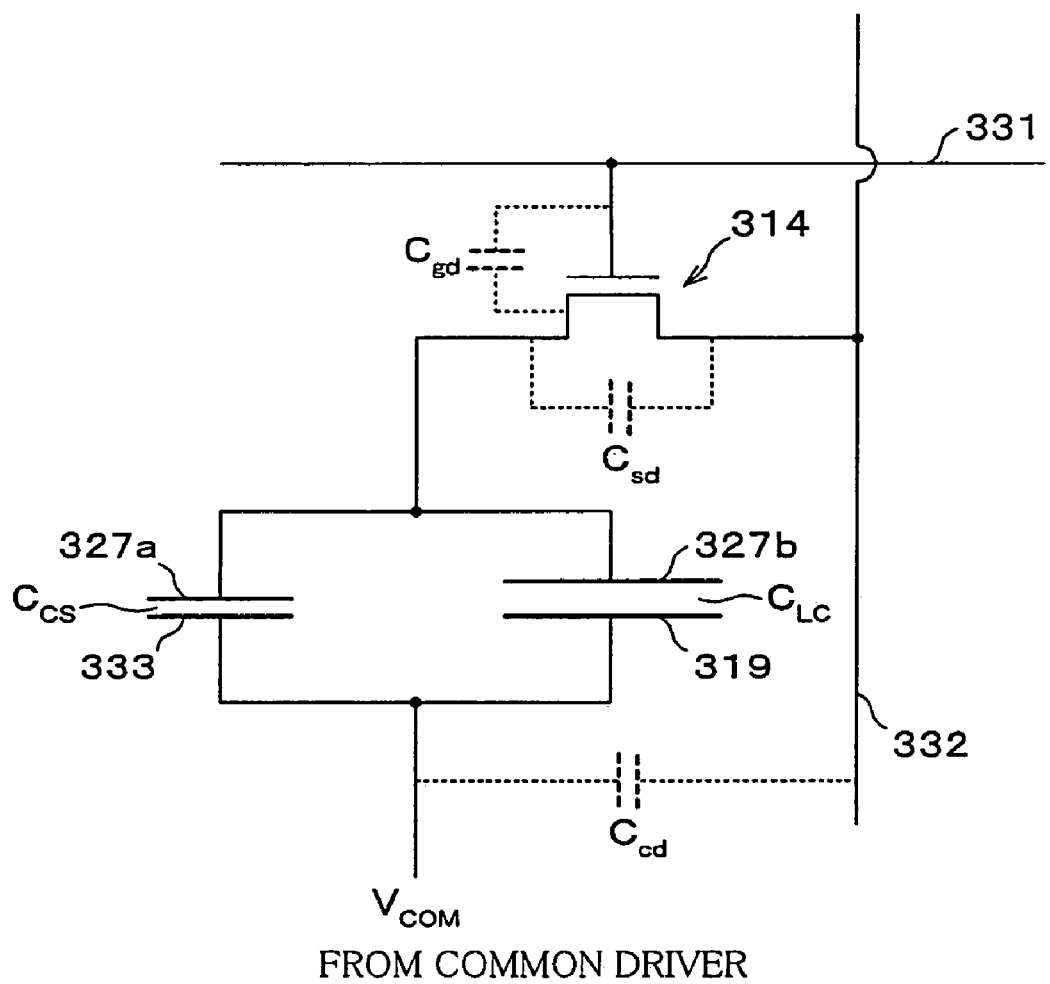
FIG. 55 is a circuit diagram illustrating an equivalent circuit of the liquid crystal panel illustrated in FIG. 51.

An equivalent circuit per pixel of the liquid crystal panel 302 of the foregoing structure is illustrated in FIG. 55. As illustrated in FIG. 55, the equivalent circuit includes a liquid crystal capacitance $C_{LC}$, formed by interposing the liquid crystal layer 313 between the transparent common electrode 319 and the reflective electrode 327b, and an auxiliary capacitance $C_{CS}$, formed by sandwiching the gate insulating film 321 between the auxiliary capacitive electrode pad 327a and the auxiliary capacitance line 333, which are connected to the TFTs 314, wherein DC or AC common electrode voltage $V_{COM}$ is applied to the transparent common electrode 319 of the liquid crystal capacitance $C_{LC}$ and the auxiliary capacitance line 333 of the auxiliary capacitance $C_{CS}$ via a buffer (not shown).

Then, the control IC (control means) 305 illustrated in FIG. 51 receives image data as stored in the image memory 306, for example, in a computer, etc., and supplies to the gate driver 303 a gate start pulse signal GSP and a gate clock signal GCK, and in the meantime supplies to the source driver 304, gradation data of RGB, a source start pulse signal SSP, a source latch strobe signal SLS, and a source clock signal SCK. These signals are all in synchronous with one another which generally satisfy the condition of:

*fGSP<fGCK=fSSP<fSCK,* wherein f indicative of frequency is added to each signal.

In the case of the so-called pseudo double speed driving, the condition of fGCK>fSSP is obtained. The image data as stored in the image memory (image data storage means) 306 is the data based on which data signals are produced. The control IC 305 to be described later has a function as control means for executing the method of driving the liquid crystal display device 301 in accordance with the present embodiment.

The gate driver 303 is a scanning signal line driver, and applies respective voltages according to a selection period and a non-selection period to each scanning signal line of the liquid crystal panel 302. Specifically, the gate driver 303 starts a scanning of a liquid crystal panel 302 in response to the gate start pulse signal GSP as received from the control IC 305, and sequentially applies voltage to each scanning signal line according to the gate clock signal GCK.

The source driver 304 is a data signal line driver, and outputs a data signal to each data signal line of the liquid crystal panel 302 and supplies image data to respective pixels on the scanning signal line as selected. Specifically, the source driver 304 stores the gradation data of each pixel as received in the resistor according to a source clock signal SCK based on the source start pulse signal SSP as received from the control IC 305, and writes the gradation data in each data signal line of the liquid crystal panel 302 according to the next source latch strobe signal SLS.

The control IC 305 includes a GSP conversion circuit 305A for setting a pulse interval of the gate start pulse signal GSP. The pulse interval of the gate start pulse signal GSP is about 16.7 msec at a normal frame frequency, i.e., 60 Hz. The GSP conversion circuit 305A, for example, permits this pulse interval of this gate start pulse signal GSP to be increased up to 167 msec. Assumed the scanning period T1 of one screen be maintained at normal state, then about 9/10 of the pulse interval is occupied by the non-scanning period. As described, in the GSP conversion circuit 305A, the non-scanning period after the end of a scanning period T1 till a point the gate start pulse signal GSP is re-entered into the gate driver 303 can be set longer than the scanning period T1. The foregoing non-scanning period longer than the scanning period T1 is referred to as a quiescent period T2.

Figure 46:
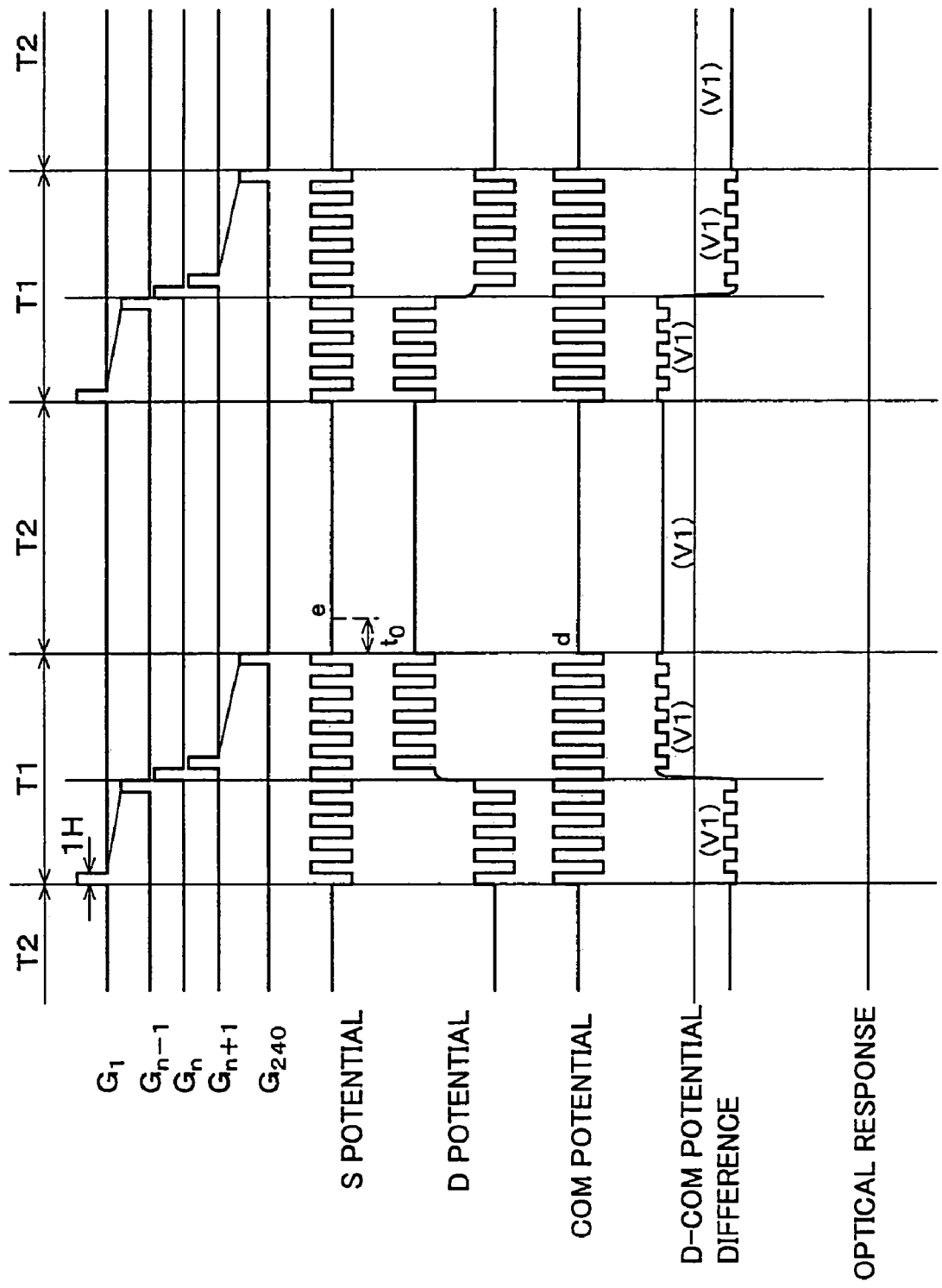
FIG. 46 is a time chart indicating respective driving signals and optical responses of a liquid crystal panel in the scanning period T1 and the quiescent period T2, which explains the driving method of a display device in accordance with still another embodiment of the present invention.

FIG. 46 illustrates a waveform of a scanning signal supplied to scanning signal lines $G_1$ through $G_n$ (n=240) in the case where quiescent period T2 is set as a non-scanning period. In the case where, the quiescent period T2 which is longer than the scanning period T1 is set as the non-scanning period, the quiescent period T2 serves as the normal vertical fly-back period (non-scanning period), and the vertical cycle indicative of frame or field therefore becomes longer.

When the quiescent period T2 is set as the non-scanning period in the GSP conversion circuit 305A, one vertical period is equivalent to a sum of the scanning period T1 and the quiescent period T2. For example, when the scanning period T1 is set to the period corresponding to the frequency of 60 Hz generally adopted, the quiescent period T2 is longer than the scanning period T1, and the vertical frequency therefore becomes lower than 30 Hz. The scanning period T1 and the non-scanning period can be suitably adjusted according to the type of the image to be displayed such as a moving picture, a static image, etc. The GSP conversion circuit 305A is capable of setting a plurality of non-scanning periods according to the content of the image, and at least one non-scanning period is the quiescent period T2. In the FIG. 51, the GSP conversion circuit 305A alters the setting of the non-scanning period according to a non-scanning period setting signal M to be input from the exterior. The type of the non-scanning period setting signal M is not particularly limited; and for example, when adopting a logic signal of 2-bit, non-scanning periods of four different lengths can be set.

By setting the foregoing quiescent period T2, the number of times of rewriting a screen can be reduced, i.e., the supply frequency of a data signal to be outputted from the source driver 304 can be reduced, thereby reducing power required for charging pixels. Therefore, in the case of adopting as the liquid crystal display device 301, an active matrix type liquid crystal display which can ensure basic display characteristics, such as brightness, response speed, gradation, etc., by setting the quiescent period T2 as the non-scanning period, the power consumption of the data signal line driver which increases in proportion to the supply frequency of the data signal output from the source driver 304 can be reduced to be sufficiently low level with ease without lowering display quality.

In view of the foregoing, when displaying a static image which is not being moved, or a moving picture which is not being moved fast, a long quiescent period T2 should be set for the non-scanning period. On the other hand, when displaying moving pictures which move aggressively, a short quiescent period T2 or a non-scanning period shorter than the quiescent period should be set for the non-scanning period. For example, in the case where a sufficiently short quiescent period (for example, 16.7 msec) is set for the scanning period, as the drive frequency corresponds to frequency, i.e., the normal frequency of 60 Hz, a moving picture can be displayed at sufficiently high speed. On the other hand, in the case where a long quiescent period (for example, 3333 msec) is set for the scanning period, power consumption for rewriting screen according to the static image or moving picture which is not being used fast, can be reduced while ensuring basic display quality. Namely, the display can be performed by suitably switching the liquid crystal panel 302 between the dynamic display and the low power consumption display. As described, according to the method of the present embodiment, the frequency of rewriting screen can be changed according to the type of an image to be displayed such as a static image, a moving picture, etc., and therefore an optimal low power consumption can be obtained for each type of display image.

In the method of the present invention, it is preferable that the non-scanning periods satisfy the following condition:

$(T1+T02)=(T1+T01) \times N$(N is an integer not less than 2).

In the above equation, T01 is the shortest non-scanning period and T02 is an arbitrary non-scanning period among all the non-scanning periods other than T01. For example, when driving at normal frequency (60 Hz), T1 is set to not more than 16.7 msec. A desirable display can be realized by setting T01 to be a vertical fly-back period, and T01 satisfying the foregoing equation, and by performing sampling one every some integer times with respect to data signals on the screen transferred at a frequency of 60 Hz. As a result, a reference synchronous signal can be used in common among non-scanning periods, and a low frequency driving can be realized merely by adding a simple circuit, and in the mean time an amount of additionally required power consumption can be minimized.

The gate drivers 303 and the source drivers 304 respectively store therein logic circuits and transistors. These logic circuits consume power when driving respective transistors. The power consumption of these logic circuits are therefore in proportion to the number of times respective transistors operate, and to clock frequencies. In the quiescent period T2, all the scanning signal lines are set in the non-scanning state, and therefore by not inputting other signals than gate start pulse signals GSP such as a gate clock signal GCK, a source start pulse SSP, a source clock signal SCK, etc., to the gate driver 303 and the source driver 304, the need of driving the logic circuits stored in the gate driver 303 and the source driver 304 can be eliminated, thereby reducing required power consumption.

When adopting a digital driver for the source driver 304 which deals with digital data signals, analog circuits in which a stationary current flows such as a gradation generating circuit or a buffer, etc., are provided in the source driver 304. On the other hand, when adopting an analog driver as the source driver 304, which deals with analog data signals, analog circuits of a sampling hold circuit and a buffer are provided in the source driver 304. Further, an analog circuit may be provided in the control IC 305.

The power consumption of the analog circuit is not affected the driving frequency, and therefore the power consumption cannot be reduced merely by stopping the operations of the logic circuits provided in the gate driver 303 and the source driver 304. In response, it is arranged so as to stop the foregoing analog circuits in the quiescent period T2, and to separate these analog circuits from the power source. As a result, a required power consumption of the analog circuits can be reduced, and an overall power consumption of the entire liquid crystal display device 301 can be further reduced. When adopting an active matrix liquid crystal display device as the liquid crystal display device 301, non-selective voltage is applied to pixels from the gate driver 303 in the quiescent period T2, and therefore it may be arranged so as to stop operations of analog circuits which are not irrelevant to at least the gate driver 303, i.e., the display in the quiescent period T2. Here, by arranging so as to stop at least the operations of analog circuits in the source driver 304 which consume power most, an overall power consumption of the liquid crystal display device 301 can be reduced efficiently.

Furthermore, in the quiescent period T2, data are not written in pixels. Therefore, by stopping the transfer of the image data from the image memory 306 in the quiescent period T2, the power consumption for transferring the image data in the quiescent period T2 can be reduced. The transfer of the image data can be stopped by sending a command for stopping the transfer of the image data from the control IC 305 to the image memory 306 based on the above-mentioned non-scanning period setting signal M etc. As a result, it is possible to further reduce an overall power consumption of the liquid crystal display device 301 by controlling the stoppage of the transfer operation with ease.

For the setting of non-scanning periods, it may be arranged such that a plurality of non-scanning period setting signals are input to the GSP conversion circuit 305A as in the foregoing example, or that the GSP conversion circuit 305A is provided with a volume for adjusting each non-scanning period, or a switch for selecting each non-scanning period. Needless to mention, these volume for adjusting each non-scanning period and switch for selecting each non-scanning period may be provided on the periphery of the liquid crystal display device 301. The structure of the GSP conversion circuit 305A is not particularly limited as long as a non-scanning period can be set as desired based on an instruction given from the exterior.

As illustrated in FIG. 51, the control IC 305 is provided with an amplifier control circuit 305B for use in controlling an output amplifier connected to the data signal line. This amplifier control circuit 305B is arranged so as to set the output amplifier in the high-impedance state in the quiescent period T2 so as to separate all the data signal lines from the source driver 304. As a result, a high quality display in which flicker noise is suppressed can be achieved.

Namely, the foregoing amplifier control circuit 305B enables the potential of each data signal line in the quiescent period T2 to be constant. It is therefore possible to suppress fluctuations in data holding state of each pixel generated by fluctuations in potential of the data signal line associated with the structure of the liquid crystal display device 301 having pixel electrodes connected to the data signal line, such as fluctuation in potential of pixel electrode due to capacitive bond between the data signal line and the pixel electrode, and a flicker noise on the screen can whereby be suppressed sufficiently. As a result, a reduction in power consumption can be achieved while ensuring a high quality display in which flicker noise is suppressed to a sufficiently low level.

As described, when terminating an operation of an analog circuit inside the buffer of the source driver 304 for the purpose of suppressing power consumption, the buffer becomes at a ground potential. Then, the data signal line connected to the buffer also becomes at a ground potential, and in the case where the liquid crystal display device 301 includes pixel electrodes to be connected to the data signal line, variation in potential of the pixel electrodes occurs due to capacitive bond. In response, by arranging such that an operation of analog circuits irrelevant to the display of the quiescent period T2 is stopped after setting all the data signal line at high impedance state, variation in data holding state of pixels can be suppressed while reducing power consumption of the analog circuit, thereby achieving high quality display from which flicker noise is further suppressed.

It is more preferable that all the data signal lines be set in high impedance state after setting them to have potential at which fluctuation in data holding state of all the pixels is minimized on average. For example, in the case where the liquid crystal display device 301 includes pixel electrodes connected to data signal lines, the counter electrode and liquid crystal interposed between the pixel electrodes and a counter electrode, preferably the data signal lines be all set to potential at the center of the amplitude of AC voltage when applying AC voltage to the counter electrode, and to the same potential as the counter electrode when the DC voltage is applied to the counter electrode. In this case, even if the pixels having potential of positive polarity and pixel electrodes having potential of negative polarity exist at the same time, fluctuations in charge holding state of all the pixels, i.e., fluctuation in data holding state can be minimized on average. As a result, even when the data holding state of pixels differs for each line, an overall fluctuation in data holding state on the screen can be minimized, thereby realizing a high quality display in which flicker noise is further suppressed.

In the case where a DC voltage is applied to the transparent common electrode (COM potential) 319 in the scanning period T1 as illustrated in FIG. 46, the transparent common electrode 319 in the quiescent period T2 is set to the potential at a center of the amplitude of the AC voltage. As described, by setting the potential of the transparent common electrode 319 in the quiescent period T2 to the foregoing potential, fluctuation in potential of the pixel electrodes 327 due to capacitive bond between each pixel and the counter electrodes can be suppressed. As a result, fluctuation in data holding state of pixels can be suppressed, and a high quality display in which flicker noise is suppressed can be achieved.

The method of driving a display device in accordance with the present embodiment in which the quiescent period T2 is set will be explained with respect to the liquid crystal panel 302 of the foregoing structure.

In the equivalent circuit of FIG. 55, a selective voltage is applied to the scanning signal line 331 to set ON the TFT 314, and data signals are applied to the liquid crystal capacitance $C_{LC}$ and the auxiliary capacitance $C_{CS}$ through the data signal line 332. Next, the non-selective voltage is applied to the scanning signal line 331 to set OFF the TFT 314, thereby holding charges written in the liquid crystal capacitance $C_{LC}$ and the auxiliary capacitance $C_{CS}$. Here, as described, the auxiliary capacitance line 333 for use in forming the auxiliary capacitance $C_{CS}$ of the pixel is formed so as not to overlap the scanning signal line 331. In the foregoing equivalent circuits, the respective capacitive bonds between the scanning signal line 331 and the auxiliary capacitive electrode pads 327a can be ignored. Therefore, in this state, by adopting the driving method of the liquid crystal panel 302 by setting the quiescent period T2 by the control IC 305, unlike the case of forming the auxiliary capacitance by the Cs-on-gate structure, fluctuation in potential of pixel electrodes 327 due to fluctuation in potential of the previous scanning signal line can be eliminated.

With the low frequency driving by setting the quiescent period T2, the frequency for reversing the data signal can be reduced, and significant reduction in power consumption of the data signal driver (source driver 304 in this example) can be achieved. Furthermore, by suppressing fluctuation in potential of the pixel electrodes 327, a high quality display in which flicker noise is suppressed can be achieved even when setting a long quiescent period T2.

In the following, the method of driving the liquid crystal display device 301 will be explained in more details. Specifically, two examples will be given for the driving waveforms of the pixel electrodes 327 and the transparent common electrode (counter electrode) 319 in the quiescent period T2.

[1] Firstly, the driving method of fixing the potential of the data signal line 332 and/or transparent common electrode 319 in the quiescent period T2 will be explained in reference to FIGS. 46 through 49.

Figure 47:
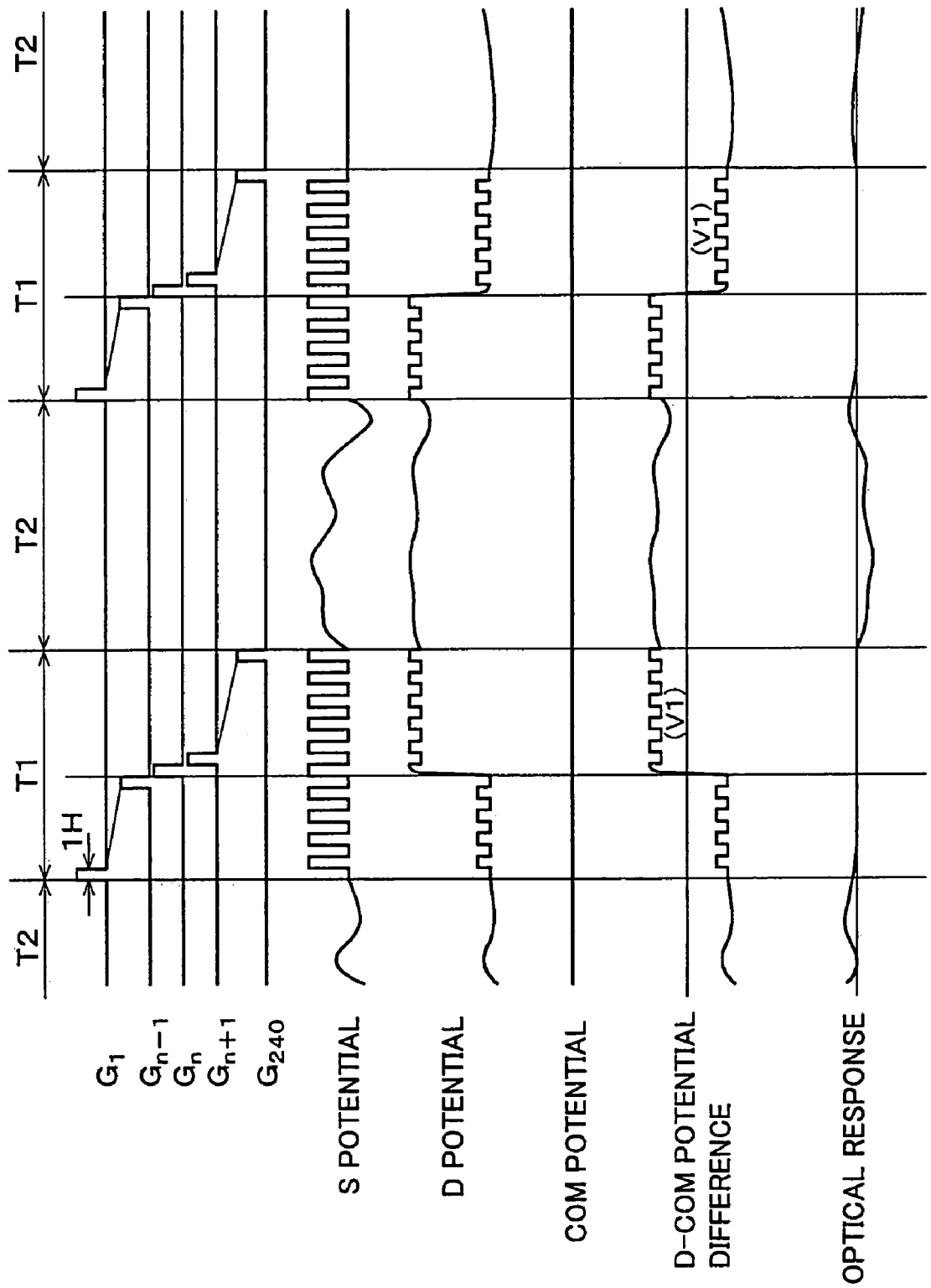
FIG. 47 is a timing chart indicating respective driving signals and optical responses of a liquid crystal panel in the scanning period T1 and the quiescent period T2, which explains the driving method of a display device in accordance with still another embodiment of the present invention.

FIG. 47 show timing charts of scanning signals ($G_1$ to $G_{240}$) supplied to the scanning signal lines 331 under the control of the gate driver 303, data signal (S-potential) supplied to the data signal line 332 under the control of the source driver 304, counter electrode signal (COM-potential) supplied to the transparent common electrode 319 under the control of the common driver 307, and the potential (D-potential) of the pixel electrode 327, a potential difference (D-COM potential difference) between the pixel electrode 327 and the transparent common electrode 319, and optical response of the liquid crystal layer 313.

As illustrated in FIG. 47, in the scanning period T1, data signals (S-potential) according to the scanning signals ($G_1$ to $G_{240}$) and the display image having AC waveform are applied. Additionally, in order to eliminate the effects of potential amplitude of the transparent common electrode 319, in the illustrated example, the transparent common electrode 319 is driven at DC (COM potential).

In the scanning period T1, the data signal lines 332 are driven by the source driver 304 in the 1H reverse driving method, wherein the polarity of the data signal line 332 is reversed at sufficiently high frequency, i.e., per one horizontal scanning period (1H). Then, the potential (D-potential) of the pixel electrode 327 vibrates as being affected by the potential amplitude of the data signal line 332. Here, the liquid crystal molecules of the liquid crystal layer 313 interposed between the transparent common electrode 319 and the pixel electrode 327 response not to the vibration in voltage in one horizontal period but to the effective voltage V1, i.e., the effective voltage of an application voltage in the scanning period T1.

In FIG. 47, a non-selective signal is input per each scanning signal in the quiescent period T2, and the image data written in the scanning period T1 is held. FIG. 47 shows the state where the potential of the data scanning line 332 is not controlled in the quiescent T2.

As described, by alternating the scanning period T1 and the quiescent T2 which is longer than the scanning period T1 for setting all the data signal lines 323 in the non-scanning state, the supply frequency of the data signal required in one horizontal period can be reduced. Therefore, in the case of an active matrix liquid crystal display which can ensure basic display characteristics, such as brightness, response speed, gradation, etc., the power consumption of the source driver 304 which increases in proportion to the supply frequency of the data signal output from the source driver 304 can be reduced to a sufficiently low level with ease without lowering display quality.

Here, in the quiescent period T2, the TFT 314 is set in the OFF state. Therefore, on theory, even if S-potential illustrated in FIG. 47 is applied to the data signal line 332, current does not flow between the data signal line 332 and the pixel electrode 327, and the potential of the pixel electrode 327 (D-potential) is thus fixed.

In practice, however, as illustrated in FIG. 55, the data signal line 332 is capacitive-bonded (Csd) to the pixel electrode 327, and the potential (D-potential) of the pixel electrode 327 fluctuates according to fluctuation in potential (S-potential) of the data signal line 332, which results in that the potential of the pixel electrode 327 fluctuates for each quiescent period T2, thereby generating flicker noise.

Figure 48:
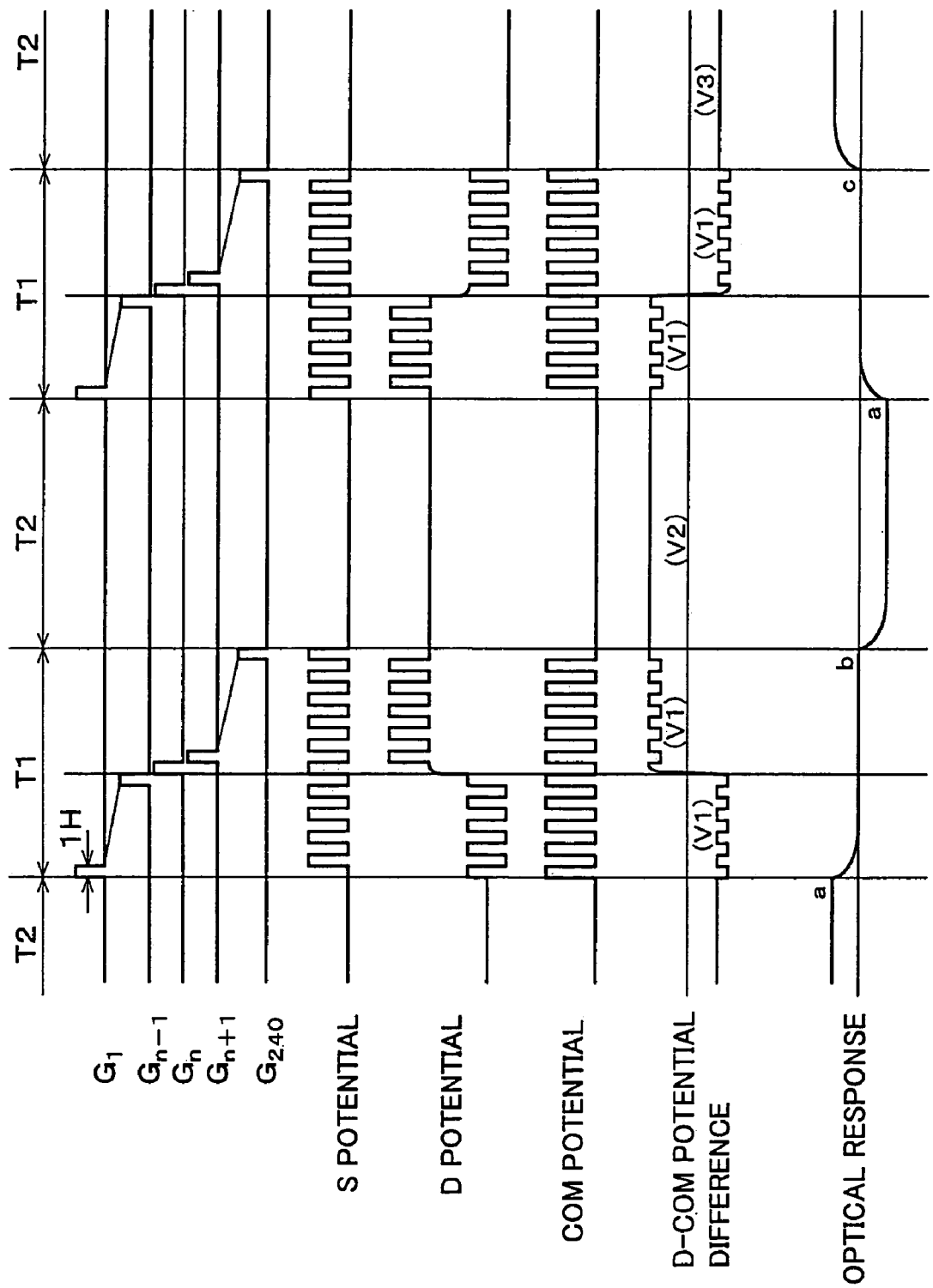
FIG. 48 is a time chart indicating respective driving, signals and optical responses of a liquid crystal panel in the scanning period T1 and the quiescent period T2, which explains the driving method of a display device in accordance with still another embodiment of the present invention.

FIG. 48 shows other timing charts indicative of respective driving signals and optical response of the liquid crystal panel 302 in the scanning period T1 and in the quiescent period T2. In FIG. 48, unlike the case of FIG. 47, in order to reduce the amplitude of the output voltage of the source driver 304, the transparent common electrode 319 is AC driven by a driving signal (counter electrode driving signal) supplied from the common driver 307. The potential of the transparent common electrode 319 as well as S-potential are driven in the 1H reverse driving method by the common driver 307, in which the polarity of the transparent common electrode 319 is reversed for horizontal scanning period (1H period).

Furthermore, in the quiescent period T2, under the control of the source driver 304, the potential of the data signal line 332 is fixed at potential (data signal line quiescent potential) within the range of voltage of driving signal of the scanning period T1 (low potential in example of FIG. 48). Similarly, in the quiescent period T2, under the control of the common driver 307, the potential of the transparent common electrode 319 is fixed at potential (counter electrode quiescent potential) within the range of voltage of driving signal of the scanning period T1 (low potential in example of FIG. 48). Specifically, a predetermined potential is kept being supplied to the source driver 304 and the common driver 307, so as to control respective fluctuations in the data signal line 332 and the transparent common electrode 319 respectively.

The potential (D-potential) of the pixel electrode 327 fluctuates as being affected by pixel amplitudes of the data signal line 332 and the transparent common electrode 319. For ease in explanation, in waveforms shown in FIG. 48, effects of fluctuations in potential of the data signal line 332 on the potential of the pixel electrode 327 via Csd (see FIG.

55) is ignored. In actual display, according to the image data contained in the S-potential, respective waveforms of S-potential, D-potential and D-COM potential vary. Further, the liquid crystal molecules of the liquid crystal layer 313 interposed between the transparent common electrode 319 and the pixel electrode 327 response not to the oscillation in voltage in one scanning period but to the effective voltage, i.e., the effective value of the application voltage for the scanning period T1.

The potential of the pixel electrode 327 in the non-selecting state is determined by the driving waveform of the transparent common electrode 319, and on theory, the potential difference (D-COM potential difference) between the pixel electrode 327 and the transparent common electrode 319 is fixed in all the quiescent periods T2.

In practice, however, as illustrated in FIG. 55, the pixel electrode 327 is capacitive-bonded to the scanning signal line 331 ($C_{gd}$) and the data signal line 332 ($C_{sd}$), and the potential amplitude of the pixel electrode 327 is therefore not identical with the potential of the transparent common electrode 319.

The optical response of the pixels in the nth line in FIG. 48 will be explained in details. First, upon completing the quiescent period T2 (point a), a scanning operation of the first line is started, and an AC is applied to the transparent common electrode 319. As a result, the effective voltage to be applied to the liquid crystal layer 313 becomes V1, and the liquid crystal molecules respond. Then, upon completing a scanning operation of the last line (240th line) (point b), the potential of the transparent common electrode 319 is fixed at low potential, and the effective voltage becomes V2, and the liquid crystal molecules thus respond again. Further, the potential of the transparent common electrode 319 works in the direction according to the polarity of the potential of the pixel electrode 327 in the quiescent period T2, the effective voltage between the pixel electrode 327 and the transparent common electrode 319 becomes an effective voltage V3 at point c.

As described, the effective voltage to be applied to the liquid crystal layer 313 in the scanning period T1 is defined by a difference (V1) between the respective centers of the potential amplitude of the pixel electrode 327 and the potential amplitude of the transparent common electrode 319. On the other hand, in the quiescent T2, both the potential of the data signal line 332 and the potential of the transparent common electrode 319 are fixed at low potential, and therefore, the effective voltage to be applied to the liquid crystal layer 313 is the difference (V2) between the lower limit value of the potential amplitude of the pixel electrode 327 and the lower limit value of the pixel amplitude of the transparent common electrode 319 in the scanning period T1. Moreover, the effective voltage in the quiescent period T2 has different absolute values (V2≠V3).

Namely, in the driving method as explained in FIG. 48, by fixing the respective potentials in the data signal line 332 and the transparent common electrode 319 in the quiescent period T2 at low potentials in the scanning period T1, the effective voltage to be applied to the liquid crystal layer 313 differs between the scanning period T1 and the quiescent period T2. Moreover, an absolute value for an effective voltage differs between the quiescent periods T2 of different polarities. As a result, an application voltage to the liquid crystal layer 313 varies each time of switching between the scanning period T1 and the scanning period T2, and the liquid crystal molecules respond each time. For this reason, although a flicker noise can be suppressed as compared to the case of FIG. 47, it is still not possible to eliminate generation of flicker noise.

FIG. 46 shows another timing chart indicative of respective driving signals and optical response of the liquid crystal panel 302 in the scanning period T1 and the quiescent period T2. The driving waveform in FIG. 46 differs from the driving waveform in FIG. 48 in that the data signal line 332 and the transparent common electrode 319 are controlled by the source driver 304 and the common driver 307 to be equivalent to respective centers of the voltage amplitude of the respective scanning periods T1.

As a result, the respective effective voltages to be applied to the liquid crystal layer 313 in the scanning period T1 and the quiescent period T2 become substantially the same. It is therefore possible to eliminate a flicker noise generated for each scanning period T1.

According to the foregoing method of driving the liquid crystal display device 301, the respective potentials of the data signal line 332 and the transparent common electrode 319 are stopped at respective centers of the potential amplitude in the scanning period T1. As a result, between the scanning period T1 and the quiescent period T2, substantially the same effects of respective potentials of the data signal line 332 and the transparent common electrode 319 on the pixel electrodes 327 can be achieved. It is therefore possible to fix the effective voltage of the potential of the pixel electrode 327, and to achieve a high quality display without flicker noise.

However, it should be noted here that it is not necessarily that the respective potentials in the quiescent period T2 of the data signal line 332 and the transparent common electrode 319 be set at substantially the centers of the voltage amplitude in the scanning period T1. Namely, as long as the voltage of the data signal line 332 is within the range of ±1.5 V, and the potential of the transparent common electrode 319 within the range of ±1.0 V from the center of the amplitude, in practice, a display without flicker noise can be achieved.

Next, the reason why the potential of the data signal line 332 in the quiescent period T2 is set to substantially the center of the voltage amplitude of the scanning period T1 as in the foregoing driving method will be explained.

In the TFT driving, voltage in the scanning signal line varies such as −10V→+15V→−10V, and the drain potential also varies for gate/drain capacitance ($C_{gd}$) Specifically, the drain which is written when the scanning signal line is set to +15V (gate on), is drawn by $\Delta V=(-25V) \times C_{gd}/(C_{LC}+C_{CS}+C_{gd})$ in response to change in voltage of the scanning signal line to −10V (gate off). For this reason, in the TFT driving, the drawing voltage ΔV is applied to the counter voltage as DC offset.

Among capacitances which determine the lead-in voltage ΔV, $C_{CS}$ and $C_{gd}$ do not vary. On the other hand, $C_{LC}$ varies according to the alignment state (gradation) of the liquid crystal. For example, in the positive type liquid crystal (liquid crystal which rises with an applied voltage), the specific inductive capacity ∈ is around 3 at black voltage (liquid crystal molecules are aligned parallel to the substrate), and the specific inductive capacity ∈ is around 8 at black voltage (liquid crystal molecules are aligned vertical to the substrate). With changes in dielectric constant, $C_{LC}$ also changes.

As described, as $C_{LC}$ varies for each gradation, i.e., according to the display state, a lead-in voltage ΔV also varies for each gradation. However, since the counter electrode is used in common, it is not possible to set an optimal ΔV for each pixel. In response, it is arranged so as to apply a voltage resulting from shifting a center of the amplitude of the data signal line beforehand for each gradation, to compensate for a difference in lead-in voltage ΔV having different gradations.

As described, the center of the voltage amplitude of the scanning period T1 of the data signal line differs for each gradation, according to the display content. In practice, however, the liquid crystal panel displays in various gradation in the entire display region, and it is therefore assumed that an average center of an amplitude of the scanning period T1 is close to a value in an halftone display.

According to the method of driving the liquid crystal display device 301 of the present embodiment, as illustrated in FIG. 46, when the quiescent period T2 has started (point d), the AC driving of the transparent common electrode 319 is stopped under the control of the common driver 307 to fix the transparent common electrode 319 at a predetermined potential (the center of amplitude in the scanning period T1 in the example shown in FIG. 46). When a predetermined time period t0 has passed (point e), the source driver 304 is set to high-impedance state under the control of the amplifier control circuit 305B. As a result, at or after the point the time interval t0 has passed, the potential of the data signal line 332 becomes in the floating state. Thereafter, the transparent common electrode 319 becomes free from fluctuation in potential, and thus the data signal line 332 and the pixel electrodes 327 also become free from fluctuations in potential. As a result, a high quality display without flicker noise can be achieved.

As described, under the control of the common driver 307 and the amplifier control circuit 305B, in the quiescent period T2, initially, the AC driving of the transparent common electrode 319 is stopped, and the source driver 304 is then set in the high-impedance state so as to reduce an amount of stationary current flowing through the amplifier in the source driver 304 in the quiescent period T2. As a result, it is possible to reduce required power consumption, and at the same time a high quality display without flicker noise can be achieved.

Figure 49:
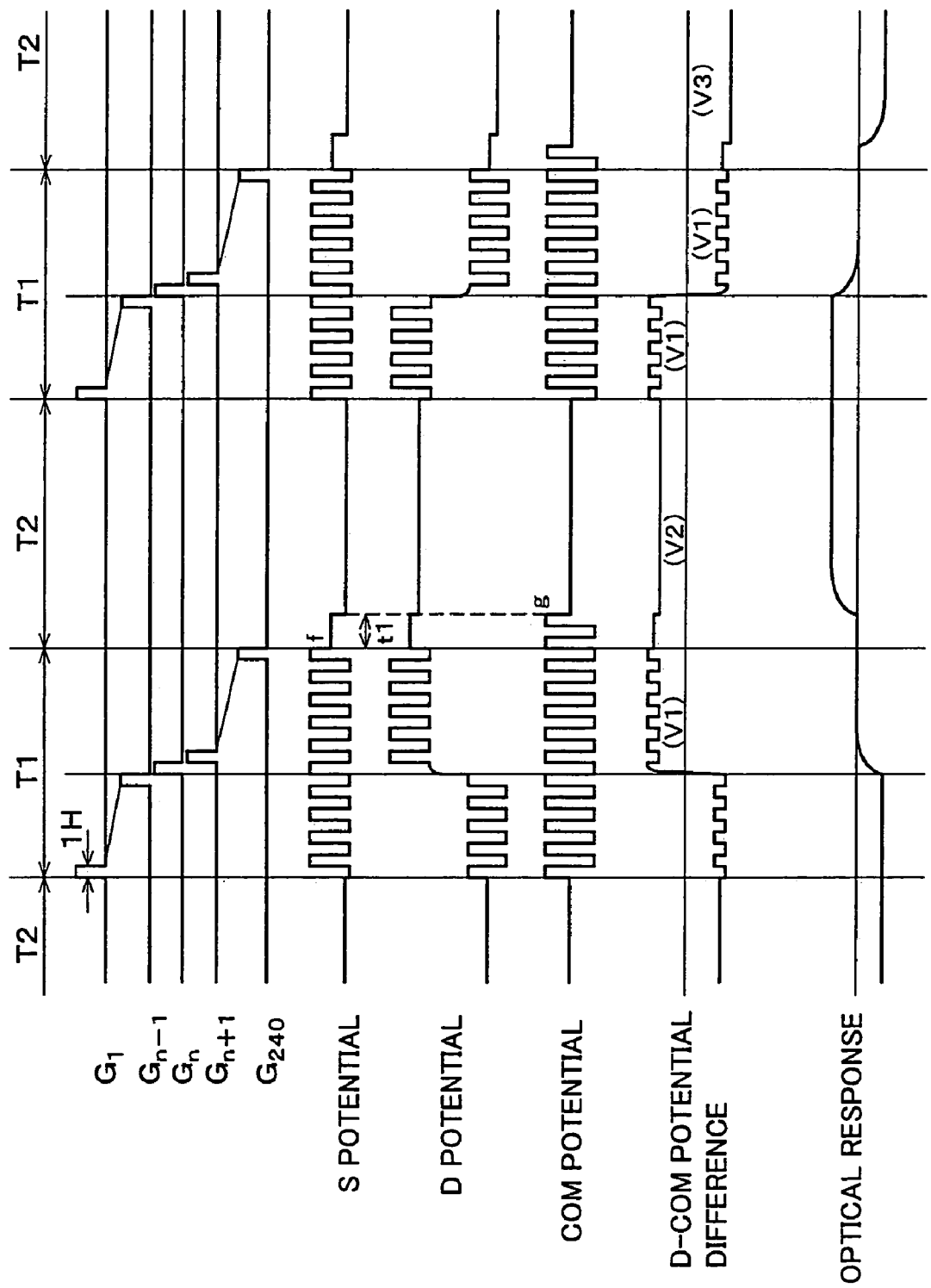
FIG. 49 is a time chart which explains a comparative example of a driving method of a display device illustrated in FIG. 46.

FIG. 49 shows timing charts indicative of driving waveform and optical response as a comparative example of FIG. 46 wherein in the quiescent period T2, after setting the data signal line 332 in the high-impedance state, the AC driving of the transparent common electrode 319 is stopped.

In the case of FIG. 49, by setting the source driver 4 in the high impedance state at a start of the quiescent period T2 (point f), the potential of the data signal line 332 becomes in the floating state. Then, the AC driving of the transparent common electrode 319 is stopped when a predetermined time t1 has passed (point g) to fix the transparent common electrode 319 at a predetermined potential, the potential of the data signal line 332 fluctuates as being attracted to the potential of the transparent common electrode 319, and further the potential of the pixel electrode 327 fluctuates as being attracted to the potential of the data signal line 332. According to the driving method of the foregoing comparative example, flicker noise generates each time switching between the scanning period T1 and the quiescent period T2.

Lastly, the liquid crystal display device 301 was driven by the method explained in FIG. 46. As a result, a desirable display without flicker noise was achieved. In this experiment, the respective potentials of the transparent common electrode 319 and the data signal line 332 in the quiescent period T2 were set to 1.5 V (amplitude within the range of from −1V to 4V in the scanning period T1), and 2V (amplitude within the range of from 0V to 4V in the scanning period T1).

[2] Secondly, the driving method of applying an AC voltage of lower frequency than that in the scanning period T1 to the data signal line 332 and/or transparent common electrode 319 in the quiescent period T2 will be explained in reference to FIGS. 50, and 56 through 58.

Figure 50:
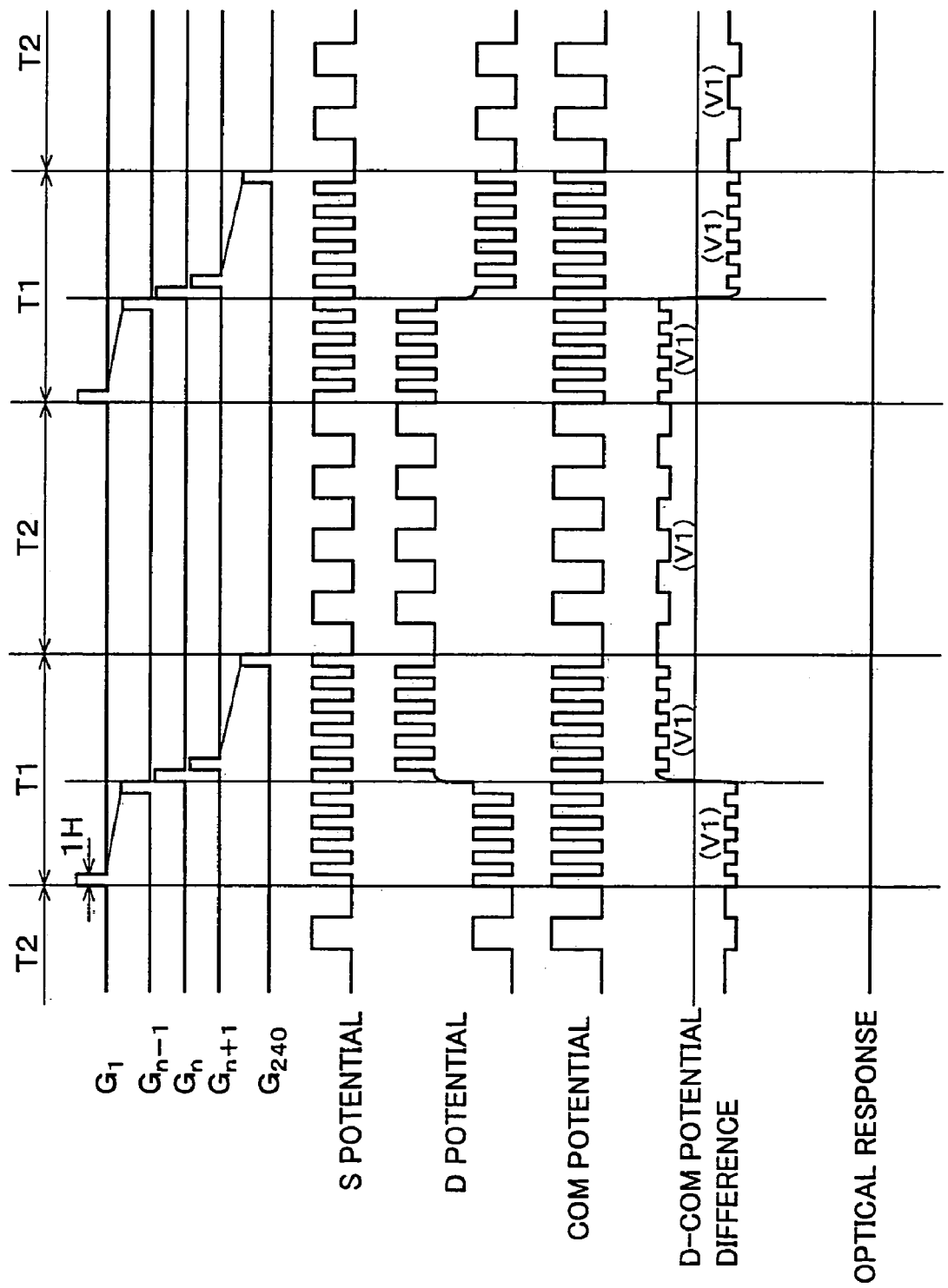
FIG. 50 is a time chart indicating respective driving signals and optical responses of a liquid crystal panel in the scanning period T1 and the quiescent period T2, which explains the driving method of a display device in accordance with still another embodiment of the present invention.

FIG. 50 shows timing charts indicating respective driving signals and optical responses of the liquid crystal panel 302 in the scanning period T1 and the quiescent period T2.

As shown in FIG. 50, in the scanning period T1, as the scanning signals ($G_1$ to $G_{240}$) and the data signals (S-potential), AC waveforms are applied according to display image. In order to reduce the amplitude of the output voltage of the source driver 304, the transparent common electrode 319 is AC driven by the common driver 307. The potential of the transparent common electrode 319 as well as S-potential are driven in the 1H reverse driving method by the common driver 307 in which the polarity of the transparent common electrode 319 is reversed for each horizontal scanning period (1H period).

In the quiescent period T2, under the control of the source driver 304 and the common driver 307, an AC voltage of low frequency which has a potential within a voltage range (between maximum potential and minimum potential) in the scanning period T1 is applied to the data signal line 332 and the transparent common electrode 319 respectively.

As a result, the effective value for a voltage to be applied to the liquid crystal layer 313 becomes equivalent between the scanning period T1 and the quiescent period T2. It is therefore possible to eliminate a flicker noise generated at every scanning period T1 in the conventional structure.

In the quiescent period T2, the frequencies of AC voltages to be supplied to the data signal line 322 and the transparent common electrode 319 in the quiescent period T2 are set to be not more than the frequency of the scanning period T1 in order to achieve a reduction in power consumption. In general, the smaller is the frequency, the more is preferable. However, if the frequency is too small, the liquid crystal molecule responds to the reversal of the electrode, which results in generation of another clicker noise. In the quiescent period T2, it is generally known that frequencies of the driving signals to be applied to the data signal line 332 and the transparent common electrode 319 are not less than 30 Hz, and more preferably not less than 45 Hz in order to achieve a display without a flicker noise.

Lastly, the liquid crystal display 301 was driven by the method illustrated in FIG. 50, as a result, desirable display free from flicker noise was obtained. In this experiment, the respective potentials and frequencies of the transparent common electrode 319 and the data signal line 332 in the quiescent period T2 were set to be equivalent to an amplitude within the range of from −1V to 4V in the scanning period T1, and 60 Hz and to an amplitude within the range of from 0V to 4V in the scanning period T1 and 60 Hz respectively.

Figure 56:
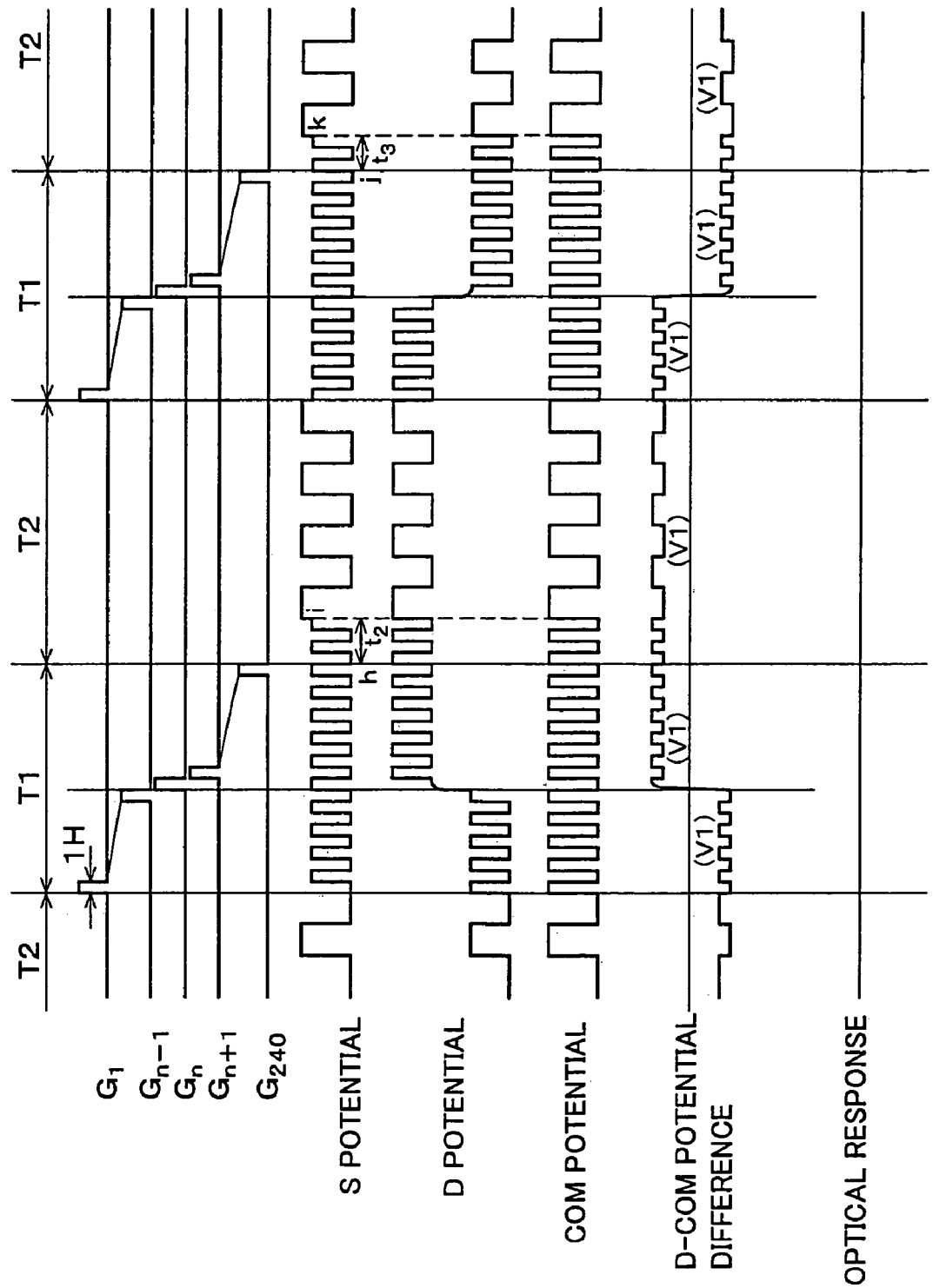
FIG. 56 is a timing chart indicating respective driving signals and optical responses of a liquid crystal panel in the scanning period T1 and the quiescent period T2, which explains the driving method of a display device in accordance with still another embodiment of the present invention.

As illustrated in FIG. 50, it is preferable that the amplitude of the AC voltage to be applied to the data signal line 332 and the transparent common electrode 319 in the quiescent T2 be set to the potential within the voltage range of the scanning period T1. However, the amplitude of the AC voltage to be supplied to the data signal line 332 in the quiescent period T2 may be set to potential above the maximum amplitude of the scanning period T1 as illustrated in FIG. 56.

In the following, the structure of the liquid crystal display device 301 to which an AC signal having a larger amplitude than a maximum amplitude in the scanning period T1 to the data signal lines 332 in the quiescent period T2 will be explained in reference to FIGS. 56 through 58.

Figure 57:
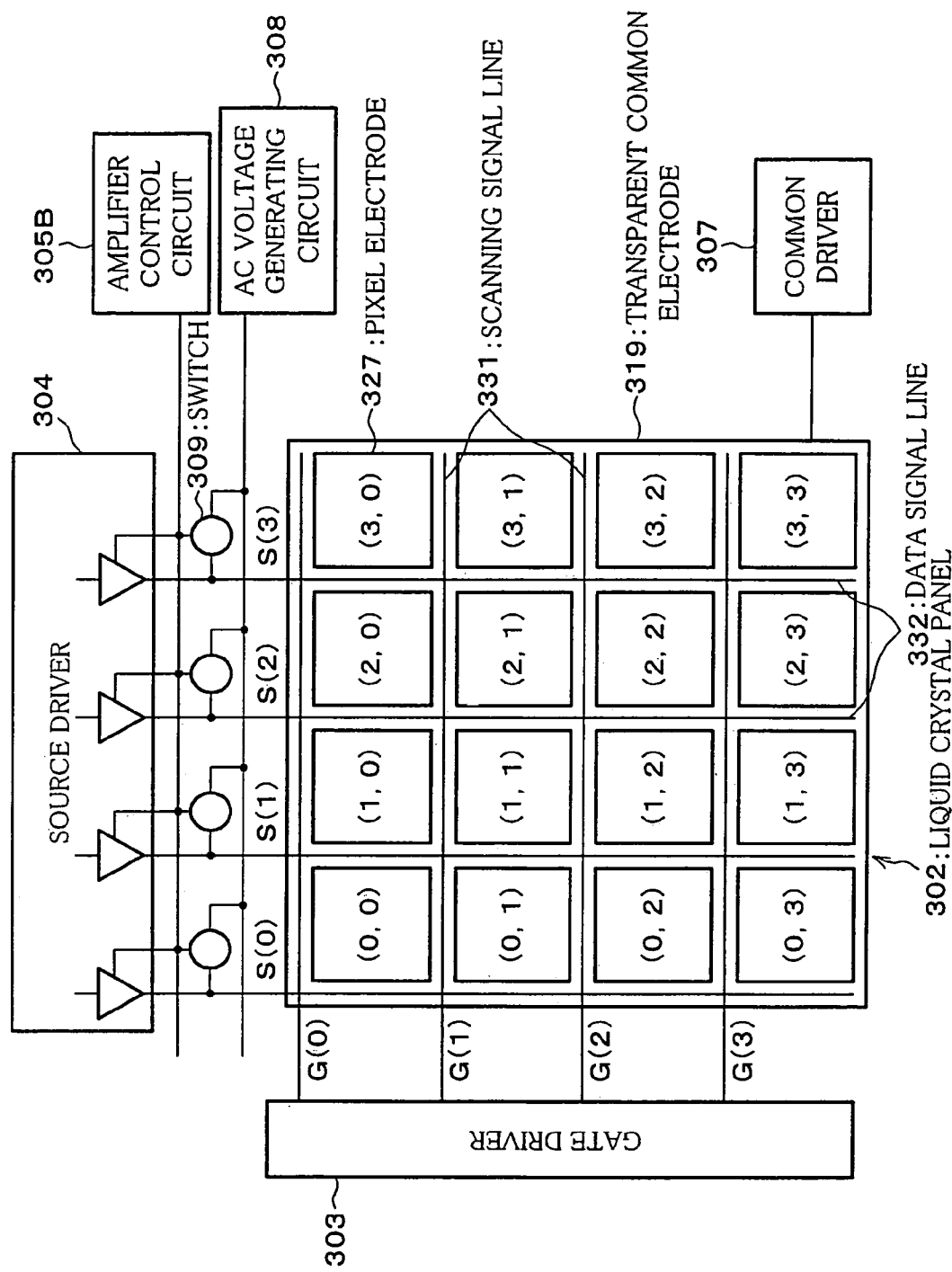
FIG. 57 is a block diagram illustrating a schematic structure of another liquid crystal display device adopting a driving method of a display device illustrated in FIG. 51.

The liquid crystal display device 301 illustrated in FIG. 57 is provided with an AC voltage generating circuit 308 and switches 309 in addition to the structure illustrated in FIG. 52.

The AC voltage generating circuit 308 is a circuit for generating an AC voltage to be supplied to the data signal lines 332 in the quiescent period T2. The frequency of the AC voltage to be generated is not more than the frequencies in the scanning period T1, and the smaller is the frequency, the more is preferable as in the case of FIG. 50. The amplitude of the AC voltage is set according to a driving signal of the transparent common electrode 319 in the quiescent period T2 so that an effective value for a potential of the pixel electrode 327 due to a difference between the D-potential and COM-potential becomes substantially constant between the scanning period T1 and the quiescent T2.

The switch 309 is provided between the source driver 304 and the liquid crystal panel 302 for each data signal line 332. Then, based on an amplifier control signal from the amplifier control circuit 305B, the switch 309 is switched so as to supply to the data signal lines 332 a driving signal from the source driver 304 in the scanning period T1 and a driving signal from the AC voltage generating circuit 308 in the quiescent period T2.

As a result, it is possible to supply a driving signal in the quiescent period T2 of the data signal line 332 from the AC voltage generating circuit 308, and to stop the source driver 304 in the quiescent period T2. As a result, a required power consumption for the source driver 304 in the quiescent period T2 can be reduced.

Furthermore, by setting the amplitude of the output voltage of the AC signal generating circuit 308 to the existing reference source voltage, i.e., the amplitude of 0V to 3V or 0V to 5V, an additional intermediate potential (for example, 4V) is not needed to be generated. With this arrangement, a loss in boost in voltage when generating an intermediate potential can be eliminated, and therefore loss in power can be eliminated, thereby realizing a further reduction in power consumption.

As illustrated in FIG. 56, when the scanning of one screen is completed, and the quiescent period T2 is started, it may be arranged so as to input the same driving signal as in the scanning period T1 for a predetermined period (continuous period). In FIG. 56, before the signals to be input to the data signal line 332 and the transparent common electrode 319 be come equivalent, at the beginning of the quiescent period T2, two continuous periods are provided for continuously inputting the same driving signal as the scanning period T1 (h–i period: t2=4H; j–k period: t3=3H). In the driving method illustrated in the timing chart of FIG. 56, two continuous periods alter for each frame. Here, these two continuous periods can be set as desired as long as they are sufficiently short for the quiescent period T2, and a difference (|t2−t3|) between them is an odd-number multiple (n×H (n=1, 3, 5, . . . )) in one horizontal scanning period.

As described, the liquid crystal display device 301 is arranged so as to supply data signal lines 332 and transparent common electrodes 319 while shifting a timing at which a driving signal for driving the data signal line 332 and the transparent common electrode 319 is switched to the same voltage by an odd number multiple of one horizontal period. It was confirmed that a still more stable display without flicker noise was obtained. In the driving method shown in FIG. 56, when the driving signals for driving the data signal line 332 and the transparent common electrode 319 are switched to the same voltage, the frequency is also switched to low frequency. However, the switching timing for the frequency is not limited to the foregoing, and it may be before or after the switching timing for the frequency.

The foregoing driving method of FIG. 56 was applied to the liquid crystal display device 301, as a result, a desirable display without flicker noise was obtained. In the quiescent period T2, the data signal line 332 is separated from the source driver, and is then connected to the AC voltage generating circuit 308, and an AC signal having a frequency of not less than 30 Hz, preferably not less than 45 Hz is applied. In the present embodiment, the frequency is set to 60 Hz by adopting a clock signal of one vertical period when scanning, amplitudes are set to 0 V and 5 V where potentials are reference source voltage.

Figure 58:
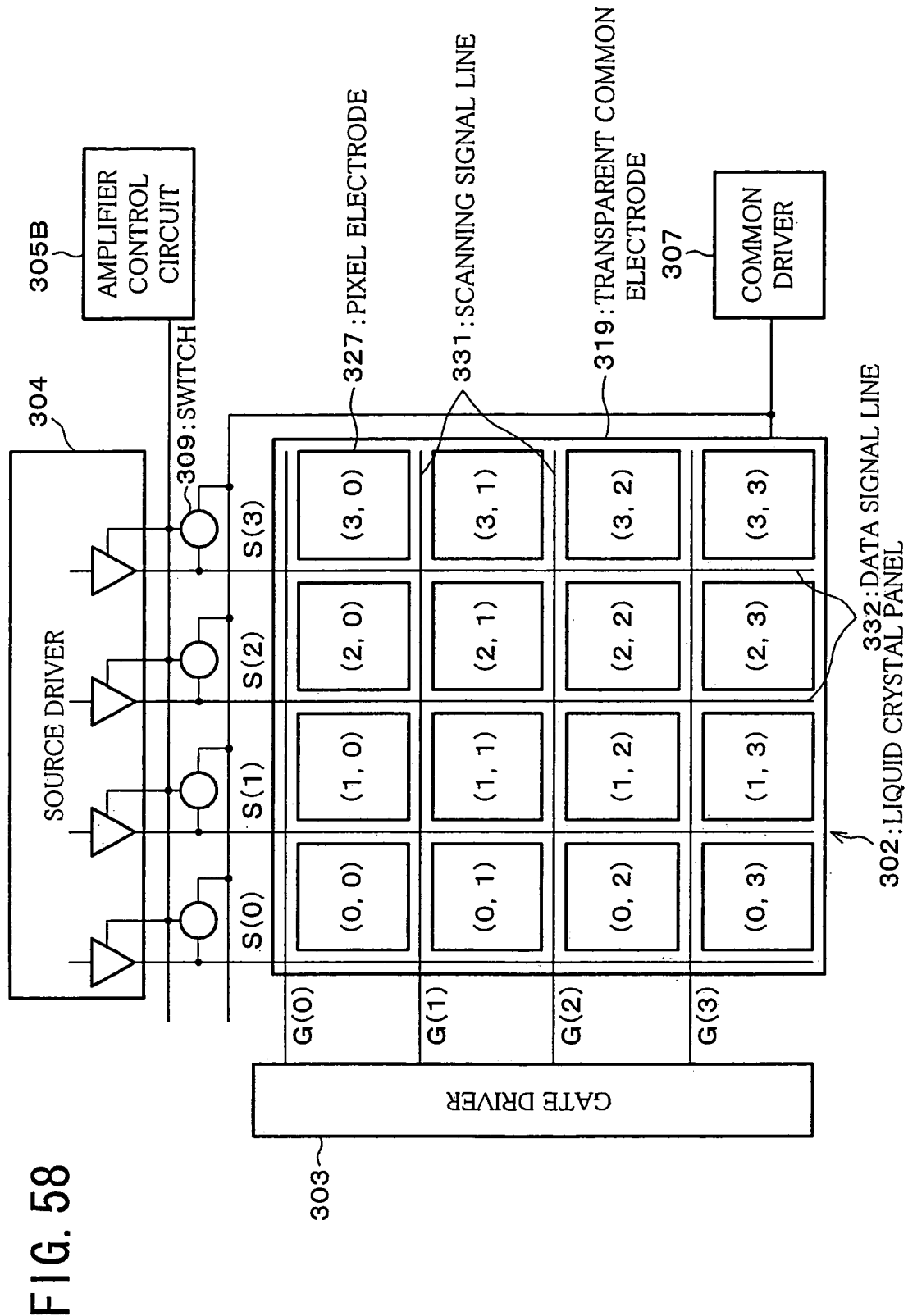
FIG. 58 is a block diagram illustrating a schematic structure of still another liquid crystal display device adopting a driving method of a display device illustrated in FIG. 51.

As illustrated in FIG. 58, it may be arranged such that the common driver 307 serves as the AC signal generating circuit 308. In the quiescent period T2, a driving signal from the common driver 307 may be supplied to the transparent common electrode (counter electrode) 319 and the data signal line 332. The amplitude of the driving signal in the quiescent period T2 may be the same as the amplitude of the driving signal to be applied to the transparent common electrode 319 in the scanning period T1, or to or below the maximum amplitude (i.e., within a voltage of the driving signal). Needless to mention, it may be arranged so as to supply in the quiescent period T2, a driving signal from the AC signal generating circuit 308 to the data signal line 332 and the transparent common electrode 319, and to stop the operations of the source driver 304 and the common driver 307 (not shown).

As a result, a common driving signal from the common driver 307 can be supplied to the transparent common electrode (counter electrode) 319 and the data signal line 332 in the quiescent period T2. With this arrangement, it is not necessarily to provide the AC signal generating circuit 308 for driving the data signal line 332 in the quiescent period T2, and it is therefore possible to prevent circuits in the liquid crystal display device 310 from being larger in size or complicated. In order to input a common driving signal to the data signal line 332 and the transparent common electrode 319, charge/discharge with respect to capacitance ($C_{cd}$ in FIG. 55) between the transparent common electrode 319 and the data signal line 332 is eliminated, and it is also possible to reduce power consumption.

In FIG. 56, a driving signal to be applied to the data signal line 332 in the quiescent period T2 is set to be equivalent to the driving signal to be applied to the transparent common electrode 319. As a result, the potential in the data signal line 332 fluctuates between the scanning period T1 and the quiescent period T2. To be precise, a slight difference occurs in effective value of D-COM potential difference.

However, in general, $C_{sd}/(C_{gd}+C_{sd}+C_{LC}+C_{CS})$ in FIG. 55 is set to around 1/20, and therefore, in practice, fluctuation in effective value is in the ignorable level. Therefore, the potentials in the data signal line 332 and the transparent common electrode 319 in the quiescent period T2 enable a desirable display without flicker noise in practice even when the value is varied within the range of ±1.0 V of the center of the amplitude in the scanning period T1.

In order to further reduce flicker noise, it is effective to increase a frequency of the driving signal to be applied in the quiescent period T2. In the driving method, a common potential is input to the source electrode and the common electrode, and thus charge/discharge is not generated between the source electrode and the common electrode. However, charge/discharge is generated between the gate electrode and the source electrode, and the gate electrode and the common electrode, and therefore by increasing the frequency, the effect of reducing the power consumption is lowered.

The relationship between the driving frequency and the perception limit for flicker noise in the quiescent period T2 was fully examined by the applicant of the present invention through experiments, and the results obtained in Table 8 were obtained. Therefore, in the present embodiment, the driving frequency in the quiescent period T2 of the data signal line 332 and the transparent common electrode 319 was set to 500 Hz at which it was completely impossible to percept flicker noise.

TABLE 8

| AC frequency to be applied in quiescent period T2 | Evaluation results on flicker noise by observation with eyes |
|---|---|
| 6 Hz | x |
| 12 Hz | x |
| 30 Hz | Δ |
| 45 Hz | Δ |
| 60 Hz | Δ |
| 120 Hz | Δ |
| 250 Hz | Δ |
| 500 Hz | ○ |
| 1 kHz | ○ |
| 10 kHz | ○ |

○: flicker noise was not perceptible.
Δ: flicker noise was partially perceptible.
x: flicker noise was perceptible.

The parameters ($C_{LC}$, $C_{CS}$, etc.,) of the liquid crystal panel 302 differ for the type of the liquid crystal panel 302, and optimal driving frequency differs for the liquid crystal panel of each kind. Then, for the display quality, the larger is the driving frequency, the more is preferable. On the other hand, for the power consumption, the smaller is the driving frequency, the more is preferable. The driving frequency of the quiescent period T2 is therefore optimized based on parameters, usage, etc., of the liquid crystal display panel 302. For example, the driving signal in the quiescent period T2 may have a driving frequency of "0", i.e., DC signal.

As described, according to the foregoing liquid crystal display device 301, in the structure having active elements, after the scanning period T1 for switching one screen, a quiescent period T2 longer than the scanning period T1 is provided, and respective potentials of the data signal line 332 and the transparent common electrode 319 in the quiescent period T2 are controlled to be optimized. As a result, a desirable display without flicker noise can be realized, and at the same time, a reduction in power consumption can be realized.

The foregoing method of driving the liquid crystal display device 301 is achieved by setting the respective potentials of the data signal line 332 and the transparent common electrode 319 in the quiescent period T2 to the center of the scanning period T1 when image data having a typical gradation distribution are input in the scanning period T1. However, it may be arranged so as to set a combination of potentials of the data signal line 332 and the transparent common electrode 319 based on the potential in the scanning period T1 directly before or further before the scanning period T1. Furthermore, in the case of reversing the polarity, such combination may be set in every other scanning periods T2.

The present invention is not intended to be limited to the foregoing preferred embodiment, and other variation may be equally adopted within the scope of the present invention as below-explained.

For example, the method of driving a display device of the present invention wherein a plurality of active elements are provided on only one of a pair of substrates which are disposed so as to face one another, a predetermined voltage is applied across the substrates via the plurality of active elements, so as to control the transmittance and reflectance of light may be arranged so as to provide a quiescent period, which is longer than the scanning period for scanning one screen, for setting all the scanning signal lines in non-scanning state after the scanning period, in which the potential of the counter electrode is fixed (not AC driven) in the quiescent period.

In the foregoing method of driving a display device, the potential of the counter electrode in the quiescent period may be selected within the amplitude of the counter signal voltage to be supplied in the scanning period.

The method of driving a display device of the present invention may be arranged such that the potential of the counter electrode in the quiescent period is set to substantially the center of the amplitude of the counter signal voltage to be supplied (for the liquid crystal display device, within ±1 V of the center of the amplitude) in the scanning period. As a result, a desirable display device of low power consumption can be achieved.

The method of driving a display device of the present invention wherein a plurality of active elements are provided on only one of a pair of substrates which are disposed so as to face one another, a predetermined voltage is applied across the substrates via the plurality of active elements, so as to control the transmittance and reflectance of light may be arranged so as to provide a quiescent period, which is longer than the scanning period for scanning one screen, for setting all the scanning signal lines in non-scanning state after the scanning period, in which the potential of the data signal line is fixed (AC driving is not performed) in the quiescent period.

In the foregoing method of driving a display device, the potential of the data signal line in the quiescent period may be selected within the amplitude of the data signal voltage to be supplied in the scanning period.

The foregoing method of driving a display device may be arranged such that the potential of the data signal line in the quiescent period is set to around a center of an amplitude (for the liquid crystal display device, within the range of ±1.5 V from the center of the amplitude) of the data signal line voltage supplied in the scanning period. As a result, a desirable display device of low power consumption can be achieved.

The foregoing method of driving a display device of the present invention may be arranged such that an output amplifier of the data signal driver is set in a high impedance state after stopping the AC driving of the counter electrode signal and the data signal line.

The method of driving a display device of the present embodiment wherein a plurality of active elements are provided on only one of a pair of substrates which are disposed so as to face one another, and a predetermined voltage is applied across the substrates via the plurality of active elements, so as to control the transmittance and reflectance of light may be arranged such that a quiescent period for setting all the scanning signal lines in non-scanning state after the scanning period is provided so as to be longer than the scanning period for scanning one screen, and in response to a driving signal to be applied in the scanning period, an AC voltage equivalent to the driving signal, which has a smaller frequency than the driving signal (for the liquid crystal display device, the frequency is not ½ of the driving signal and not less than 45 Hz) is applied to the counter electrode in the quiescent period. As a result, a desirable display device of low power consumption can be achieved.

The method of driving a display device of the present embodiment wherein a plurality of active elements are provided on only one of a pair of substrates which are disposed so as to face one another, and a predetermined voltage is applied across the substrates via the plurality of active elements, so as to control the transmittance and reflectance of light may be arranged such that a quiescent period for setting all the scanning signal lines in non-scanning state after the scanning period is provided so as to be longer than the scanning period for scanning one screen, and in response to a driving signal to be applied in the scanning period, an AC voltage of prescribed intermediate potential, which has a smaller frequency than the driving signal (for the liquid crystal display device, the frequency is not ½ of the driving signal and not less than 45 Hz) is applied to the data signal line in the quiescent period. As a result, a desirable display device free from flicker noise of low power consumption can be achieved. The foregoing method of driving a display device may be arranged such that respective AC voltages to be supplied to the counter electrode and the data signal line in the quiescent period oscillate in synchronous with one another.

The method of driving a liquid crystal device of the present invention which displays by selectively scanning each scanning signal line on a screen whereon pixels are arranged in a matrix form, and supplying a data signal from the data signal line to each of pixels connected to the line as selected; may be arranged such that a quiescent period for setting all the scanning signal lines in non-scanning state is provided subsequent to a scanning period for scanning a screen one time so as to be longer than the scanning period, wherein in the quiescent period, the data signal line is separated from the data signal driver, and is then connected to the AC signal generating circuit so as to apply to the data signal line an AC driving signal having a prescribed amplitude (for example, the same amplitude as the AC signal generating circuit) and a frequency of not more than that of the data signal. The amplitude of the driving signal to be supplied to the data signal line in the quiescent period is not limited to be within the range of a voltage in the scanning period. According to the foregoing method, in the quiescent period, the data signal line is separated from the data signal driver by means of a switch, and is then connected to the AC signal generating circuit, it is possible to terminate the data signal driver. A driving signal of the data signal line in the quiescent period may be supplied from the AC voltage generating circuit (common driver) for supplying a driving signal to the counter electrode.

As described, a method of driving a display device which displays by selecting and scanning each scanning signal line of a screen having pixels arranged in a matrix form and supplying through a data signal line a data signal to a corresponding pixel of the scanning signal line as selected, wherein:

subsequent to a scanning period required for scanning a screen one time, a quiescent period, in which all the scanning signal lines are set in non-scanning state, is formed so as to be longer than the scanning period, and in the quiescent period, a potential of the data signal line is set to a predetermined data signal line quiescent potential.

The method of driving a display device of the present invention may be arranged such that the data signal line quiescent potential in the quiescent period is set within a voltage of the data signal to be supplied to the data signal line in the scanning period.

The method of driving a display device of the present invention may be arranged such that the data signal line quiescent potential of the data signal line in a quiescent period is set to a center of an amplitude of a data signal to be supplied to the data signal line in the scanning period.

According to the foregoing method, the quiescent period which is longer than the scanning period is provided as a non-scanning period subsequent to the scanning period of rewriting one screen, and it is therefore possible to reduce the power consumption of the data signal line driver (source driver), which increases in proportion to the supply frequency of the data signal, with ease.

Further, by fixing the potential of the data signal line quiescent potential of the data signal line, it is possible to optimally control the potential of the data signal line in the quiescent period. Namely, between the scanning period and the quiescent period, it is possible to achieve the same effects of the potential of the data signal line onto the pixel electrodes. As a result, although the quiescent period is provided, by setting the effective value for the potential of the pixel electrode substantially constant, a display without flicker noise can be realized.

Therefore, the matrix-type display device which permits required power consumption to be significantly reduced, and in which flicker noise is suppressed to a sufficiently low level can be realized.

In the quiescent period, it is preferable that the data signal line quiescent potential for fixing the potential of the data signal line in the quiescent period is set within a range of a voltage of a data signal to be supplied to the data signal line in the scanning period. Further, it is more preferable that the quiescent potential of the data signal line is set to a center of the amplitude of the data signal to be supplied to the data signal line in the scanning period.

For the active matrix liquid crystal display, in practice a desirable display without flicker noise can be realized even if the potential of the data signal line in the quiescent period is varied within the range of ±1.5 V from the center of the amplitude in the scanning period.

The method of driving a display device which displays by selecting and scanning each scanning signal line of a screen having pixels arranged in a matrix form and supplying through a data signal line a data signal to a corresponding pixel of the scanning signal line as selected, is characterized in that:

subsequent to a scanning period required for scanning a screen one time, a quiescent period, in which all the scanning signal lines are set in non-scanning state, is formed so as to be longer than the scanning period, and in the quiescent period, a potential of the counter electrode is set to a predetermined counter electrode line quiescent period.

The method of driving a display device of the present invention may be arranged such that the counter electrode quiescent potential of the counter electrode in the quiescent period is set within a voltage of the counter electrode driving signal to be supplied to the counter electrode in the scanning period.

The method of driving a display device of the present invention may be arranged such that the quiescent potential of the counter electrode in the quiescent period is set to a center of an amplitude of a counter electrode driving signal to be supplied to the counter in the scanning period.

According to the foregoing method, even in the case of AC driving the counter electrode to reduce the amplitude of an output voltage of the data signal driver, by providing the quiescent period which is longer than the scanning period subsequent to the scanning period of rewriting one screen, it is possible to reduce the power consumption of the common electrode driver (common driver), which increases in proportion to the supply frequency of the data signal, with ease.

Further, by fixing the potential of the counter electrode at the prescribed counter electrode quiescent potential, it is possible to optimally control the potential of the counter electrode in the quiescent period. Namely, between the scanning period and the quiescent period, it is possible to achieve the same effects of the potential of the counter electrode onto the pixel electrodes. As a result, although the quiescent period is formed, by setting the effective value for the potential of the pixel electrode substantially constant, a display without flicker noise can be realized.

Therefore, in the matrix-type display device, a high quality display which permits required power consumption to be significantly reduced, and in which flicker noise is suppressed to a sufficiently low level can be realized.

In the quiescent period, it is preferable that the counter electrode quiescent potential for fixing the potential of the data signal line in the quiescent period be set within a range of a voltage of a data signal to be supplied to the counter electrode in the scanning period. Further, it is more preferable that the quiescent potential of the counter electrode is set to a center of the amplitude of the data signal to be supplied to the counter electrode in the scanning period.

For the active matrix liquid crystal display, in practice, a desirable display without flicker noise can be realized even if the potential of the data signal line in the quiescent period is varied within the range of ±1.0 V from the center of the amplitude in the scanning period.

The method of driving a display device of the present invention is arranged such that in the quiescent period, the potential of the data signal line is fixed at the potential of the data signal line, the potential of the counter electrode is fixed at the potential of the counter electrode quiescent period.

According to the foregoing method, by providing the quiescent period which is longer than the scanning period of rewriting one screen, subsequent to the scanning period, it is possible to reduce the power consumption, which increases in proportion to the frequencies of the driving signals to be supplied to the data signal line and the counter electrode, with ease.

Further, by fixing the respective potentials of the data signal line and the counter electrode in the quiescent period to the data signal line quiescent potential and the counter electrode quiescent potential, it is possible to control the respective potentials of the data signal line and the counter electrode in the quiescent period to be optimized. Namely, in the scanning period and the quiescent period, substantially equal effects of the potentials of the data signal line and the counter electrode on the pixel electrodes can be achieved. Here, respective data signal line quiescent potential and the counter electrode quiescent potential may be set such that the effective voltage between the pixel electrode and the counter electrode is substantially constant between the scanning period and the quiescent period. Therefore, even if the quiescent period is provided, by fixing the effective value of the potential of the pixel electrodes substantially constant, a desirable display without flicker noise can be achieved.

Therefore, in the matrix-type display device which realizes a significant reduction in required power consumption, and a high quality display in which flicker noise is suppressed to a sufficiently low level can be achieved.

The method of driving a display device of the present invention may be arranged such that in the quiescent period, after fixing the potential of the data signal line and the potential of the counter electrode to the data signal line quiescent potential and the counter electrode quiescent respectively, the data signal line is set to high impedance state with respect to the data signal line driver for supplying a data signal to the data signal line.

According to the foregoing structure, all the data signal lines are set to high impedance state in the quiescent period, for example, by separating all the data signal lines from the data signal driver, and it is possible to maintain the potential of each data signal line at a constant potential in the quiescent period.

It is therefore possible to suppress fluctuations in data holding state of each pixel caused by fluctuations in potential of the data signal line associated with the structure of the display device having pixel electrodes connected to the data signal lines, such as fluctuations in potential of pixel electrode due to capacitive bond between the data signal line and the pixel electrode, and to suppress a flicker noise in the screen to a sufficiently low level.

Therefore, in the matrix-type display device, a high quality display which permits required power consumption to be significantly reduced, and in which flicker noise is suppressed to a sufficiently low level can be realized.

The method of driving a display device which displays by selecting and scanning each scanning signal line of a screen having pixels arranged in a matrix form and supplying through a data signal line a data signal to a corresponding pixel of the scanning signal line as selected, wherein:

subsequent to a scanning period required for scanning a screen one time, a quiescent period, in which all the scanning signal lines are set in non-scanning state, is formed so as to be longer than the scanning period, and an AC driving signal, having a frequency of not more than that of the data signal to be supplied to the data signal line in the scanning period, is applied to the data signal line in the quiescent period.

The foregoing method of driving a liquid crystal display of the present invention may be arranged such that an amplitude of a driving signal to be applied to the data signal line in the quiescent period to be within a range of a voltage of a data signal to be supplied on to the scanning period.

According to the foregoing method, the quiescent period which is longer than the scanning period is provided as a non-scanning period subsequent to the scanning period of rewriting one screen, and it is therefore possible to reduce the power consumption of the data signal line driver (source driver), which increases in proportion to the supply frequency of the data signal, with ease.

Here, the upper limit for the frequency of a driving signal to be supplied to the data signal line in the quiescent period is not particularly limited as long as it is smaller than the driving signal of the scanning period, preferably not more than ½ and more preferably not more than 1/10 of the frequency of the driving signal. The lower limit for the frequency of the driving signal to be supplied to the data signal line in the quiescent period is selected to be not less than 30 Hz, more preferably not less than 45 Hz. By setting the frequency in the prescribed range, a desirable display without flicker noise can be obtained.

Furthermore, by selecting the driving signal to be supplied to the data signal line in the quiescent period to have an amplitude within a voltage of a data signal to be supplied to the data signal line in the scanning period and have a frequency of not more than that of the data signal line, it is possible to control the potential of the data signal line in the quiescent period to be optimized. Namely, in the scanning period and the quiescent period, substantially equal effects of the potentials of the data signal line and the counter electrode on the pixel electrodes can be achieved. Therefore, even if the quiescent period is provided, by fixing the effective value of the potential of the pixel electrodes substantially constant, a desirable display without flicker noise can be achieved.

Therefore, in the matrix-type display device, a high quality display which permits required power consumption to be significantly reduced, and in which flicker noise is suppressed to a sufficiently low level can be realized.

The method of driving a display device of the present invention, which displays by selecting and scanning each scanning signal line of a screen having pixels arranged in a matrix form and supplying through a data signal line a data signal to a corresponding pixel of the scanning signal line as selected, wherein subsequent to a scanning period required for scanning a screen one time, a quiescent period, in which all the scanning signal lines are set in non-scanning state, is formed so as to be longer than the scanning period, and an AC driving signal, which is within a range of a voltage of a counter electrode driving signal to be supplied to said counter electrode in the scanning period and which has a frequency of not more than that of the counter electrode driving signal, is applied to the counter electrode in the quiescent period.

According to the foregoing method, even in the case of AC driving the counter electrode to reduce the amplitude of an output voltage of the data signal driver, by providing the quiescent period which is longer than the scanning period subsequent to the scanning period of rewriting one screen, and selecting the frequency of the driving signal to be supplied to the counter electrode to be smaller than that in the scanning period, it is possible to reduce the power consumption of the common electrode driver (common driver), which increases in proportion to the supply frequency of the counter electrode driving signal, with ease.

Furthermore, by selecting the driving signal to be supplied to the counter electrode in the quiescent period to have an amplitude within a voltage of a counter electrode driving signal to be supplied to the counter electrode in the scanning period and have a frequency of not more that of the counter electrode driving signal, it is possible to control the potential of the counter electrode in the quiescent period to be optimized. Namely, between the scanning period and the quiescent period, it is possible to achieve the same effects of the potential of the data signal line onto the pixel electrodes. As a result, although the quiescent period is provided, by setting the effective value for the potential of the pixel electrode substantially constant, a display without flicker noise can be realized.

Therefore, in the matrix-type display device, a high quality display which permits required power consumption to be significantly reduced, and in which flicker noise is suppressed to a sufficiently low level can be realized.

Here, the upper limit for the frequency of a driving signal to be supplied to the counter electrode in the quiescent period is not particularly limited as long as it is smaller than the driving signal of the scanning period, preferably not more than ½ and more preferably not more than 1/10 of the frequency of the driving signal. The lower limit for the frequency of the driving signal to be supplied to the counter electrode in the quiescent period is selected to be not less than 30 Hz, more preferably not less than 45 Hz. By setting the frequency in the prescribed range, a desirable display without flicker noise can be obtained.

The foregoing method of driving a display device of the present invention may be arranged such that in the quiescent period, AC driving signals are applied to the data scanning line and the counter electrode respectively, wherein the respective driving signals have the same frequency and phase.

According to the foregoing method, by providing the quiescent period which is longer than the scanning period subsequent to the scanning period of rewriting one screen, it is possible to reduce the power consumption, which increases in proportion to the frequency of a driving signal to be supplied to the data signal line and the counter electrode, with ease.

Furthermore, by driving the data signal line and the counter electrode in the quiescent period with driving voltages having an amplitude within a voltage of respective driving signals to be supplied in the scanning period and having a frequency of not more that of the respective driving signals, it is possible to control respective potentials of the data signal line and the counter electrode in the quiescent period to be optimized. Namely, in the scanning period and the quiescent period, substantially equal effects of the potentials of the data signal line and the counter electrode on the pixel electrodes can be achieved. Here, the amplitude and the frequency of respective driving signals to be supplied to the data signal line and the counter electrode in the quiescent period may be set so as to have the same effective voltage across the pixel electrode and the counter electrode between the scanning period and the quiescent period. It is preferable that respective driving signals to be supplied to the data signal line and the counter electrode in the quiescent period be in phase synchronous with one another. Therefore, even if the quiescent period is provided, by fixing the effective value of the potential of the pixel electrodes substantially constant, a desirable display without flicker noise can be achieved.

Therefore, in the matrix-type display device, a high quality display which permits required power consumption to be significantly reduced, and in which flicker noise is suppressed to a sufficiently low level can be realized.

As described, the method of driving a display device of the present invention may be arranged so as to fix the potentials of the data signal line and the counter electrode to the data signal line quiescent potential and to the counter electrode quiescent potential in the quiescent period respectively, or to apply an AC driving signals to the data signal line and the counter electrode. The foregoing method of driving a display device of the present invention may be arranged so as to fix the potential of the data signal line to the data signal line quiescent period, and to apply an AC driving signal to the counter electrode to the AC driving signal, or so as to fix the potential of the counter electrode to the counter electrode quiescent period according to a driving signal of an AC data signal line.

The method of driving a display device of the present invention which displays by selecting and scanning each scanning signal line of a screen having pixels arranged in a matrix form and supplying through a data signal line a data signal to a corresponding pixel of the scanning signal line as selected, wherein: subsequent to a scanning period required for scanning a screen one time, a quiescent period, in which all the scanning signal lines are set in non-scanning state, is formed so as to be longer than the scanning period, and an AC driving signal, which is within a range of a voltage of a counter electrode driving signal to be supplied to said counter electrode in the scanning period and which has a frequency of not more than that of the counter electrode driving signal, is applied to the counter electrode in the quiescent period.

According to the foregoing method, in the quiescent period, the data signal line is separated from the data signal driver by means of a switch, and is then connected to the AC signal generating circuit, it is possible to terminate the data signal driver. A driving signal of the data signal line in the quiescent period may be supplied from the AC voltage generating circuit (common driver) for supplying a driving signal to the counter electrode.

The method of driving a display device of the present invention which displays by selecting and scanning each scanning signal line of a screen having pixels arranged in a matrix form and supplying through a data signal line a data signal to a corresponding pixel of the scanning signal line as selected, wherein subsequent to a scanning period required for scanning a screen one time, a quiescent period, in which all the scanning signal lines are set in non-scanning state, is formed so as to be longer than the scanning period, and a DC driving signal, which is within a range of a voltage of a counter electrode driving signal to be supplied to said counter electrode in the scanning period and which has a frequency of not more than that of the counter electrode driving signal, is applied to the counter electrode in the quiescent period.

According to the foregoing method, the quiescent period which is longer than the scanning period is provided as a non-scanning period subsequent to the scanning period of rewriting one screen, and it is therefore possible to reduce the power consumption of the data signal line and the counter electrode which increase in proportion to the supply frequency of the driving signals with ease.

By driving the data signal line and the counter electrode in the quiescent period, with an AC driving signal having a frequency of not less than the counter electrode driving signal to be supplied to the counter electrode in the scanning period and a frequency of not more than a counter electrode driving signal or a DC driving signal having a potential within the voltage of the counter electrode driving signal, it is possible to optimally control a difference in potential between the data signal line and the counter electrode in the quiescent period. Namely, between the scanning period and the counter electrode, substantially the same effects of respective potentials of the data signal line and the counter electrode onto pixel electrodes can be achieved.

According to the foregoing method, the respective driving signals to be supplied to the data signal line and the counter electrode in the quiescent period have almost the same amplitudes and phases. Therefore, even if the quiescent period is provided, by fixing the effective values for the potential of the pixel electrodes substantially constant, a desirable display without flicker noise can be achieved.

Additionally, in the quiescent period, it is possible to supply respective driving signals to the data signal line to the counter electrode by means of AC signal generating circuit (common driver) for supplying driving signals, required power consumption can be reduced by terminating the data signal line driver by separating it from the data signal line in the quiescent period.

Therefore, in the matrix-type display device, a high quality display which permits required power consumption to be significantly reduced, and in which flicker noise is suppressed to a sufficiently low level can be realized.

For the active matrix liquid crystal display, in practice, a desirable display without flicker noise can be realized even if the potential of the data signal line in the quiescent period is varied within the range of ±1.0V from the center of the amplitude in the scanning period.

The display device of the present invention is provided with control means for executing the driving method.

According to the foregoing structure, in the matrix-type display device, a high quality display which permits required power consumption to be significantly reduced, and in which flicker noise is suppressed to a sufficiently low level can be realized. For example, according to the liquid crystal display device, in the structure having active elements, low power consumption can be realized while maintaining desirable display quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

INDUSTRIAL APPLICABILITY

As described, the display device and the method of driving the display device of the present invention are applicable to liquid crystal display devices of TFT system or reflective type or reflective-transmission type, or other display devices such as EL display devices. The display device of the present invention are applicable to various electronic devices such as portable telephones, pocket-size game machines, PDA (Personal Digital Assistants), portable televisions, remote controllers, note-type personal computers, or other portable devices. The foregoing portable devices are driven using battery, and by adopting the display device of the present invention which realizes reduced power consumption while maintaining desirable display quality which is free from flicker noise, it is possible to drive them for a longer period of time with ease.

The invention claimed is:

1. A display device provided with a display element of an active matrix type comprising:
scanning signal lines for supplying thereto scanning signals from a scanning signal driver;
data signal lines for supplying thereto data signals from a data signal driver by AC driving; and
pixels connected to said scanning signal lines and said data signal lines, each of said pixels including a predetermined electric capacitance in which a charge, which determines a display state as an active element is periodically set in a selection state, is written via the active element based on a scanning signal and a data signal,
wherein each of said pixels includes an auxiliary capacitance formed with respect to the electric capacitance in such a manner that a capacitive bond is not generated between an electrode of the auxiliary capacitance and a corresponding one of said scanning signal lines,
said display device further comprising:
frequency setting means capable of setting a rewriting frequency, which determines a cycle of writing the charge, to be not more than 30 Hz.

2. The display device as set forth in claim 1, wherein:
said rewriting frequency is within a range of from not less than 0.5 Hz to not more than 30 Hz.

3. The display device as set forth in claim 1, wherein:
said rewriting frequency is within a range of from not less than 1 Hz to not more than 15 Hz.

4. The display device as set forth in claim 1, wherein:
said frequency setting means is also capable of setting a rewriting frequency to be not less than 30 Hz.

5. The display device as set forth in claim 1, wherein:
said frequency setting means is capable of setting a plurality of frequencies for said rewriting frequency.

6. The display device as set forth in claim 5, wherein:
the plurality of frequencies for said rewriting frequency are integer multiplies of a smallest one of the plurality of frequencies for said rewriting frequency respectively.

7. The display device as set forth in claim 5, wherein:
the plurality of frequencies for said rewriting frequency are integer powers of the number 2 of multiples of the number 2 of a smallest rewriting frequency respectively.

8. The display device as set forth in claim 5, wherein: at least a smallest frequency of the plurality of frequencies for said rewriting frequency is a multiple of an integer of not less than 2 of a refresh frequency for updating a display content of said display element.

9. The display device as set forth in claim 8, wherein:
upon updating the refresh frequency, said frequency setting means is capable of setting at least a smallest frequency of the plurality of frequencies for said rewriting frequency according to the refresh frequency as updated.

10. The display device as set forth in claim 5, wherein:
a smallest frequency of the plurality of frequencies for said rewriting frequency is an integer, of not less than 2 Hz.

11. The display device as set forth in claim 1, wherein:
said display element is a liquid crystal display element including an electric capacitance formed by interposing liquid crystal between a pixel electrode and a counter electrode, and an auxiliary capacitance formed corresponding to the electric capacitance, said liquid crystal display element having a pixel voltage holding ratio P satisfying the condition of:

$$V_1 = V - \{V \cdot (1 - Hr(T)) \times C_{LC}/(C_{LC} + C_{CS})\}$$

$$P = V_1 \cdot \exp[-T/\{(C_{LC} + C_{CS}) \cdot R\}]/V 0.9,$$

wherein $C_{LC}$ is the electric capacitance, $C_{CS}$ is the auxiliary capacitance, T is anon-elective period of the active element, Hr (T) is a liquid crystal voltage holding ratio after the non-selection period of T at the rewriting frequency, V is a potential difference between the pixel electrode and the counter electrode directly after writing, and R is a resistance value of the active element in the non-selection period.

12. The display device as set forth in claim 1, wherein:
said display element is a liquid crystal display element including an electric capacitance formed by interposing liquid crystal between a pixel electrode and a counter electrode, and
said pixel electrode is formed so as to at least partially face a scanning signal line of pixels connected to a line adjacent, in a fixed direction along the scanning direction, to a line to which a pixel of said pixel electrode is connected.

13. The display device as set forth in claim 1, wherein:
the display element is a liquid crystal display element including an electric capacitance formed by interposing liquid crystal between a pixel electrode and a counter electrode, and
said pixel electrode is a non-transmissive type electrode, which is formed so as to at least partially face active elements of pixels connected to a line adjacent in a fixed direction along a scanning direction to a line to which a pixel of said electrode is connected.

14. The display device as set forth in claim 13, wherein:
said liquid crystal display element further includes an active element light-shielding layer for shielding active elements of one of the lines effective for display, which is formed on a starting point side in a fixed direction.

15. The display device as set forth in claim 14, wherein:
said liquid crystal display element further includes an anti-reflected light-shielding layer for preventing a reflected light from said active element light-shielding layer from being returned onto a display surface of said liquid crystal display element.

16. The display device as set forth in claim 14, wherein:
said active element light-shielding layer is an electrode formed in such a manner that liquid crystal is interposed between said electrode and said counter electrode, and
an AC voltage is applied between said active element light-shielding layer and said counter electrode.

17. The display device as set forth in claim 16, wherein:
the liquid crystal display element includes a line of pixels wherein said active element light-shielding layer is adopted as pixel electrodes, said line of pixels being formed on outer side than a line formed at an end on a starting point side in the fixed direction.

18. The display device as set forth in claim 1, wherein:
said display element is a liquid crystal display element including an electric capacitance formed by interposing liquid crystal between said pixel electrode and said counter electrode, and
said liquid crystal display element further includes a light-shielding layer formed so as to least partially face, from a display surface side, respective sides of said pixel electrodes, positioned on a side closer to a starting point of an alignment process.

19. The display device as set forth in claim 1, wherein:
the display element is a liquid crystal display element including an electric capacitance formed by interposing liquid crystal between a pixel electrode and a counter electrode, and
a surface in contact with a portion treated with an alignment process of said pixel electrodes, excluding an area electrically in contact with the active elements, has a level difference of not more than 0.6 μm.

20. The display device as set forth in claim 1, wherein:
said display element is a liquid crystal display element having an electric capacitance formed by interposing liquid crystal between a pixel electrode and a counter electrode, and
a portion around respective sides of said pixel electrodes, positions on a side closer to a starting point of an alignment process is constituted by a transparent electrode.

21. The display device as set forth in claim 1, wherein:
said display element is a liquid crystal display element including an electric capacitance formed by interposing liquid crystal between a pixel electrode and a counter electrode, and
a direction of applying an alignment treatment to a substrate on the side active elements are formed is substantially parallel to the scanning signal lines.

22. The display device as set forth in claim 11, wherein:
said liquid crystal display element includes a reflective member which realizes a reflective-type display using surrounding light.

23. The display device as set forth in claim 22, wherein:
said reflective member constitutes at least a part of said pixel electrode.

24. The display device as set forth in claim 23, wherein:
said reflective member either has a hole for transmitting therethrough light or is semi-transparent.

25. An electronic device adopting said display device of claim 1.

* * * * *

UNITED STATES PATENT AND TRADEMARK OFFICE
Certificate

Patent No. 7,286,108 B2                                                              Patented: October 23, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is:
Kazuhiko Tsuda, Ikoma-gun (JP); Masahiro Shimizu, Tenri (JP); Hisakayu Nakamura, Yamatokoriyama (JP); Kouji Kumada, Tenri (JP); Takashige Ohta, Yamatokorivan (JP); Yutaka Kamezaki, deceased (JP); Hitoshi Kamezaki, Legal Representative (JP); and Masano Kamezaki, Legal Representative (JP).

Signed and Sealed this Seventh day of April 2009.

<div align="right">

SUMATI LEFKOWITZ
*Supervisory Patent Examiner*
Art Unit 2629

</div>